| DIVIDEND HIGH ORDER DIGIT | | | | | | | | | | |
|---|---|---|---|---|---|---|---|---|---|---|
| | 1 | 2 | 3 | 4 | 5 | 6 | 7 | 8 | 9 | |
| 1 | 1 | 2 | 2 | 2 | 5 | 5 | 5 | 5 | 5 | |
| 2 | .5 | 1 | 1 | 2 | 2 | 2 | 2 | 2 | 2 | |
| 3 | .5 | .5 | 1 | 1 | 2 | 2 | 2 | 2 | 2 | |
| 4 | .2 | .5 | .5 | 1 | 1 | 1 | 2 | 2 | 2 | |
| 5 | .2 | .5 | .5 | .5 | 1 | 1 | 1 | 2 | 2 | |
| 6 | .2 | .5 | .5 | .5 | .5 | 1 | 1 | 1 | 1 | |
| 7 | .2 | .2 | .5 | .5 | .5 | 1 | 1 | 1 | 1 | |
| 8 | .2 | .2 | .5 | .5 | .5 | .5 | 1 | 1 | 1 | |
| 9 | .2 | .2 | .5 | .5 | .5 | .5 | 1 | 1 | 1 | |
| DIVISOR HIGH ORDER DIGIT | | | | | | | | | | TABLE LOOKUP-DIVISION |

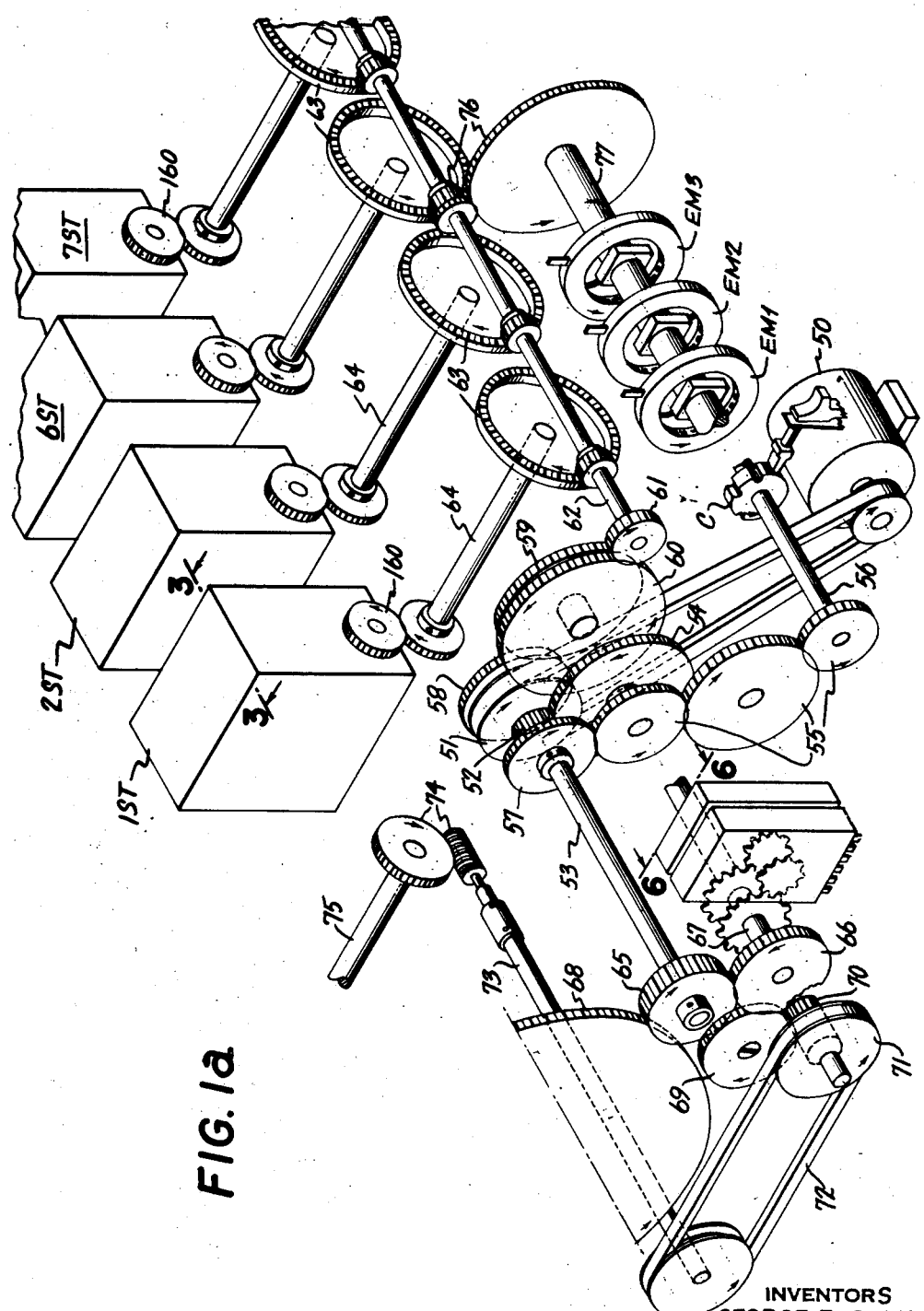

INVENTORS
GEORGE F. DALY
FRANCIS V. ADAMS
BY
Robert L. Dunham
ATTORNEY

Nov. 24, 1953        G. F. DALY ET AL        2,660,373
                     CALCULATING PUNCH

Filed Oct. 8, 1948                    61 Sheets-Sheet 3

INVENTORS
GEORGE F. DALY
BY FRANCIS V. ADAMS
Robert L. Dunham
ATTORNEY

Nov. 24, 1953

G. F. DALY ET AL 2,660,373

CALCULATING PUNCH

Filed Oct. 8, 1948

INVENTORS
GEORGE F. DALY
BY FRANCIS V. ADAMS
Robert S. Dunham
ATTORNEY

Nov. 24, 1953                G. F. DALY ET AL                2,660,373
                             CALCULATING PUNCH
Filed Oct. 8, 1948                                    61 Sheets-Sheet 5

INVENTORS
GEORGE F. DALY
BY FRANCIS V. ADAMS
Robert L. Dunham
ATTORNEY

Nov. 24, 1953  G. F. DALY ET AL  2,660,373
CALCULATING PUNCH
Filed Oct. 8, 1948  61 Sheets-Sheet 6
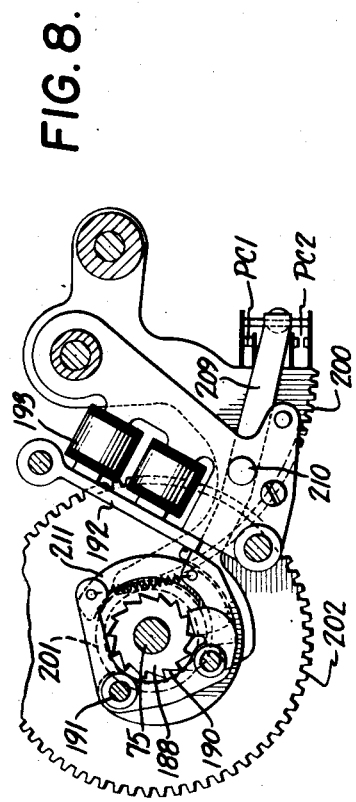
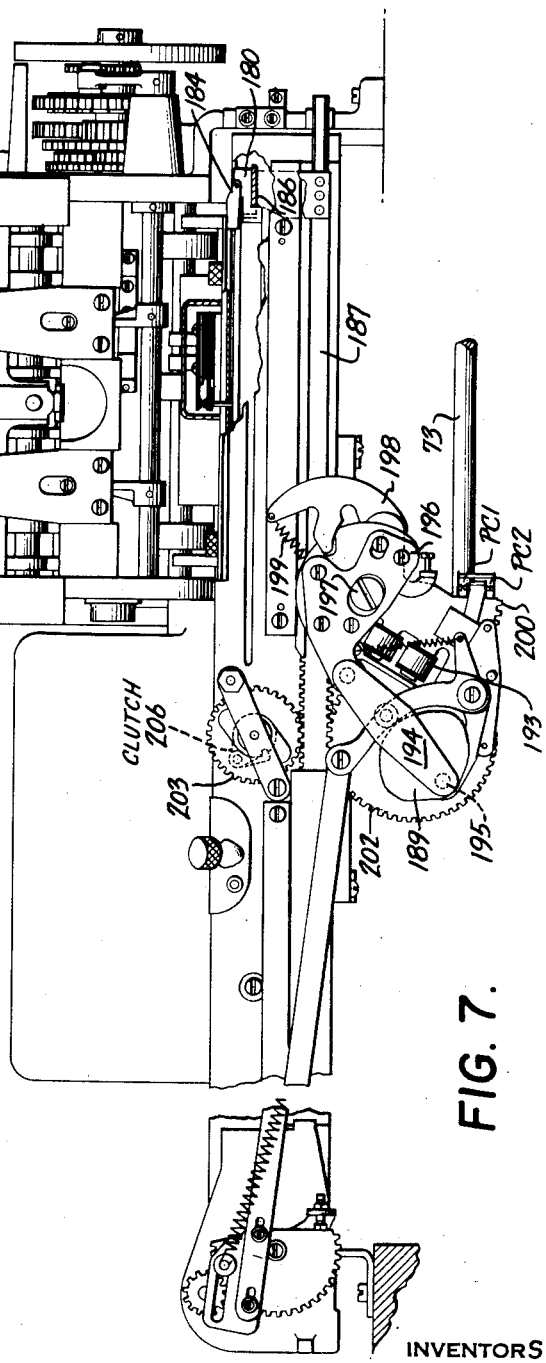
INVENTORS
GEORGE F. DALY
BY FRANCIS V. ADAMS
Robert S. Dunham
ATTORNEY

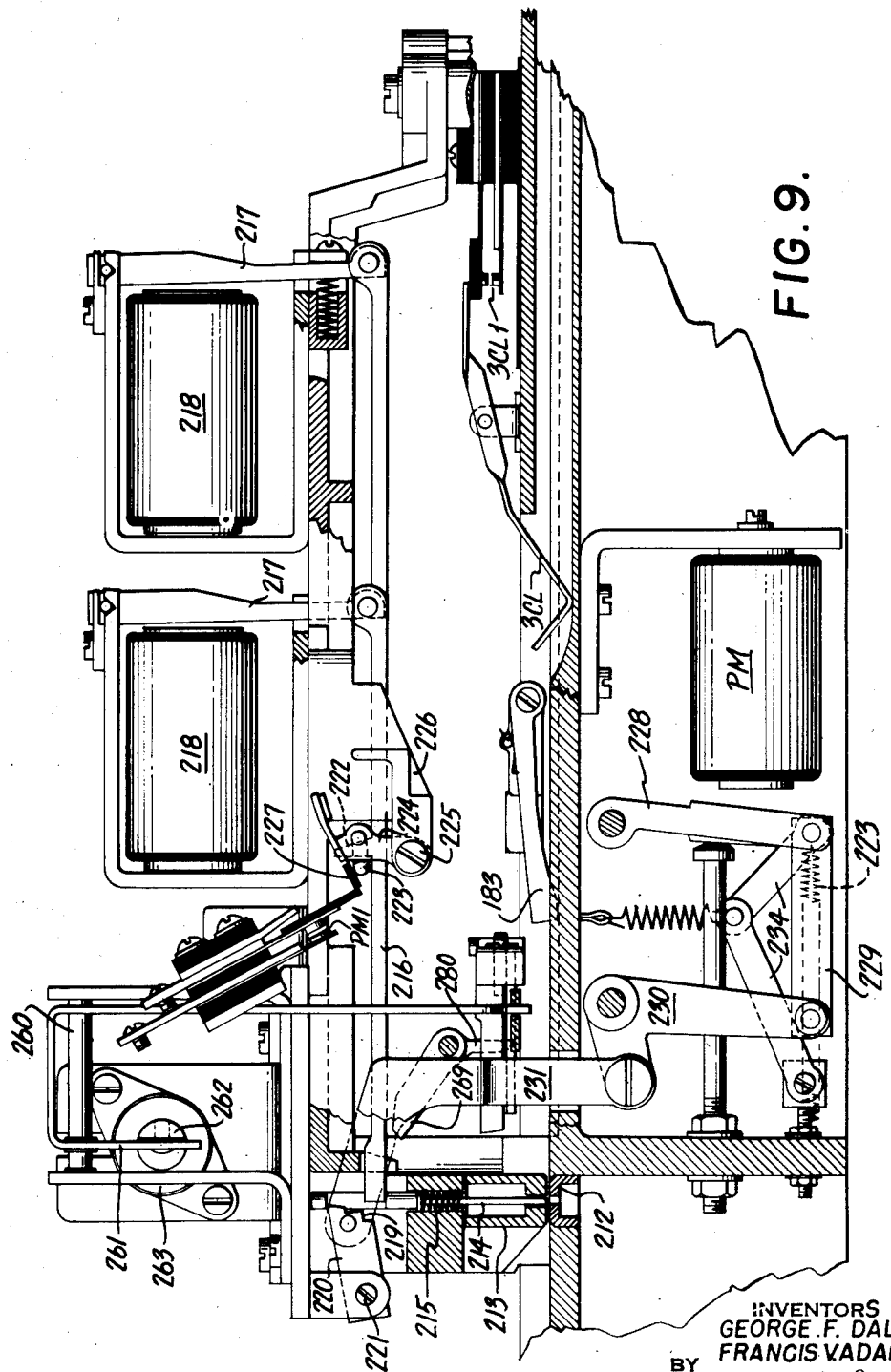

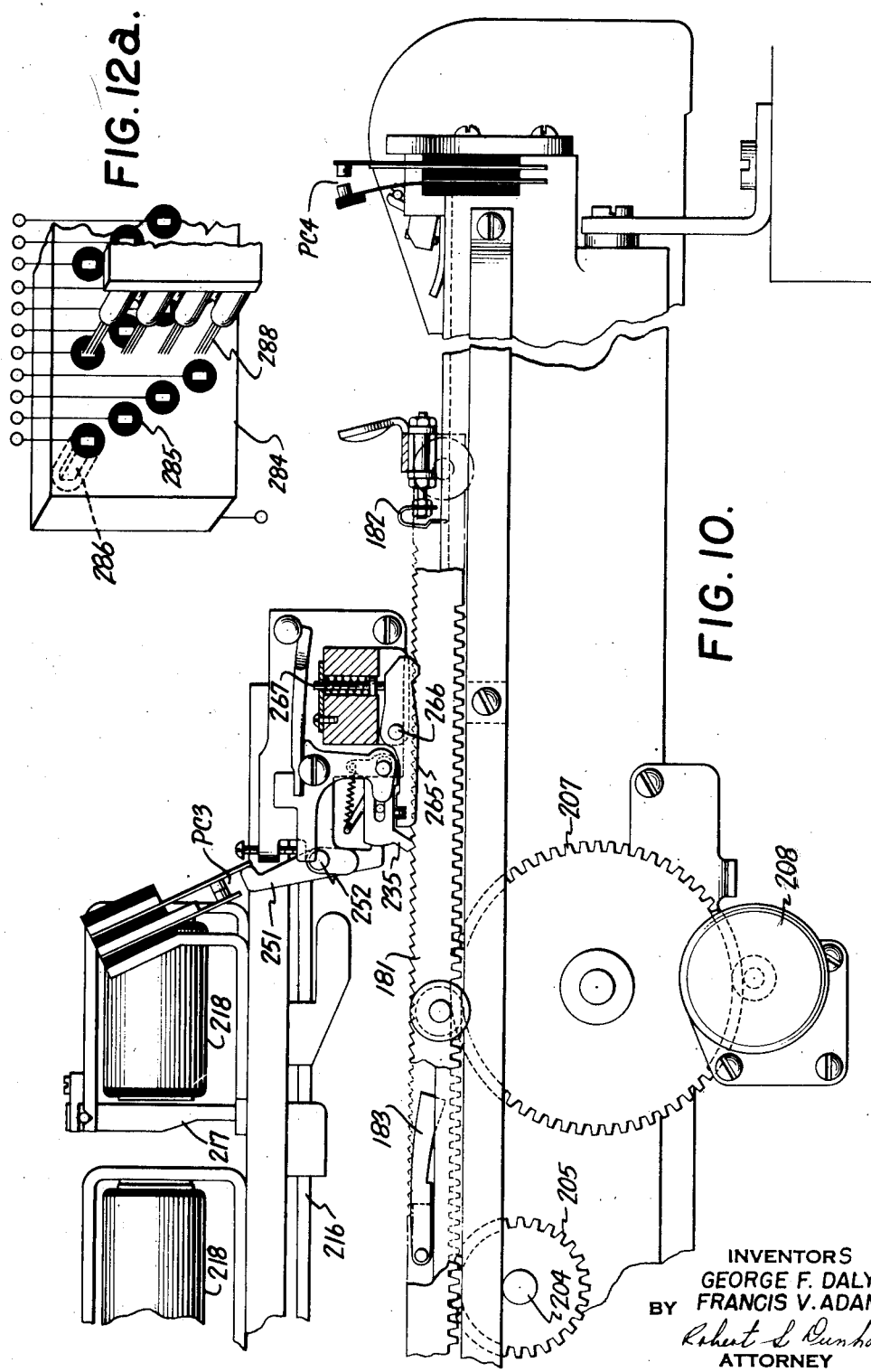

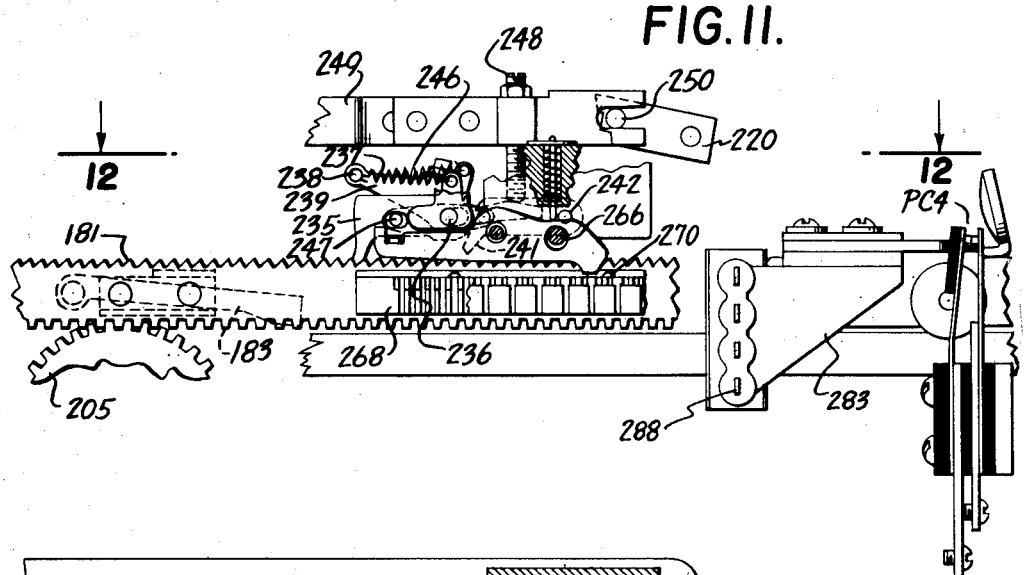
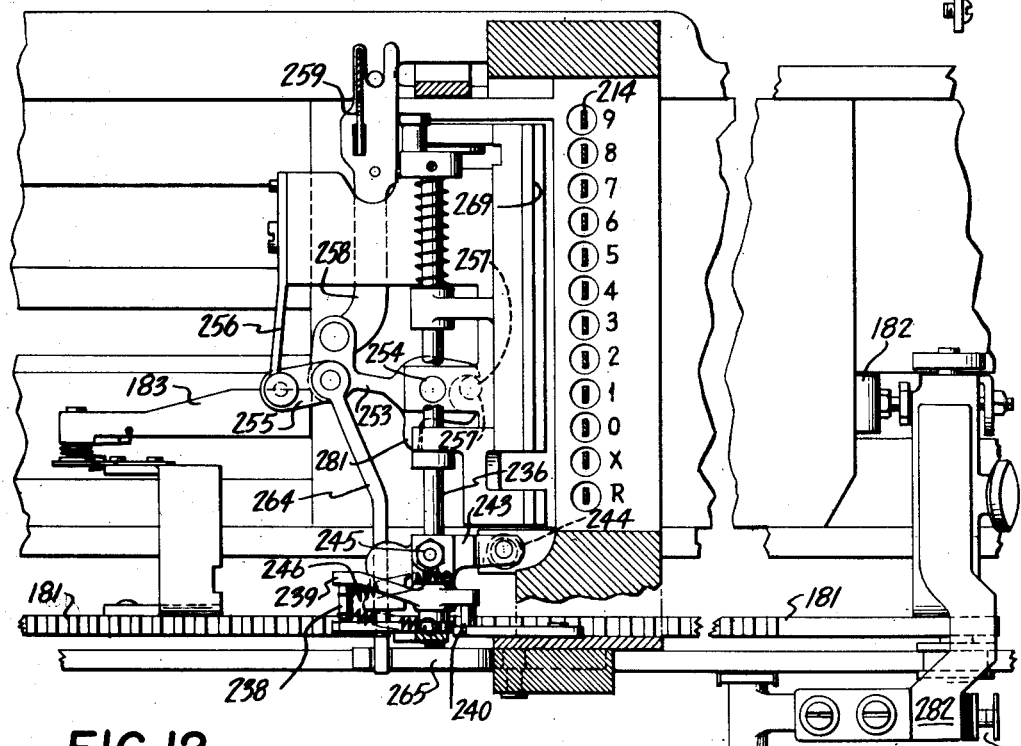

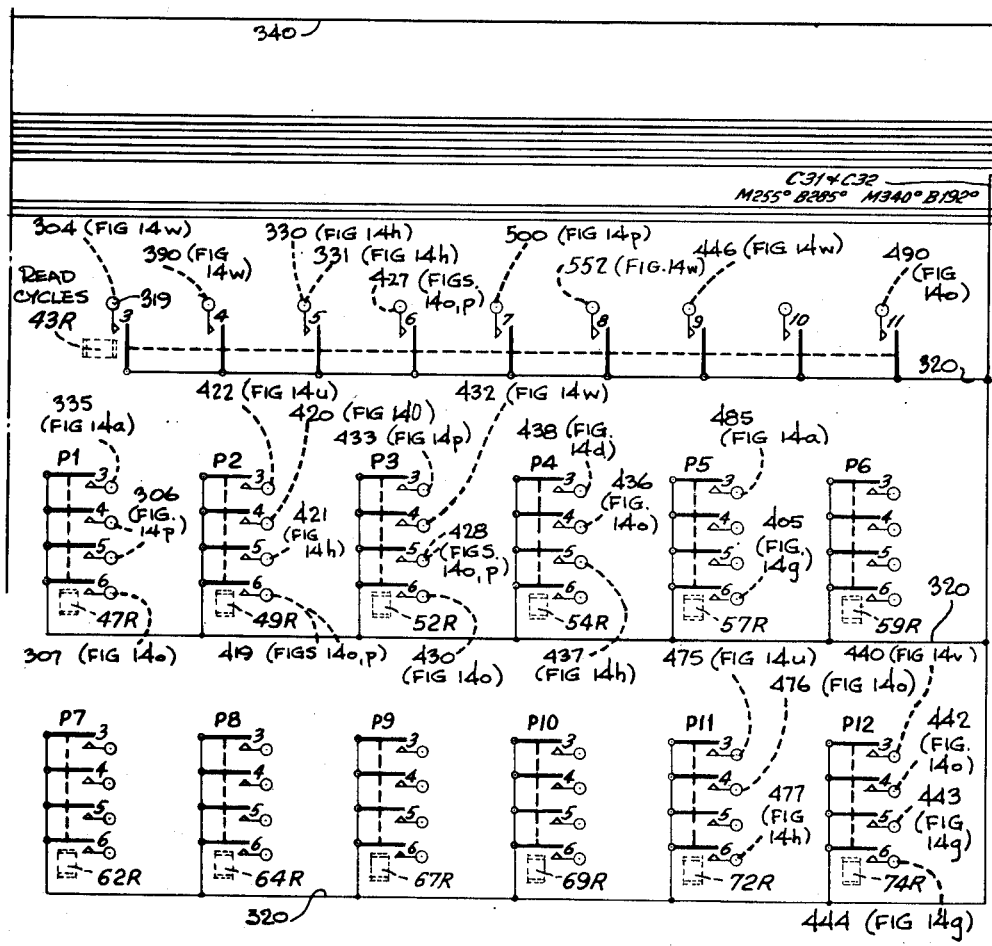
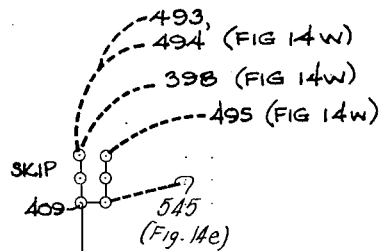
FIG. 14c

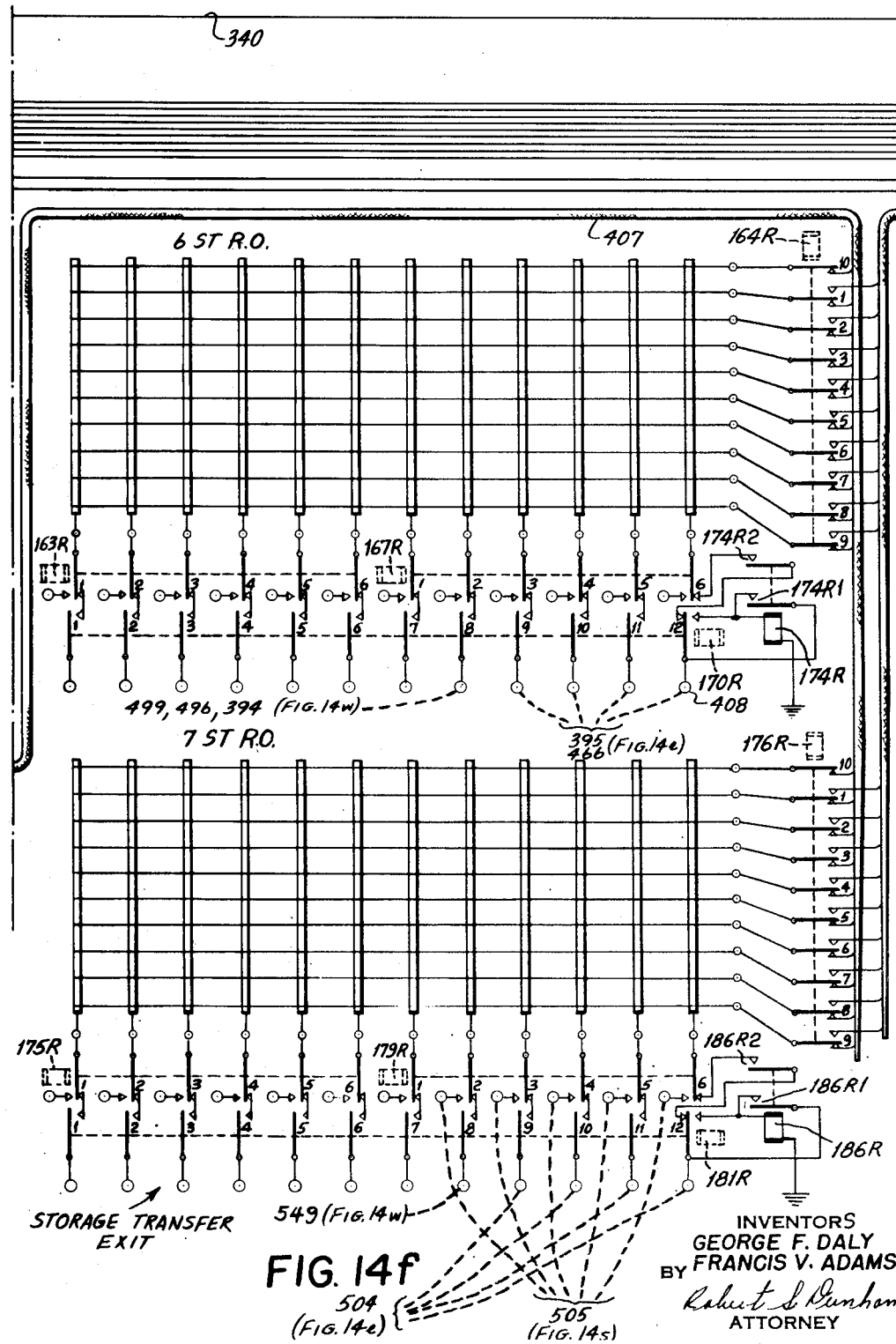

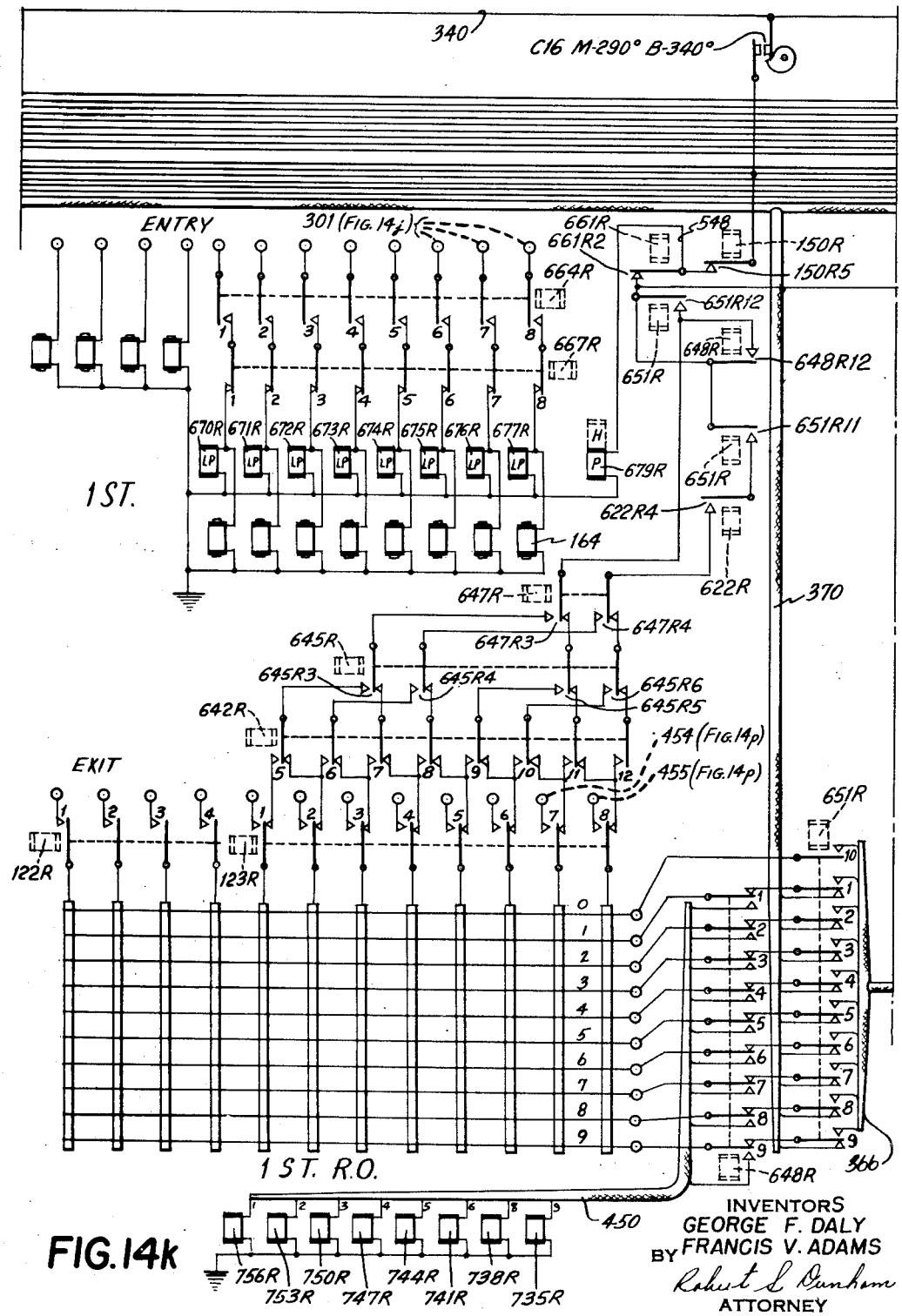

Nov. 24, 1953 — G. F. DALY ET AL — 2,660,373
CALCULATING PUNCH
Filed Oct. 8, 1948 — 61 Sheets-Sheet 23

INVENTORS
GEORGE F. DALY
FRANCIS V. ADAMS
BY
ATTORNEY

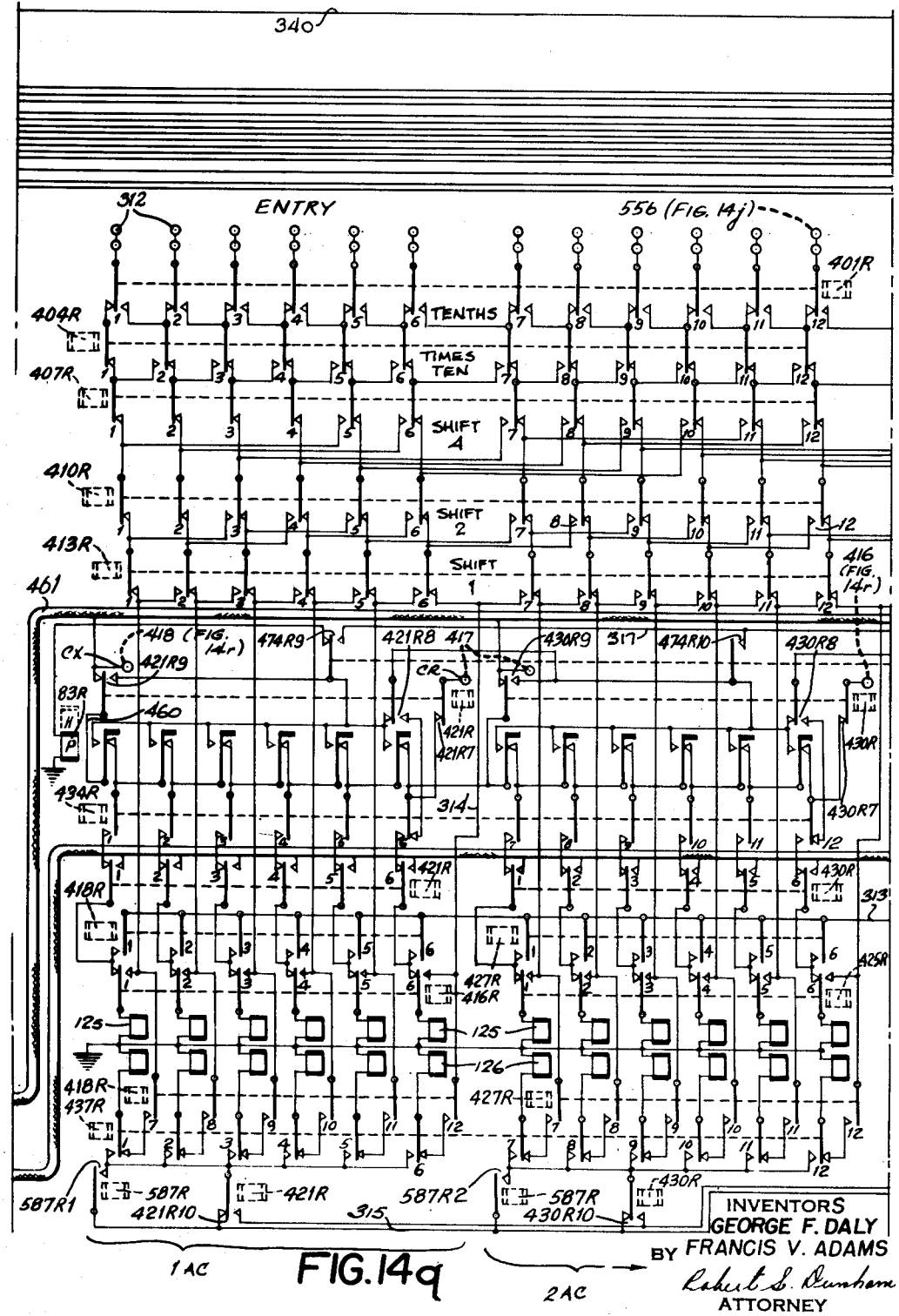

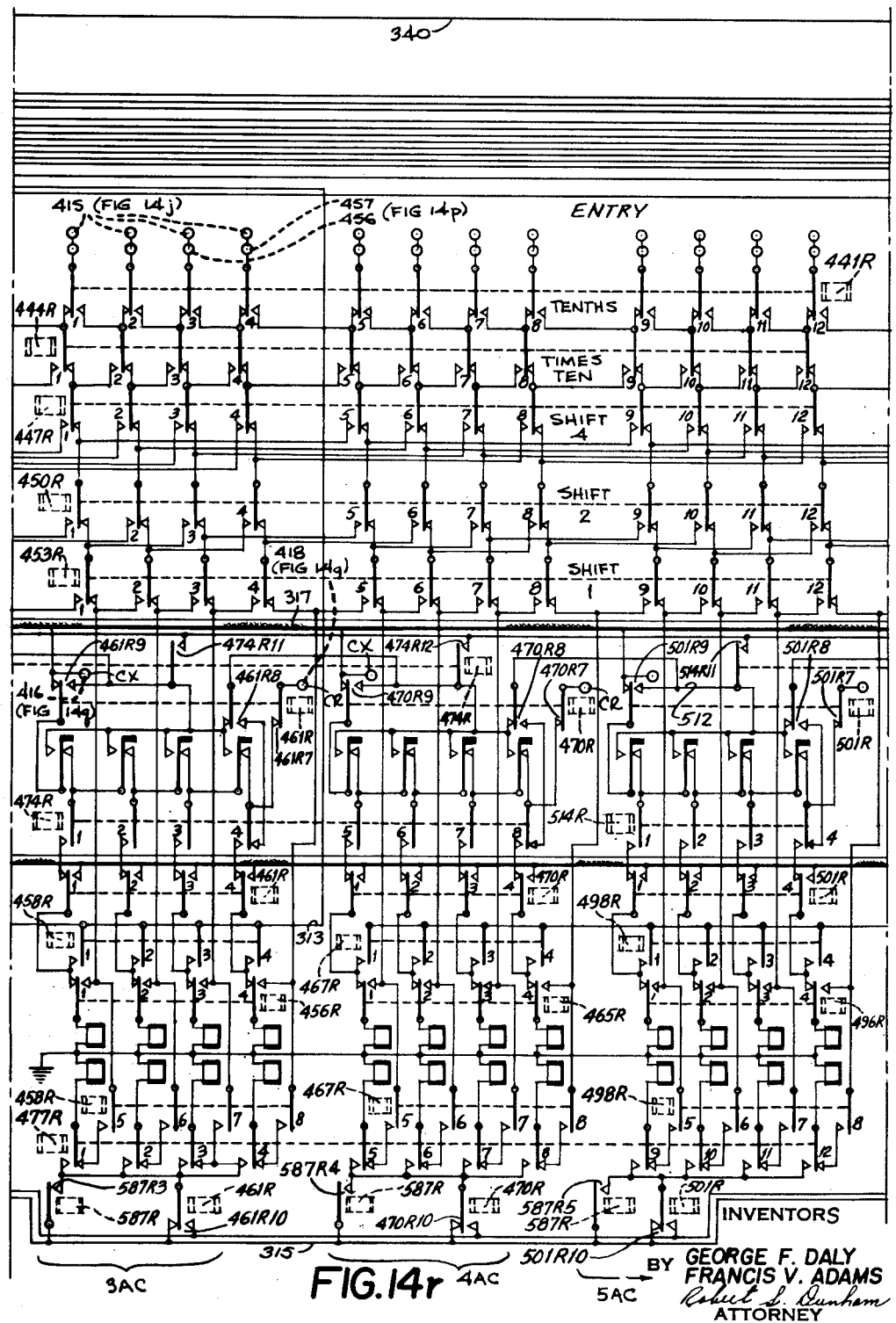

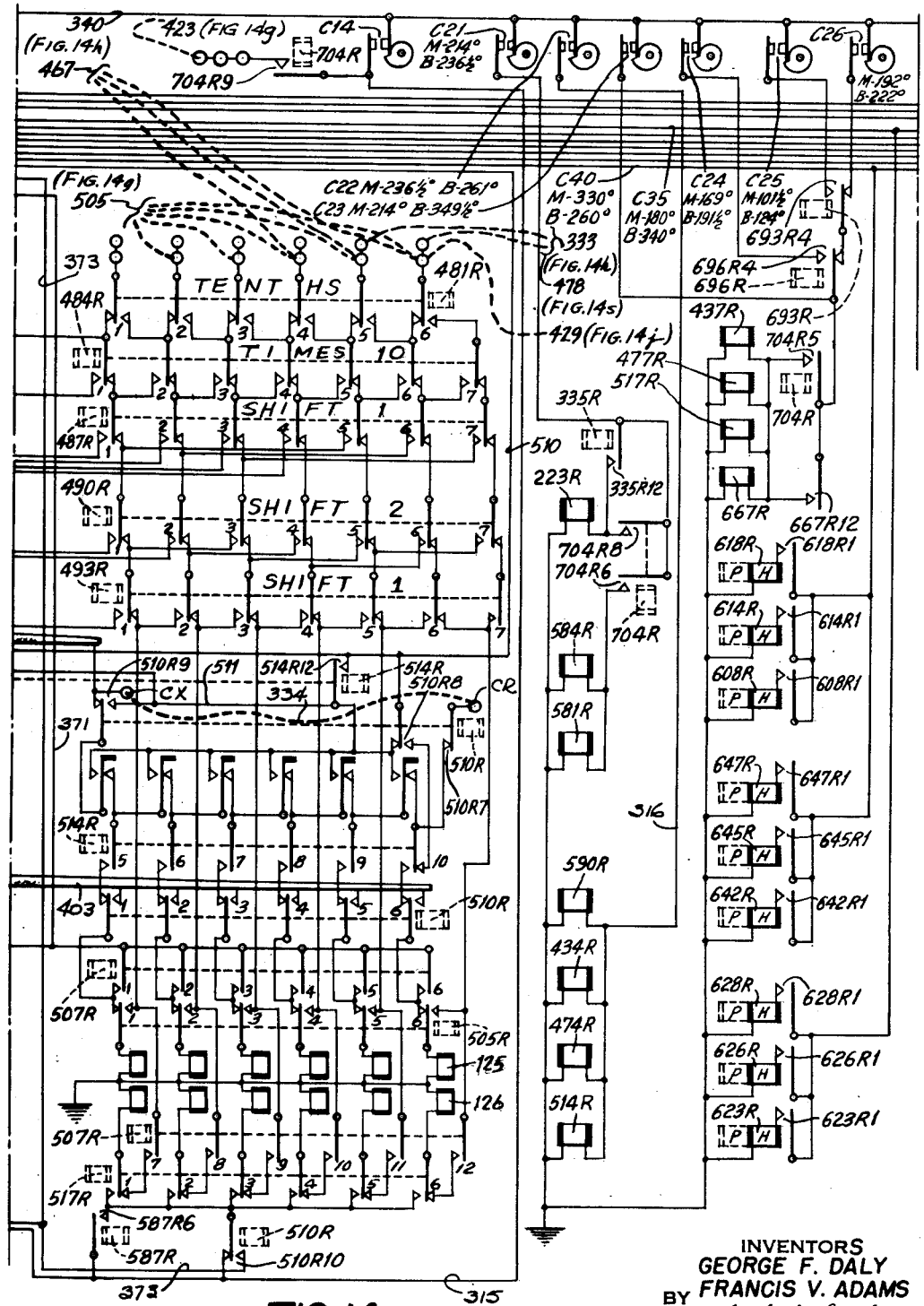

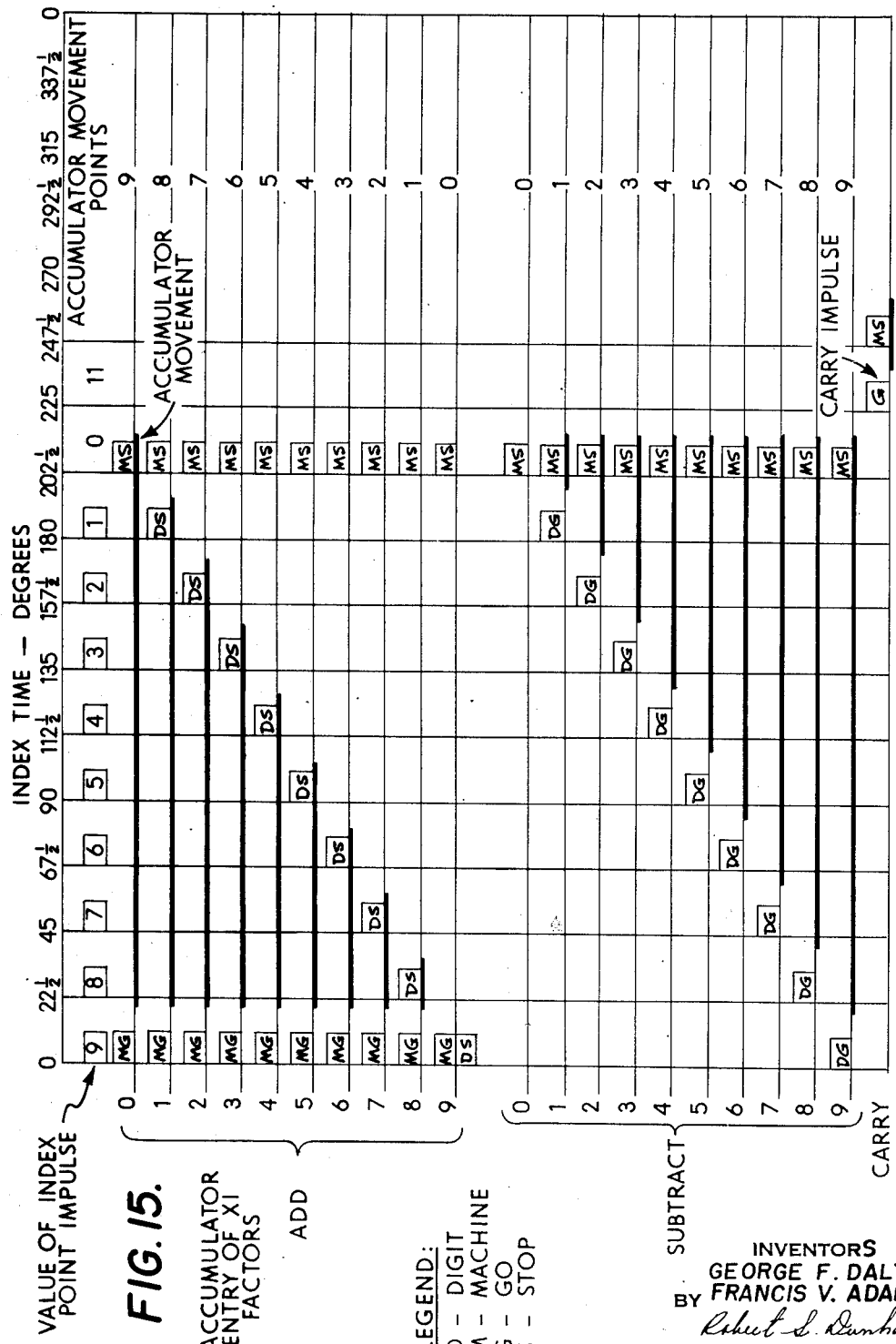

Nov. 24, 1953    G. F. DALY ET AL    2,660,373
CALCULATING PUNCH
Filed Oct. 8, 1948    61 Sheets-Sheet 34

G. F. DALY ET AL 2,660,373

CALCULATING PUNCH

Filed Oct. 8, 1948

INVENTORS
GEORGE F. DALY
FRANCIS V. ADAMS
BY
Robert L. Dunham
ATTORNEY

Nov. 24, 1953  G. F. DALY ET AL  2,660,373
CALCULATING PUNCH

Filed Oct. 8, 1948   61 Sheets-Sheet 36

INVENTORS
GEORGE F. DALY
BY FRANCIS V. ADAMS
ATTORNEY

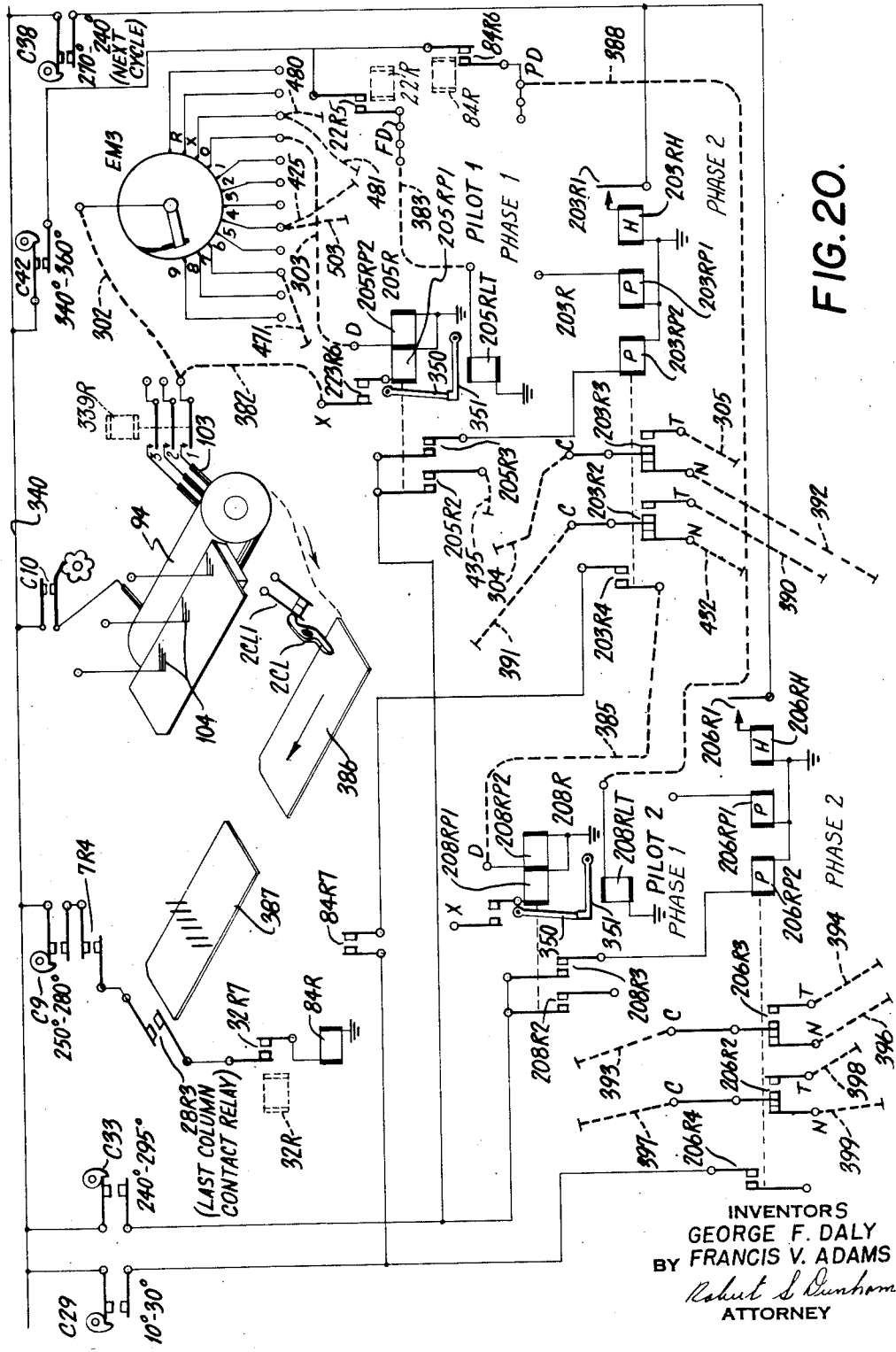

Nov. 24, 1953    G. F. DALY ET AL    2,660,373
CALCULATING PUNCH
Filed Oct. 8, 1948    61 Sheets-Sheet 40

CARD NO. 1

B × A = C                    PUNCH C
B = 39    A = 302
                              39
                            X 302
                            -----
                            11778

———PRODUCTS ACCUMULATOR———

| ARITHMETICAL VALUES | ACTUAL ACCUMULATOR READINGS | REMARKS |
|---|---|---|
| 000000 | 999999 | START |
| + 5500 | + 550055 | RT. COMPONENT X 500 |
| + 14000 | + 430444 | LEFT COMPONENT X 500 |
| 019500 | 980499 | END OF CYCLE 1 |
| − 6800 | 006800 | RT. COMP. MINUS X 200 |
| − 01000 | 001000 | LEFT COMP. MINUS X 200 |
| 11700 | 988299 | END OF CYCLE 2 |
| + 68 | 888820 | RT. COMP. X 2 |
| + 10 | 111101 | LEFT COMP. X 2 |
| 11778 | 988221 | END OF CYCLE 3 |

CARD NO. 2

D = 6558    E = 82    G = 141        $\frac{D}{E}$ = F        PUNCH F
                                                              PUNCH H
$\frac{6558}{82} = 79 + \frac{80}{82}$        F + G = H        STORE H FOR SUMMARY

DIVIDEND—REMAINDER ACCUMULATOR         QUOTIENT ACCUMULATOR

| ARITHMETICAL VALUES | ACCUMULATOR READING | ARITHMETICAL VALUES | ACCUMULATOR READING | |
|---|---|---|---|---|
| 6558 | 9999999999993441 | 000000 | 999999 | START |
| − 8200 | 8200 | + 100 | 999899 | PLUS X 100 |
| − 1642 | 0000000000001642 | 000100 | 999899 | END CYC. 1 |
| + 1640 | 9999999999998359 | − 20 | | 2 X 100 |
| | | | | 10 |
| − 2 | 0000000000000002 | 000080 | 999919 | END CYC. 2 |
| 0 | 0000000000000000 | 0 | 000000 | IDLE |
| − 2 | 0000000000000002 | 000080 | 999919 | END CYC. 3 |
| + 82 | 9999999999999917 | − 1 | 1 | MINUS X1 |
| 80 | 9999999999999918 | 000079 | 999920 | END CYC. 4 |

FIG. 21.

INVENTORS
GEORGE F. DALY
FRANCIS V. ADAMS
BY
*Robert L. Dunham*
ATTORNEY

Nov. 24, 1953  G. F. DALY ET AL  2,660,373
CALCULATING PUNCH
Filed Oct. 8, 1948  61 Sheets-Sheet 41

$$\frac{D}{E} = F$$
$$F + G = H$$

INVENTORS
GEORGE F. DALY
BY FRANCIS V. ADAMS
Robert S. Dunham
ATTORNEY

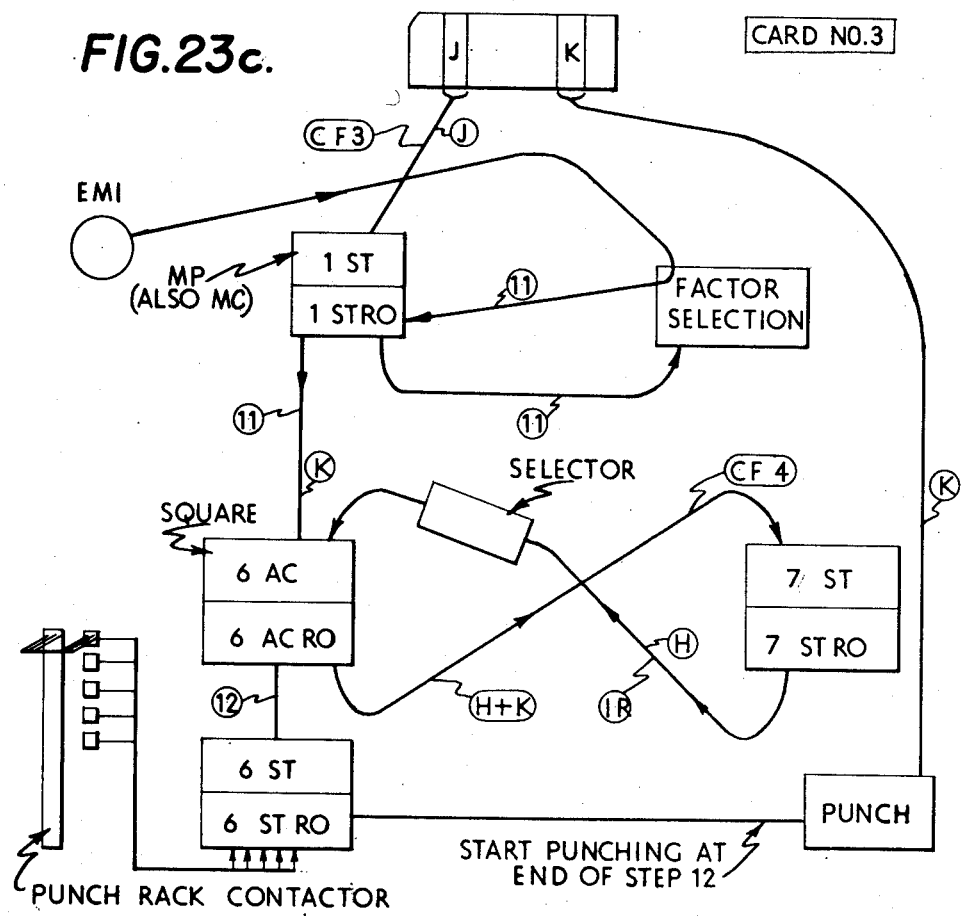
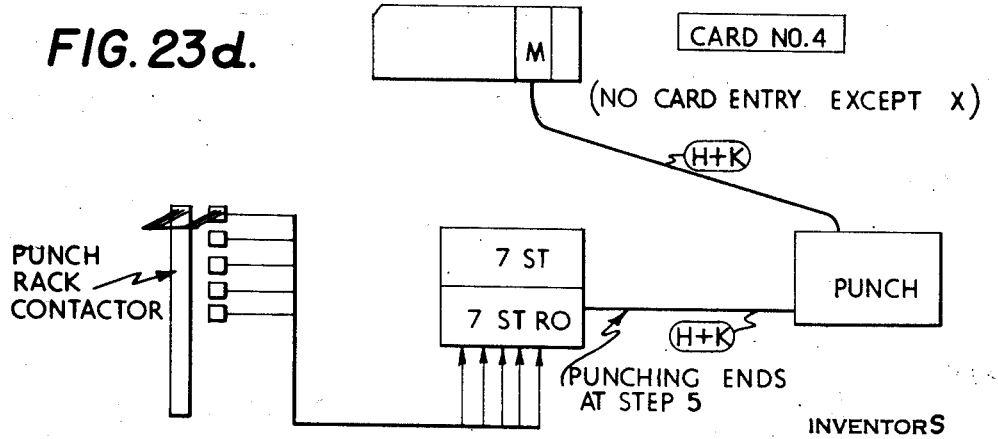

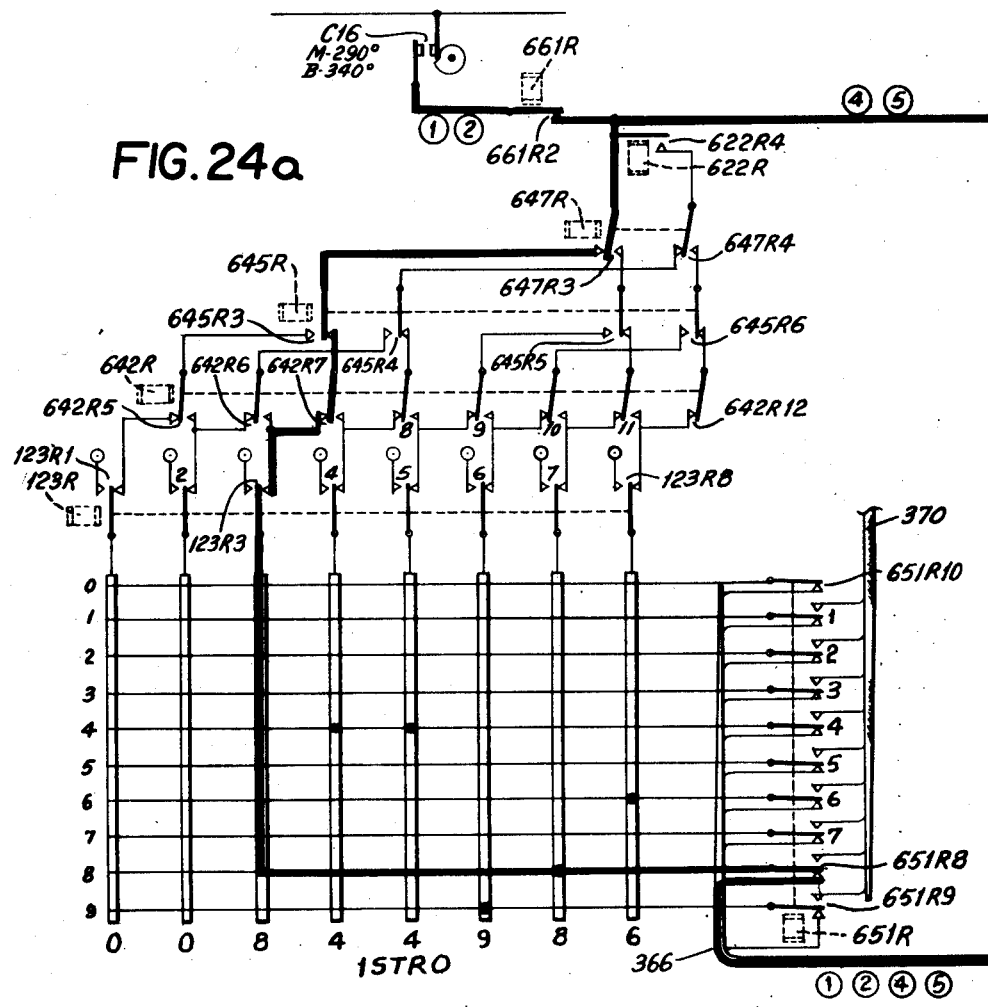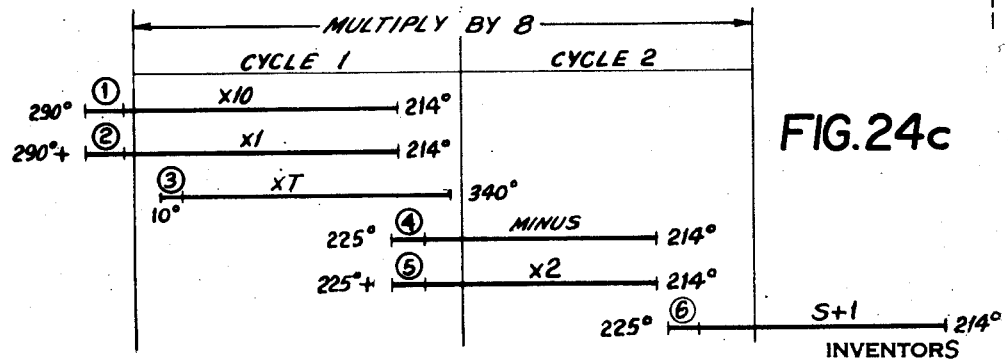

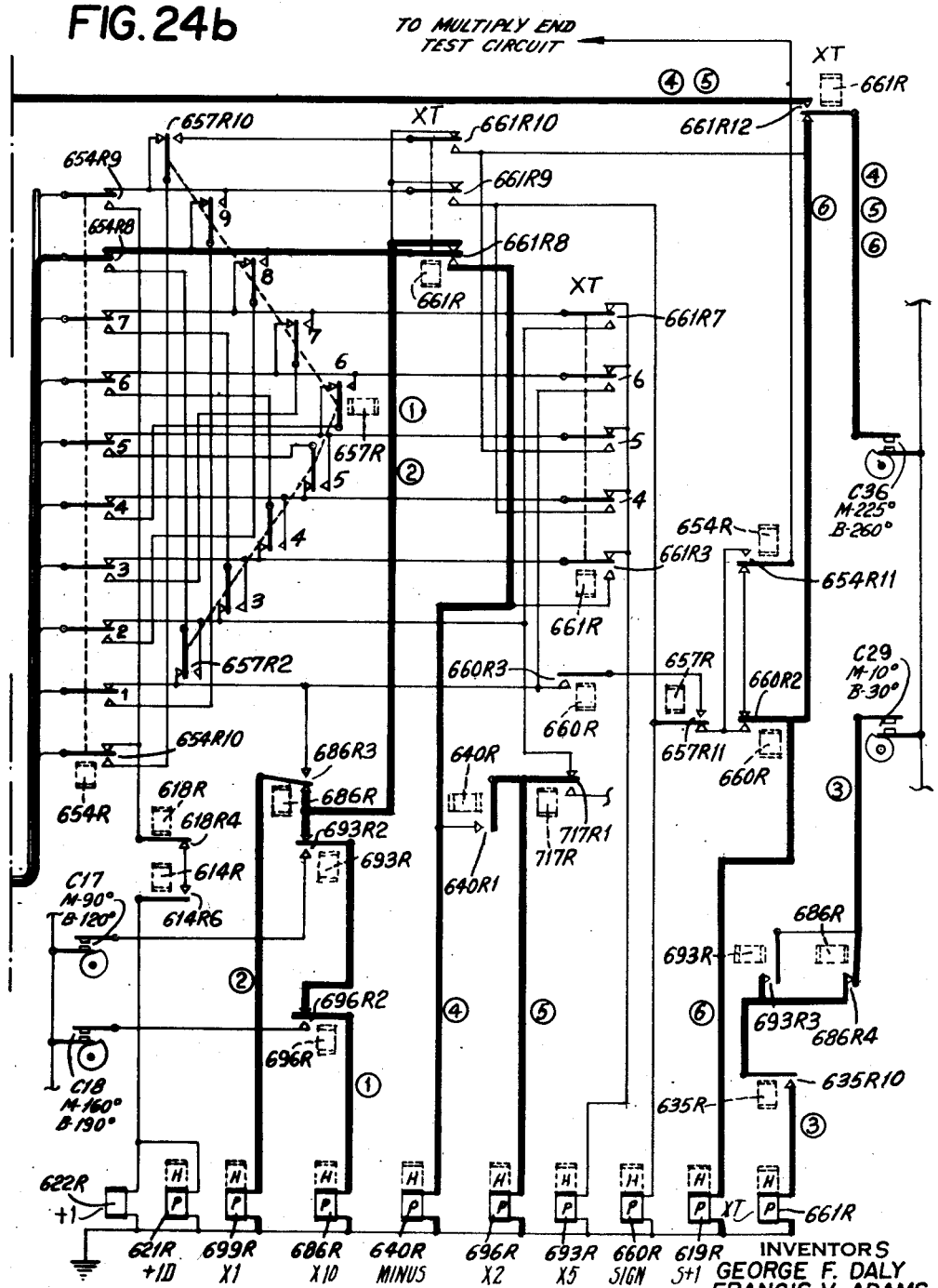

Nov. 24, 1953  G. F. DALY ET AL  2,660,373
CALCULATING PUNCH
Filed Oct. 8, 1948  61 Sheets-Sheet 46

Nov. 24, 1953  G. F. DALY ET AL  2,660,373
CALCULATING PUNCH
Filed Oct. 8, 1948  61 Sheets-Sheet 47

INVENTORS
GEORGE F. DALY
BY FRANCIS V. ADAMS
ATTORNEY

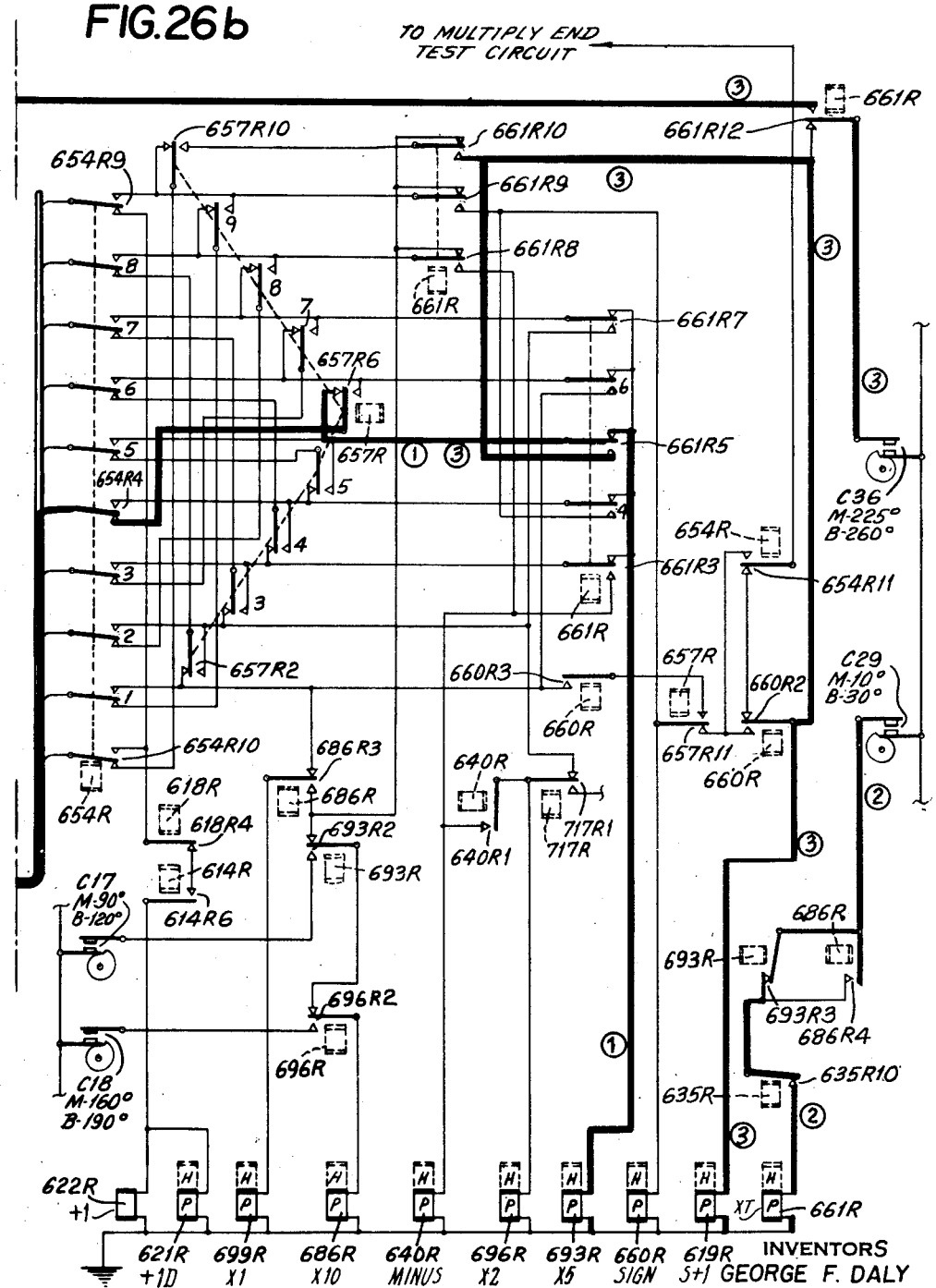

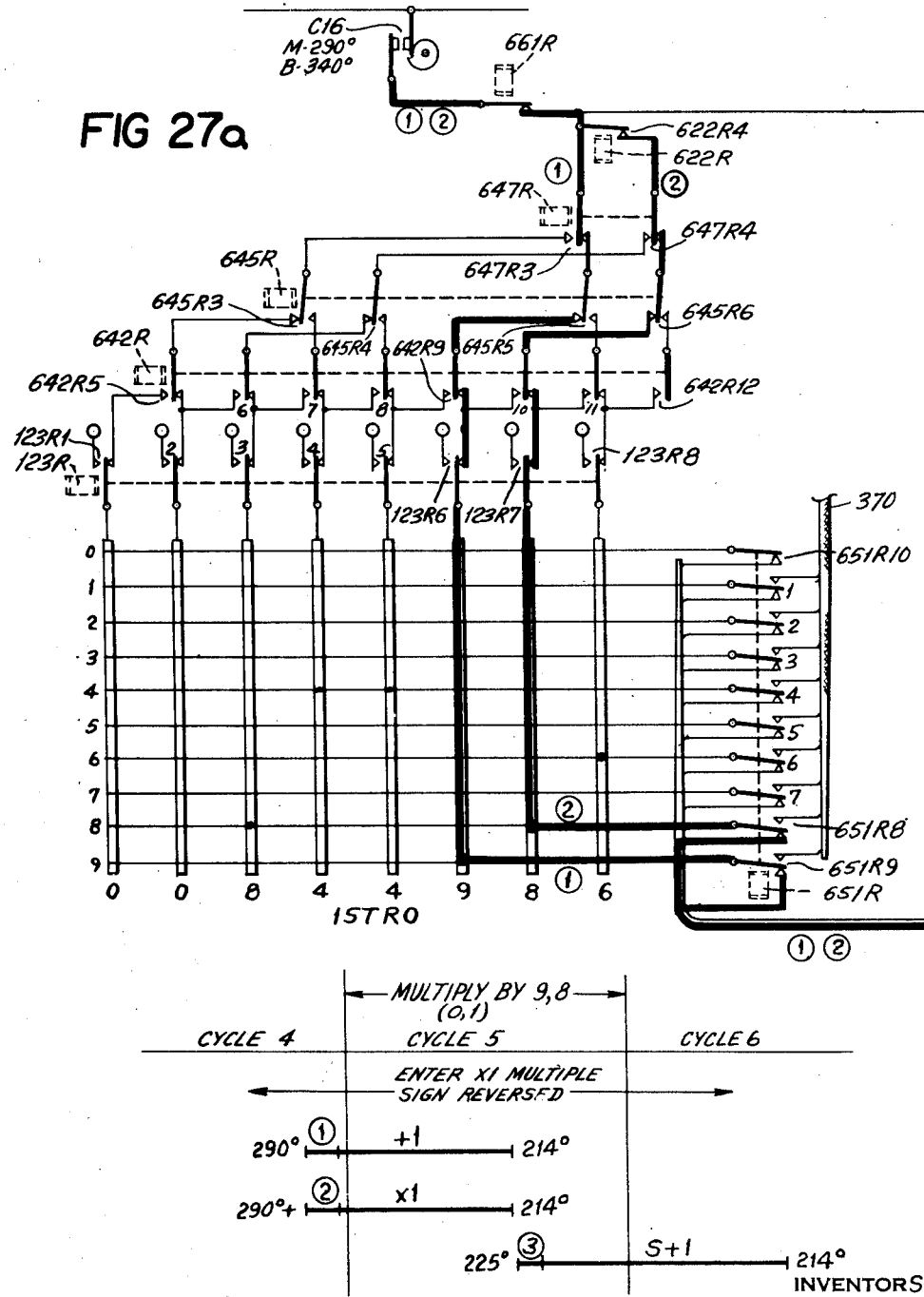

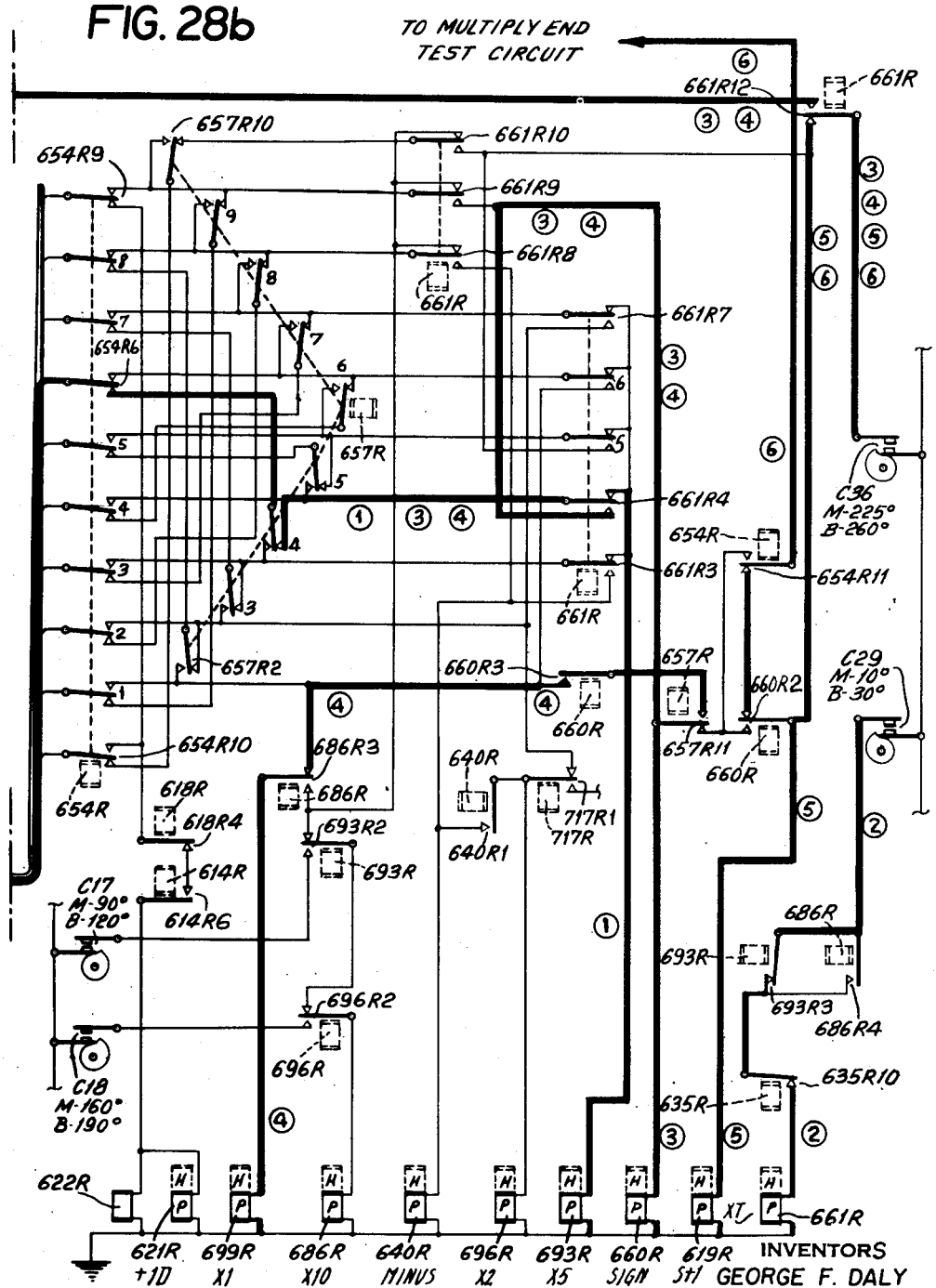

Nov. 24, 1953    G. F. DALY ET AL    2,660,373
CALCULATING PUNCH

Filed Oct. 8, 1948    61 Sheets-Sheet 53

INVENTORS
GEORGE F. DALY
BY FRANCIS V. ADAMS
ATTORNEY

INVENTORS
GEORGE F. DALY
BY FRANCIS V. ADAMS
Robert S Dunham
ATTORNEY

Nov. 24, 1953 — G. F. DALY ET AL — 2,660,373
CALCULATING PUNCH
Filed Oct. 8, 1948 — 61 Sheets-Sheet 56

INVENTORS
GEORGE F. DALY
BY FRANCIS V. ADAMS
ATTORNEY

INVENTORS
GEORGE F. DALY
BY FRANCIS V. ADAMS
Robert L. Dunham
ATTORNEY

INVENTORS
GEORGE F. DALY
BY FRANCIS V. ADAMS
ATTORNEY

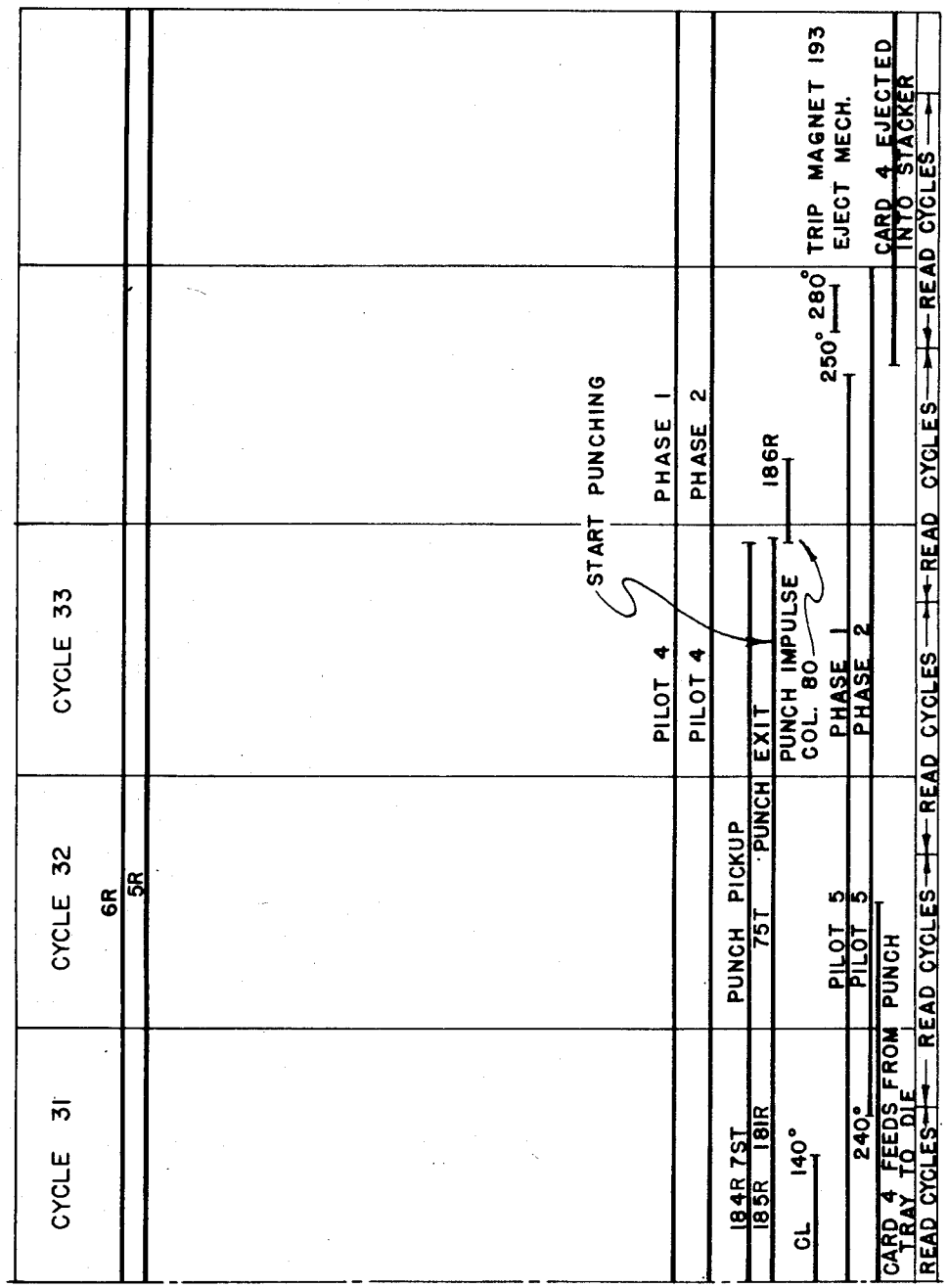

Nov. 24, 1953    G. F. DALY ET AL    2,660,373
CALCULATING PUNCH

Filed Oct. 8, 1948    61 Sheets-Sheet 60

CARD NO. 3

$J^2 = K$
$J = 74$ $74^2 = 05476$

PUNCH K
STORE K FOR
SUMMARY

——— PRODUCTS ACCUMULATOR ———

| ARITHMETICAL VALUES | ACTUAL ACCUMULATOR READINGS | |
|---|---|---|
| 000000 | 999999 | START |
| + 3700 | 996299 | X 50 |
| 003700 | 996299 | END OF CYCLE 1 |
| + 001480 | 998519 | X 20 |
| 005180 | 994819 | END OF CYCLE 2 |
| + 000370 | 999629 | X 5 |
| 005550 | 994449 | END OF CYCLE 3 |
| − 000074 | 000074 | MINUS X1 |
| 005476 | 994523 | END OF CYCLE 4 |

CARD NO. 4

NO AMOUNTS FROM CARD
PUNCH M FROM STORAGE

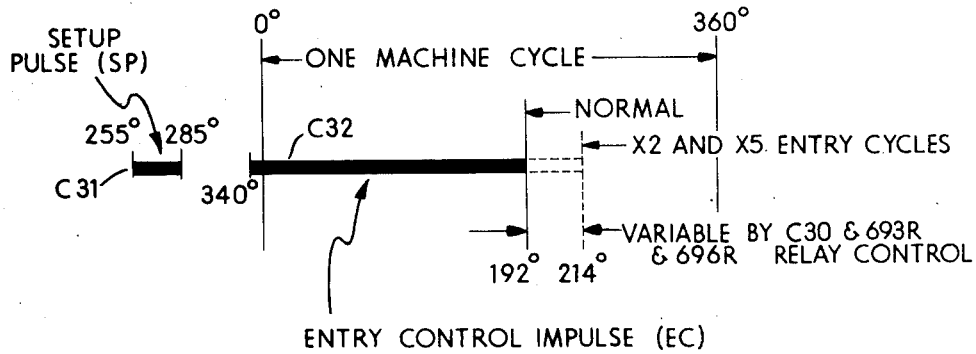

SETUP AND CONTROL IMPULSE TIMING

ENTRY CONTROL IMPULSE (EC)

FIG. 32.

INVENTORS
GEORGE F. DALY
BY FRANCIS V. ADAMS

*Robert L Dunham*
ATTORNEY

Nov. 24, 1953     G. F. DALY ET AL     2,660,373
CALCULATING PUNCH
Filed Oct. 8, 1948     61 Sheets-Sheet 61

MULTIPLICAND ---- 74
M'PLIER --- 84403930
        0000000000

| | CYCLE | MULTIPLIER DIGIT | MULTIPLIER VALUE USED | SIGN | FACTOR SELECTED | FORMATION OF MULTIPLIER 000000000 |
|---|---|---|---|---|---|---|
| R.H. + 740<br>L.H. + 000 | 1 | 8 | 8 | NORMAL | +X 10 | + 10 |
| 7400000000<br>- 48<br>- 10 | 2 | ↓ | ↓ | NORMAL | -X 2 | 100000000<br>- 2 |
| 5920000000<br>+ 50<br>+ 32 | 3 | 4 | 4 | NORMAL | +X 5 | 080000000<br>+ 5 |
| 6290000000<br>- 50<br>- 32 | 4 | 4 | 5<br>(9'S COMP.) | REVERSE | -(+X5) | 085000000<br>- 5 |
| 6253000000<br>- 740<br>- 000 | 5 | 0 | 9<br>(9'S COMP.) | REVERSE | -(+X10) | 084500000<br>- 10 |
| 6245600000<br>+ 50<br>+ 32 | 6 | 3 | 3 | NORMAL | +X 5 | 084400000<br>+ 5 |
| 6245970000<br>- 48<br>- 10 | 7 | ↓ | ↓ | NORMAL | -X 2 | 084405000<br>- 2 |
| 6245822000<br>+ 740<br>   000 | 8 | 9 | 9 | NORMAL | +X 10 | 084403000<br>+ 10 |
| 6245896000<br>- 50<br>- 32 | 9 | 3 | 6<br>(9'S COMP.) | REVERSE | -(+X5) | 084404000<br>- 5 |
| 6245892300<br>- 74<br>   00 | 10 | ↓ | ↓ | REVERSE | -(+X1) | 084403950<br>- 1 |
| 6245891560<br>- 74<br>- 00 | 11 | 0 | 10<br>(10'S COMP.) | REVERSE | -(+X10) | 084403940<br>- 10 |
| 6245890820 | | | | | | 084403939 |

FIG. 33.

| CYCLE | FACTOR SELECTED | FORMATION OF MULTIPLIER |
|---|---|---|
| 1 | X10 | 1000000 |
| 2 | -X2 | -2 |
| | | 800000 |
| 3 | X5 | 5 |
| | | 850000 |
| REVERSE SIGN | | |
| 4 | X5 | - 5 |
| | | 845000 |
| 5 | X1 | - 1 |
| | | 844990 |
| 6 | X5 | - 5 |
| SIGN NORMAL | | 844985 |
| 7 | X1 | + 1 |
| | | 844986 |

NINE'S COMPLEMENT OF 9 = 0
IMMEDIATE USE OF NEXT R.H. DIGIT 8

FIG. 34.

INVENTORS
GEORGE F. DALY
BY FRANCIS V. ADAMS
*Robert L. Dunham*
ATTORNEY

Patented Nov. 24, 1953

2,660,373

UNITED STATES PATENT OFFICE 2,660,373

CALCULATING PUNCH

George F. Daly and Francis V. Adams, Endicott, N. Y., assignors to International Business Machines Corporation, New York, N. Y., a corporation of New York Application October 8, 1948, Serial No. 53,456

65 Claims. (Cl. 235—61.8)

The present invention relates to improvements in calculating punches and more particularly to improvements of calculating punches which are now on the market and which are adapted to derive amounts from record cards, multiply or divide the amounts, cross add or subtract amounts and record results on the record cards.

The present invention has for its general object the provision of a machine which is simpler than previous machines, less expensive, both in initial cost and in cost of maintenance and in general to provide a machine which is more flexible in its adaptability to perform a greater diversity of calculations than previous machines which are now in use.

A further object of the present invention, which is auxiliary to the foregoing, resides in the provision of novel form of storage devices, several being utilized, with novel means for calling them into operation. More particularly the storage devices are units adapted for reset to zero in the same cycle in which entries are received therein and read out therefrom, whereby a separate machine cycle is not required for resetting the storage devices to zero. Accordingly, a new entry of a number to storage may be effected in the immediately following machine cycle. In other words, if there be a readout from a storage device in a given machine cycle, at the end of that cycle such storage device may be reset and a new entry may be put in the storage device.

A further object of the present invention resides in the simplification of the previous machine by the conjoint utilization of accumulating devices and storage devices in such a manner that number storage is effected normally in non-accumulative type storage units, these being less complicated and expensive than accumulating types of storage devices. Accordingly the columnar capacity of accumulating means may be materially reduced. Such storage devices have the further characteristic of not requiring excessive machine cycle time for clearing.

A further object of the present invention resides in the provision of a novel programming control means for bringing about operation of the various units of the machine in the desired sequence which may be readily varied by the operator.

While provision has heretofore been made for programming certain operations in the machine of this general class, such as to program cross adding or subtracting before or after calculating (multiplying or dividing), such programming controls in previous machines were heretofore subordinate and auxiliary controls only, whereas according to the present invention the programming controls are the predominating controls which direct the control of all major functions of units of the machine in place of merely being adjunct controls as heretofore.

A further object of the present invention resides in the provision of a novel program unit with means for controlling and deriving machine controls from it so that the machine can be caused to go through either predetermined or indefinite number of calculating steps and to delay advance of the program steps when repeat operations have to be performed which pertain to a single calculating step (for example, for multiple orders of a multiplier upon multiplication or for multiple deductions of a dividend upon dividing), to provide for skipping of a program step or steps and to provide for repeating the set up of a new series of program steps when the capacity of a program has been reached. In connection with the foregoing, when a program is repeated, the functions performed on the repeat program can be varied with respect to the functions performed on the first group of program steps.

A further object of the present invention resides in the provision of a calculating punch wherein provision is made for effecting multiplying calculations in a manner which is consistent with the procedure used on dividing calculations.

A further object resides in the provision of novel means for testing a stored multiplier and for calling in or programming the necessary machine cycles in accordance with such testing and to further do this in a manner which is consistent with the procedures and controls which the machine utilizes upon dividing calculations.

A further object resides in the provision of novel controls for programming machine operations generally.

A further object resides in the provision and simplification of the controls which interrelate card handling operations which are tied to a definite cyclic time in the machine cycle operation with other controls which may include either definite time controls or controls the time of which is relatively indefinite to machine cycle time.

A further object of the present invention resides in the provision of means to enable the operator to program the machine operations in an expeditious and flexible manner.

Another object of the present invention resides in the provision of means whereby under the control of designations on the controlling record, the machine is adapted to punch results upon the record in a variable location thereon and in other variable manners. More specifically, the punching may be effected in certain fields or the punching may be skipped in certain fields. Intermediate results may be punched on desired cards even including cards from which no number data has been derived. All of the foregoing operations are effective at the punch after the controls which were initially derived from the controlling record may have been released.

A further object of the present invention resides in the provision of means whereby a storage unit may be used to control punching of an intermediate result in a computation and where in such a storage unit may be later used for controlling the punching of a final result of calculation.

A further feature of the present machine resides in the provision of a novel programming control for machines of this class which has the following characteristic:

A program of any desired number of steps can be pre-selected there being ordinarily from 1 to 12 steps. Any of the above machine functions such as cross adding, multiplying, dividing, punching, resetting, card feed, sign control of accumulating entry, etc. can be assigned to any program step. For different runs different functions can be assigned to the same program step. For example, step 1 of the program can be used for cross-adding, or if the operator desires, this step can be used for dividing, multiplying or the like.

On machine operations which require a plurality of machine cycles, such as multiplying or dividing, the program device has provision to delay program advance until the repeat operations have been completed. Thereafter the program advance is resumed. Program arrangement also is provided with means to delay program advance until operations which require a more or less indefinite time interval for completion have been finished. For example, if punching of a card is required, and such operation is to be initiated on program step 3, program delay will be brought about if a storage device used to control such punching has not completed an earlier control of punching operation and there will be no advance of the program from such step 8 until earlier punching has been completed. A similar program delay also takes care of other time consuming operations such as endwise card feed in the punching unit. In short, the program control is the predominating control for all major machine operations in place of being an adjunct which only controls certain machine operations leaving other sequential steps frozen to a particular cycle or group of cycles.

A further feature of the program control is that the program may be used to call into or out of operation a common unit such as the storage unit and to use such unit for different functions on different machine cycles in a run which pertains to the same record. To illustrate, an amount might be in a storage unit after which the storage unit could be used to control a desired machine operation such as multiplying. Thereafter the storage unit could be cleared to receive the result of a computation and such storage units could then be used to control punching of the result. Expressed broadly, all these functions are under the control of the program device.

Another object of the present invention resides in the provision of simpler and more flexible type of number storage.

A further object of the present invention resides in the provision of novel read-outs with means for controlling and/or current flow thereinto and for also controlling the outflow of impulses therefrom to the general end that a single common read-out may be employed for controlling cyclic operations such as cross-adding and may be also employed for controlling step by step operations such as column by column punch selection.

A further object of the present invention resides in the provision of means for augmenting the number of controls which can be taken off or derived from any program step. Provision is made for the use of co-selectors which may be coupled at will to any program step or steps to augment the possible output of controls therefrom.

Another object of the present invention resides in the provision of means for punching result data in the card from which no number data has been derived.

A further object of the present invention resides in the provision of novel controls for a machine of this class to the general end that a single hole on one card will select a sequence of operations, including punching, which are to be performed pertaining to that card and to select a substantially different sequence or set of functions under the control of another single hole upon another card. The number of such combinations of functions or sequences of operations is limited only by the number of holes available for this purpose and upon the selectors which are utilized. More particularly, it may be mentioned that a single hole can be used to select a wide variety or group of operations which are to be performed, all under the directing guidance of a single hole on one record.

Another object of the present invention resides in the provision of novel selector circuits including pilot selectors which can be used directly for controlling purposes or which may be connected in pairs and wherein one pilot selector derives its control from a record and thereafter transfers its control to a second pilot selector which controls other operations such as punching after the first selector has been released or restored to normal position. Subordinate thereto the release of one selector is effected under control of card feed through a suitable pluggable connection while the release of a second selector is effected on completion of such an operation as punching.

Subordinate to the pilot selectors just mentioned, co-selectors can be coupled for use in conjunction therewith to the general end that the pilot selectors can be used for control of devices as a unit whereas the co-selectors can be used through their individual circuits to control multi-columnar controls.

A further object of the present invention resides in the provision of novel controls for multiplying operations to the general end that multiplying operations pertaining to single multiplier digits 1, 2 or 5 may be effected for both right hand and left hand component entries in a single accumulating cycle of the product accumulator and to the general end that multiplying operations pertaining to other multiplying digits may be effected by so-called compound operations which may involve a second accumulator entry cycle or an operation with a sign change.

It is a further object of the present invention to utilize partial product components related to digits 1, 2 or 5 only and/or algebraical sums of such components, viz., times 3 is taken as times 5 minus times 2, times 6 is taken as times 5 plus times 1 and times 7 is taken as times 5 plus times 2, times 8 is taken as times 10 minus times 2, 4 is taken sometimes as times 5 minus time 1 and in other cases 4 is taken as times 5 with a change of sign for the next operation. Times 9 is taken sometimes as times 10, minus times one and in other cases as times 10 with a change of sign for further operations. Times ten operations are substantially times one operations with a column shift.

Other objects of the present invention will be hereinafter pointed out in the accompanying specification and claims and shown in the drawings which by way of illustration show what we now consider to be a preferred embodiment of the invention.

Figures 1a and 1b are schematic drawings showing diagrammatically the main driving parts of the machine and the units driven thereby.

Figure 2 is a fragmentary sectional view showing the card feeding section of the machine.

Figure 3 is an end view of one of the storage units used in the machine. This view is taken substantially on line 3—3, Figure 1a.

Figure 6 is an elevational view of one of the accumulator units used in the machine. This view is taken substantially on line 6—6, Figure 1a.

Figure 7 is a front view of the punching section of the machine, including card feed.

Figure 8 is a detail view of a part of the clutching mechanism of the punching unit.

Figure 9 is essentially a sectional view of a portion of the punching unit.

Figure 10 is a rear elevational view of a portion of the punching unit, including certain parts of the escapement mechanism.

Figure 11 is an elevational view showing a portion of the escapement mechanism of the punch in detail.

Figure 12 is a top plan view of the escapement and punching mechanism taken on line 12—12 of Figure 11.

Figure 12a is a slightly expanded detail perspective of the strip commutator used in the punch unit of the machine.

Figure 14A:
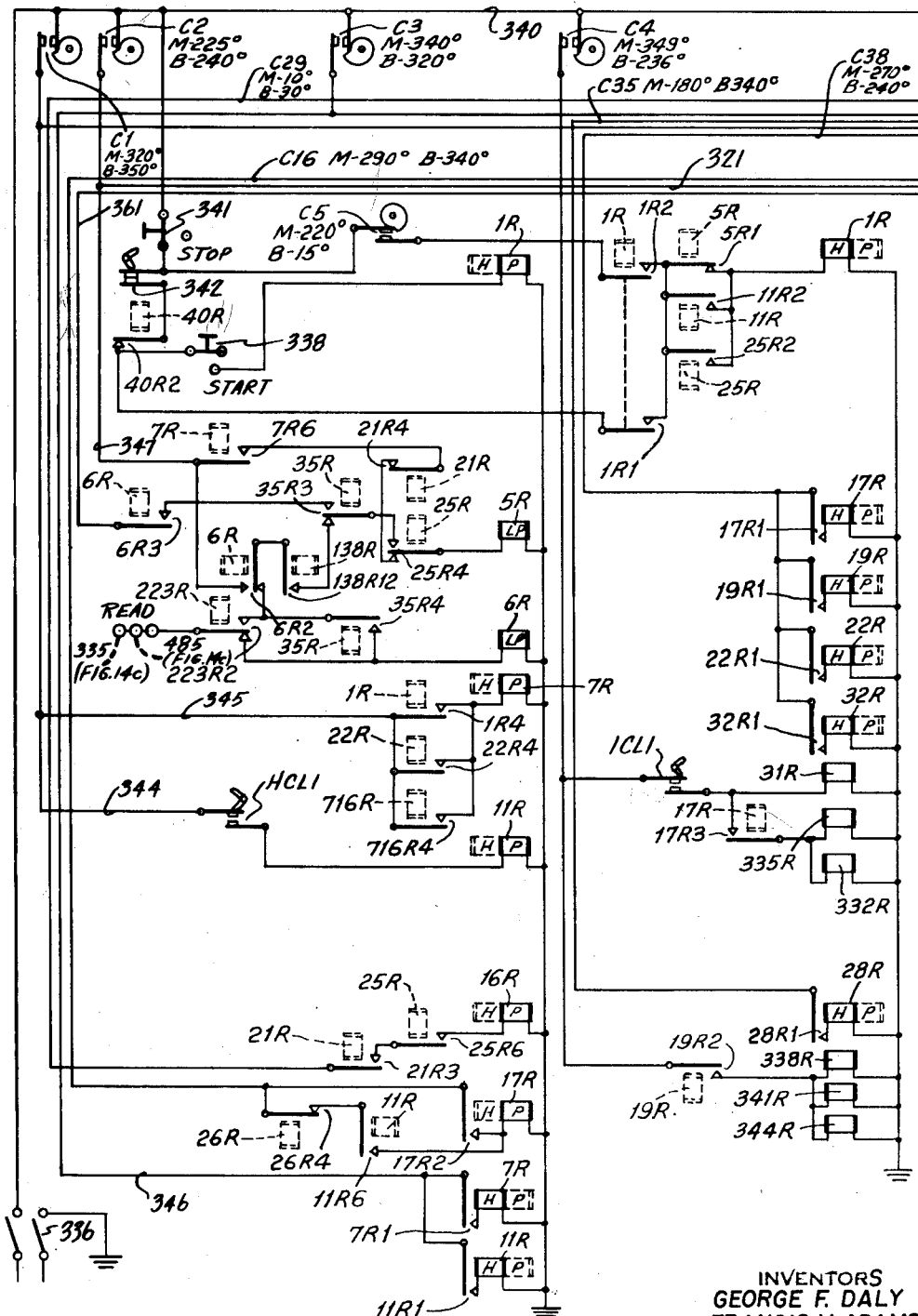

Figures 14a, 14b, 14c, 14d, 14e, 14f, 14g, 14h, 14j, 14k, 14l, 14m, 14n, 14o, 14p, 14q, 14r, 14s, 14t, 14u, 14v, and 14w, taken together show a complete circuit diagram of the machine. In the circuit diagram, Figure 14a is at the extreme left, with Figure 14b next to the right, etc.

Figure 15 is a timing chart showing the action of the accumulators during a normal operation or when multiplying by 1.

Figure 16:
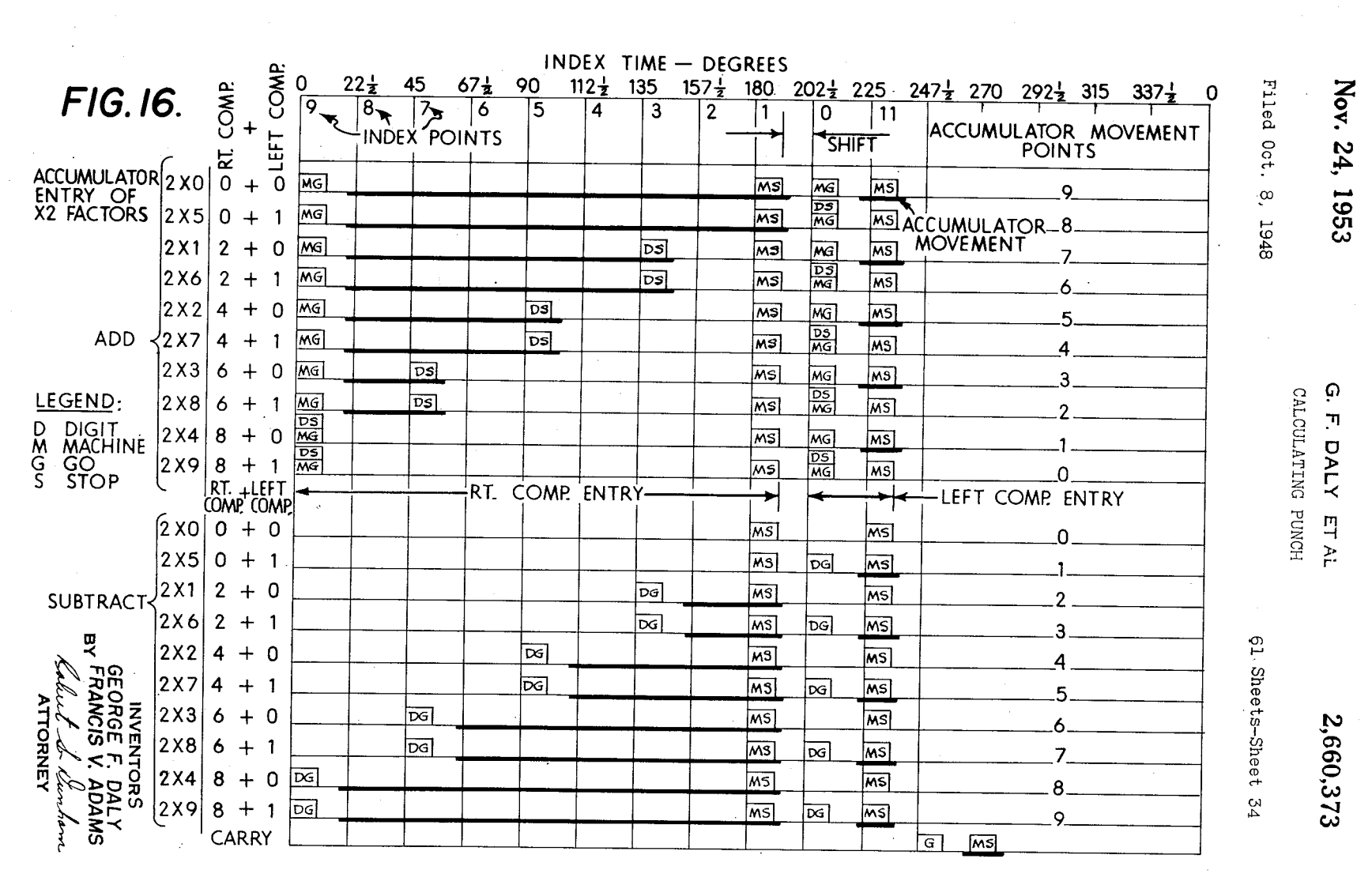

Figure 16 is a timing chart showing the action of the accumulators when multiplying by 2.

Figure 17:
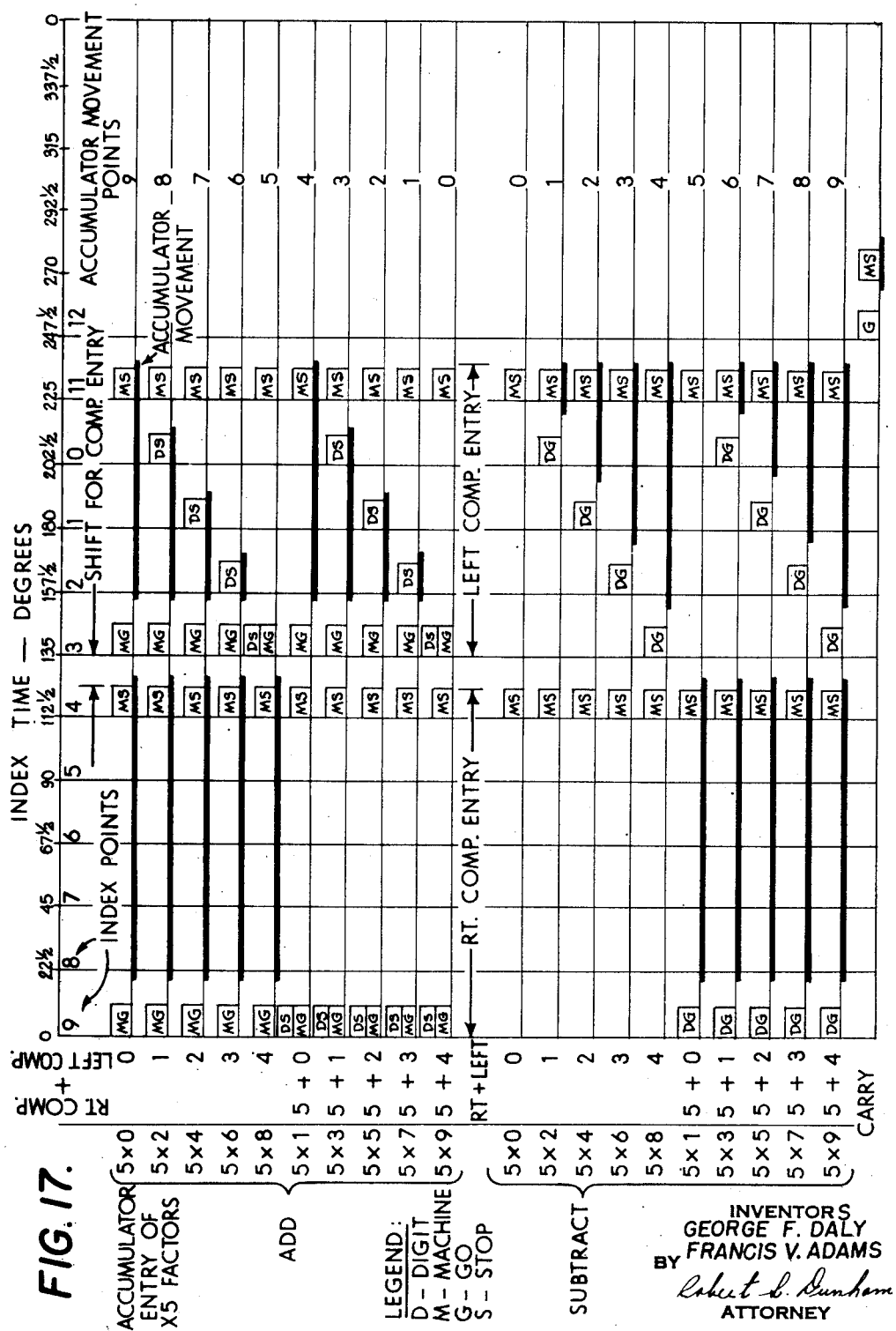

Figure 17 is a timing chart showing the action of the accumulators when multiplying by 5.

Figure 18:
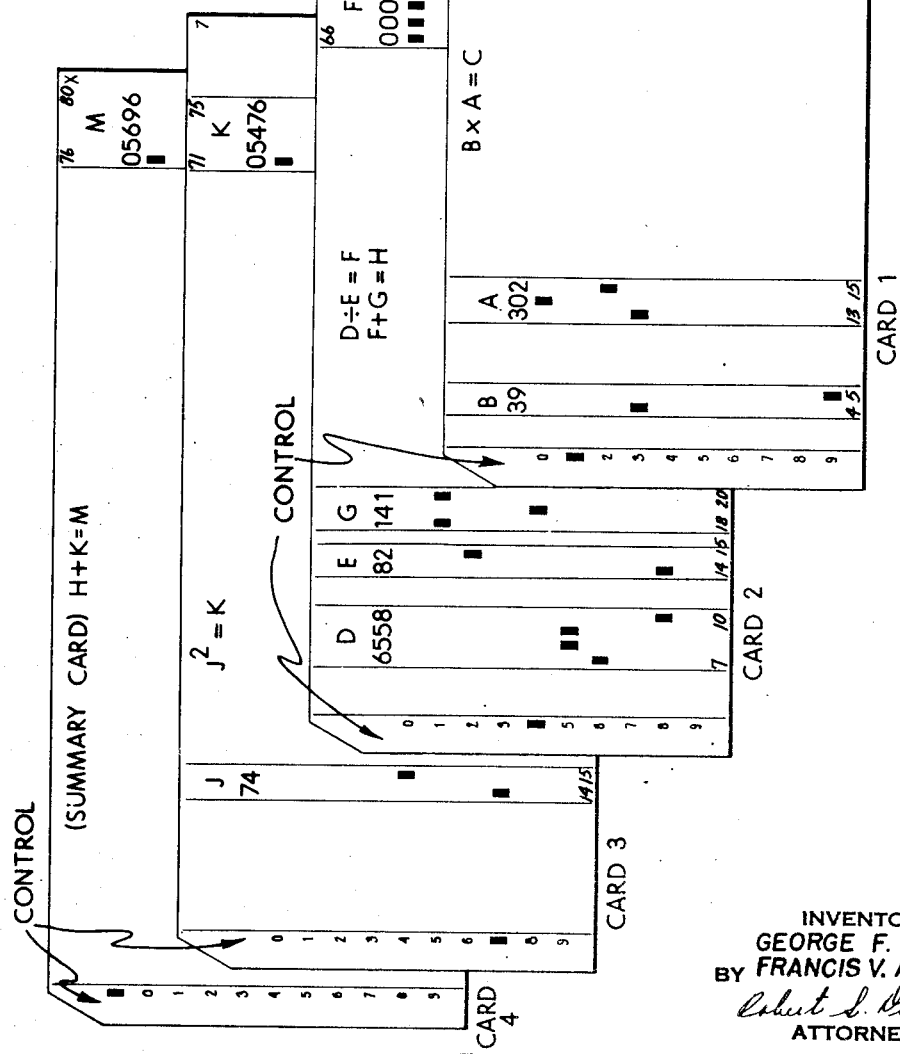

Figure 18 shows record cards used in an example of machine operation.

Figure 19A:
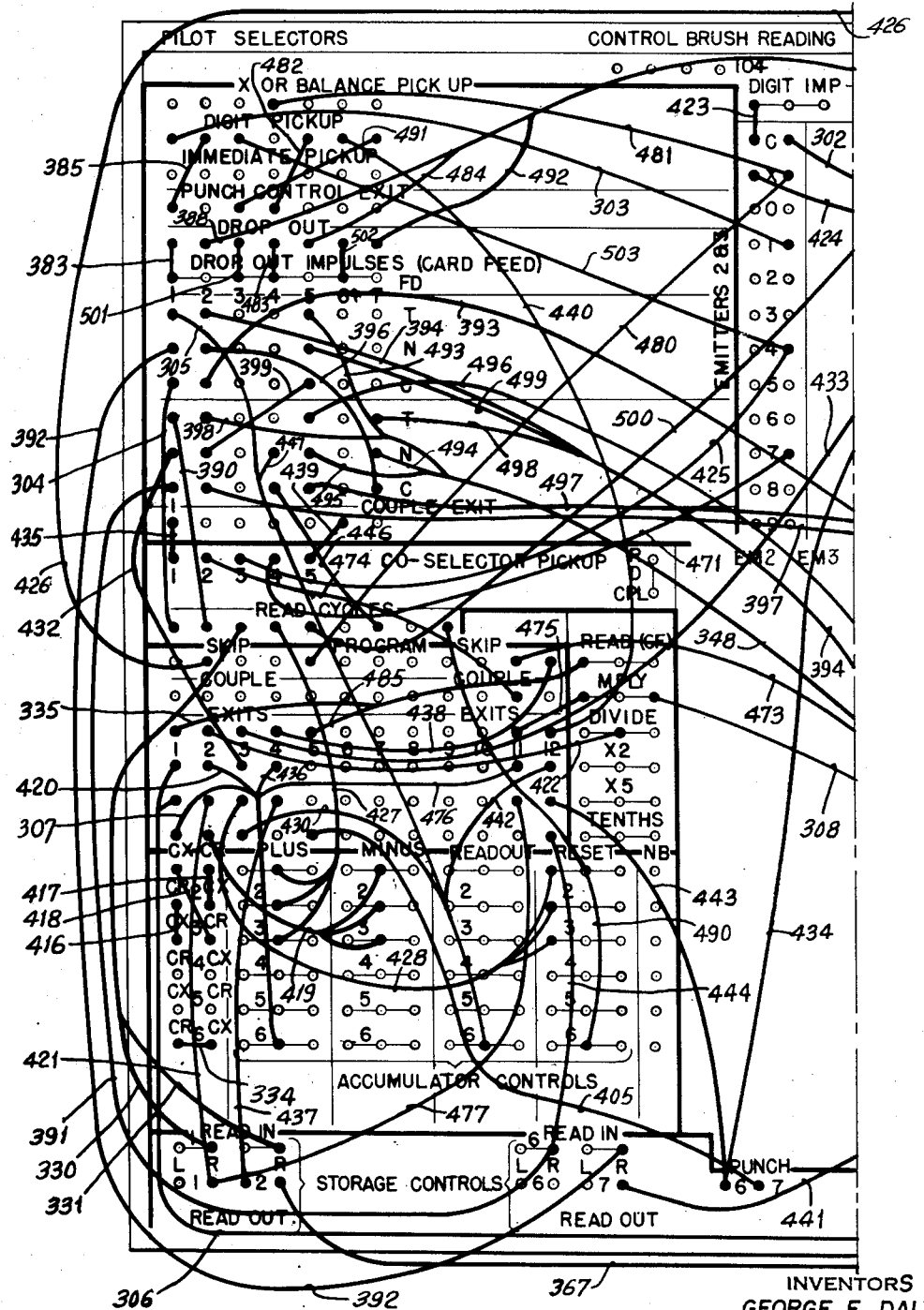
Figure 19B:
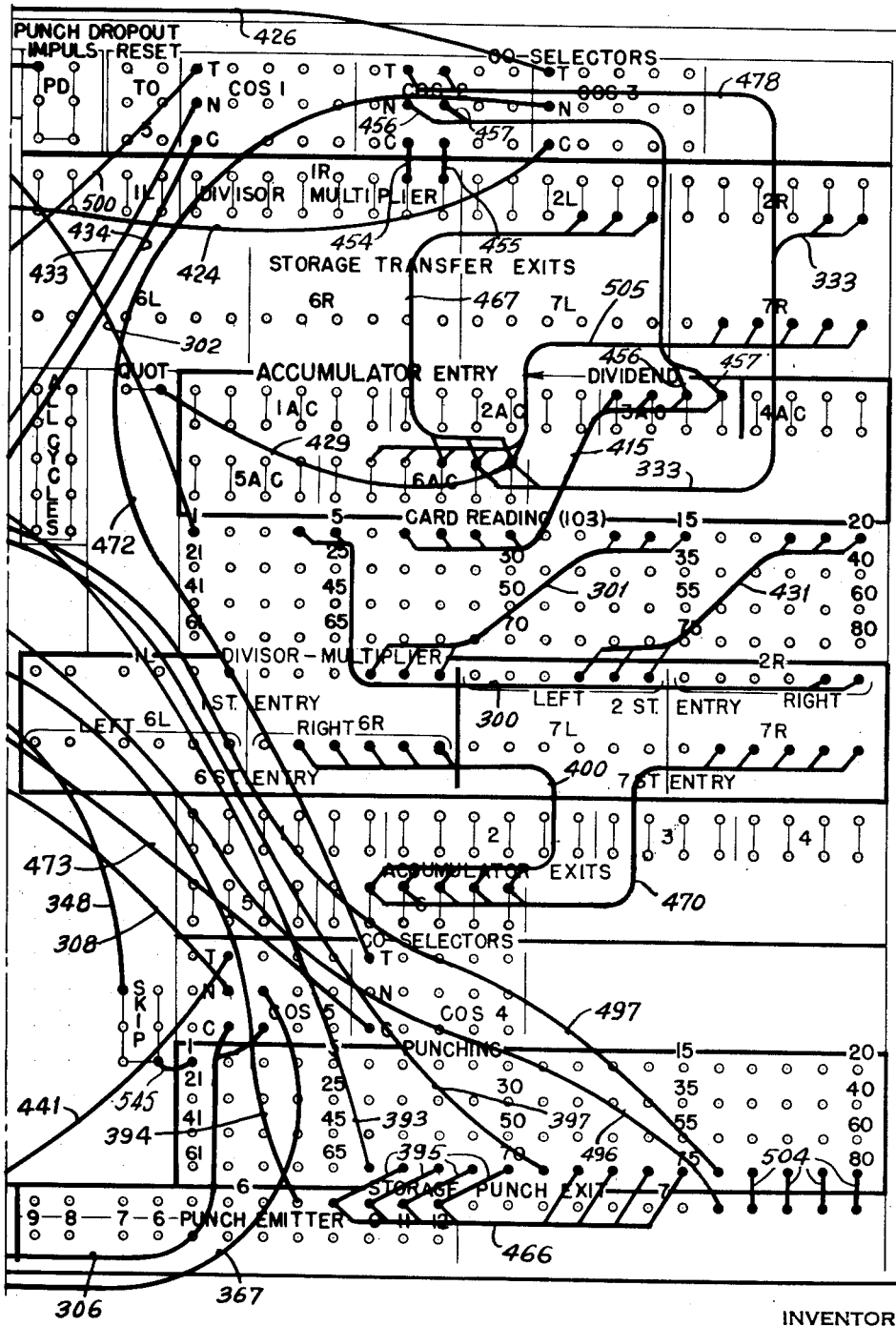

Figures 19a and 19b taken together show the plugboard, including the connections for the example using cards shown in Figure 18.

Figure 20 is an electro-mechanical schematic drawing of certain selector devices employed in the machine.

Figure 21 is a chart showing the arithmetical operation for two of the cards shown on Figure 18.

Figure 22 is a chart showing the arithmetical operation for the other two cards shown in Figure 18.

Figures 23a, 23b, 23c and 23d are schematic drawings or flow charts showing the general flow of amounts from the card through multiplying, dividing, storage, accumulating and punch devices as related to the cards shown in Figure 18.

Figures 24a and 24b, taken together, are a condensed wiring diagram showing that portion of the circuit related to control according to the multiplier rules set forth in the specification, for an example, which shows all the special conditions.

Figure 24c is a fragmentary timing chart which shows circuits related to the start of the multiplying operation described in connection with Figures 24a and 24b.

Figures 25a, 25b, and 25c to 28a, 28b, and 28c, inclusive are drawings corresponding in general arrangement to Figures 24a, 24b, and 24c, respectively, which show in heavy outline the operation of circuits used during later stages of the multiplying example.

Figure 29:
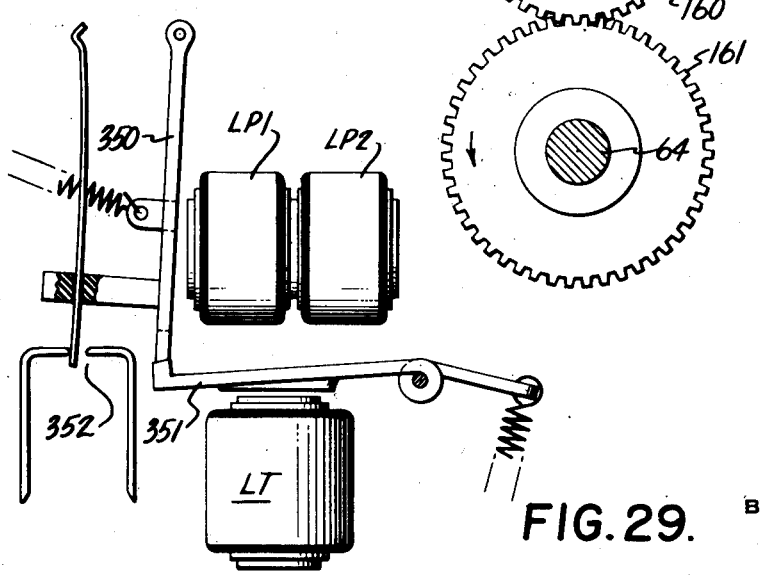

Figure 29 is a schematic drawing of a latch type relay device employed at various places in the circuit diagram of the machine.

Figures 30a, 30b, 30c, 30d, 30e, 30f, and 30g, taken together, are a multiple cycle timing chart showing all operations related to cards shown on Figure 18.

Figure 31:
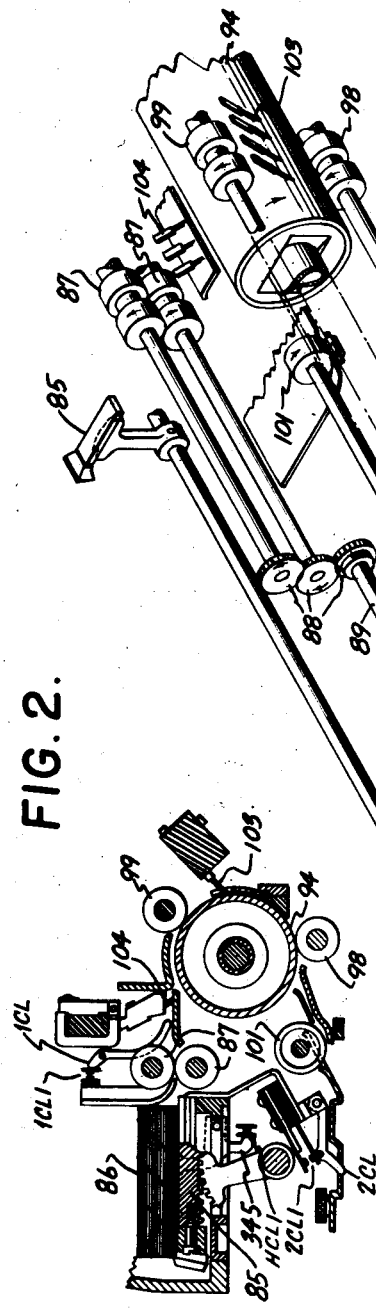
Figure 3:
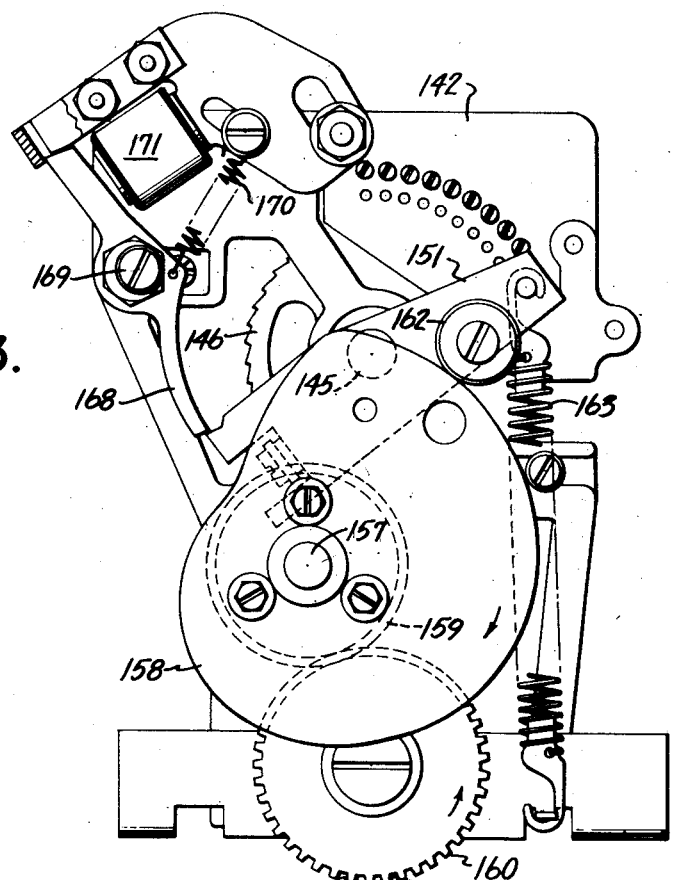

Figure 31 is a chart showing the basis for the design of the "table look-up" circuit used on dividing operations.

Figure 32 is a fragmentary timing chart showing the timing and cam control of setup impulses generally used throughout the circuit diagram.

Figure 33 shows an example of a typical multiplying computation which involves several reversals of sign.

Figure 34 is another example showing multiplication by a multiplier of 844986. This computation shown corresponds to the steps of operation illustrated on Figs. 24a, 24b and 24c through Figs. 28a, 28b and 28c inclusive.

Before describing the present machine in detail, its general characteristics will be briefly described in contrast in certain respects to certain previous calculating and punching machines now in general use, and more particularly the machine described in the application of Brand and Cunningham, Serial No. 756,246, filed June 21, 1947, now Patent No. 2,536,906. Machines of this general type are adapted to read factors and other amounts from record cards, to carry out multiplying operations, cross-adding and/or subtracting operations, dividing operations, and to effect result recording operations by punching back on the record card the results of the calculations including intermediate results, final results, etc. The machine above referred to carried out multiplying operations by partial product procedures, a commutator being utilized for obtaining partial product representing impulses. Other prior machines utilized multiplying relays in lieu of the multiplying commutator. The machine above referred to also utilized a relatively large result accumulator or accumulators, and included 2 storage units which received final results. The same machine was also adapted for dividing operations, operating on the general principle of comparing two orders of the dividend with two orders of the divisor to obtain a trial quotient. This trial quotient was multiplied by the divisor and the product subtracted from the dividend.

This operation was repeated until the final quotient was obtained. Following the development of the above machine, Messrs. Brand and Adams (see application, Serial No. 50,574, filed September 22, 1948, now Patent No. 2,615,624) simplified the dividing procedure of Brand and Cunningham by carrying out dividing operations by comparing a single order of the dividend with a single order of the divisor to obtain a trial quotient. The trial quotient thus obtained was multiplied by the divisor and the result subtracted from the dividend. This procedure was repeated a number of times until the final quotient result was obtained. It was also appreciated that if the trial quotient be the digits 1, 2, or 5, the product of any divisor digit by such trial quotient would always result in partial products components whose sum for any combination of digits would never be greater than 9. Any partial product of any multiplicand digit times a multiplier of 1 will give only right-hand components comprising the digits 1 to 9, inclusive. Any partial product of any multiplicand digit times a multiplier digit of 2 will give RH components of 2, 4, 6 and 8 only with LH components in no case greater than 1. Any partial product of any multiplicand digit of 1 to 9, inclusive, times a multiplier digit of 5 will give right-hand components of 5 and 0 only, and the left-hand components of 0, 1, 2, 3, and 4 only. Review of the above shows that for any multiplying case, the sum of any left-hand component, plus the related right-hand component will never exceed 9. Accordingly, in lieu of using 2 accumulators, one for LH components and another one for RH components, and transferring the result from one accumulator to another, Brand and Adams were able to utilize a single accumulator for both LH and RH components by entering one component in one portion of an accumulator cycle and entering the other component in another portion of the same cycle. Both of these entry operations were effected prior to carry operations. While the incorporation of the last mentioned improvement in the former machine materially simplifies that machine, the machine still presented a certain degree of complexity both in initial cost, cost of up-keep, flexibility of operation, and flexibility of programming. According to the present invention, both of the foregoing machines have been simplified and improved both from a standpoint of initial complexity and cost and from a user's standpoint. In general, this has been done by the provision of a machine which incorporates the following machine units and general principles of operation.

The relatively large accumulator has been materially reduced in columns capacity. In lieu of utilizing this accumulator or sections thereof for certain calculating operations, provision is made for making a greater use of storage devices for receiving initial entries from the card, intermediate results and final results. To this end, a novel number storage unit has been devised into which a number may be entered in one machine cycle. During the later portion of the same machine cycle in which a number has been entered and stored, it is possible to reset the number storage unit to 0 so that a new number may be entered therein in the immediately following machine cycle. The present machine incorporates a number of such novel storage units.

In addition to the use of the novel storage units above referred to, provision is made for programming the operation of the various units of the machine in a novel manner, including the accumulator calculating section, the storage unit or units, the controlling card reading section and the punching section.

Improved selectors are also provided with improved and novel means for calling them into operation.

Without describing the calculating principles of the present machine in detail, as will be done hereinafter, the present machine utilizes the principles of the Brand and Adams improvement for dividing operations, but, in addition, incorporates like principles when the machine is performing multiplying computations. By this procedure, machine construction, machine operations, and machine programming may be materially simplified and standardized, so that an operator who becomes conversant for one operation—for example, division—will more readily understood and be able to program the machine for multiplying, cross-adding, etc.

Before describing the machine in detail the machine's electro-mechanical units may be briefly referred to.

Card feeding and reading unit

This unit picks cards one at a time, reads them at either advance and main sensing brushes or both and then delivers each card one at a time to the punching section. The principal change made in this card reading section of the machine includes a variation in the drive to permit presensing of cards and regular reading of cards at the same index points of the machine, while maintaining the position of the advance sensing brushes in their usual position.

Punching unit

This unit receives the cards from the reading unit and punches them column by column. The interlocking controls are substantially the same as in the Brand and Cunningham machine above referred to.

Accumulator section

Basically this is a 30-column accumulator, but for the simplification of related controls, it has been subdivided into 6 sections. Accumulator 1, hereinafter termed lAC, comprises 6 columnar orders. 2AC comprises 6 columnar orders. Accumulators Nos. 3, 4 and 5 each comprise 4 columnar orders, and 6AC comprises 6 columnar orders. While 6 accumulators totalling 30 columnar orders have been provided, more may be utilized if desired. The various accumulator sections are provided with conventional readouts.

Storage unit

In the machine shown in the present application, 4 storage units are utilized. Each of these has a columnar capacity of 12 orders. They are designated lST to 4ST, inclusive. In commercial machines additional storage units may be provided as indicated in Fig. 1a. The various storage units are provided with readout devices. While these readout devices are identical in construction, some of them are adapted for cyclic readout only while others are adapted for both cyclic readout and/or column by column readout.

Machine drive

This comprises a driving motor with belt and pulley drive to shafting, which through suitable gearing drives the accumulator section, the storage units, and the card handling unit. Belt and pulley drive is also provided for driving the punching unit.

Cam and contact devices

Basically these comprise a single set of cam contact devices which make a single revolution per machine cycle. They are of the constantly rotating type. A reduction has been effected in the number of these devices by utilizing a single cam contact device for as many functions as is possible.

Emitters

A plurality of emitters (three) are utilized while more can be added if desired. These are of the constantly running type.

The machine generally comprises a record reading section with control means for controlling the outflow of impulses from the reading brushes. These controls are customary in machines of this class to prevent back circuits when the record card has passed the reading brushes and when the brushes are in contact with the roll or the like.

The machine further comprises a number of number storage units, each having readout means associated therewith. Provision is further made for controlling each number storage unit so that it may be effective or ineffective to receive impulses. The machine also includes means associated with each number storage unit so that the exit of impulses from storage unit can be controlled selectively.

In addition, an accumulative type calculating section has been provided which has input and output controls related with each calculating section. These may be also selectively controlled. The punching section is also provided with input controls.

In order to provide a directing control for all foregoing, a program control is provided. This device includes a plurality of program sections, one for each step of a sequence of machine operations. Means are provided for supplying control impulses to the sections of program unit and from each section of the program unit these impulses flow to the units which are to be controlled. These controls include substantially all of the foregoing units, that is to say, a section of the program unit may direct that a given storage unit is to be conditioned to receive an entry, it may direct that an entry be read out from that storage unit, it may direct that an entry from a storage unit is to be transferred to the accumulator unit or vice versa. In general, the program unit calls into operation any desired machine function and calls into operation all units of the machine. Furthermore, the program unit is capable of being pre-plugged selectively according to whatever calculation the machine is to perform for a given program set up.

The following nomenclature standards are adopted in the present specifications: all relays will be labelled thus: 168R, etc. Relay contacts will be labelled 168R1 to 168R12. All relay contacts will be assumed to be in the position shown on the circuit diagram, with the relays deenergized unless shown in a typical circuit which assumes an energized relay condition.

All punch control contacts will be labelled PC, and their contacts will be labelled PC1, PC2, etc.

A punch magnet contact will be labelled PM1, the punch magnet being designated PM.

All card levers will be labelled 1CL, 2CL, etc., and their related contacts will be labelled 1CL1, 2CL1, etc.

All accumulators or sections thereof will be labelled 1AC, 2AC, 3AC, etc. Their related readouts will be labelled with a related designation RO.

Storage devices will be labelled 1ST, 2ST, etc. Their readouts will be labelled with the suffix RO.

Exit plug sockets (sometimes called hubs) will be labelled Exit.

Entry sockets or hubs will be labelled with their related functional unit.

The card feed clutch magnet will be labelled CF.

Cam contacts will be labelled C1, C2, etc., and their time of closing and opening will be shown on the circuit diagram. In certain cases their closing time will be indicated in degrees—thus: M280°–B288°, signifying closure during such interval. In certain cases these cam contact devices will have a legend such as M310°–B70°. This indicates closing at 310 degrees in one machine cycle and reopening at 70 degrees in the following machine cycle. Column shift relays will be labelled either Shift 1, Shift 2, and Shift 4 or S1, S2, and S4. Relays which prepare for, or control, column shift will be designated generally as SC1, SC2, SC4.

Machine drive

Referring to Figs. 1a and 1b, the driving motor 50, through the belt and pulley, drives a pulley 51 which is fast to gear 52 which is freely rotatable on a shaft 53. Gear 52 drives the gear 54 which, through gearing generally designated 55, drives a shaft 56. Shaft 56 is the drive shaft for the cam contact devices, one of which is shown. In the actual machine there are 42 of the C-cam contact devices. The upper gear of the 55 gear train drives a gear 57 which is fast on shaft 53; also fast on shaft 53 is gear 58 which, in turn, drives a gear 59 which is fast to a spur gear 60. The spur gear 60 in turn drives a gear 61 fast on shaft 62. Shaft 62, by gearing such as 63, drives storage unit drive shafts such as 64. The storage unit drive shafts 64 make one revolution per machine cycle, or otherwise stated, shaft 64 rotates in unison with shaft 56.

Shaft 53 has fast to it gear 65 which, in turn, meshes with gear 66, fast on counter drive shaft 67. The counter drive shaft 67 rotates in unison with shaft 56 and the storage unit drive shafts 64. Gear 65 also drives a gear 68 which is the main drive gear for the card feeding unit of the machine. See also Fig. 1b.

Gear 66 also drives a gear 69 which in turn drives the gear 70, fast to a belt pulley 71. Pulley 71, through belt 72, drives a pulley on a punch drive shaft 73. Worm drive 74 drives a further punch drive shaft 75.

Emitter drive

Referring again to Fig. 1a the gearing 76 drives an emitter drive shaft 77. The rotatable brushes of emitters EM1, EM2, and EM3 are driven by the emitter drive shaft 77. Emitter drive shaft 77 rotates in unison with shafts 64, 56, and counter drive shaft 67.

Referring now to Fig. 1b, gear 68 drives a gear 78 which is loose on shaft 79. Fast to gear 78 is a 7-tooth ratchet 79. The customary clutch dog is provided which is carried on an arm 81, fast on shaft 49. The clutch dog 80 is adapted to be tripped into engagement with the ratchet 79 by energization of the usual card feed clutch magnet designated CF. Shaft 49 drives a picker cam 82. It will be understood from the diagrammatical view that the parts have been spread apart for clarity of illustration. Picker cam 82 cooperates with the picker follower 83, which rocks a picker shaft 84 in the usual manner. Rocking of the picker shaft actuates the picker 85. See also Fig. 2. The picker 85 is adapted to advance a card from the supply magazine, or hopper, 86. This card after being picked is advanced by the usual feed rolls 87. These are constantly running rolls, being driven by the gearing 88 from a shaft 89 which is driven by a gear 90 meshing with gear 78. Gear 91 fast on shaft 49 drives a gear 92 which in turn, through gearing 93, drives a sleeve which is fast to the card feed drum 94. Also fixed to shaft 49 is another gear 95 which drives the gear 96 fixed to a feed roll drive shaft 97 for driving the usual feed rolls 98 (see also Fig. 2). The further feed roll 99 is driven in a similar manner from gear 95 through the medium of the gear 100. Another constantly running feed roll 101 is driven by gearing 102 from shaft 89. Cooperating with the cards on the drum 94 are the usual main reading brushes 103 and advance or presensing brushes 104. Due to physical limitations in the machine it has been impossible to dispose brushes 104 and 103 so that both sets of brushes will read the same index point on two successive cards concurrently. To compensate for this condition, the new gearing and clutch drive above described has been provided. Briefly stated, the picker 85 picks each card four index points in advance of the time heretofore used in former machines. The timing relationship between the advance sensing brushes 104 and the main sensing brush 103 and the drum 94 is 4 cycle points less than one complete machine cycle. When a card is withdrawn from the magazine during a single cycle of card sensing mechanism this card will be carried through the feed rolls 87 past the sensing brushes 104 and if the card feed clutch mechanism be disengaged at this time the card will remain at rest at a position intermediate with brushes 104 and 103. Upon the next engagement of the clutch dog 80 the card which has been standing on the drum will be sensed by brushes 103 and the following card will be advanced by the picker in time relationship to be sensed by brushes 104 at a time directly corresponding to the sensing time of the preceding card at brushes 103, with respect to an accumulator cycle. It may be explained that the card feed in the instant machine is in operation for 1¾ machine cycles instead of being in operation for two machine cycles as in previous machine.

*The accumulating mechanism*

Figure 6:
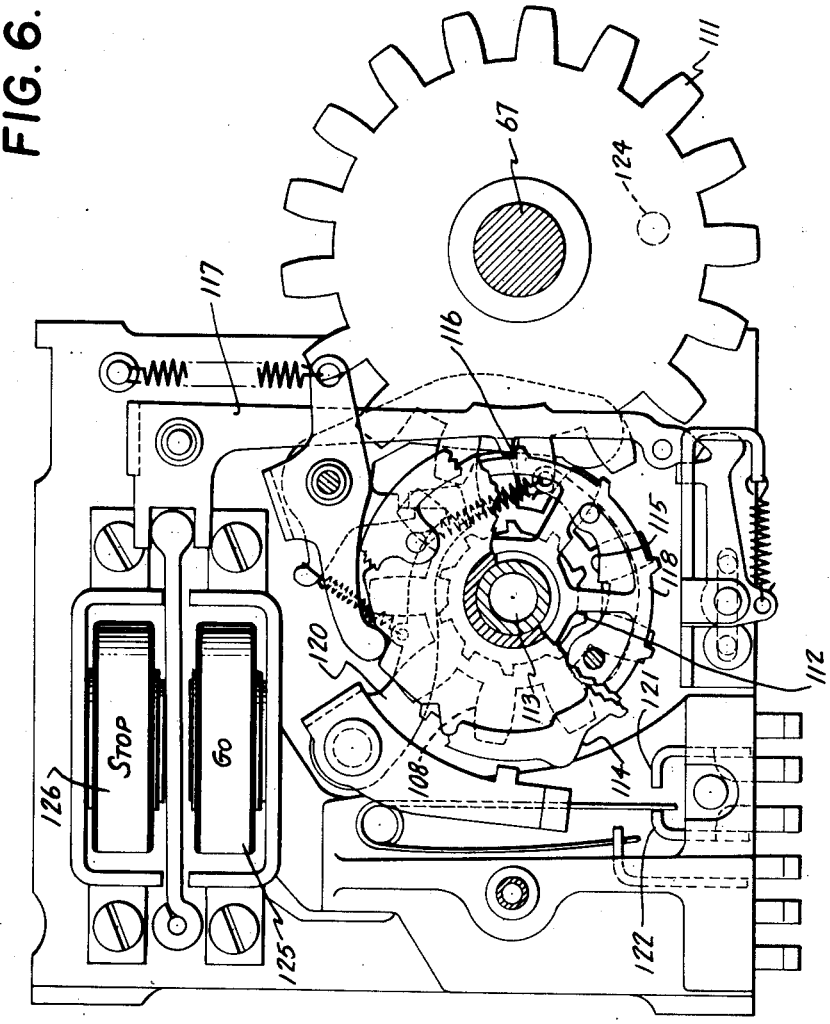

The accumulating mechanism is of the well known type disclosed in the Lake et al. Patent 2,328,653, granted September 7, 1943, and one unit or order thereof is shown in Fig. 6. Its operation briefly is as follows.

The constantly rotating shaft 67 (Fig. 1a), driven in the manner previously described, has secured thereto a gear 111 for each accumulating unit or order. This gear meshes with and drives a gear 108 integral with driving ratchet 112 (Fig. 6) freely rotatable on a stud 113. Also free on stud 113 is an element or wheel 114 to which is pivoted a dog 115 lying in the plane of ratchet 112 and normally held out of engagement therewith. As more fully explained in the patent referred to, this disengagement is maintained through the interception by a tooth 116 on a lever 117, of a disk 118. When lever 117 is rocked counterclockwise, the disk 118 is released and, as a result, dog 115 engages ratchet 112 and is driven thereby together with accumulating element 114. At a selected point in the cycle lever 117 is rocked back into intercepting position and effects uncoupling of the accumulating element. A cycle of operation represented by a revolution of shaft 67, is divided into sixteen so-called cycle points designated as 9, 8, 7, 6, 5, 4, 3, 2, 1, 0, etc. To enter any significant digit, clutching is effected at the correspondingly numbered cycle point, and later declutching at the 0 cycle point will leave the accumulating element or wheel 114 advanced a corresponding amount. The driving ratio is such that wheel 114 advances a tenth of a revolution for each cycle point of engagement and thus has ten rotative positions representative of the ten digits.

When wheel 114 stands at its rotative position 9, a carry lever 120 rocks to close 9's carry contacts 121 and, when the wheel passes from 9 to 0 position, 10's carry contacts 122 are closed and latched as shown. To effect a carry entry of one unit, lever 117 is rocked counterclockwise after the 0 point in the cycle, and one point later it is rocked back again to effect uncoupling. A pin 124 is timed to release the latched carry lever 120 after this carry period in the cycle.

A magnet 125 designated "Go," when energized, will rock lever 117 counterclockwise to start rotation of the accumulating wheel 114, and a second magnet 126 designated "Stop," when energized, will rock lever 117 in reverse direction to stop rotation of the wheel. This second magnet is employed for operations wherein the 9's complement of a digit is entered by initially energizing Go magnet 125 at the 9 point in the cycle and thereafter energizing Stop magnet 126 at the cycle point corresponding to the value of the digit whose 9's complement is to be entered.

As usual in this type of accumulator, each wheel 114 has connected thereto a so-called readout brush 127 (Fig. 6c) (shown diagrammatically in the circuit, Figs. 14n and 14o), which takes any of ten positions with relation to a series of contact segments 128 to effect an electrical connection between the segment and a common conductor 129. In the actual accumulator, the segments 128 and conductor 129 are circularly disposed as is well known but in the circuit they are illustrated in a linear manner for more convenient explanation and circuit tracing.

The separate units or orders are grouped to form several accumulators designated as 1AC, 2AC, and 3AC to 6AC, inclusive.

*Storage devices*

Each of the storage units 1ST to 4ST, inclusive (see Figs. 1a, 3, 4, and 5) comprises a group of ten digital contact bars 140 and one blank bar 141. These are mounted at their ends in plates 142 of insulating material, so as to be out of contact with each other, and each is provided with an electrical connector. The insulating plates are mounted upon side plates of a frame tied together by cross bars such as 144. The contact bars are arranged in an arc centered at the axis of a shaft 145 journalled in the two side plates. Rotatably mounted on the shaft are a number of rotary storage elements 146, in this case 12, to provide 12 decimal columns of storage. Each storage element has a contact pin 147 mounted on the storage element by a spring 148 and extending through a hole in the storage element, in position to slide over the inner edges of the contact bars. Each supporting spring 148 is electrically connected by a rivet to a contact strip 149 upon which bears wiper 150 supported by a piece of insulation on the cross bar. The wipers pertaining to the different storage elements are electrically connected to binding posts to provide means to complete circuits through the individual storage elements to any of the 10 contact bars on which the contact pins are bearing.

Means are provided to set the storage elements concurrently to make contact with selected contact bars, as determined by differentially timed impulses. For this purpose there are means to rock the 12 storage elements together and to stop them individually in the required different positions. Pinned to the opposite ends of the shaft are two bail arms 151 connected by a cross bar 152. Individual springs 153 hooked into the storage elements and anchored to a comb 154 on the cross bar pull the storage elements counterclockwise (Fig. 5) so that normally a shoulder 155 on each storage element abuts upon a stop formed by a U-shaped rubber member 156 on the upper edge of the cross bar 152.

Another shaft 157, journalled in the side frames of the unit, has fixed to it a cam 158 and a gear 159, the latter being connected through an idler gear 160 with a third gear 161 mounted on the storage unit drive shaft 64 journalled in the frame of the machine. The 64 shaft is continuously driven in the manner previously described. A cam follower roller 162 journalled on the bail arm 151 is held against the cam 158 by a strong spring 163 hooked over a pin on the bail arm and anchored to the frame of the storage unit.

Figure 5:
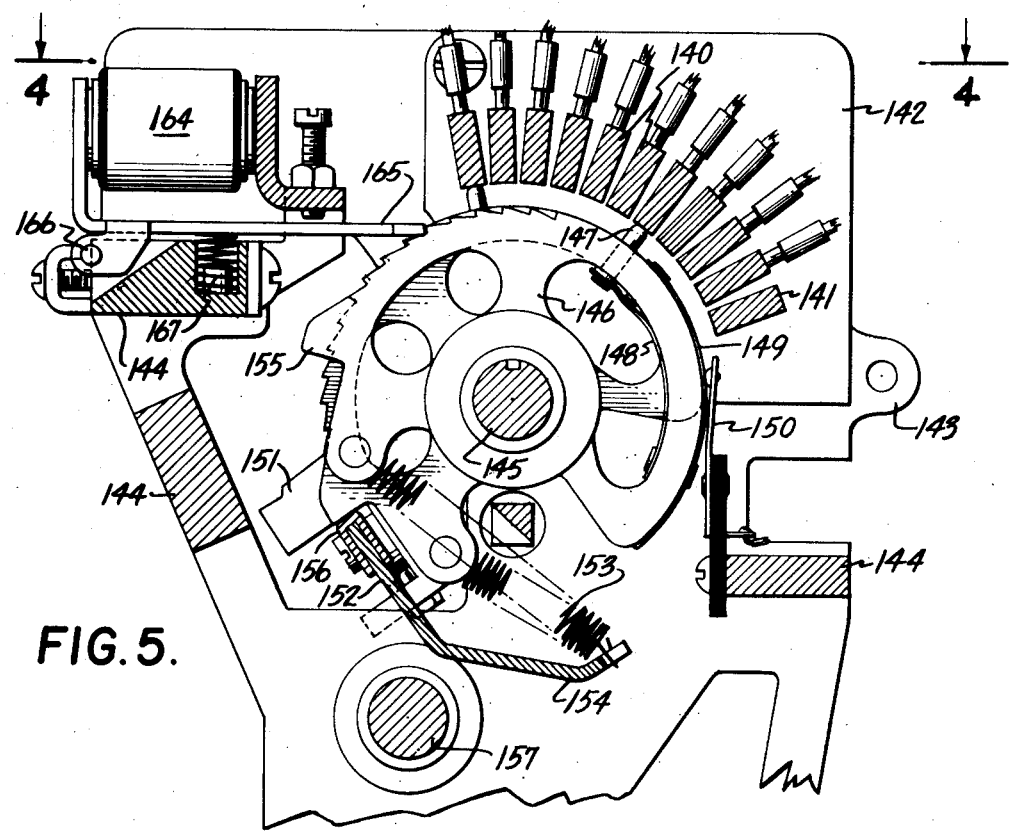
Figure 5 is a sectional view taken on line 5—5 of Figure 4.
Figure 4:
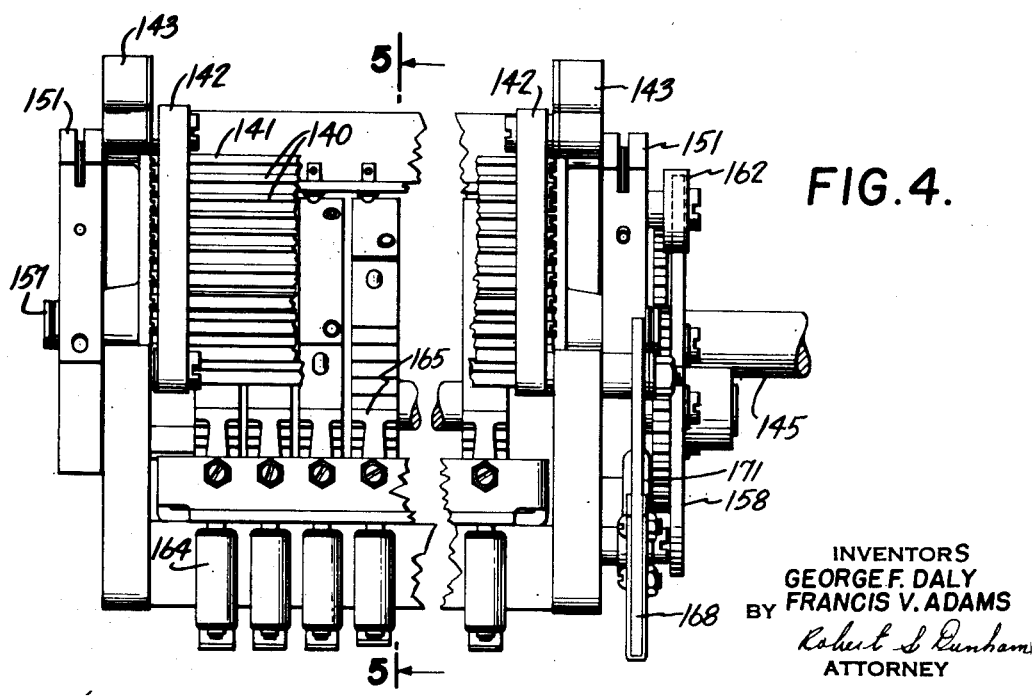
Figure 4 is a top plan view of one of the storage units.

The cam 158 rotates clockwise and during its rise rocks the bail 152 at a rate which causes the contact pins 147 of the storage elements to travel over the contact bars 140—141 in time with the reading of the corresponding index point positions 9 through 0, inclusive. Each storage element has an appertaining storage magnet 164 with an armature 165 pivoted at 166 and extending over into a position to coact with teeth of the related storage element. When a storage magnet 164 is deenergized its armature is tilted by a spring, such as the spring 167, to a position where its right end is just above the teeth of the corresponding storage element. Fig. 5 shows the condition where the front storage magnet in the view has been energized from a 6 index point impulse station, which caused its armature to drop in front of that tooth of the storage element which would stop the storage element in position to leave the contact pin on the number 6 contact bar as shown. Further movement of the bail thereafter simply stretches the spring 153. The next storage element in the rear in Fig. 5 is shown as having moved the maximum distance with the bail, bringing its contact pin onto the 0 contact bail.

When the cam follower 162 rolls onto the highest part of the cam 158 a latch 168 pivoted at 169 is pulled into position to latch the bail, by means of a spring 170. Further rotation of the cam will leave the bail latched with the values stored in the storage unit. The storage unit is reset by energizing a reset magnet 171 at the time the cam follower 162 is on the high part of the cam when pressure of the bail on the latch is relieved. This results in the resetting of the storage unit in a small portion of the latter part of the cycle, as the bail rotates clockwise and picks up the storage elements by their shoulders and returns them to the position where the contact pin bears on the blank contact bar 141. A new amount can be stored in the storage unit immediately on the next machine cycle as the cam follower rides the rise of the cam.

The storage devices which have just been described are claimed in our copending divisional application Serial No. 310,104, filed September 17, 1952.

The previous description of the machine drive has described the manner in which constant drive is imparted to the shaft 73 (see Figs. 1a and 7). The punching unit will now be more fully described.

Punch unit

The punch unit (see Figs. 7 through 12, inclusive) resembles the punch described in the Brand and Cunningham Patent No. 2,333,461. It differes from that patent in that it has no means for duplicating punchings from a master card, and in certain other particulars which will be noted.

A card delivered from the card feed mechanism previously described arrives at the tray in the magazine bed of the punch (Figs. 2 and 7), passing under a guide plate and lifting a card lever 2CL to close a magazine card lever contact 2CL1. The card lies face upon the magazine bed, with its last column edge in front of a pusher 180 (Fig. 7). The pusher is reciprocated, by means to be described presently, to feed the card from the tray to the punch station and to return to the normal position shown in Fig. 7, ready to receive the next incoming card.

In feeding toward the punch station the card glides along thet card bed (Fig. 9) and passes under a die card lever 3CL, which, being raised by the card, closes a die card lever contact 3CL1. At the end of the card feed action by the pusher 180 the card is delivered to a card carriage which is to control its positions during punching. The card carriage comprises a rack 181 (Figs. 10 and 12) from which extends a card stop 182 at the leading end of the card and a card pusher 183 at the trailing end of the card. Through a mechanism to be described the card carriage moves oppositely to the card feed pusher, during the card feeding operation, and the pusher 183 rides over the top of the card and drops behind its trailing end at the end of the card feeding operation. The card feed pusher 180 now leaves the first card and returns to position to receive the second card.

The card carriage is controlled so as to move one column at a time, to position successive columns for punching. It can also be controlled to travel for a predetermined number of columns in a continuous movement without punching, which is called skipping. When the last column which is to be punched has received its punching, the card is skipped out to a stacker mechanism identical to the one shown in Patent No. 2,333,461.

The card feed pusher 180 comprises a member 184 (Fig. 7) pivoted at 185 to an arm 186 rigidly attached to a bar 187 which slides in a guide-way. This bar is reciprocated for each card feed operation by a mechanism similar to the card feed mechanism of Patent No. 2,333,-461. In place of the motor which drives the mechanism in that patent, there is an extension of shaft 73 constantly driven in the manner previously explained. This shaft has a worm meshing with a worm wheel (see 74, Fig. 1a) on a transverse shaft 75 to which is fixed a ratchet wheel 188 (Fig. 8). Loosely mounted on this shaft is a cam 189 on which a single toothed dog 190 is pivoted at 191. The dog is urged in counterclockwise direction by a spring and is normally restrained by an armature 192 operated by a punch clutch magnet 193. When the magnet is energized the dog is released and its tooth engages the constantly running ratchet wheel. The cam rotates counterclockwise, setting in motion a link 194 pivoted to the cam at 195 and to an arm 196 pivoted on a stationary shaft 197. The arm rocks first clockwise, driving, by a notch in its periphery, a second arm 198 pivoted on the shaft 197 and having a tooth which is held in the notch by a spring 199. A sector 200 fixed to the arm 198 meshes with a small gear 201 secured to a large gear 202 meshing with rack teeth on the bottom side of the bar 187. These gears are moved counterclockwise by the sector and the large gear drives the rack bar to the left, feeding the card from the tray to the card carriage. The top side of the bar 187 has teeth meshing with a gear 203 rotatably mounted on a shaft 204 (Fig. 10) which extends to the back of the punch, where it has fixed to it a gear 205 meshing with teeth on the bottom of the carriage rack bar 181. The gear 203 is coupled to the shaft 204 by a one-way clutch 206. Thus the card feed bar, in moving to the left, drives the carriage rack bar to the right (Fig. 7) and brings it finally into position to receive the card at the end of the card feed movement. In its movement to the right the carriage rack bar 181 rotates the gear 207 of a spring box (shown and described in Patent No. 2,333,-451) so that at the end of the restoring movement of the carriage the spring is wound up. A governor 208 controls the movement of the carriage during skipping operation.

During the second half of the rotation of the cam 189, the arm 198 is rocked in counterclockwise direction and the card feed bar is restored to its right end position. The one-way clutch connection 206 between the gear and the shaft allows the restoring motion of the card feed bar to take place while the carriage remains stationary in its restored position, or executes a movement to the left independently of the card feed bar, as determined by the escapement or skipping mechanism to be described.

Associated with the card feed drive mechanism is a pair of so-called "latch contacts," namely punch clutch latch contact PC1 and punch clutch latch contacts PC2. These contacts are operated by a lever 209 mounted on a stationary pivot 210 and normally latched by armature 192 in position to hold punch clutch latch contact PC1 open and contact PC2 closed. When the punch clutch magnet 192 is energized the lever 209 is released and the contacts are reversed. A restoring arm 211 fixed to the cam 189 by studs relatches the lever when the cam is halfway through its cycle and restores the contacts to normal condition.

The ejecting mechanism is identical to the one shown in Patent No. 2,333,461 and is now not shown in detail herein. It is actuated by the cam 189 on each punch card feed cycle.

The card, in moving along the card bed, passes between a die 212 and a stripper 213 (Fig. 9). The die has 12 holes and the stripper has mounted in it a corresponding number of punches 214 aligned with respective holes of the die. These are arranged in a column, as shown in Fig. 12, the punches being positioned in accordance with respective index point locations of the card. Each punch is normally held up by an individual coil spring 215 and is slotted to receive the end of a related interposer 216. Each interposer is pivoted at its right end to the bottom end of an appertaining armature 217 mounted for operation by a related interposer or punch selecting magnet 218. When any interposer magnet 218 is energized its interposer is moved to the left under a shoulder 219 on a motor bar 220, common to all punches and pivoted at 221 on the frame of the punch.

The interposer has an upstanding finger 222 which bears against the cross rod 223 of a rocking bail. This cross rod is carried by two side arms 224 pivoted at 225 on depending brackets 226, one of which is shown on Fig. 9. The front arm 224 of the bail has attached to it a spring contact operating member 227 which engages an insulating piece on one spring of an interposer bail or punch magnet contact PM1. When the interposer moves to the left this contact is closed and, as will be seen in the circuit diagram, it completes a circuit to energize the punch magnet PM. An armature 228 of the punch magnet is connected by a linkage comprising a link 229, a bell crank 230, and a second link 231, to the motor bar 220. When the punch magnet PM is energized the link 231 moves down and presses the operated interposer against the related punch, which is driven through the card. When the punch magnet PM is deenergized in a manner to be described, a spring 233 restores the armature and linkage to its normal position against a stop. A toggle mechanism 234 prevents the armature from banging against the magnet core and is bowed upward when the punch magnet is deenergized by a spring. The restoring movement of the link 231 lifts the motor bar 220, which engages the top of the slot in the punch and positively restores the latter to normal position.

At the beginning of the punching of a column the carriage is held in the correct position for the punching of the column by a holding dog 235 (Figs. 10, 11, and 12) engaging a tooth of the rack 181. This dog is pivoted by an elongated slot on a rod 236, and is driven toward the right by the force of the spring drum acting on the rack. A small spring 237 hooked into an eye on the holding dog at one end and anchored at its other end to a pin 238 on an arm 239 urges the holding dog to engage the rack. The arm 239 is pivoted on the rod 236 and has at its right end a pin 240 which engages in the fork of an escapement dog 241 mounted on a stationary pivot 242. Also mounted on the rod 236 is a rock lever 243 urged in counterclockwise direction by a spring 244. The rock lever has a screw stud 245, the bottom end of which bears upon a flange on the arm 239, under the force of a spring 246 which connects the pin to an eye on the rock lever 243. The rock lever normally holds the escapement dog 241 out of engagement with the rack, with its tooth poised just to the right (Fig. 11) of a tooth on the rack. Thus if the escapement dog is moved to engage the rack as the holding dog is lifted above the rack, the rack will move only imperceptibly.

The left end of the rock lever 243 has fixed to it a long pin 247 extending through a large opening in the holding dog 235. Upon the right end of the rock lever bears a set screw 248 mounted on an escapement lever 249. The escapement lever is pivoted at its left end (not shown) and at its right end has a fork embracing a pin 250 on the motor bar 220. When the motor bar is depressed to punch a hole, the rock lever 243 is rocked clockwise and the pin 247 lifts the holding dog 235 out of the rack as the escapement dog is moved into the rack. The carriage undergoes only a slight movement at this time, which does not interfere with the punching. As the holding dog clears the rack it is pulled to the left (Fig. 11) by its spring, to the limit of the movement permitted by the elongated slot. This positions its tooth in front of the next tooth to the left on the rack, but leaves the holding dog above the rack bar for the present. When the motor bar rises the rock lever 243 rocks counterclockwise dropping the holding dog in front of the next tooth to the left on the rack and then lifting the escapement dog from the rack. As the escapement dog clears the rack, the spring drum moves the rack to the right as far as permitted by the elongated slot of the holding dog. At the end of this movement, the carriage is held where it will position the card for punching the next column.

A normally closed escape contact PC3 is operated by the holding dog 235 through a lever 251 composed of insulating material, which rocks on a stationary pivot 252. The escape contact PC3 is held open from the time the holding dog jumps to the left on leaving the rack, until it is returned to the right by the rack, on arrival of the card carriage in a new columnar position. The escape contact PC3 opens the circuit to the interposer magnets 218 and to the punch magnet PM during escapement time. After each punching operation the punch magnet PM is deenergized by the opening of contacts PC3.

A skipping mechanism is provided for causing the card carriage to escape over a plurality of columns in a continuous movement. In general, this skipping mechanism resembles the one disclosed in a co-pending application of Samual Brand, filed March 21, 1946, Serial No. 656,045. A T-leaver 253 (Fig. 12) mounted on a stationary pivot 254 is jointed to a link 255 to form a toggle. The outer end of the link 255 is connected to a leaf spring 256 pressing toward the right (Fig. 12) which detents the toggle on either side of its dead center position, the movement being limited by a stationary pin 257 engaging in a fork of the T-lever. A link 258 connected to the joint of the toggle is provided with a slot into which extends one arm of a lever 259 rockably mounted on a shaft 260 (Fig. 9). The other arm 261 is connected to the plunger 262 of a skip solenoid or magnet 263. When the skip solenoid 263 is energized the toggle is moved from its normal position shown in Fig. 12 to its opposite position.

A skip lifter 264 articulated to the joint of the toggle, extends under the holding dog 235 and its extremity rests in the notch of a skip stop lever 265. The lever is pivoted at 266 (Fig. 10) on a stationary part and is urged clockwise by a pin 267 pressed downward by a coil spring. The bottom edge of the skip lifter is inclined, so that when the skip lifter is moved toward the bottom of Fig. 12 by the skip solenoid 263 it tends to spread apart the skip stop lever 265 and the holding dog 235. Since the holding dog at this time is frictionally held by the rack, the skip stop lever 265 rocks down against the action of its spring pin. The circuit is arranged so that whenever the skip solenoid 263 is energized, the punch magnet PM is also energized, without any punch selector interposer being shifted. Thus, the escapement lever is rocked and the holding dog is lifted from the rack. When this occurs the skip stop lever 265 rocks under the force of its spring pin until stopped by a stationary pin 266 in an enlarged hole of the skip stop lever 265. In this position the skip stop lever, acting through the skip lifter, will prevent the holding dog from returning into engagement with the rack. The rack is not at first permitted to escape, however, because the lifting of the holding dog is accompanied by an engagement of the escapement dog. When the rock lever 243 rocks counterclockwise the escapement dog is lifted from the rack, while the holding dog is held up by the skip lifter, allowing the rack to escape over a plurality of columns. Its skip movement is terminated by an insert 270 on the skip bar 268 (Fig. 11). This insert, which may be located in any selected columnar position, moves under the nose on the right end of the skip stop lever 265, and rocks the latter counterclockwise. This movement allows the holding dog to engage a tooth of the rack, terminating the skipping movement.

Pivotally mounted on the rod 236 is a restoring bail 269, Fig. 12, the cross bar of which underlies all of the interposers except the X interposer. This bail has an arm 280 (Fig. 9) which coacts with an arm 281 on the T-lever 253, Fig. 12. When the skip mechanism is in normal position the restoring bail 269 is below the field of action of the interposers, but when the skip mechanism is moved to active position the bail 269 is raised, by the coaction of arms 280 and 281 to a position such that it will be struck by any interposer which operates a punch. The resultant downward rocking of the bail will restore the skip mechanism. Thus, the skip mechanism will be restored by the first punch operation following a skip operation.

Mounted on the frame of the punch is a contact called the last column contact PC4. An arm 282 on the rack closes this contact when the card carriage escapes from the last column. This prepares the circuit for a punch card feed and ejection operation.

If the last column to be punched is not the last column of the card the punching of this column is followed by a skip-out through the last column position. An operation of the skipping mechanism is initiated by the skip solenoid and the carriage moves to its extreme position, without hindrance of any skip bar insert, closing the last column contact PC4 and initiating ejection and punch card feed operations. The skip lifter remains in its actuated position during the restoring of the card carriage and when the new card is fed to the card carriage the holding dog does not necessarily stop the card carriage in the first column position, or in a position determined by the location of the first column position, but in a position determined by the location of the first insert on the skip bar, which will terminate the skipping operation. The punching of the first column of information will restore the skip lifted to its normal position and escapement of the card carriage will then proceed as previously described.

An arm 283 on the card carriage carries four vertically aligned column read-out brushes. These bear upon a stationary column read-out strip 284 of the kind shown in the patent to Von Pein et al., No. 2,157,040. In the present case the strip is a metal plate, insulated from the frame of the machine, with plastic inserts 285 in sockets thereof, each insert having a metal contact spot 286 connected to a plugwire socket, Fig. 12a. The contact spots are in diagonal columns and there is a spot for each card column. There is always one brush, and only one, on a contact spot, in any columnar position of the carriage. One or more of the other brushes will then bear on the base metal plate. The brushes are electrically connected together. Therefore the contact spots are electrically connected in succession to the base metal plate, which has a socket 287 to receive a plugwire.

Summarizing as to the electrically controlled contacts in the punch, there are 5 of these contacts. Contacts PC1 and PC2 are so-called latch contacts. The function of contact PC1 is to maintain the main driving motor 50 in operation until the last card of the run has been ejected from the punch. This control is effective after the normal motor running circuits have ceased to function.

The general purpose of contact PC2 is to interrupt all circuits to the punch selecting magnets and to the punch magnet during return movements of the card carriage and thus prevent any arcing at the column readout strip.

The general purpose of escapement contacts PC3 is to interrupt the circuits to punch selecting magnets and to the punch magnet following the punching of a hole in the card and during escapement of the card carriage.

The general purpose of PC4 contacts is to initiate card eject operations and to initiate return of the card carriage in the punch so it may be in a position to receive a new card. The PC4 contacts are here operative in conjunction with the CL contacts, which contacts indicate the presence of a card in the tray of the punching section of the machine.

The PM1 contacts are provided to control the energizing of the punching magnet PM and to also prevent energizing of the magnet when they are in open condition.

The 3CL–1 contacts in the punching section of the machine are contacts which close when a card has been advanced through the punch to a position adjacent to the punching die. The opening of these 3CL–1 contacts is used for certain controlling operations, the general purpose being to detect improper endwise feeding of a card in the punch or lack of such card feeding.

*Accumulator operation*

Before describing in detail the basic multiplying rules of the present machine, it may be mentioned that the accumulators of the present machine operate on the so-called direct reading (9's complement) system. The basic features of this system are as follows:

1. All accumulator wheels are reset to 9 initially.
2. Numbers are added by entering the nines complements of the number into the accumulator.
3. Numbers are subtracted by adding the direct number into the accumulator.
4. Carry-back from highest order to lowest order is utilized. This is a normal accumulator operation for this type of machine.
5. A negative accumulator reading indicated by 9 in the highest order represents the 9's complement of a positive number.
6. A positive accumulator reading indicated by a 0 in the highest order represents the true value of a negative number.

From the foregoing, it is evident that subtraction by the direct reading system is similar to addition by the more conventional direct subtraction method; that is, an accumulator wheel is started by an impulse from the card or other control source at some variable time and accumulator wheel movement is stopped near the end of the cycle by an impulse occurring at a fixed time. Conversely, addition in the direct reading system is similar to the conventional concept of subtraction. In this case, the accumulator wheel is started at the beginning of a cycle by an impulse occurring at a fixed time and accumulator wheel movement is stopped at some later variable time by an impulse from the card or other control source.

Fig. 15 shows the accumulator movements for both adding and subtracting operations for different impulses derived from record cards or different impulses derived from readouts on transferring operations. For example, on an add operation the legend MG designates a machine "go" impulse. If the index point value of an impulse is 1, for example, on adding, the machine "go" impulse comes at 0 degrees and accumulator wheel movement starts after a slight delay. The accumulator wheel movement continues for 8 steps of counter wheel movement. The digit representing impulse is received at 180 degrees, which is at 1 index point time. This is represented on the diagram by the legend "DS" meaning digit stop. As shown on the diagram, the resulting accumulator movement will be 8 steps.

If 1 is to be subtracted the digit "go" impulse is received at the 180-degree index point, the accumulator wheel will take up movement at the point indicated by the solid line, and this movement will be terminated by a machine "Stop" impulse which is received at 202½ degrees of machine main drive shaft movement. The accumulator wheel will, in this case, be moved one step. The diagram also shows the time of the carry impulse, which comes in at 247½ degrees as indicated by the symbol "G" for "go" and the "stop" impulse comes in later as indicated by the legend "MS." The accumulator wheel in this instance is moved one step.

From the foregoing, it will be seen that on adding operations, the machine controlled "go" impulses always occur at 0 and the digit "stop" impulses occur at variable index point times or degrees through the cycle. On the other hand, on subtracting operations, the digit "go" impulses occur at variable times through the cycle and the machine "stop" impulses always occur at a fixed time; namely, 202½ degrees of accumulator drive shaft movement.

The foregoing chart, Fig. 15, illustrates timing conditions for direct entries either from the card or from a readout device or for operations involving multiplication by one.

Referring now to Fig. 16, this timing chart shows the time relations of both "go" and "stop" machine impulses and digit impulses for all operations involving multiplication by 2. The left-hand column of figures on the chart indicates the digit 2 multiplied by digits 1 to 9, inclusive, including 0. The next two columns indicate RH (right hand) and LH (left hand) digital components respectively. Assume, for example, a multiplicand digit of 1 and a multiplier digit of 2. Here the RH component is 2 and the LH is 0. The machine "go" impulse occurs at the 0 degree position. Since the nines complement of 2 is actually to be entered into the accumulator, this entry is effected by first providing 6 steps of accumulator movement followed at 135 degrees by a digit "stop" impulse. This will afford 6 steps of accumulator movement. Later, at 202½ degrees, there is another machine "go" impulse which provides a single further step of accumulator wheel movement which is terminated at 225 degrees by a machine "stop" impulse. Accordingly, under this condition, there will be 7 steps of accumulator movement made up of an initial movement of 6 steps followed by a further movement of 1 step. The chart at the top of Fig. 16 shows similar conditions for other multiplicand digits, all of which involve a 2 digit as a multiplier.

Considering now the same operations on subtraction, (see lower portion of Fig. 16) here a digit "go" impulse is received at 135 degrees. Accumulator wheel movement commences, terminated by a machine "stop" impulse which is received at 180 degrees. The resulting complete accumulator movement will be 2 steps. The subtracting operation will be understood from the following arithmetical example:

```
Subtract   9999
              2
           ----
           0001
Carry         1
           ----
Neg. Result   2
```

In the explanation above, 2 added to 9999 gives the result of 0001. However, there is a carry from the highest to lowest order, so an additional unit of 1 is added to the lowest order wheel, which gives a resulting amount of 2. This is characterized as a negative balance by the presence of a 0 at the extreme left.

Referring again to Fig. 16, consider multiplication of 2×4. Here the RH component is 8 and the LH component is 0. It will be noted, however, that at 0 degrees there is a digit "stop" and a machine "go" impulse, both occurring at 0 time. By reference to the accumulator, these 2 impulses in effect buck or cancel each other out, so no accumulator movement takes place at this time. Later in the cycle, there is a machine "go" impulse at 202½ degrees which results in a one unit movement of the accumulator wheel, the movement being terminated at 225 degrees by a machine "stop" impulse.

If Figs. 15 and 16 be compared, it will be noted that on Fig. 15 the terminating MS impulses occur at 202½ degrees, whereas on Fig. 16, the terminating MS impulses occur at 225 degrees. This is necessary because the intermediate controlling impulses are required at 202½ degrees as indicated on the chart. There is, accordingly, one unit of time where there is no accumulator wheel motion.

Fig. 17 need not be further described except to state that this pertains to multiplications with the 5 digit as a multiplier. Since dual entries are required in a single accumulator cycle, 5 steps of accumulator wheel movement are provided for in the first portion of the cycle, with up to 4 steps provided in the last part of the cycle. In this particular instance, the intermediate digit "stop" and machine "go" impulses come in at 135 degrees instead of at 202½ degrees as in Fig. 16. In Fig. 17, all accumulator wheels will stop in response to a machine stop impulse coming in at 112½ degrees unless such wheels remain at rest.

As an example of subtraction, consider the subtraction of 0293 from an accumulator which has been reset to a true value of 0000; i. e., the accumulator wheels all stand at 9:

```
Accumulator value (position of   Digit
accumulator wheels)              (true) value
     9999                         0000
    +0293                        −0293
                      Including
End of accumulation  9182 Carry Back
Carry                1111
                     ----
                     0293                −0293
                     0−0293=−0293
```

In the direct reading system, the busses of the accumulator readouts are so connected that the 9's complement of the accumulator value is sensed. Thus the result 0293 of example 9 would be transferred out of the accumulator as impulses representing 9706. This set of impulses if directed to a storage unit would set up a reading of 9706 or the nines complement of 0293.

If 0293 is added to an accumulator which has been reset to 9's the following action takes place:

```
Accumulator value (position   Digit
of accumulator wheels)        (true) value
    9999                        0000
   +9706 (9's comp. 0293)      +0293
   ----
    8695
Carry 111
    ----
    9706                       +0293
       0+0293=0293
```

Owing to the complement connection of the accumulator readouts mentioned above, the result 9706 of the above example would appear during readout as a set of impulses representing a value 0293. These impulses directed to a storage unit would set the unit to a reading of 0293. It is of interest to note that the impulses 0293, if added to the accumulator value 9706 which produced them, yield 9999. This suggests that the readout impulses can be used to reset the accumulator by directing such impulses to the "go" magnets of the respective accumulator positions, and by stopping the accumulators with the usual fixed machine stop impulses at the 202½° time employed during ×1 subtraction. This method of reset constitutes one of the most important advantages of the nines complement system of accumulator entry, since it is seen that accumulator readout and accumulator reset may take place during the same cycle.

Figure 6A:
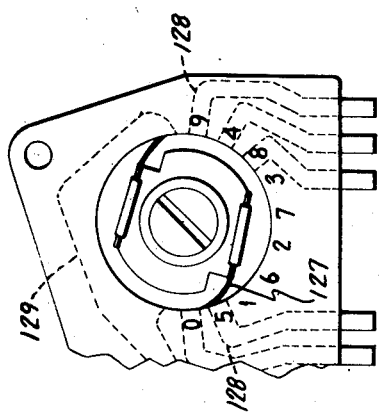
Figure 6a shows the readout of the accumulator.

It may be mentioned that though the readout impulse is passing through an accumulator commutator brush 127 and readout segment 128 (Fig. 6a) when the Go magnet of the same accumulator is being impulsed, the clutch lag of the accumulator is such that the impulse is terminated before the accumulator wheel begins its reset movement and moves the brush from the segment.

Before discussing further the basic multiplier rules under which the machine operates, it will be helpful to point out in a general manner the machine procedure. On a multiplying operation, the multiplier amount is read in from a card and entered into a designated storage device. As generally explained before, this storage device has a readout section associated therewith. In the present machine, provision is made for sensing the amount set up on the readout device. Sensing is effected from left to right; that is, the highest order multiplier digit is sensed first followed later by the sensing of the lower orders. The sensing is for several purposes:

1. There is a sensing to determine whether there is a 0 in an order of the multiplier, or a significant digit.

2. There is a further sensing to determine the value of the significant digit.

With this general explanation, the basic multiplier rules will now be recited as follows:

*Multiplying principles*

It has been previously stated that in order to obtain two entries of partial product components in a single cycle, the multiplier digits and their corresponding partial products are limited to use of the digits 1, 2 and 5. Any other digit which may be encountered in a multiplier is used by the machine to select a combination of 1, 2 and 5 making an algebraic sum which will equal the digit of the multiplier on which the machine is currently operating. Such combinations are limited to the use of no more than two of the factors 1, 2 and 5. If a combination be selected the machine goes through two multiplying cycles to complete the operations related to a single digit of the multiplier.

For example, if the multiplier digit be 6, the machine initially breaks this digit down into a combination of 5 and 1 and in such a case would first multiply by 5 and then by 1. At the end of two cycles, the partial product which had been entered into the products accumulator would be the same as if partial product for ×6 had been entered in a single cycle.

As another example, if the multiplier be a 3, the machine initially selects a +5 and a −2, first entering partial products of the multiplicand as if the multiplier were a 5 and then entering partial products as if the multiplier were a negative 2. At the end of these two cycles of operation the amount appearing in the products accumulator will be the same partial product which would have resulted from a direct multiplication by 3.

The machine operates in a special fashion whenever the digit of the multiplier is a 9 or a 4. If the principle described in the preceding paragraphs were applied in such cases it is obvious that a 4 appearing in the multiplier might be operated upon during two machine cycles, multiplying by +5 and then multiplying by −1 so that to all intents and purposes a 4 might be treated in exactly the same manner as has been described for a 3. A more efficient method is employed in the machine whenever the multiplier digit be a 9 or a 4 (except in the units position).

Until a 4 or a 9 is encountered in the multiplier the machine proceeds with what may be designated as normal sign operations. When a 4 is encountered the machine carries out a multiplication by 5 and thereafter compensates for this excessive entry into the product accumulator by operating for further multiplier digits with what may be termed reversed sign operations. Under reversed sign operations the partial product components are obtained by using the product of the nines complements of the sensed multiplier digit or digit times the multiplicand and such product is subtractively entered into the products accumulator.

In a corresponding manner when a nine is sensed, the machine multiplies the multiplicand by 10 and compensates for this excessive product by entering further amounts with a reversed sign operation as described above.

After reverse sign operation is in effect, it remains effective for succeeding digits until a 5 or a zero multiplier digit is sensed (the nines complement of these digits are 4 and 9). This has the effect of multiplying by 5 or by 10 as previously explained with an attendant sign reversal which in effect restores the machine to normal sign operations.

The above general succession of events may be repeated several times if suitable combinations of digits are encountered in the multiplier.

The operation of the machine, may best be explained by one or two examples of the arithmetical operation, before an attempt is made to explain the derivation of rules which govern machine operations.

If 17 be multiplied by 48 for example, the results of such multiplication may be obtained by using digits 4 and 8 as multiplier digits, adding the partial products of such entries offset to the corresponding columnar position. The same result may also be obtained by first entering the partial product using 50 as a multiplier and thereafter subtracting another partial product using as a multiplier the difference between 50 and 48, in this case 2.

|  | Normal method | New machine method (condensed) |
|---|---|---|
| Multiplicand | 17 | 17 |
|  | 48 | 48 |
|  | 68 (×40) | 850 (×50) |
|  | 136 (×8) | − 34 (×−2) |
| Product | 806 | 806 |

The machine is arranged to take note of 4's in such a case and each time a 4 appears in any position of the multiplier, except the units position, the machine operates on a single cycle using 5 as a multiplier. Each digit at the right of the "4" multiplier digit is then treated as a complement and the partial product is subtractively entered into the products accumulator. Referring again to the example noted above, the actual partial product obtained when multiplying 17 by 4 in the 10's position is 680. The partial product obtained when multiplying by 8 in the units position is 136. The partial product obtained when multiplying by 50 according to the machine method is 850 and when multiplying by −2 the partial product is −34. The net sum of partial products is the same in either case.

If each 4, whenever encountered in the multiplier, be treated as a 5, there will be an entry in the products accumulator which is greater than the actual product being computed. This "overdraft" as it may be termed, is corrected by subtractively entering partial products during succeeding operations. It must be noted, however, that the digit chosen as a multiplier on such succeeding operation is in complementary relationship to the digit which actually appears in the multiplier storage device. Referring again to the simple example noted above, where 48 is the actual multiplier, if during the initial multiplying cycle 50 be used as the multiplier, the 10's complement of 8, i. e. 2 is used as the multiplier, during the next operation. (This will be the 10's complement if there be only one digit as in the simple case noted above. The digit so used will be a 9's complement in any position of multiplier except the units.) Citing another example, using a three digit multiplier such as 483, for example, the machine would first multiply the 5 in the hundreds position and would then subtract partial products derived by use of the complement of 83. The machine would operate on a multiplier 483 as if it were 500×17. 1 is the 9's complement of 8. The 10's complement of 3 i. e. 7 is used since 3 appears in the units position. Thus in order to save time on 4's, the machine is actually arranged to operate according to the second of these two examples.

|  | Normal | Machine |
| --- | --- | --- |
| Multiplicand | 17 | 17 |
| Multiplier | 483 | 483 |
|  | 68 (×400) | 85 (×500) |
|  | 136 (×80) | − 17 (×−10) |
|  | 51 (×3) | − 119 (×−7) |
|  | 8211 | 8211 |

It should now be explained that the machine may encounter a combination of multiplier digits which will result in a re-reversal of sign one or more times, i. e. whenever the machine encounters a digit which is used by the machine as a 4 or a 9. It should be explained specifically before proceeding further with a showing of more complex example, that the operation of the machine is in all cases governed by the value of the multiplier digit if the machine is operating in normal fashion or by the complement of such a digit if there has been an earlier sign reversal in the sequence of operations related to a single calculation.

We have noted in the earlier examples that when the machine proceeds with the remaining operations after using 4 as a multiplier, each succeeding digit of the multiplier is used by the machine as a complement and it is the value of the complement which governs the machine operation in all such cases, thus in the example noted above using multiplier 483, this number is treated as multiplication by 500 thereafter the 8 is sensed by the machine and converted to a 1, which is the 9's complement of 8, and the 3 in the units position is sensed by the machine and converted to a 7 (10's complement of 3). On a longer example this procedure would continue until such time as the machine senses a 0 (or a 5) with sign reversed. In such cases, the machine operates not according to 0 but according to the 9's complement of 0, which is 9. If the digit sensed be a 5, the machine operates as if the digit was a 9's complement of 5 or a 4. In such cases, the ×10 or ×5 partial product is subtracted, the machine operating according to the examples noted above. However, since we have seen that a true digit value of 4 is treated as a 5 with a reversal of sign, the machine performs a second change of sign returning to normal sign conditions for the succeeding digits. In such a case, the machine operates on the remainder of the multiplier entering positive partial products. A relatively simple example of such a condition is encountered when we multiply 17 by 9852. A manual multiplication might be compared with the machine operation as follows:

| | Normal method | Machine method |
| --- | --- | --- |
| Multiplicand | 17 | 17 |
| Multiplier | 9852 | 9852 |
| | 153 | +170000 (×9 used as ×10 then change sign) |
| | 136 | −1700 (−×1 in hundreds pos.) |
| | 85 | −850 (×4 used as ×5 then change sign) |
| | 34 | +34 (×2 in units pos.) |
| | 167484 | 167484 |

It will be noted that when multiplying by the first digit 9, this digit is treated as a 10 with the reversal of sign on succeeding operations; thus, for example, we may consider that multiplication by 9800 is the same as multiplication by 10,000 followed by a multiplication by −200, the principle being the same as has been explained in the first example above where we obtained the product of 17×48 as the result of 17×50+(17×−2).

In the example where 17 is multiplied by 9852, the 9 in the 1000's order is first used as a 10 and thus a consequent multiplication by 10,000 introduces too large a partial product initially. The reversal of sign at the end of this cycle causes the machine to operate on the 8 in the hundreds position as if it were a 9's complement or 1 and also causes the machine to operate on the 5 in the 10's position as if it were a 9's complement or 4.

In the tens order of the multiplier the machine senses a 5, and since sign reversal is in effect, converts it to the nines complement of 5, which is 4. It has been shown above that a 4 multiplier digit is calculated by entering 5 times the multiplicand, then reversing sign. Since a sign reversal is already in effect at this time the ×5 partial product amount is subtractively entered as shown above and the accompanying sign reversal restores sign conditions to normal for calculation of the remaining portion of the multiplier, in this case a 2 in the units order. The 2 multiplier digit is thus entered as a plus ×2 operation. Thus there is an entry of 170,000 when operating on 9 in the thousandths position, there is an entry of −1700 when operating on 8 in the hundredths position, there is an entry of −850 when operating on 5 in the 10's position. (The machine is now functioning on the remainder as if it were −48.) Since the 5 is treated as −4 there is a reversal of sign, the machine entry control circuits are restored to normal before the cycle in which there is to be a multiplication by 2 in the units position. This same general principle of operation will be illustrated by more complex examples later.

All of the foregoing examples have been shown for the sake of simplicity, as if the multiplication in partial product entry related to each digit had occurred in a single machine cycle. Likewise there has been no distinction between right and left hand components. The ultimate value of each line of partial product entry has been shown complete in order to clarify an understanding of the arithmetical operation of the machine.

The following tables will indicate the manner in which the various multiples 1, 2 and 5 are built up in the machine, each digit controlling the operation of the machine for one or two cycles. It should be explained that the second columns heading of multiplier digit applies to the digit as used by the machine. In other words, when sign conditions are normal (as when starting any multiplying operation, these rules apply exactly as stated in Table 1. However, whenever sign conditions are reversed by reason of there having been an operation on a 4 or 9 as explained in the examples above, the operation of the machine will be governed according to the rules of Table 2 which shows the effect of control exercised by the complement of the digit actually appearing in the multiplier. The general rules may now be recited as follows:

Table 1.—GENERAL MULTIPLIER RULES—SIGN NORMAL

[These rules apply in all cases when sign is normal, for all orders of the multiplier except the units order]

| Multiplier | | Cycles | Operation |
| --- | --- | --- | --- |
| Digit in storage unit | Digit value used | | |
| 0 | 0 | Variable | If only 1 zero, immediately sense next lower order multiplier digit and proceed without loss of time. If 2 adjacent zeros, 1 idle cycle will intervene before sensing of next digit. All zeros to the right of the lowest order significant digit are skipped without loss of time when the sign is normal. |

Table 1.—GENERAL MULTIPLIER RULES—SIGN NORMAL—Continued

| Multiplier Digit in storage unit | Digit value used | Cycles | Operation |
|---|---|---|---|
| 1 | 1 | 1 | Enter +1×multiplicand into product accumulator. Sense next lower order multiplier digit at end of cycle. |
| 2 | 2 | 1 | Enter +2×multiplicand into product accumulator. Sense next digit at end of cycle. |
| 3 | 3 | 2 | *First cycle.*—Enter +5×multiplicand into product accumulator. *Second cycle.*—Enter −2×multiplicand into product accumulator. Sense next digit at end of cycle. |
| 4 | 4 | 1 | Enter +5×multiplicand into product accumulator, Reverse sign at end of cycle then sense next digit. |
| 5 | 5 | 1 | Enter +5×multiplicand into product accumulator. Sense next digit at end of cycle. |
| 6 | 6 | 2 | *First cycle.*—Enter +5×multiplicand into product accumulator. *Second cycle.*—Enter +1×multiplicand into product accumulator. Sense next digit at end of cycle. |
| 7 | 7 | 2 | *First cycle.*—Enter +5×multiplicand into product accumulator. *Second cycle.*—Enter +2×multiplicand into product accumulator. Sense next digit at end of cycle. |
| 8 | 8 | 2 | *First cycle.*—Enter +10×multiplicand into product accumulator (+1×factor shifted 1 place to left). *Second cycle.*—Enter minus 2×multiplicand into product accumulator. Sense next digit at end of cycle. |
| 9 | 9 | 1 | Enter +10×multiplicand into product accumulator. Reverse sign at end of cycle, then sense next digit. |

TABLE 2.—GENERAL MULTIPLIER RULES—SIGN REVERSED

[These rules apply in all cases where sign is reversed, for any position of multiplier except units.]

[Sense multiplier digits successively from left to right.]

| Multiplier Digit in storage unit | Digit value used | Cycles | Operation |
|---|---|---|---|
| 0 | 9 | 1 | Enter −10×multiplicand into product accumulator.—Return sign to normal and sense next lower order at end of cycle. |
| 1 | 8 | 2 | *First cycle.*—Enter −10×multiplicand into product accumulator (−1×factor shifted one place to left). *Second cycle.*—Enter +2×multiplicand into product accumulator. Sense next digit at end of cycle. |
| 2 | 7 | 2 | *First cycle.*—Enter −5×multiplicand into product accumulator. *Second cycle.*—Enter −2×multiplicand into product accumulator. Sense next digit at end of cycle. |
| 3 | 6 | 2 | *First cycle.*—Enter −5×multiplicand into product accumulator. *Second cycle.*—Enter −1×multiplicand into product accumulator. Sense next digit at end of cycle. |
| 4 | 5 | 1 | Enter −5×multiplicand into product accumulator. Sense next digit at end of cycle. |
| 5 | 4 | 1 | Enter −5×multiplicand into product accumulator. Return sign to normal and sense next lower order at end of cycle. |
| 6 | 3 | 2 | *First cycle.*—Enter −5×multiplicand into product accumulator. *Second cycle.*—Enter +2×multiplicand into product accumulator. Sense next digit at end of cycle. |
| 7 | 2 | 1 | Enter −2×multiplicand into product accumulator. Sense next digit at end of cycle. |
| 8 | 1 | 1 | Enter −1×multiplicand into product accumulator. Sense next lower order multiplier digit at end of cycle. |
| 9 | 0 | Variable | If only 1 nine immediately sense next lower order multiplier digit and proceed without loss of time. If 2 adjacent nines 1 idle cycle will intervene before sensing of next digit. |

TABLE 3.—MULTIPLIER RULES—UNITS ORDER—SIGN NORMAL

[These rules apply only for a digit in the units order of multiplier when sign is normal.]

| Multiplier Digit in storage unit | Digit value used | Cycles | Operation |
|---|---|---|---|
| 0 | 0 | None | End calculation. |
| 1 | 1 | 1 | Enter +1×multiplicand into product accumulator. End calculation. |
| 2 | 2 | 1 | Enter +2×multiplicand into product accumulator. End calculation. |
| 3 | 3 | 2 | *First cycle.*—Enter +5×multiplicand into product accumulator. *Second cycle.*—Enter −2×multiplicand into product accumulator. End calculation. |
| 4 | 4 | 2 | *First cycle.*—Enter +5×multiplicand into product accumulator. *Second cycle.*—Enter −1×multiplicand into product accumulator and end calculation. |
| 5 | 5 | 1 | Enter +5×multiplicand into product accumulator. End calculation. |
| 6 | 6 | 2 | *First cycle.*—Enter +5×multiplicand into product accumulator. *Second cycle.*—Enter +1×multiplicand into product accumulator. End calculation. |
| 7 | 7 | 2 | *First cycle.*—Enter +5×multiplicand into product accumulator. *Second cycle.*—Enter +2×multiplicand into product accumulator. End calculation. |
| 8 | 8 | 2 | *First cycle.*—Enter +10×multiplicand into product accumulator (+1×factor shifted 1 place to left). *Second cycle.*—Enter −2×multiplicand into product accumulator. End calculation. |
| 9 | 9 | 2 | *First cycle.*—Enter +10×multiplicand into product accumulator (+1 factor shifted 1 place to the left). *Second cycle.*—Enter −1×multiplicand into product accumulator. End calculation. |

TABLE 4.—MULTIPLIER RULES—UNITS ORDER—SIGN REVERSED

[These rules apply only for a digit in the units order when sign is reversed.]

| Multiplier Digit in storage unit | Digit value used | Cycles | Operation |
|---|---|---|---|
| 0 | 10 | 1 | Enter −10×multiplicand into product accumulator. End calculation. |
| 1 | 9 | 2 | *First cycle.*—Enter −10×multiplicand into product accumulator. *Second cycle.*—Enter +1×multiplicand into product accumulator. End calculation. |
| 2 | 8 | 2 | *First cycle.*—Enter −10×multiplicand into product accumulator (−1×factor shifted 1 place to left). *Second cycle.*—Enter +2×multiplicand into product accumulator. End calculation. |
| 3 | 7 | 2 | *First cycle.*—Enter −5×multiplicand into product accumulator. *Second cycle.*—Enter −2×multiplicand into product accumulator. End calculation. |
| 4 | 6 | 2 | *First cycle.*—Enter −5×multiplicand into product accumulator. *Second cycle.*—Enter −1×multiplicand into product accumulator. End calculation. |
| 5 | 5 | 1 | Enter −5×multiplicand into product accumulator. End calculation. |
| 6 | 4 | 2 | *First cycle.*—Enter −5×multiplicand into product accumulator. *Second cycle.*—Enter +1×multiplicand nto iproduct accumulator. End calculation. |
| 7 | 3 | 2 | *First cycle.*—Enter −5×multiplicand into product accumulator. *Second cycle.*—Enter +2×multiplicand into product accumulator. End calculation. |
| 8 | 2 | 1 | Enter −2×multiplicand into product accumulator. End calculation. |
| 9 | 1 | 1 | Enter −1×multiplicand into product accumulator. End calculation. |

It is worthy of note that zeros which occur between significant digits in the multiplier are not skipped as in some calculating machines. When the multiplier table lookup circuit senses a zero, the shift circuits are controlled to sense the next digit to the right, which if it be a significant digit is immediately calculated without loss of cycles. If, however, both digits are zero, an idle cycle must intervene before a third digit may be sensed. Thus a multiplier of 308 requires no cycles for skipping the zero; a multiplier such as 3008 requires one idle cycle for skipping zeros; a multiplier 30008 likewise requires one idle cycle; while multipliers 300008 or 3000008 require two. The above method permits a significant reduction in circuit components, sufficient to overcome the obvious disadvantage of slower operation in some cases. The loss of time is, in fact, very slight, since none is encountered unless two or more zeros in succession appear in the multiplier. The probability of such an occurrence is approximately one in one hundred. The resultant waste of one cycle once in a hundred complete multiplication problems appears trifling. Circuits are provided, however, to skip all zeros to the right of the lowest order significant digit of the multiplier without loss of time when sign conditions are normal.

Fig. 33 represents the application of the rules set forth in tables 1 to 4 above and in the accompanying explanation to a large multipler, containing digits and involving several reversals of sign. The example is largely self-explanatory if studied in conjunction with Table 1.

The use of complements of multiplier digits in connection with sign reversal should be particularly noted as well as the change in sign of accumulator entries. It is of particular interest that the last digit of the multiplier, which is a zero, is not skipped. Owing to the sign reversal being effective, the zero is sensed as a complement, and as it occupies the units position of the multiplier, the tens complement of 0, i. e., 10, is used.

Fig. 34 is generally similar to Fig. 33 but considers a special multiplier amount of 844986. The manner in which this particular multiplier amount is handled will be hereinafter explained in connection with the detailed explanation of Figs. 24a, 24b, 24c to 28a, 28b, 28c inclusive.

In further explanation of the working of the rules stated above, it may be explained that whenever the machine is operating with sign reversed (i. e. after an overdraft condition) and encounters a 9 in the multiplier, this 9 is treated as a 9's complement or 0 and in such cases the machine operates generally according to the rules stated above for multiplier digit 0 in Table 1. The machine will immediately detect that the 9 is to be used as a 9's complement or 0 and there will be an immediate shift to the next lower order without loss of time, just as if the digit had been a 0 with sign normal. Conversely, if the machine senses a 0 in the multiplier and there has been an odd number of sign reversals, this 0 is treated as a 9 and the machine proceeds with its operations exactly as if it were operating on a 9, with the exception that there is a negative entry in the products accumulator.

To further clarify the operation of the sign reversal controls, it may be explained that the first time the machine encounters a 4 or a 9 there will be a multiplication by 5 or 10 respectively, and there is a change of sign at the end of such cycle. The abnormal sign condition then controls machine operation during all succeeding cycles until such time as the machine encounters either a 0, which is now treated as a 9, or a 5, which is now treated as a 4. In such case, the machine makes a negative entry of ×10 or ×5 respectively and then changes sign back to normal. Thus whenever there has been an odd number of sign change operations, the controlling sign will be abnormal and whenever there has been no reversal or an even number of sign changes, the sign applying to the multiplier rear-out will be the normal one.

Hereinafter in the specification and claims it will be understood that the term "compound operation" includes a double entry cycle into the accumulator or a single entry cycle into the accumulator followed by a sign change for the next entry operation.

*Typical card calculations*

Fig. 18 shows a run of cards showing certain typical calculations which can be performed by the machine. Referring to Fig. 18 the first card shows a simple multiplying computation wherein the multiplicand in amount of "B" is multiplied by "A," these factors being read in from the record and the result "C" is recorded on the card. The card also shows a control perforation in one of the columns, this control being index point "1" which in this particular instance signifies that the card pertains to a multiplying computation. While "1" has been here shown, any other digit or an "X" perforation might have been used for this purpose.

Card #2, which is the following card of the run, shows a computation wherein amounts "D," "E" and "G" are read from the card. Amount "D" is divided by "E" to obtain an intermediate result "F." "F" is recorded on the card and "F" and "G" are added together to obtain the result H which is also recorded on the card. In this case the control perforation is in the 4th index point position which signifies that the operation from the card involves both a dividing operation and a cross-adding operation. Here again, other index points could be used to signify this particular type of calculation.

Card 3 shows another type of calculation wherein amount J is read into a single storage unit. This amount is squared and the result "K" punched back on the card. This particular card has a control perforation at index point "7." This signifies that the single amount which is read is to be multiplied by itself.

The last or 4th card is wholly unpunched except for a control perforation at the "X" index point. In this particular case the control perforation signifies that the amounts "H" and "K" which have been carried forward from previous cards (numbers 2 and 3) and summed up in the machine are to be recorded on the 4th card.

While in general machine operations of such diverse calculations would not normally be used as single cards, they have been selected in this case to show the diverse calculations which could be automatically effected under program control.

Before describing the manner in which the machine is plugged up for the foregoing typical card calculations, the matter of programming may be briefly mentioned.

One of the features of the present machine resides in the provision of a very flexible programming arrangement. While programming has been provided in previous machines, the programming was subordinate to what might be termed basic machine operations such as multiplying and/or dividing. According to the present invention the programming is the primary control and multiplying and/or dividing or crossfooting are subordinate thereto. To attain these general ends, the machine is adapted to conform to the programming rules which are generally set forth as follows:

1. Programming is subdivided into 12 steps.
2. Machine operations can continue on a single program step for a multiple number of machine cycles until a condition directs a change to the next program step.
3. Program steps may be skipped as preset by the operator.
4. Upon completion of a number of program steps or all steps provision can be made to automatically repeat the entire program.
5. Duration of any program step can be of indefinite number of machine cycles if machine procedures in such step require indefinite or variable time interval.
6. While the complete programming cycle may include 12 or a lower number of steps or include a repetition of the program after the completion of a number of steps the complete program cycle is definitely coordinated with card feed and card reading. Thus a new card feed and reading operation will completely terminate a former program and condition the programming elements for the setup of a new program.
7. The operation in a given program step or steps may be modified by the use of a subordinate control such as a selector or co-selector. In such case the determining control for such subordinate control may be a characteristic derived from a card or a sign control.
8. A control associated with programming may be brought into operation when a units order is reached. Thus in reading out of storage for punching, a storage unit may be cleared or reset immediately when a units order has been read out and punched.

*Plugging*

As is customary in machines of this class, plugboard panels are provided. These are shown in Figs. 19a and 19b. In general, the plugboard panel shown in Fig. 19b is the plugboard section which is used for plugging up the flow of entries through the machine from reading brushes to storage, to accumulators, back to the punch. The other plugboard panel, Fig. 19a, is the section of the plugboard which is utilized for programming and control of machine functions generally. It will be understood that, in practice, both of these boards will be pre-plugged completely before a run is commenced but for clarity of the present description plugging connections will be described card by card. Like reference numbers will be used on plug connections shown on Figs. 19a and 19b and on the main circuit diagram, Figs. 14a to 14v inclusive except Fig. 14i.

Referring again to Figs. 19a and 19b, the preliminary plugging for card 1 (Fig. 18) will now be briefly described. As has been explained before, the multiplicand "B" and the multiplier "A" are to be read from card 1 and directed to storage. The multiplicand, as read from the brushes, is directed to 2ST by plug connections 300 extending from the reading sockets to the right hand side of the 2ST storage unit (see Fig. 19b). See also Figs. 14j and 14h. Multiplier entry plug connections 301 are also provided (see Fig. 19b) which direct entry to storage unit 1ST. This storage unit, as may be mentioned, is used for the multiplier or divisor. (See also Figs. 14k and 14j.)

Card #1 is to receive a product punching. This product will be accumulated in accumulator 6AC and upon completion of multiplying such product is to be transferred to 6ST which is the storage unit utilized to control punching of the product. This transfer is actually made effective while the next following card is being sensed and, accordingly, the "read cycles" hub connected to a contact of pilot selector #1 sets up a circuit extending through plugwire 305 (Figs. 19a, 14u and 14w) which will cause readout of accumulator #6 at the time when the next following card is being sensed. During this same operation, storage unit 6ST must be conditioned to receive the product being transferred out of the accumulator, the objective being to clear the accumulator so that it may receive a new entry, which may be a product or any other accumulation.

From the reading brush socket of column 1 the plug connection 302 is established to the indicated socket on Fig. 19b. This plug connection 302 also extends from a socket, Fig. 14j, to a socket or hub on Fig. 14g which leads to the input of emitter #3. Since the index point to be sensed on card 1 is a "1" index point, a plug connection 303 is made out of the "1" spot of emitter #3 to a selector on Fig. 14v. The subsequent plugging and the operations of the selector will be described later. Before describing the calculation pertaining to card #1, a brief description will be given of certain electrical units of the machine and their functions.

*Product and dividend accumulator, column shifts therefor, and control*

Referring now to certain diagram sections, Figs. 14q, r and s, here are shown the wirings of accumulators 1AC to 6AC inclusive. For this entire group of accumulators there is a column shift mechanism which is labelled on the circuit diagram, Shift 1, Shift 2, and Shift 4. The Shift 1 column shift is controlled for accumulators 1AC and 2AC by relay 413R, see Fig. 14q. The Shift 1 for accumulators 3AC to 5AC is controlled by relay 453R and the Shift #1 for the 6AC accumulator is controlled by relay 493R, Fig. 14s. For the same groups of accumulators, the Shift 2 is controlled by 410R, 450R and 490R, while Shift 4 is controlled by 407R, 447R and 487R. From this diagram it will be evident that if none of the shift relays are energized, a units order entry from the entry hub sockets will go to the units order of the accumulator. If the Shift 1 relays are energized, units order will go to the tens order of the accumulator. If Shift 2 relays are energized, the order entry from units order hub will go to the hundreds. If the Shift 4 relays are energized, the units entry will go to the ten thousands order. By energizing combinations of the above relays, other column shift relations can be established through a total of 8 orders. For example, if Shift 2 and Shift 1 are both energized, units order entry will go to the thousands order, and so on.

As will be understood from the subsequent description of dividing operations, shifts progress from highest order to lowest order. Since this shift arrangement is utilized for division, a similar shift arrangement is utilized for multiplication. In other words, multiplication proceeds from highest orders of the multiplier toward lowest orders and column shifts are directed accordingly. That is to say, initially all the shift relays pertaining to Shifts 1, 2 and 4 will be energized if there is an 8-digit multiplier.

In addition to the Shift 1, Shift 2 and Shift 4 relays, so-called times ten shift relays are provided. For accumulators 1AC and 2AC, such times ten shift contacts are controlled by relay 404R. For accumulators 3AC to 5AC, these times ten shift contacts are controlled by relay 444R, while for the 6AC accumulator these are controlled by relay 484R. For certain dividing operations, tenths supplemental column shifts are required. These are controlled by relays 401R, 441R and 481R.

Each accumulator can be conditioned for a subtracting operation by a common relay which is utilized individually for that accumulator. For example, for accumulator 1AC, energization of 416R conditions accumulator 1AC for minus or subtracting operations, whereas energization of 418R relay conditions the same accumulator for a plus, or adding operation. The 418 relays comprise two groups of contacts in each accumulator: one being contacts 418R1 to 6, and the other group being 418R7 to 12. In addition, each accumulator section is provided with a relay which conditions the entire accumulator for resetting to zero, relay 421R being supplied for this purpose. Provision is also made for furnishing the entire group of accumulators with so-called MS or machine stop impulses. The MS impulses have been referred to heretofore in connection with the descriptions of Figs. 15 to 17 inclusive. Relay 437R when energized provides accumulators 1AC and 2AC with such machine stop impulses, relay 477R provides accumulators 3AC through 5AC with such machine stop impulses and relay 517R when energized provides the machine stop impulses for accumulator 6AC. The plus or minus relays for accumulator 1AC have been explained. There are like relays for the other accumulators, namely; plus relays 427R, 458R, 467R, 498R and 507R; minus relays 425R, 456R, 465R, 496R and 505R. Likewise, there are individual resetting relays for accumulators 2AC to 6AC, namely, 430R, 461R, 470R, 501R, and 510R.

The various accumulators also require so-called carry impulses. These are provided for by relays 434R for accumulators 1AC and 2AC; 474R for accumulators 3AC and 4AC; relay 514R for accumulators 5AC and 6AC. Relay 474R is provided with additional contacts 9, 10, 11 and 12 to furnish feed-in circuits to each group of tens carry contacts.

Since carry from the highest to the lowest order is required, the following supplemental plug connections can be made: assuming accumulators 1AC, 2AC and 3AC are to be used together as one large accumulator, the plug connections 416 and 417 will be established (Figs. 14q and r and Fig. 19a). In order to carry from highest to lowest order of such accumulator, a connection 418 will be established as indicated.

Similar jumper plug connections can be made on the other accumulator sections. In these examples, 6AC is used as an individual accumulator, so that connection 334 (see Figures 19a and 14s) is established. The plug sockets for these jumper connections are labelled, CX and CR, CX signifying an exit hub, and CR signifying a receiving hub.

Assume that accumulator 1AC is to receive additive entries. The hubs generally designated 312 (see Fig. 14q) are plugged to any source of impulses. For example, these impulses may come from the card reading brush or read-out associated with the storage units, etc. In such case, assuming that the shift relays are all de-energized as shown, the general operation will be as follows:

At the beginning of a machine cycle, the 418R relays will be energized, causing closure of contacts 418R1 to 6 inclusive and 418R7 to 12 inclusive. With such relays energized a master impulse will be transmitted on line 313, Figures 14r and q. This impulse finds its source at emitter #1 on the "9" index point spot, Fig. 14j. The circuit extends through certain other controlling relay contacts but these are not being here described. This occurs at "0" index point time in the cycle and provides the MG impulse shown in Fig. 15. Remembering that relay 418R is energized and relay 416R at this time is de-energized, the master impulse circuit extends from line 313 through the shifted 418R relay contacts 1 to 6, through the 416R1 to 6 contacts in the position shown, to the "Go" magnets 125 and thence to ground. This will place all of the wheels of accumulators 1AC in motion. The entry impulses coming in at hubs 312 are rounted through the various tenths, times ten, Shift 4, Shift 2 and Shift 1 contacts, all the positions shown, to lines such as 314. These impulses pass through the 418R7 to 12 contacts, in shifted position, through the 437R1 to 6 contacts, in the positions shown, and back through the stop magnets 126 to line and to ground. The differential energization of stop magnets 126 will cause stoppage of indicator wheel movement as indicated by the legend "DS" on Fig. 15.

In subtraction the plus relays 418R will be de-energized and the 416R relays energized. In this case the impulses coming down through lines 314 will go through the shifted 416R1 to 6 contacts direct to the "Go" magnets 125. This will effect accumulator actuation as shown in the lower part of Fig. 15.

Referring to Figs. 14q to 14s inclusive, a series of impulses are impressed on line 315. These impulses find their source from main line through cam contacts C14 (see Fig. 14s) and thence to line 315. Slightly before 202½° of machine time, namely, at 192°, a cam contact C26, Figure 14s, establishes a circuit from line through relay contacts 693R4, 696R4, both in the position shown, and 704R5, now closed, relay coils 437R, 477R, 517R and 667R and to ground. Energization of 437R, for example, Fig. 14q, shifts contacts 437R1 to 6 to reverse position and the impulse on line 315 then flows through contacts 421R10 in the position shown, through contacts 437R1 to 6 in reverse position from that shown, through stop magnets 126, and thence to ground. This provides the accumulator with the machine stop impulses shown in the lower portion of Fig. 15.

For carry impulses, cam contact C22 (see Fig. 14s) makes at the time indicated and establishes a circuit through wire 316 to relays 599R, 434R, 474R, 514R, and thence to ground. With relay 474R energized its contacts assume the reverse position from that shown on Fig. 14q. An impulse is supplied to line 317 at 247½°. The source of this impulse is cam contact C10 (Fig. 14j), through emitter #1 out via the "12" spot of the emitter to the line 317 previously referred to. Such impulse from line 317 extends through the contacts 474R9, in shifted position, through one of the carry contacts if it is latched in tens position, through the next higher order to the "Go" magnet 125. Immediately thereafter a machine stop impulse is received. This impulse comes over line 315 previously referred to except that in this instance the relay coils 437R, 477R, 517R and 667R are energized from the circuit which is completed at cam contacts C23, Fig. 14s. Carry through carry is effected in the usual manner if the order into which carry is being made has its accumulator wheel standing at a "9" position when the impulse is transmitted.

*Programming section*

From the previous description, it has been brought out that the accumulator unit, for example, must be controlled in one manner for an adding operation, in a different manner for subtracting and in a still different manner for reset. Selective entry into an accumulator must always be provided for as well as selective "readout" from a particular accumulator or accumulators.

So far as storage devices are concerned, these must be selectively reset by a single pulse transmitted late in the preceding cycle. Provision must be made for selectively entering amounts into one or another of the storage units and for selective readout therefrom. The foregoing are some of the principal controls that have to be brought into operation under a programming control. It will be further understood that in multiplying a plurality of repeat operations have to be provided for until multiplication is complete. These dictate a delay or hesitation of programming. The same applies to dividing.

Before describing an actual calculation, it is believed that a general description of the programming section of the machine will clarify the subsequent more detailed operation and description.

*Program control*

Before describing the program control in detail, these general characteristics may be briefly described.

When card feed occurs, the programming unit is prepared for operation. This may be considered to precede the setup of the program. Following card feed, the program is set up. In the present machine 12 possible program steps are provided for and when the program is set up, step 1, for example, becomes active. With such step active, current supply is afforded to plurality of plug sockets or hubs from a source of set up impulses (SP). These are early impulses. Current supply is later afforded to the same hubs for a source of entry controlling impulses which may be termed EC impulses. The foregoing SP impulses and the EC impulses are available on each and every machine cycle and are adaptable for calling in various machine functions and units. Upon or just before the following cycle, provision is made to advance the program unit to the following step. This is the general law of operation except on calculating cycles such as multiplication or division where repetitive operations are required or desirable on program step.

Another characteristic of the program control is that no step is frozen to a particular operation, i. e., step 1 is used for multiplication, division, adding or subtracting as determined by the operator.

A further characteristic of the program control is that program steps can be skipped if impulses received dictate such skipping.

Another characteristic is that a 12 step program can be repeated if desired, that is to say, if more than 12 steps of program are required, the completion of step 12 will recall step 1.

Another feature is that provision is made for augmenting the number of controls which can be taken off any particular program step. If 4 controls are available on each step by supplemental plugging by so-called coselectors or selectors, additional output sockets can be made available.

Another characteristic of program control is that program detail may be effected from any programming step in the event that any operation ensues which requires more time than a machine cycle, i. e., requiring an indefinite time interval not related to a definite machine cycle.

Before describing the detailed program circuits, it might be generally stated that programming is always initiated by a preparatory step which may be hereafter referred to as the read cycles step. This stage of programming coincides with the first machine cycle of every card feeding operation and is initiated under control of such card feeding operation. After the preparatory step, program steps 1, 2, 3, etc. become effective successively each being ordinarily active during one machine cycle. As will be explained later, by reference to Figs. 14c and 14d, a program read or program preparing relay 43R is energized under control of read feed relay 5R during the first machine cycle of every card feeding operation. A hold coil and stick circuit maintains this relay active throughout such cycle so that read cycle hubs, see Fig. 14c, may emit SP and EC all cycles impulses under control of contacts of relay 43R. These all cycles impulses are therefore useful in controlling all machine operations to take place during a card feeding and reading operation. Now the program read relay 43R sets up the program control relay 46R for the next succeeding step which will be step 1.

Ordinarily, unless a delay is occasioned under circumstances which are explained later, a stepping control relay 42R is energized concurrently with the program control relay and step 1 program control relay 46R is thereby permitted to energize step 1 program relay 47R, later in the same cycle at the time when program read relay 43R is being de-energized. If for any reason, a delay of programming is necessary, the above mentioned energization of stepping control relay 42R is suppressed and step 1 program control relay 46R instead of energizing step 1 program relay 47R will instead repeat the energization of program read relay 43R. Assuming however that no such delay occurred, step 1 program relay 47R would be effective during the cycle following the card reading cycle and during such time the four exit hubs at program step 1, Fig. 14c, will emit all cycles impulses under control of the contacts of relay 47R. Step 1 program relay 47R controls the energization of step 2 program control relay 48R so that when the holding circuit to step 1 program relay 47R is terminated step 2 program control relay 48R energizes step 2 program relay 49R. It is thus seen that each program relay when energized remains effective for one cycle and during such cycle sets a program control relay for the next higher step. Such program control relay then energizes its associated program relay unless a program delay is initiated. In such an event, the program control relay circuits are so diverted that energization of the last previous program relay is repeated and therefore the condition arises in which no advance of the program will occur until the program delay is terminated. It may be generally stated therefore that each program relay when energized remains effective for only one cycle and in the event of a program delay a pick up circuit to energize such relay must be repeated during each cycle while the delay is effective. Therefore when stepping occurs from one step to the next, the preceding program relay always becomes inactive as the new program step becomes effective. Therefore there is never more than one program relay energized at a given time. A new card feed cycle may take place at any time during a program, i. e., it is not necessary to progress through the entire program before a new card feed may take place. Under such conditions when the card feed occurs, the last effective program step such as step 7, for example, will become inactive and program read relay 43R will energize under control of the read feed controls to make the read cycle hubs active during the card reading cycle. It will be shown that any desired intervening number program steps may be skipped over without loss of cycles by the use of so-called skip hubs one of which is provided for each program step except 1. Whenever a controlling impulse is provided such a skip hub, the next program step which occurs will be the step to which such hub pertains. The circuits are so arranged that any lower step, which would have normally become active during such a cycle, is prevented from becoming effective. If the program continues through and to step 12 without a new card feeding operation being initiated, the program will repeat beginning with step one but not with the read cycles step since the read cycles hubs are associated only with card feeding and reading cycles. Such repetition may occur as often as desired and by use of suitable switching circuits using the selector controls provided in the machine, this feature is useful in effectively increasing the number of operations which may be programmed.

Figure 14B:
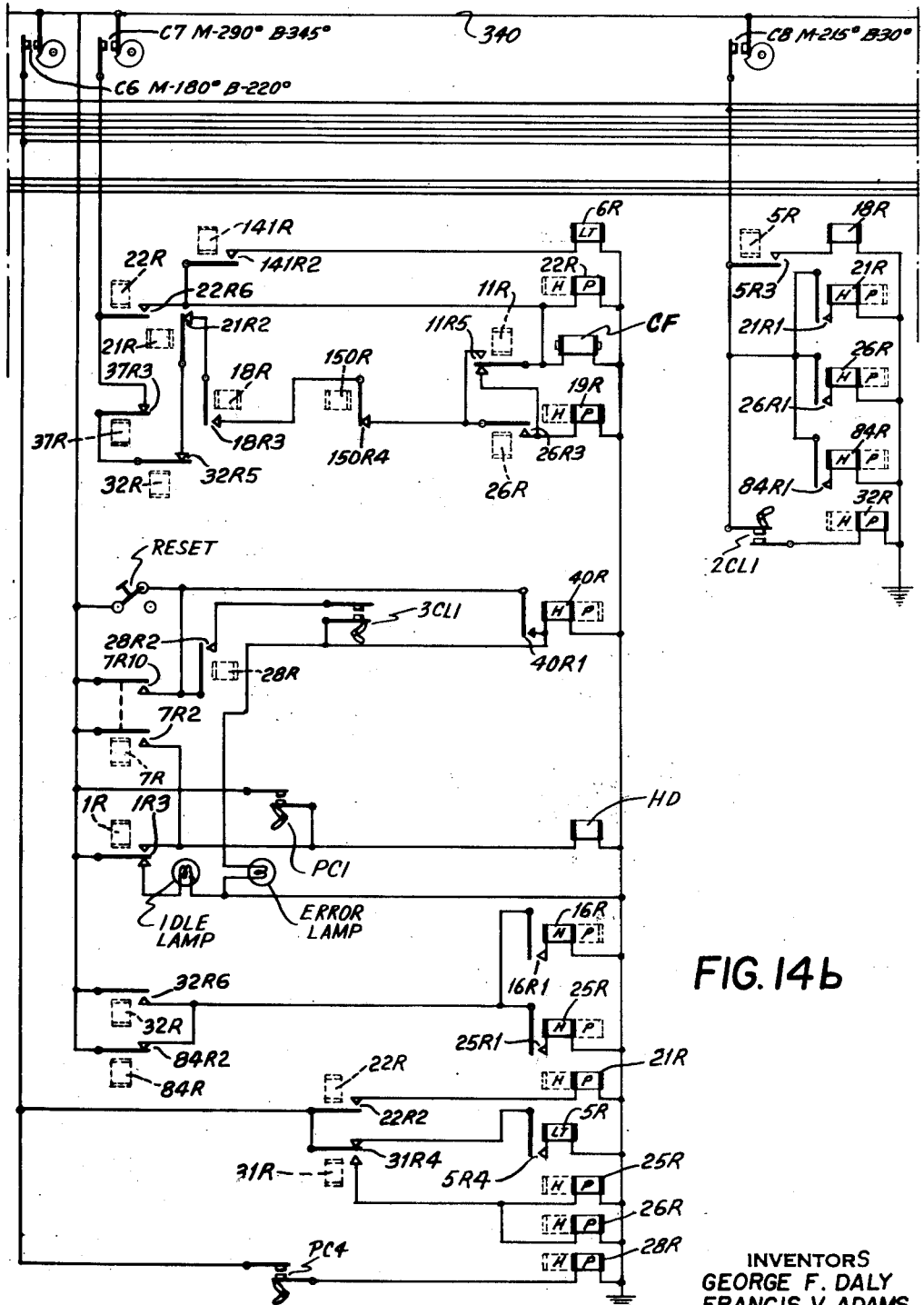
Figure 14D:
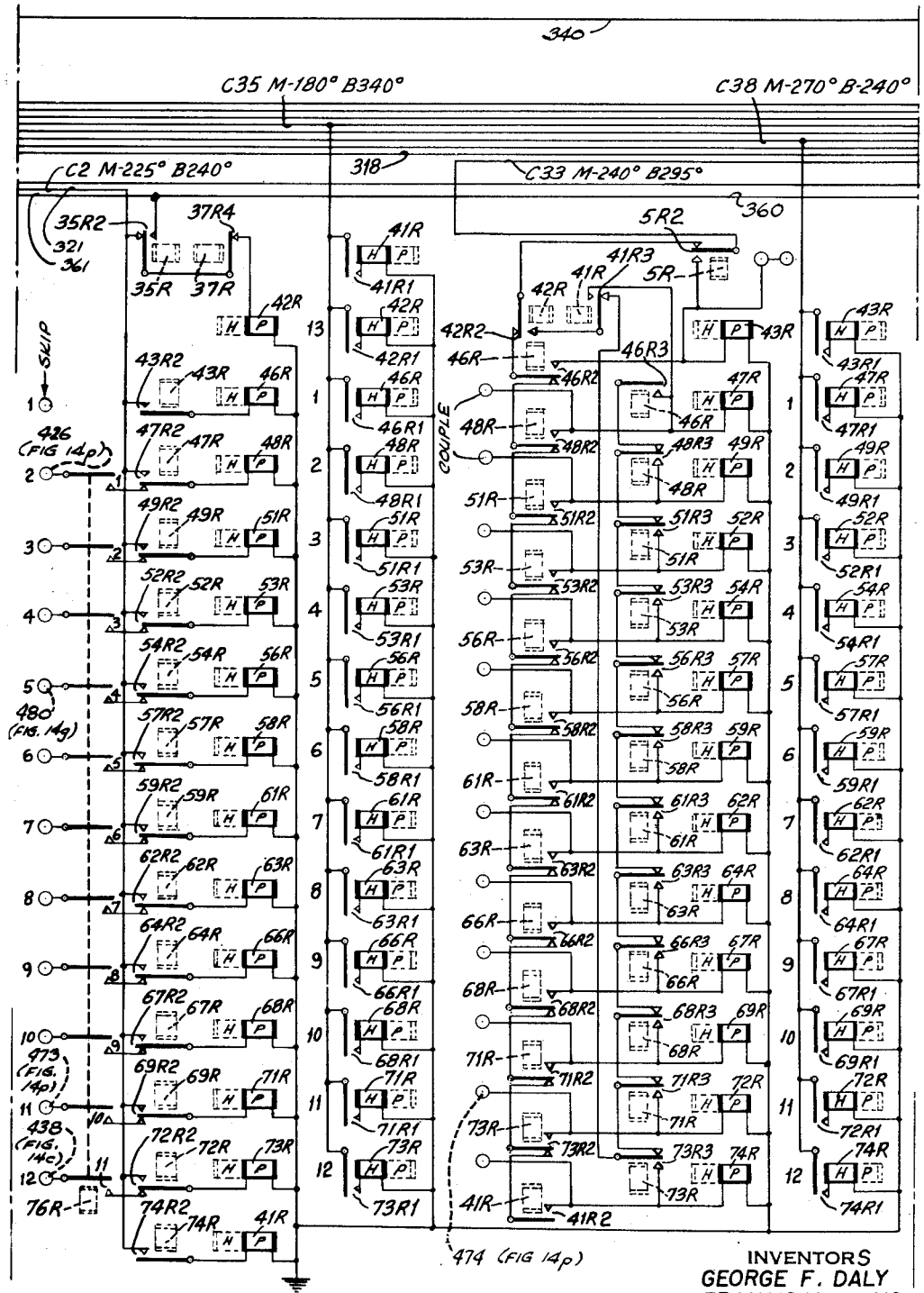

To provide for such flexibility, the program arrangement generally shown on Figs. 14c and 14d is provided. In general, it may be stated that the circuit through the programming relays here shown steps continuously following a reading cycle. There is a stoppage of program change during multiplication, or while division is in progress. Thereafter the program change again starts automatically and continues advancing one step per machine cycle until a new card read cycle occurs. This event sets up a control which starts the programming operation over again at the beginning. If the last program step is reached without a card feed ensuing, the program relay arrangement resets automatically and again starts stepping, beginning with step 1.

Referring to Fig. 14c. Where there are shown sets of multicontact relays pertaining to the different program steps thus PI designates program step 1, P2 designates program step 2, etc. The PI step includes a program relay 47R which controls 4 sets of contacts which lead to 4 exit hubs. A generally similar arrangement is provided for the other program steps. The program relays are designated 47R, 49R, 52R, 54R, 57R, 59R, 62R, 64R, 67R, 69R, 72R and 74R, the latter pertaining to program step 12, i. e., P12. In general whenever card feed takes place, upon closure of cam contacts C33 between 240 and 295 degrees, (see Fig. 14d) a circuit is established from the line through these cam contacts (Fig. 14u), via line 318 to Fig. 14d, through relay contacts 5R2 in shifted position (relay 5R being energized as a control for card feed), thence through the pickup coil of relay 43R and back to ground. Energization of 43R closes contacts 43R1 and energizes the holding coil of relay 43R. At this point, it may be mentioned that numerous of these relays in this programming unit include a pickup coil or coils and a holding coil. Accordingly in each instance, the pickup coil will be designated "P" and the holding coil will be designated "H." The holding circuit is established to cam contact C30, which makes at 270 degrees and breaks at 240 degrees. At this point, it may be explained that the pickup coil 43R is established in one machine cycle, and the control for the holding coil 43R is maintained energized over into the following machine cycle.

On Fig. 14c read cycle hubs generally designated 319 are provided. As shown, these individual hubs connect to contacts 43R3 through 11, inclusive. One side of the contacts just mentioned connects to a line 320 (Fig. 14c). This line 320 extends to cam contact C31 and C32 (see Fig. 14u). Cam contact C31 makes at 255 degrees and breaks at 285 degrees. This provides a short timed impulse suitable for unlatching the storage units, and for resetting them to zero so that they can immediately thereafter accept a new reading. Cam contact C32, on the other hand, makes at 340 degrees and breaks at 192 degrees in the following machine cycle. This provides a relatively long impulse which can be taken out through hubs 319, and which relatively longer impulse is suitable for controlling counter plus and minus relays as well as certain readout and reset relays. It will be understood that when relay 43R is energized, the impulses just referred to are available at any of the hubs 319. The controls just mentioned, so far as card reading operations are concerned, will be effective to influence their related controls when the card is being sensed by the main reading brushes.

Referring to Fig. 32, certain impulses from cams C31 and C32, as mentioned above, are used in the machine for set up and entry control purposes. These pulses are emitted on all machine cycles. The set-up pulse is a short pulse which is established at 255 degrees of machine time, and interrupted at 285 degrees under control of cam contact C31. The entry control pulse is established at 340 degrees of machine time under control of cam contact C32. The termination of the entry control pulse under control of cam contact C32 occurs at 192 degrees of machine time. However, on certain computing operations, namely, on the times 2 and times 5 operation—a supplemental cam contact is provided in the circuit to extend the closing time of the entry control pulse from 192 degrees to 214 degrees as shown.

Considering machine timing of the main drive shaft, this comprises 360° per machine cycle. One of the features of the present machine comprises a novel means to emit and distribute so-called all cycles impulses. These impulses comprise setup impulses hereafter called SP impulses and EC impulses, i. e. entry controlling impulses. Both the SP and EC impulses are potentially emitted on each machine cycle. They are permitted to flow to their related control means such as relays if machine conditions so determine. That is, while they are always available, their flow will take place when required. There are two significant characteristics which are pertinent to these all cycles impulses. They are potentially available on all machine cycles. SP impulses are early impulses and these are potentially emitted in advance of a machine cycle so that they can be used to call in or initiate reset of devices such as storage devices which must be ready to operate on the next following machine cycle.

The EC impulses are effective from zero of the machine cycle onward and are in effect sustained impulses which are utilizable during machine cycle to direct or route all machine impulses of entry portion of such machine cycle.

In other words, the setup or all cycles impulses are used to control operations in anticipation of what is to happen on a following machine cycle. The EC impulses, short or long, are used to effectively supervise control during the same cycle in which they flow.

Having energized relay 43R and having established a holding circuit for it, the manner in which the program step relays are set up will now be described. It has been explained heretofore that relay 43R is picked up in one cycle and held over into the following cycle. On such following machine cycle, when cam contact C2 closes at 225 degrees (see Fig. 14d) a circuit is established from the C2 cam contact on Fig. 14a, via line 321, through relay contacts 35R2 and 37R4, in the position shown, to a stepping control relay 42R, and thence to ground. The circuit just traced is through the pick-up coil of 42R. Upon energization of 42R, 42R1 closes to establish a holding circuit to the 42R holding coil and back to ground. This holding circuit is established to cam contact C35 (Fig. 14a), the cam making at 180 degrees and breaking at 340 degrees. Concurrent with the establishment of the foregoing circuit through the pick-up coil of 42R, another circuit is established through the pick-up coil of the 46R relay, through relay contacts 43R2, now in shifted position from the position shown, since relay 43R is now energized. Relay 46R has a holding circuit through stick contacts 46R1 and through its holding coil to ground. This holding circuit is established through the same circuit which was previously traced for the holding coil of relay 42R. Shortly thereafter, a circuit is established from line 318, namely at 240 degrees, through relay contacts 5R2 in the position shown (since relay 5R has now been de-energized as will hereafter be explained) through relay contacts 42R2, now in shifted position, through 41R3 in the position shown, thence down by a line and then through all the contacts 73R3, 71R3, etc. to and through relay contacts 48R3, all of which are in the position shown, thence through contacts 46R3 which are now in shifted position, through pick-up relay coil 47R, back to ground. A holding circuit for relay 47R is established as before through its stick contacts 47R1. Energization of 47R has now set up the first program step, and with such relay energized, all contacts 47R3 through 47R6 (Fig. 14c) are in closed position. The exit hubs associated with this program step No. 1 are now available to allow the outflow of the short impulse which comes over line 320, previously referred to, and the following long impulse. Relay coil 47R will be held energized until 240 degrees of machine time in the next machine cycle. Shortly before such 240 degree time, at 225 degrees, a circuit is established from line 321 through the circuit previously traced to relay 42R, to ground, see again Fig. 14d. At the same time, another circuit is established through relay contacts 47R2, in shifted position, to the pickup coil of relay 48R. A hold circuit is established for this relay through stick contacts 48R1. Shortly thereafter another circuit is established from line 318 through the circuit previously traced to and through the 41R3 contacts, thence via contacts 73R3, 71R3, etc., through 51R3, all in the position shown. However, contacts 48R3 are now in shifted position. Accordingly, the circuit is established to the pick-up coil of relay 49R and thence back to ground. 49R being picked up, is held energized by stick contacts 49R1, etc. The contacts of relay 49, namely 49R3 through 49R6 (Fig. 14c) are all now in shifted position, and the second program step is set up so that long and short impulses flowing through these contacts from line 320 are available at the exit hubs for any desired use. The exit hubs above referred to, associated with program step 2, can thereupon be utilized for any controlling function which is desired to take place in the second machine cycle following the card feed cycle. It may be mentioned that co-incidentally with the setting up of the 49R3 to 6 contacts, the related contacts associated with program step 1, namely 47R3 to 6, resume the position shown. This is brought about by the deenergization of relay coil 47R, which occurs at 240 degrees as determined by cam contact C38.

The foregoing operations are repeated for successive and following machine cycles; that is, the setup of the second step of the program will, in turn, set up the third step before the second step program relays are deenergized. This follows for all 12 steps.

It may be here mentioned that it is possible to suspend the successive setting up of the different program steps at any step and to hold the setup until another control comes into action. This is provided for by opening of either of the contacts 35R2 or 37R4 (Fig. 14d), which when opened will prevent energization of 42R. With 42R maintained deenergized relay contacts 42R2 remain in the position shown. Accordingly, the previously traced circuit through 41R3, 73R3, etc. is not established, but in lieu thereof, a circuit is established through contacts 42R2 in the position shown, 46R2 in the position shown, 48R2 now shifted, since 48R is energized, thence directly to pick-up coil of 47R, and back to ground. The above operation will re-energize the 47R relay in the event of any delay being desired in program step 1. The delay can be maintained as long as desired by suitable control of relays 35R and 37R.

In the event that one or more of the program steps have been set up in the manner above indicated, the setup will be broken down on the next card reading cycle in the following manner: The breakdown will be effective irrespective of the number of program relays which have been set up. It may be mentioned that relay 5R is energized in preparation for card reading. When this relay is energized, the contacts 5R2 go to a shifted position to energize the pickup coil of relays 43R, see again Fig. 14d. With 5R2 shifted, current is prevented from flowing to any of the relays such as 47R, 49R, etc. and, accordingly, current is directed through contacts 5R2, in reverse of position shown, to energize pickup coil of relay 43R, which makes the read cycles hubs active during the card feeding cycle and thereafter initiates a new series of program steps starting with No. 1 in the manner previously described.

Further program plugging

We will now assume that certain additional plug wires are to be connected to condition the machine for operation on card No. 1. This is a multiplying operation involving no crossfooting or other complications, and all multiplying is to be performed while the setting of the program device is retained at program step 1 being delayed during all multiplying cycles as has been just described.

Figure 14E:
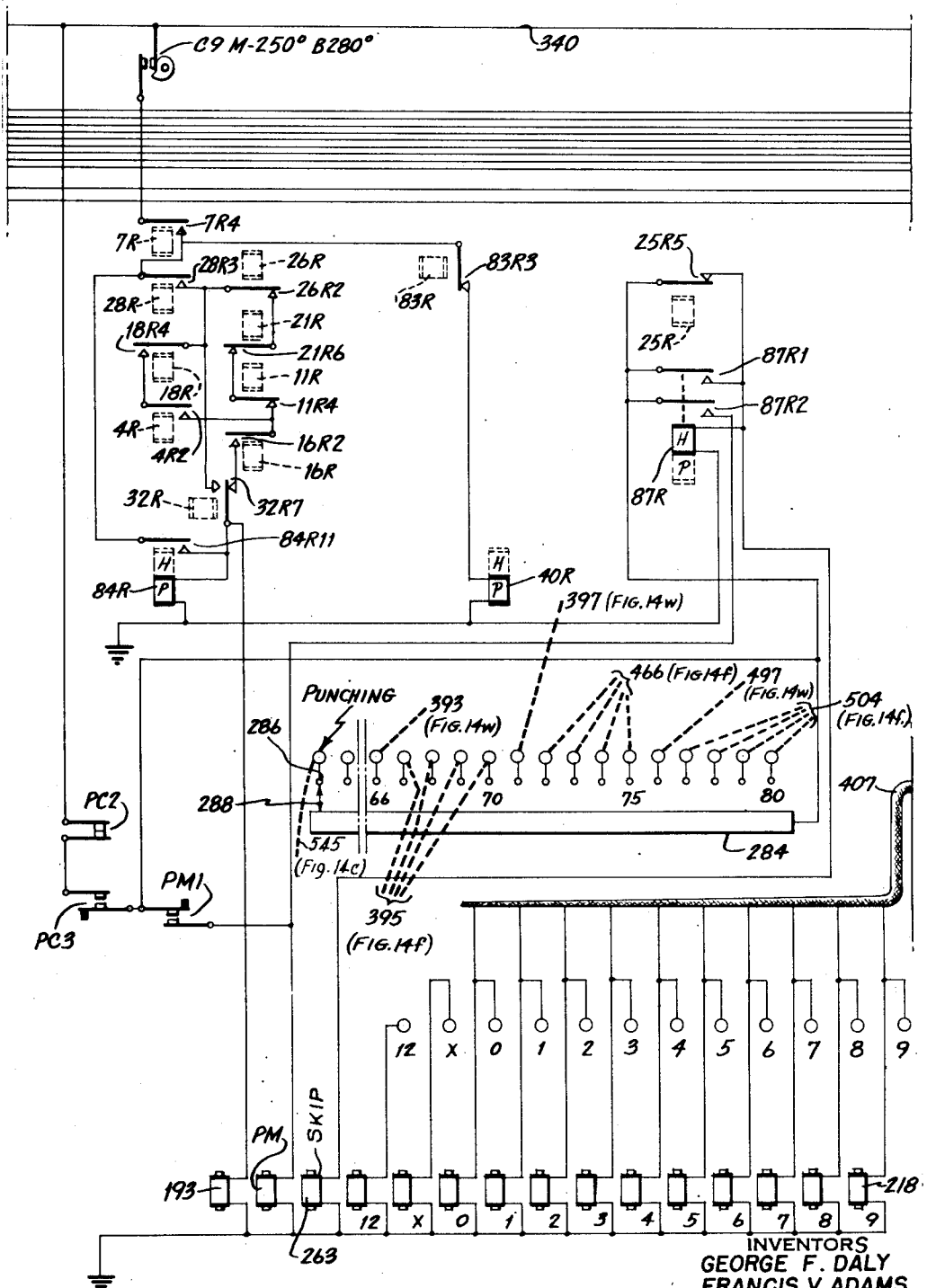
Figure 14G:
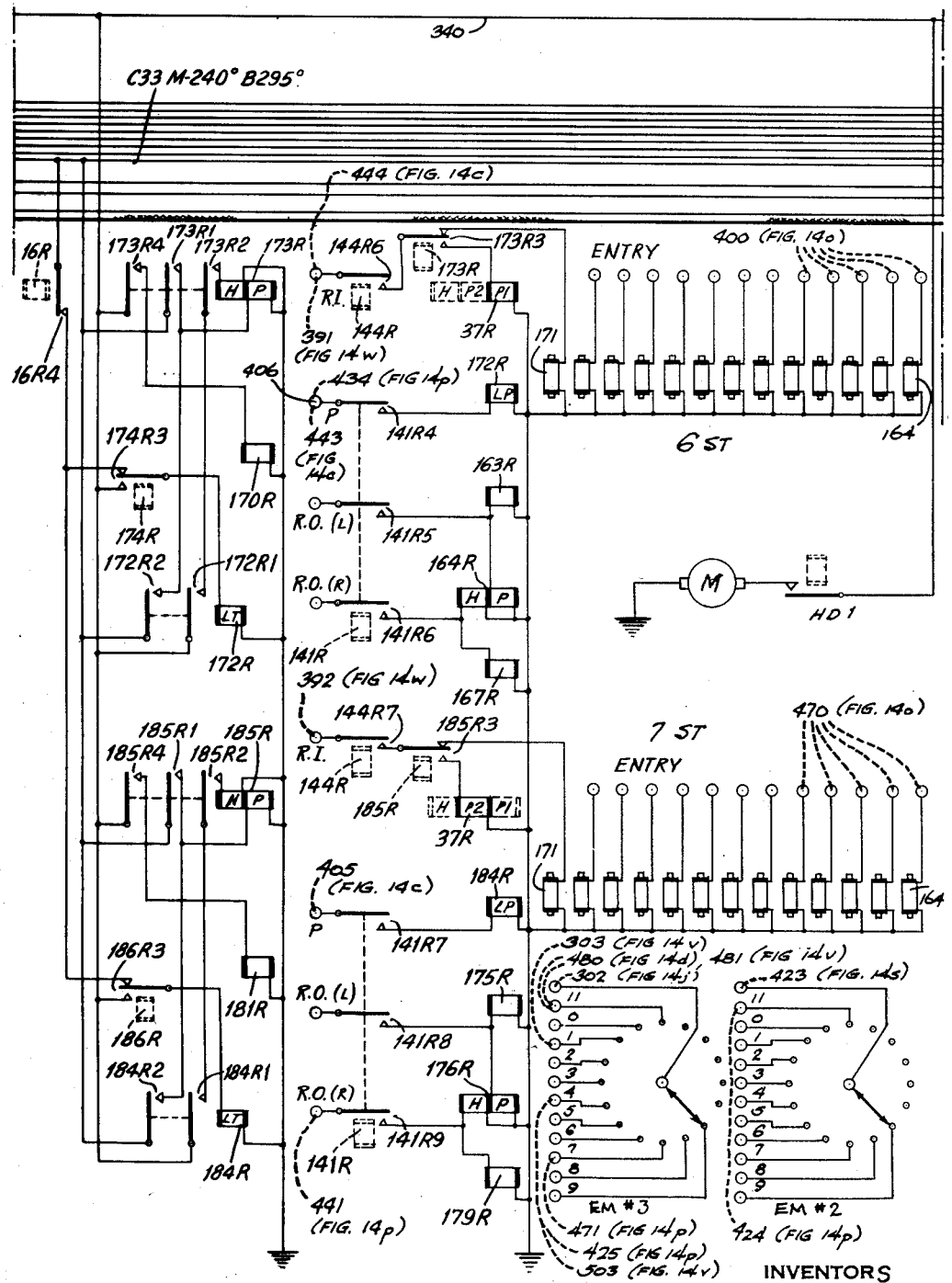
Figure 14H:
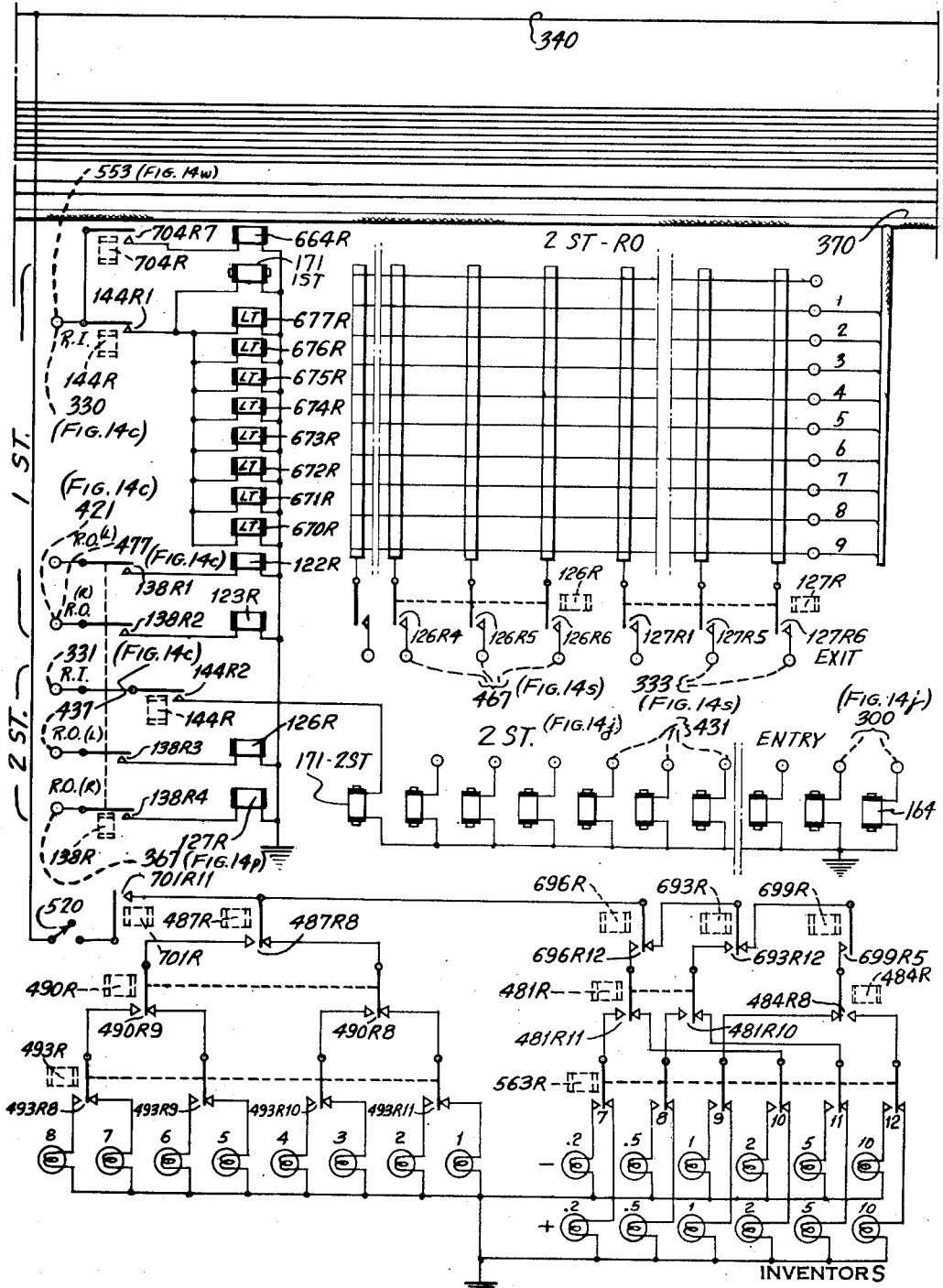
Figure 14J:
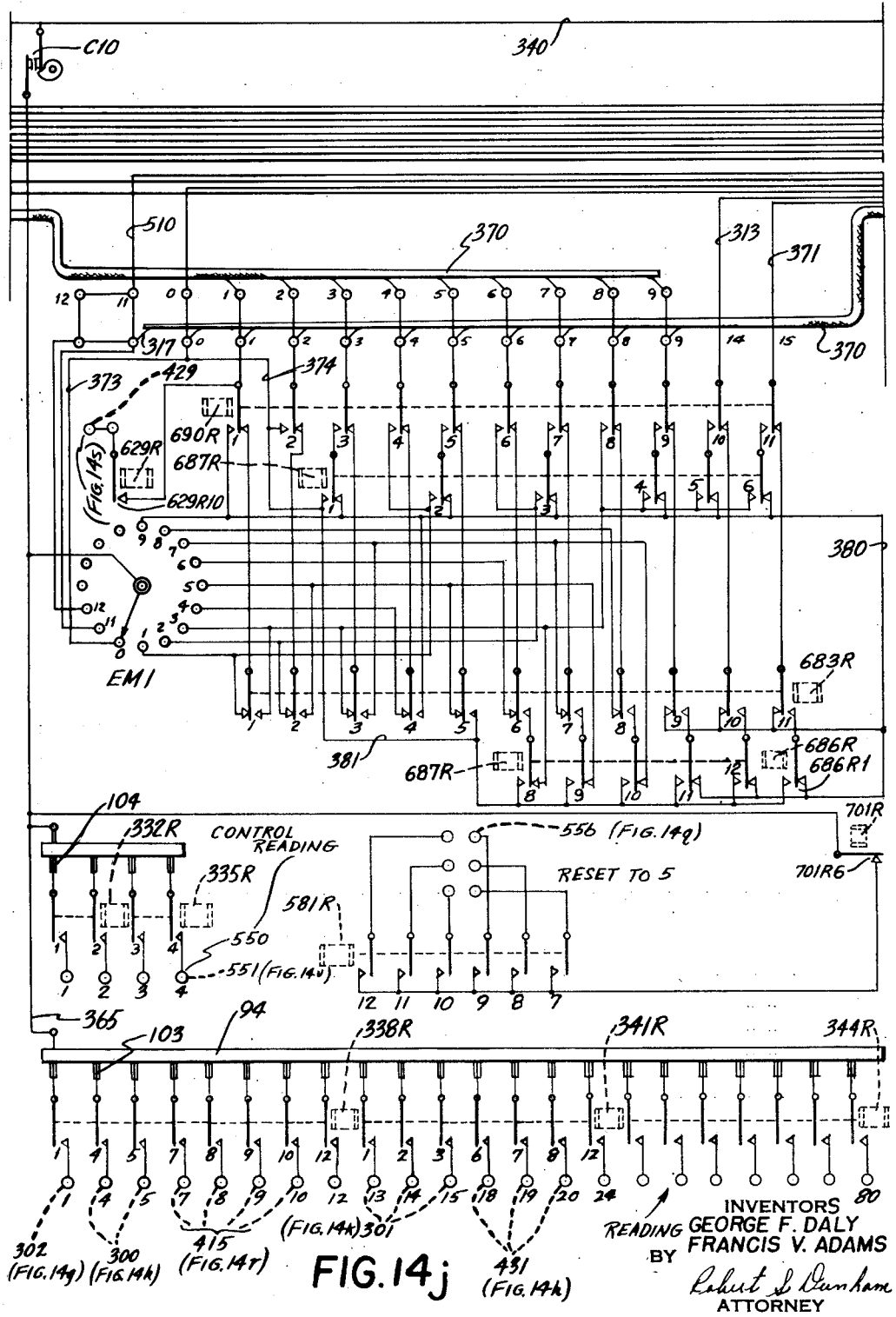
Figure 141:
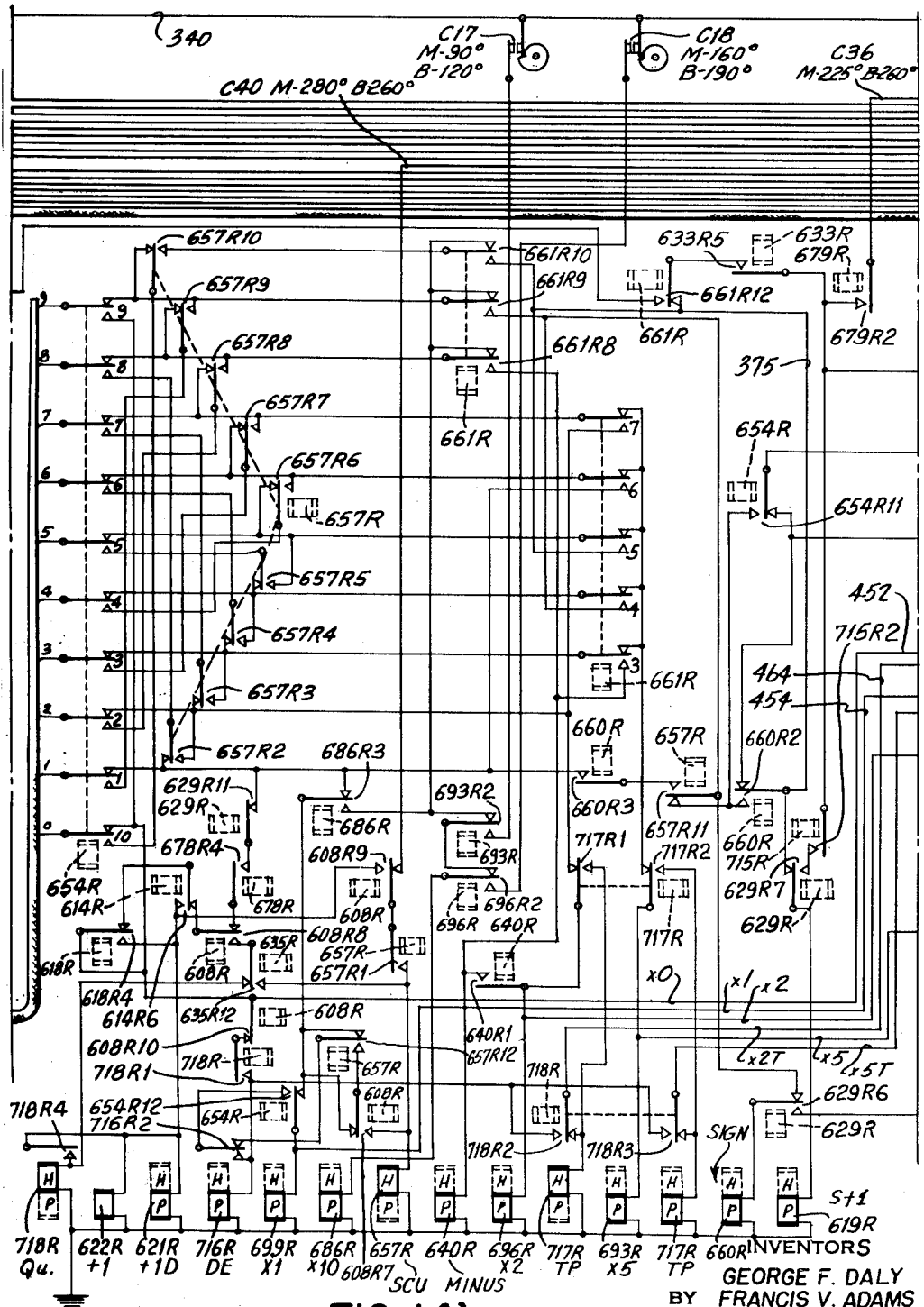

Card #1 is specifically selected to multiply, such multiplication being identified by control perforation 1 in column #1, Fig. 18. This control perforation must be filtered through a digit emitter before the various digits which control special programming of the various types of cards can be considered. The first column of the reading brushes, Fig. 14j is accordingly plugged to the input or rotor of a digit selector EM3 (Fig. 14g) via wire 302, and the #1 spot of this emitter is plugged via wire 303 to the digit pickup of a pilot selector 1, Fig. 14v. This pilot selector functions primarily in the current example to effect multiplying on a card identified by a "1" perforation and to skip the first step of programming on other cards, which eliminates multiplying on cards not bearing the "1" perforation.

The terminology employed on the pilot selector contact hubs is as follows:

"C" identifies the common or center leaf of the contact.
"N" identifies the normally closed contact.
"T" identifies the transfer contact or the contact which is to be connected to "C" when the selector is picked up. In such case, "N" is disconnected by the shift of contact.

The operation of pilot selector 1 is explained in detail in the chapter entitled pilot selectors and card control of punching.

Card #1 has been explained as being arranged to control multiplying, and the program is plugged to effect such multiplying on the first program step. Calculation of the multiplier amount 302 necessitates three cycles of machine operation. During these three cycles of machine operation the exit hubs of the #1 step of the program device (PI) will continue to emit impulses to continue the multiplying operation until the machine receives a signal from internal circuits that multiplying has been completed. Multiplication is called into operation by one of the wires 306 which is connected from program exit #1, Fig. 14c, to a "C" hub of co-selector 5CS, see Fig. 14p. This co-selector in its normal position is connected by wire 308 to the input hubs which are labelled "Multiply," Fig. 14u.

During the reading cycle, when card #1 is being sensed, the factors are to be entered into storage units 1ST and 2ST. The control of such entries is effected by wires 330 and 331, which extend from the read cycle hubs 319 (Fig. 14c), to the read-in hubs of storage units 1 and 2 (Fig. 14h). This circuit will condition the tripping of the magnets 171 associated with units 1ST and 2ST, which for purposes of identification are further labelled 171–1ST and 171–2ST. This operation physically conditions the storage units (see Fig. 3) so that the bail 151 will first rock to permit clearing of any previous setting. One of the read cycles exit hubs 319 (Figs. 19a and 14c) is connected by wire 304 to the center leaf hub of a #1 pilot selector contact (see Fig. 14w) which when transferred will complete a circuit to its related hub "T," which is connected by a wire 305 to the readout hub of accumulator 6AC, which has been selected as the product accumulator. Plug wire extension 304 will extend from one of the hubs 319 (Fig. 14c) to the center leaf hub of pilot selector contact 203R3 (Fig. 14w). The normally open hub connected to contact 203R3 is connected via a wire 305 (Fig. 14w) to the readout control hub of 6–AC (Fig. 14o). This plugging conditions the No. 6 accumulator 6AC for readout. A similar connection 307 extends from the No. 1 program step hub, connected to 47R6 (Fig 14c), to condition the No. 6 accumulator 6AC for adding, which is the normal operation associated with product entry. This connection extends to the plus hub of 6AC (Fig. 14o). A connection 306 extends from another one of the first program step exit hubs (in this case the one connected to 47R5) to a co-selector contact 302R2 (Fig. 14p). The normally closed contact is now connected by plugwire 308 to the multiply control hub (Fig. 14u). The plugging connections 306 and 308 are in a circuit which conditions the machine for multiplying during program step 1 when operating on card 1. Connections 333 (Fig. 14h) show wires (2 in this instance) which serve to connect the readout of the second storage unit, which has been identified as 2ST (Fig. 14h), to the product accumulator which, in this instance, is the No. 6 accumulator 6AC. The connections 333 extend to the product entry hubs shown on Fig. 14s.

The foregoing connections have conditioned the machine to operate on card No. 1 with respect to sensing factors, entering these factors in storage, operating upon such factors during program step No. 1, to condition the machine for multiplying, and for entering the product in accumulator No. 6 (6AC). In addition, a plug connection 335 extends from one of the No. 1 step program hubs (Fig. 14c) to the read hub, see Fig. 14a. This connection is utilized to repeat the read operation at the end of program step 1 as each multiplication or preliminary operation of the machine is effected. The connections which will ultimately be required to transfer the product from accumulator to storage and record the product by punching back into the card will be described later in connection with punching. The machine is now in condition to sense the factors from card No. 1 and multiply these factors.

First card feed cycles

The power source for the machine is shown at the left side of Fig. 14a. The power is supplied by closure of a main line switch 336, which supplies current to the line shown at the top of all diagram sheets 14a, 14b, etc. and to ground. The main line is designated 340.

Assuming record cards, including those previously described, in the supply hopper 86, Fig. 2, and with current supply provided, the operator presses the start key 338 (Fig. 14a). Current flows from line 340 through the stop key contacts 341, through a conventional stacker stop contact 342, through error stop relay contacts 40R2, through start key contacts 338, to energize relay coil 1R, thence back to ground. A hold circuit for relay 1R is established through relay contacts 1R1, relay contacts 5R1 in the position shown, holding coil of relay 1R, and back to ground. With 1R energized, a circuit is established (see Fig. 14b) from line 340 through contacts 1R3, now in shifted position, to and through a heavy duty relay designated "HD," and thence back to ground. With the heavy duty relay HD energized (Fig. 14b), relay contacts HD-1 (Fig. 14g) close and provide current supply to the motor. With the motor in operation, the various shafts and cam contacts are set in rotation. With the C cams in operation, cam contact C1 (Fig. 14a) closes at 320 degrees and establishes a circuit via line 344, to and through hopper card lever contacts HCL1, which are closed when cards are in the supply magazine by means of lever 345 (Fig. 2), to the pick-up coil of relay 11R. Another line 345 receives current from cam contact 1, which line extends through relay contacts 1R4 now closed (Fig. 1a), to energize pickup coil of relay 7R. Relay coils 7R and 11R are held energized by holding coils 7R and 11R through a circuit established to line through stick contacts 7R1 and 11R1. This circuit to line is completed through a wire 346, which leads to cam 3, which makes at 340 degrees and breaks at 320 degrees. With relay 7R energized on the following machine cycle, upon C2 (Fig. 14a) making at 225 degrees, a circuit is established via line 347, through the 7R6 contacts now closed; through relay contacts 21R4 now in the position shown; to relay contacts 25R4, now in the position shown, to energize relay 5R, the circuit extending back to ground. At this point, it may be explained that relay 5R is of the so-called latch type, it being more fully shown in Fig. 29. The coil 5R is the pickup coil of this latching relay, this being shown on Fig. 14a. The trip coil of this relay is shown on Fig. 14b. The legend "LP" associated with 5R on Fig. 14a signifies latch pick up and the symbol "LT" on Fig. 14b signifies latch trip. Latch-trip relays of this type may be provided with one or more pickup coils such as LP-1 and LP-2 (Fig. 29), and with a trip coil LT. On energizaton of one of the pick-up coils, the armature 350 will be attracted, whereupon this armature is latched by another armature 351, which snaps into position under spring action. To release the latched armature 350, the LT coil is energized, whereupon spring action restores the armature 350 to the position shown. It will be understood that there may be a group of contacts generally designated 352 which are controlled upon attraction of armature 350. Relay 5R when energized closes relay contacts 5R3 (Fig. 14b) and establishes a circuit from line 340 through the cam contacts C8, through contacts 5R3 to a so-called read feed relay 18R and to ground. On the same machine cycle, upon closure of cam contact C7 at 290 degrees, a circuit is established (Fig. 14b) through relay contacts 31R3, in the position shown; to and through relay contacts 32R5, in the position shown; through relay contacts 21R2; through relay contacts 18R3, now closed by reason of energization of relay 18R; through relay contacts 150R4, relay contacts 11-R-5, now in shifted position; to card feed clutch magnet CF, and back to ground.

The first card is now picked from the hopper and card feed of the first card occurs. The first machine cycle of the card feed cycle, as is customary in these machines, advances the card to the feed rolls, and it requires the second machine cycle of the card feed cycle to present the card to the control or advance sensing brushes 104 (Fig. 2). The first machine cycle of the following card feed cycle advances the card past the card reading brushes 103 (see Fig. 2).

Following the initial card reading cycle, the first card reaches the control brushes, closing card lever 1CL (see Fig. 2) immediately before reaching the control brushes. Closure of card lever contacts 1CL1 (Fig. 14a) completes a circuit from line 340, through cam C4, closed at 349 degrees, and contacts 1CL1, to energize relay 31R (Fig. 14a). At 180 degrees of the cycle during which the first card is sensed at the control brushes, a circuit is therefore completed from line 340, through cam C6 made at 180 degrees (Fig. 14b), and relay contacts 31R4 now shifted, to energize first card relay 25R through its pickup coil (Fig. 14b). Relay 25R holds continuously until the last card leaves the machine by a holding circuit extending from line 340 through either relay contacts 32R6 or relay contacts 34R2 (Fig. 14b) and stick contacts 25R1, to the hold coil of relay 25R. One or both of contacts 32R6 and 34R2 will be closed at all times until the last card is ejected from the machine.

When cam C-6 (Fig. 14b) closes at 180 degrees of the first card reading cycle, a circuit is completed from line 340, through C6, relay contacts 22R2 (relay 22R' having been picked in parallel with feed clutch CF), through relay contacts 31R4 in the position shown, and relay contacts 5R4 now closed, through latch trip coil of relay 5R, and thence to ground. This circuit unlatches read-feed relay 5R in preparation for later feeding control. During the first card feeding cycle, the read cycles sockets of the program circuit (Fig. 14c) emit a pair of SP and EC impulses in the manner previously described, and control read in of storage units 1 and 2 in a manner which will be described in detail subsequently. Owing to the absence of a card at the reading brushes, no factors will, however, be entered into storage units 1 and 2. Following the first card reading cycle, the program circuit advances to step 1, and the No. 1 exhibit hubs become active during such cycle. One of the exit hubs of program step 1 is connected by wire 306 to coselector 5 (Fig. 14p) and thence by wire 308 to the contron panel multiply sockets (Fig. 14u). This impulse initiates a multiplying operation, but since both multiplier and multiplicand factors are equal to 0 in this instance, the detailed multiplying control circuits will not be described at this time. At the same time, a second exit hub of program step 1 transmits an SP impulse at 255 degrees to the read sockets (Fig. 14a), via wire 335, completing a circuit through relay contacts 223-R2, in the position shown, to energize and latch read-feed control relay 6R, through its LP magnet. By means which will be described elsewhere, the impulse to the multiplier hub initiates a program delay by energizing program delay relay 35R (Fig. 14u). Relay 35R prevents normal program advance and also alters the pickup circuit to read-feed relay 5R so that its energization is conditioned upon the reception of an impulse indicating end of multiplication.

Owing to the presence of a 0 multiplier in this example, the end of multiplication is signaled near the end of program step 1 by current flow through a circuit extending from the line (Fig. 14i) through cam C36 at 225 degrees, thence through relay contacts 679R2 and 633R5, shifted in a manner to be later described (Figs. 14l and 14r), contacts 661R12, via line 375, 660R2, 654R11, as shown, 629R12 (Fig. 14m), 628R2, 626R2, 623R10 and 621R6, all as shown (Fig. 14m), to a line 360. The impulse proceeds via line 360 to relay contacts 35R2, now shifted, Fig. 14d, where it proceeds through 37R4 contacts as shown, to energize stepping control relay 42, thereby ending the program delay set up by the energization of relay 35R. At the same time, a parallel circuit is completed via line 361 to relay contacts 6R3, Fig. 14a, through contacts 6R3 now shifted, contacts 35R3 and 25R4, now shifted, to energize and latch read-feed relay 5R.

It may be mentioned at this time that contacts 1CL1 are also the controlling means which make the card reading brushes and the control sensing brushes active in said order during the two successive machine cycles which comprise a card feed operation. Referring now to Fig. 2, read card lever contacts 1CL1 are closed following the first card feed operation by the trailing edge of the card which has passed beneath the control sensing brushes 104 and which is in position to be sensed at the card reading brushes 103 during the first machine cycle of the next card feed operation. During the cycle preceding the second card feed operation, the closed condition of contacts 1CL1 provides the aforementioned circuit to energize relay 31R, Fig. 14a. At 180 degrees of said cycle, therefore, a circuit is available from line 340, Fig. 14b, through cam contacts C6, relay contacts 31R4, now shifted, to energized pickup coil of relay 26R, and thence to ground. Relay 26R holds by means of a stick contact 26R1 until cam contacts C8 open at 30 degrees of the following cycle, which in this example is the first machine cycle of a card feed operation. When card feed clutch magnet CF, Fig. 14b, is impulsed to initiate such cycle, therefore, in the manner to be described, a parallel circuit is available from contacts 150R4 through shifted contacts 26R3 to energize relay 19R pickup coil, relay 19R holding by means of 19R hold coil and stick contacts 19R1, Fig. 14a, until cam contacts C38 open at 240 degrees of the first machine cycle of a card feed clutch operation. Therefore, during the time that card 1 is passing the reading brushes, a circuit may be traced as follows: from cam contact C4, Fig. 14a, through contacts 19R2 now closed, relay coils 338R, 341R, and 344R, and thence to ground. Contacts of the last named relays are shown in Fig. 14j, connecting the card reading brushes to associated control panel sockets when in shifted position. The foregoing circuits assure that impulses may be received from the reading brushes only when a card is actually passing beneath them. When card 1 begins to move at the start of the first machine cycle of the card feed operation now under discussion, contacts 1CL1 are immediately opened. In consequence thereof, the above cited circuits to energize relays 31R and 26R are not operative, with the result that relay 26R remains de-energized following 30 degrees of said first machine cycle when its associated holding circuit is terminated. In addition, relay 31R (Fig. 14a), fails to energize during said first machine cycle ownig to the open condtion of contacts 1CL1. At 180 degrees of the first machine cycle of a card feeding operation, a circuit is therefore completed from cam C6 (Fig. 14b), through contacts 31R4, as shown, and contacts 5R4, now closed, to de-energize the latch trip coil of relay 5R causing this relay to return to its energized position. At the same time a parallel circuit is completed from cam 6 (Fig. 14b), through contacts 22R2, now shifted, to energize relay 21R (pickup coil). A holding circuit is established for relay 21R through 21R holding coil and stick contacts 21R1, Fig. 14b, to cam C8. It might be explained that relay 22R is in a parallel circuit with the card feed clutch magnet CF and is energized whenever CF is energized. At 290 degrees of the first machine cycle, of a card feed cycle, therefore a circuit is completed from cam contacts C10 through contacts 26R4 (Fig. 14a), now as shown, and contacts 11R5, now shifted, through pickup coil 17R to ground. Relay 17R closes stick contacts 17R1, Fig. 14a, to connect hold coil 17R to cam contacts C36. Immediately before the second machine cycle of the card feed cycle begins, card 2, leaving the feed hopper, reaches a position where it closes contacts 1CL1, so that at 349 degrees of such cycle a circuit may be traced as follows: from cam contacts C4 (Fig. 14a), through contacts 1CL1, and relay coil 31R, as previously described to ground. At the same time a parallel circuit exists, however, through contacts 17R3, through relay coils 332R and 335R, the contacts of which when shifted (see Fig. 14j), connect the control sensing brushes 104 to the associated control panel sockets, thus limiting reception of impulses from the control brushes 104 to only those cycles during which a card is actually passing beneath the brushes.

Returning now to a consideration of the events occurring during the first card feeding operation, it will be recalled that energization of relay 5R has been described. Referring now to Fig. 14d, the energization of relay 5R will shift contacts 5R2 to reverse position from that shown. Thereupon when cam C33 makes at 240 degrees, current is supplied from line 318 through the shifted 5R2 contacts, to energize program read relay 43R. The resulting setup of the program control has been previously described. It may be explained that on these first card setting up operations, certain dummy operations ensue, but these need not be explained in detail. Their general purpose is to ensure clearing out of storage devices and accumulators, etc., before actual operations commence which pertain to the first card. In general, the machine attempts to read in, under control of the program, a non-existent amount, owing to the absence of any card at the reading brushes. It then attempts to effect a multiplication, since the first program step is plugged for multiplication. It actually, in effect, makes a muliplication by zero, and at the completion of this multiplication by zero cycle, a relay control is set up which indicates that the dummy multiplication has finished. This end of multiplication test circuit will be subsequently described in detail, but at this point, it may be mentioned that when the dummy multiplication is complete, an impulse is provided to initiate a new card feed operation which has been delayed pending the end of multiplication. It will suffice to say at this point that such impulse effects energization of relay 5R latch pickup coil (Fig. 14a).

*Multiplying circuits*

Before describing on the circuit diagram the succeeding steps in detail the general operations which are to be performed will be first pointed out. The multiplier amount will be read from the first card and entered into 1ST. The multiplicand amount will be read from the same card and entered into 2ST. After the foregoing amounts have been entered in their respective storage devices the machine is ready to start multiplying. In general the multiplying procedure is as follows: Impulses flow through an emitter and thence through multiplying relays or times relays. These relays are provided for a ×2 multiplication and ×5 multiplication. If neither of these relays is called into operation the multiplication is to be a multiplication of ×1. Since LH components and RH components can be entered into the same accumulator in successive portions of the same machine cycle, the multiplicand read-out is of the single type in lieu of the dual read-out heretofore provided in impulse controlled multiplying machines. The impulses as selected by the multiplying relays flow through this single multiplicand read-out and thence flow to the product accumulator.

The machine carries out multiplying computations by causing entries into the product accumulator according to the following rules:

(1) In the first portion of a ×5 entry cycle into an accumulator, the 5's complements of the RH components are entered. On the second portion of the accumulator cycle, the 4's complements of the LH components are entered.

(2) When multiplying ×1, if the entry be a positive entry, the 9's complement of the number will be entered in the accumulator and if the basic control be ×−1, the true value components will be entered. It should be noted that when multiplying by a "1," there are no left hand components and in such a case, the entire cycle is utilized for entering an RH component, which may be any digit value from "1" to "9."

(3) In multiplying by ×2 for an additive entry, the machine on the first portion of an accumulator cycle enters the 8's complements of the RH components. On the latter portion of the accumulator cycle, it enters the 1's complements of the LH components. When operating for a ×−2 entry, the machine enters the RH components as a true number value on the first portion of the entry cycle and on the latter portion of the entry cycle, it enters as true numbers, the LH components. The foregoing is the general operation which will now be described in detail.

The previous description has explained the manner in which relay 5R, Fig. 14a, was energized. With relay 5R energized cam contacts C3 (Fig. 14b) closed at 215 degrees and established a circuit through relay contacts 5R3, through the 18R relay and back to ground. Relay 18R may be termed a read-feed relay. With relay 18R energized, relay contacts 18R3 (Fig. 14b) close and a circuit is established from line 340 through cam contacts C7, through relay contacts 37R3, 32R5, 21R2, 18R3, and 153R4, all in the position shown, except 18R3 now closed through contacts 11R5, now in shifted position, to the card feed clutch magnet CF and thence to ground. Concurrently with the energization of the card feed clutch magnet CF, a feed clutch interlock relay 22R is picked up. 22R hold coil is held energized through stick contacts 22R1, Fig. 14a. Concurrently with the energization of CF and 22R another circuit will be established through shifted relay contacts 141R2, through latch trip coil relay 6R and back to ground (Fig. 14b). Referring to Fig. 14v, a circuit from cam contacts C1 is established through contacts 701R7, 37R2, 18R2, 156R3, all as shown, to energize 141R, 138R, 76R, 704R, 575R and 572R, pickup coils at 320 degrees. A stick circuit for these relays (see Fig. 14u) is established from cam contacts C34 through stick contacts 144R1, maintaining the relays energized until 240 degrees of the following cycle. With the latch trip coil of relay 6R energized the contacts controlled by the 6R pickup coil (designated LP on Fig. 14a) return to the position shown. With card feed clutch CF (Fig. 14b) energized the first card passes the reading brushes. During this cycle, relay 43R (Fig. 14d) is set up in the manner previously described and 43R when energized shifts contacts 43R3 to 43R11 to reverse position to that shown in Fig. 14c. At 255 degrees to 285 degrees of the cycle preceding the card feed cycle, SP impulses are sent out from hubs 319. One of these impulses flows through plug connection 330 (Figs. 14c to Fig. 14h) and such impulse flows through relay contact 144R1, now closed, and thence through latch magnet 171 pertaining to the 1ST storage device. Relay 144R is energized during each machine cycle by a circuit extending from cam contacts C33, Fig. 14u, through relay contacts 7R7, in shifted position, to 144R. This relay is thus energized from 240 degrees to 295 degrees so that only SP impulses (255 degrees to 285 degrees) can pass through its contact. With magnet 171 energized the sectors of 1ST are immediately restored. A similar impulse flows via plug connection 331 from one of the sockets 319 (Fig. 14c to Fig. 14h) and thence through relay contacts 144R2, now closed, to the latch magnet 171 of the 2ST storage device, thus allowing reset of the sectors of this storage device. It may be here mentioned that the 1ST storage device is to receive the entry of the multiplier and 2ST is to receive the entry of the multiplicand.

Referring to Fig. 14j, relay contacts termed "read brush relays" are provided between the main reading brushes and the reading sockets. These read brush relays include relay contacts 338R1 to 338R12 and relay contacts 341R1 to 341R12. Referring to Fig. 14a, these relays are energized during the passage of card #1 past the reading brushes in the manner previously described. Energization of these two relays closes the related relay contacts 338R1 to 338R12 (Fig. 14j). The multiplicand entries flow via plug connection 300 (see also Fig. 14j) through the entry hubs of 2ST storage device (Fig. 14h) to the 164 magnets of this storage device. Accordingly, the amount of the multiplicand is set up on 2ST.

Before the multiplier can be entered into 1ST (see Fig. 14k) relay contacts 664R1 to 664R8 (Fig. 14k) must be closed. To close these contacts, relay contacts 704R7 are now closed (Fig. 14h) permitting the EC (340 degrees—192 degrees) impulse through wire 330 to flow through these contacts to energize relay coil 664R. This 664R relay is thus energized from 340 degrees in the machine cycle preceding the card read cycles to 192 degrees in the card read cycle.

At this point the manner of energizing 704R and 144R will be described. Referring to Figure 14u, cam contacts C33 establish a circuit at 240 degrees to and through relay contacts 7R7, now shifted, to relay coil 144R hereafter designated SP (setup pulse) relay. To energize pickup coil 704R, a circuit is established from cam contacts C1 at 320 degrees (Fig. 14v) to and through relay contacts 701R7 in the position shown, thence through relay contacts 372R in the position shown, through 18R2, in the position shown, to 150R3, thence through the pickup coils of relays 572R, 575R, 704R, 76R, 138R, and 141R to ground, said relays are held energized upon closure of stick contacts 141R1 under control of C34 (Fig. 14u). These relays may hereafter be referred to as EC (entry control) relays.

Referring to Fig. 14j current supply is provided to the contact roll 94 in the following manner: From line 340 through cam contacts C10 to line 365; thence through the card perforations and the brushes, to and through the now closed relay contacts 338R1 to 338R12 (for multiplicand entries), through 341R1 to 341R12 (for multiplier entries), thence via plug conections 301 for multiplier entry (see also Fig. 14k), thence through the 664R1 to 664R8 contacts, now closed, through relay contacts 667R1 to 667R8, now closed, to the 164 magnets of the 1ST storage device and back to ground. Impulses which are representative of the multiplier not only flow through the 164 magnets of the 1ST storage device, but such impulses also flow through the LP coils of relays 670P to 677R, inclusive. In the problem under consideration a multiplier amount is 302. Accordingly, relay 675R will be picked up due to the significant digit "3" in the hundreds order of the multiplier and relay 677R will be picked up due to the significant digit of "2" in the units order of the multiplier. On the other hand relay coil 676R will not be energized. It may be here explained that the 664 relay contacts 1 to 8, inclusive, open before the time of the zero impulse. As an additional means to insure that zero timed impulses at 202½ degrees will not energize relays 670R to 677R, inclusive, contacts 667R1 through 667R8 are provided. Relay 677R is energized as shown in Fig. 14s, in the manner described in connection with counter MS impulses. On noncalculating cycles such as the card reading cycle, relay 667R is energized at 192 degrees, following the "1" index point and preceding the "0" index point. All relays to the left of 675R remain deenergized, namely 670R to 674R, inclusive. Relays 670R to 677R are the latch type, so accordingly their setting is stored.

*Control for initiation of multiplication*

At 240 degrees machine time in the reading cycle program, relay 47R (Fig. 14d) is energized, causing closure of contacts 47R3 to 47R6, inclusive, (Fig. 14c). An SP impulse which flows on line 320 at 255 degrees to 285 degrees through contacts 47R4 flows via plugwire 306 to Fig. 14p; thence this early impulse flows through relay contacts 302R3, in the position shown; thence via plug connection 308 to Fig. 14u through relay contacts 638R3, now shifted, to energize pickup coil of relay 635R and calculate relay 701R. With calculate relay 701R energized, a circuit extends from cam contacts C6, Fig. 14u, through contacts 701R4, now closed and 716R4, as shown, to energize program delay relay 35R (pickup coil). Relay 35 holds by means of hold coil 35R and stick contacts 35R1 (Fig. 14u). Energization of relay 35R shifts contacts 35R2 (Fig. 14d) to initiate a program delay in the manner described in connection with program advancing circuits. Relay contacts 638R will have been previously closed via circuit extending from the line through cam contacts C33 (Fig. 14u), thence through 638R relay coil to ground. This circuit is made at 240 degrees and breaks at 295 degrees. Relay 635R being picked up in the manner described is held energized through hold circuit from C43 by stick contacts 635R1 (Fig. 14u) and 635R hold coil.

The machine is now ready to test the storage unit read-out containing the multiplier to ascertain the columnar order of the highest significant digit. As has been previously explained, the presence of a "3" in the hundreds order of the multiplier has energized relay 675R (Fig. 14k). Accordingly, relay contacts 675R2 (Fig. 14t) are closed. At 235 degrees cam contacts C27 (Fig. 14t) close and establish a circuit through relay contacts 670R2, 671R2, 672R2, 673R2, 674R2 (all now in the position shown) to and through 675R2, now in shifted position, through relay contacts 633R3 to energize multiplier test offset relay 645R. Upon picking up of this relay 645R, the relay is maintained energized by stick contacts 647R1 (Fig. 14s.) This hold circuit is completed by cam contacts C40 at 280 degrees. Shortly thereafter, at 255 degrees, relay 635R being energized, relay contacts 635R8 (Fig. 14t) are in shifted position and relay coil 614R becomes energized in parallel with relay 645R. This relay is held energized by stick contacts 614R1 (Fig. 14s).

It may be mentioned at this point, referring to Fig. 14t, that relays 647R, 645R and 642R are so-called multiplier test offset relays, contacts of which are utilized in a manner to be shown later, to sense the various orders of the multiplier amount standing in storage unit 1ST, Fig. 14k. The circuit described above has made an initial setup of these relays to test the highest significant digit of the multiplier amount which, in this example, is a number 302. Since there is a significant digit in the hundreds order, relay 645R, which provides a shift offset of two places, was energized through a suitable combination of the contacts of significant digit relays 670R through 676R inclusive. It will be understood that for multiplier amounts of varying denominational magnitude, suitable combinations of relays 646R, 645R and 642R would be selected. For example, if the highest significant digit of the multiplier was in the thousands order, relays 645R and 642R would both be energized providing a three place offset in column shift. On the other hand, if these was a single multiplier digit in the units order, none of the above mentioned multiplier offset relays would be energized.

It has been described that relay 614R was energized shortly after relay 645R by a parallel circuit through contacts 635R8. Relay 614R is one of a group of relays which also includes 618R, 608R and 605R, these being termed shift control relays. These shift control relays are combinationally energized in a manner similar to that described for the multiplier test offset relays to provide a corresponding column shift of entry into the product accumulator. In short, the multiplier test offset relays are used to direct the multiplier digit selecting circuit to the proper order of the multiplier storage unit. The shift control relays on the other hand are used to direct a corresponding column shift for the entries in the products accumulator. It will be appreciated that the multiplier order which is tested corresponds with the shift of product entries into the accumulator.

The machine has now tested the storage unit containing the multiplier to ascertain the columnar order containing the highest significant multiplier digit. The 1ST storage device must now be tested to ascertain which digit appears in the hundreds order. Accordingly, the test circuit for this purpose must be directed to such hundreds order. This is the purpose of the so-called multiplier test offset relays, particularly relay 645R in the present example. Not only must the 1ST storage device be tested in the hundreds order but the product must be directed into the proper order of the products accumulator. Shift control relay 614R is utilized for this purpose.

It will be recalled that the problem pertaining to the first card comprises the multiplication of "39" as the multiplicand, by "302" by the multiplier. As previously explained, multiplication proceeds from highest to lower orders. Accordingly, if the multiplying rules be referred to for a multiplier digit of "3," two accumulator entry cycles are required. On the first entry cycle, 5 times the amount of the multiplicand is to be entered into the product accumulator and upon the second entry cicle, minus 2 times the multiplicand is to be entered into the product accumulator and during this latter cycle, toward the end thereof, the next significant digit in the multiplier is sensed.

Relay coil 635R (Fig. 14u) was energized as stated above at 255 degrees. With this relay energized, relay contacts 635R11 (Fig. 14u) will close and during the period of closure of cam contacts C27 between 235 degrees and 340 degrees a circuit will be established to pick up relay coil 651R, this relay coil being energized at the time 635R11 closed. Referring now to Fig. 14k, with relay coil 651R energized in the manner just described, relay contacts 651R12 are closed. Accordingly, on closure of cam contacts C16 at 290 degrees (see Fig. 14k) a circuit is established from line 340 through 150R5, now closed, thence through wire 548 to energize the pickup coil of relay 679R. At the same time a parallel circuit continues through relay contacts 661R2, in the position shown; through 651R12, now closed; through relay contacts 647R3, in the position shown; through 645R5, now in shifted position; through 642R9, in the position shown; through 123R6, in the position shown; down to the 1ST read-out which will find a brush standing on the "3" spot in the hundreds order. The circuit continues via #3 read-out bus; through relay contacts 648R3, in the position shown; through 651R3, in shifted position, through the #3 wire in the cable 366, to Fig. 14l; then through relay contacts 654R3, in the position shown; through 661R3, in the position shown; through 717R2, in the position shown; thence to the ×5 multiplier relay 693R and then to ground. The pickup coil of ×5 multiplier relay 693R having been energized, is held energized through a stick circuit from C-37 shown on Fig. 14u. The stick circuit extends through relay contacts 701R3, relay 701 being energized in parallel with the 635 multiplier relay previously described (see Fig. 14u). The stick circuit for the ×5 multiplier relay 693R extends also through stick contacts 693R1 to cam C37 which closes at 250 degrees. With 693R energized, relay contacts 693R9 (Fig. 14u) will be closed and a circuit will be completed to energize an additional ×5 relay 690R through contacts 704R3, now closed, relay contacts 701R10, now shifted, relay contacts 693R9, now shifted, and back to line through now shifted relay contacts 693R7 and 693R8, the circuit being completed to line through cam contacts C32 which make at 340 degrees.

Factor selection circuit—times transfer (XT) relay operation

The factor selecting operations for various multiplier digits may be briefly summarized as follows, neglecting special cases.

| Multiplier digit | Factor selected | |
|---|---|---|
| | First cycle | Second cycle |
| 1 | ×1 | |
| 2 | ×2 | |
| 3 | ×5 | −×2 |
| 4 | ×5, change sign | |
| 5 | ×5 | |
| 6 | ×5 | ×1 |
| 7 | ×5 | ×2 |
| 8 | ×10 | −×2 |
| 9 | ×10, change sign | |

From the above, it is seen that all digits, except 1, 2 and 5, require compound operations, that is, either a second cycle or a sign change.

It will be noted that compound multiplier digits 3, 6 and 7 are characterized by a first multiplying cycle of ×5. Compound multiplier digit 8 is characterized by first multiplying cycle of ×10. Simple digits, such as 1 or 2, require no further cycle. A simple ×5 digit will require a single ×5 multiplication only. A 4 digit will require a cycle of ×5 followed by a sign change. A 9 digit will require a cycle of ×10 followed by sign change.

The previous explanation of multiplier factor testing for multiplying by 302 has shown how the 3 digit caused energization of 693R and energization of a supplemental relay 690R.

Referring to Figs. 14k and 14l, if a 1 digit is in an order of 1STRO and with 651R1 through 10 contacts shifted, a circuit will be completed through the wire 1 in cable 366, Figs. 14k to 14l and will extend through 654R1 as shown, 686R3 as shown, 654R12 as shown, to pickup coil of relay 699R, the ×1 relay. For a 2 digit the circuit on line 2 of the cable will extend through 654R2 as shown, 717R1 as shown, to the pickup coil of 696R, the ×2 relay. If digits 3, 4, 5, 6 or 7 are detected, the circuits will extend through 654R3 to 654R7, respectively, as shown, through 661R3 to 661R7, as shown, through 717R2 as shown, to the pickup coil of 693R, the ×5 relay.

If digits 8 or 9 are tested, the circuits will extend through 654R8 or 654R9, as shown, through 661R8 or 661R9, as shown, through 693R2, as shown, through 696R2, as shown, to the pickup coil of 686R, the ×10 relay. If either the ×5 or the ×10 relays be energized, this will signify a compound operation, i. e. either a second cycle operation or a change of sign except for a simple ×5 digit operation as will be subsequently explained. If 693R, the ×5 relay, be energized or if 686R, the ×10 relay, be energized, a relay 661R (times transfer relay) will be energized to reroute the test circuits for a second test and make selection for the following sign change or for a second multiplying cycle.

The general effect of energizing the times transfer relay 661R is to temporarily establish conditions which will nullify shift to the right until a second multiplier digit test has been made at the end of the cycle. This second test may or may not ultimately result in a shift before start of the next cycle. It may be explained at this point that the general circuit design of that portion of the circuit shown in Figs. 14k and 14l is based on the assumption that whenever the machine detects a 3, 4, 5, 6, 7, 8, or 9 there will be a second test and if the digit be a 3, 4, 5, 6, or 7 this will result immediately in the energization of an ×5 relay 693R which is always used on the first cycle in such cases. If the digit sensed be a 3, 6, or 7, the second test will indicate the necessity for a second multiplication by 1 or 2 before proceeding to shift further to the right. The same condition applies when multiplying by 8 as in this case the machine must first multiply by 10 and then by −2.

If the second test indicates a simple 5, this second test results in an immediate shift to the next right-hand order as the multiplication ×5 is completed in a single cycle. The second test in this case will establish a circuit from C–36 (26a and 26b) through the (3) circuit which parallels the same path as the circuit (1) until it arrived at the now shifted relay contacts 661R5. It then follows a new path labelled (3) to directly energize the S+1 relay 619R which causes an immediate shift to the right and omits any second cycle. If the test indicates a 9 or a 4 there is also an immediate shift at the end of the cycle, accompanied by a sign change before proceeding with multiplication by the next lower order digit to the right in the multiplier storage unit.

Referring to Fig. 14u, it will be seen that if either the 693R3 contacts of the ×5 relay or the 686R4 contacts of the ×10 relay are shifted, a circuit will be completed from cam contacts C29 at 10 degrees–30 degrees through multiply relay contacts 635R10 to energize the pickup coil of the 661R relay (the times transfer relay). Relay coil 661R being energized is held energized until 260 degrees of the same cycle by a stick circuit extending from cam contacts C41 (Fig. 14v) through stick contacts 661R1 and the hold coil of 661R relay.

With 661R thus energized, contacts 661R12 (Fig. 14l) shift so that at 225 degrees an impulse from cam contacts C36 flows through the shifted 679R2 contacts, the 633R5 contacts in shifted position, the shifted 661R12 contacts, thence (see Fig. 14k) through the multiplier test circuit previously explained to and through the 651R12 contacts now closed and thence via the path previously described to the appropriate order of 1STRO. Since the 661R relay has been previously energized, the shifted condition of contacts 661R3 through 661R10 (Fig. 14l) will alter the test circuits so that on the second test there is an energization of either the ×1 multiplier relay 699R (if the multiplier be a 6), the ×2 relay 696R if the multiplier digit be a 7 or an energization of both the minus relay 640R and the ×2 relay 696R if the digit be a 3. There is an energization of both minus relay 640R and ×2 relay 696R on the second test if the digit be an 8.

In the case of a simple 5 digit, no compound operation is required and the shifted condition of contacts 661R5 causes the second test to energize the S+1 relay 619R so that the shift circuits are displaced one order to the right.

If the 4 or 9 digits be tested, the second test is directed by the shifted 661R contacts to energize the sign change relay 660R and the S+1 (shift +1 619R relay) to both initiate a sign change and move the shifted circuits one place to the right so that the next lower multiplier digit may be immediately tested. It may be mentioned that when the 660R relay is energized, contacts 660R2 shift to provide an energizing circuit for the S+1 relay 619R (Fig. 14l).

It is seen from the above that if the ×1 or ×2 relays be energized by the second test, through the shifted 661R contacts, a second cycle of multiplication is to ensue. In such a case, it is desirable to hold relay 661R beyond the 260 degrees duration normally provided, so that the hold circuit in Fig. 14u is provided. Here if either ×2 contact 696R3 or the ×1 contact 699R3 are shifted after the second test, a hold circuit is available from cam C27, through one of the shifted contacts, through stick contacts 661R11, now shifted, through 686R4 and 693R3, now as shown, and 635R10, shifted, to the 661R pickup coil, providing a hold circuit until 340 degrees of the first multiplying (×5 or ×10) cycle. This maintains 661R2 (Fig. 14k) in an open condition, so that the test impulse at 290 degrees of the first multiply cycle of a compound digit is suppressed. At 225 degrees of the second multiplying entry cycle of a two-cycle digit, the XT relay 661R will have returned to normal position, so that an impulse from cam C36, Fig. 14l, continues through contacts 679R2, 633R5, now shifted, 661R12, as shown, and 629R7, as shown, to energize S+1 relay 619R, so that at 290 degrees immediately following, the test impulse from cam C16, Fig. 14k, will proceed through the multiplier test shift circuit, displaced one place to the right, by a new setting of the relays 647R, 645R, and 642R, the multiplier tests offset relays to sense the next lower order multiplier digit.

The primary function of the contacts controlled by relay 619R is to prepare for immediate shift and test of the next lower significant order to the right, except in the special case where there be two intervening zeros, when three will be a lost cycle, as will subsequently be explained.

Before describing the manner in which ×5 the amount of the multiplicand is entered into the product accumulator, explanation will be given of the manner in which proper column shifts are provided for entries into the product accumulator. The previous description has explained the manner in which shift control relay 614R (Figs. 14t and 14s) was energized. Upon closure of cam contact C32 at 340 degrees (Fig. 14u) a circuit is established to and through relay contacts 701R5, now closed (Fig. 14t); through relay contacts 638R1, now in position shown, through relay contacts 614R3, now shifted; through relay contact 621R3, now in the position shown; to shift relays 490R, 450R, 410R, and to the pickup coil of relay 626R. Relay 626R is held energized through stick contacts 626R1 (Fig. 14s). Referring now to Figs. 14q, 14r, and 14s, it will be appreciated that with the shift #2 relays 490R, 450R, and 410R energized, all product entries will be shifted relatively two orders to the left in any products accumulator.

The foregoing description has explained the manner in which ×5 multiplier relay has been selected and the manner in which proper column shifts have been provided into the products accumulator. Provision should now be made to select which product accumulator of accumulators 1AC to 6AC is to receive the component entries and in addition, cause the read-out of 2ST storage unit to be properly connected so that related impulses will flow through it to the selected products accumulator. Provision must be made to transmit the proper machine "go" impulses to the selected products accumulator and provision should be made to transmit the proper stopping impulses related to the partial product components to the products accumulator. Referring to Fig. 14c, one of the EC impulses flows through contacts 47R6 via wire 307 to the plus hub of 6AC (Fig. 14o) through relay contacts 566R11, in the position shown; through relay contacts 572R9, now shifted; to plus relay 507R and back to ground. Relay 507R when energized will shift contacts 507R1 through 507R12 to reverse position from that shown on Fig. 14s. Accordingly, the 6AC accumulator will be selected for receiving partial product entries in an additive manner.

One of the programming plug connections is provided as shown on Figs. 19a and 19b at 367. This plug connection on the circuit diagram (Fig. 14p) extends from the socket as shown to a socket in Fig. 14h. Referring to Fig. 14c, an EC all-cycles impulse flowing through contacts 47R5 flows via plugwire 306 to Fig. 14p. This impulse flows through relay contacts 302R4, in the position shown, thence via plugwire 367 to Fig. 14h, thence through relay contacts 138R4, now in shifted position, through readout relay 127R to ground. With relay 127R energized (see Fig. 14h) contacts 127R1 to 127R6 are closed so that impulses may flow through 2STRO via plugwires 333 which extend to the accumulator 6AC entry hubs shown on Fig. 14s.

Referring now to Fig. 14j, cable 370 is provided which extends to the read-outs associated with all of the storage devices and accumulator sections of the machine. Assuming "39" to be multiplied by "302" it has been previously explained that this multiplication by "3" is handled as if it were a multiplication by "5" minus a multiplication by "2." The highest order in the multiplicand is the digit "3" and the "3" bus of the multiplicand storage read-out 2STRO, Fig. 14h, will be connected to the center blade of the 690R3 contacts, Fig. 14j. The 698R ($\times$5) relays have been previously energized. Accordingly, a circuit is completed through the shifted 690R3 contacts to a wire leading to the "9" spot of EM1. When the emitter brush encounters the "9" spot, an impulse will be transmitted through the circuit including the shifted 690R3 relay contacts, through the brush standing on the "3" spot of the tens order of the read-out; thence out through contacts 127R5, now closed, to plug hub, via wire 333 to Fig. 14s, and to the tens plug hub of 6AC. This impulse will flow through contacts 481R5, in normal position; through 484R5; through 487R5, through 490R5, in shifted position; thence through contacts 493R3, in the position shown; through contacts 507R9, in shifted position, through 517R3, in the position shown, and back to stop magnet 126. The effect of this impulse, the circuit of which was just traced, is to provide the digit stop impulse at 0 degrees on Figure 17 in the computation where 5$\times$3 is multiplied.

From this diagram it will be seen that concurrently there is a machine "Go" impulse. The digit stop impulse counteracts the effect of the machine "Go" impulse at this cycle point. The said machine "Go" impulse comes from the "9" emitter spot, Fig. 14j, through the 687R6 contacts, in the position shown; through 696R11, in shifted position; to a wire 371. This wire extends to Fig. 14s, the impulse flowing through contacts 507R6, in shifted position; through contacts 505R6, in the position shown; to the "Go" magnet 125. The circuit from wire 371 extends through like paths to all other "Go" magnets of the 6AC accumulator. Similiar circuits and impulses occur for the other wires in the 370 cable, that is, a similar effect will be provided in the units order of the multiplicand where "9" is the digit standing therein.

The net result of the foregoing can best be seen by referring to Fig. 21. In the first column the right hand component entry is seen to be 5500 in its true arithmetical value. In the second column it will be seen that the actual entry is 550055. The two zeros in the thousands and hundreds orders show the effect of the cancelling circuit just described. It will be noted that the digit stop impulses from the "9" index spot of the emitter can only go through to the odd numbered wires in cable 370. All the even numbered lines will receive no digit stop impulse but they will receive the above described machine "go" impulse at the accumulator through contacts 507R1 through 507R6, inclusive, which are in shifted position. This will provide for the entry of 550055 as shown in the right hand column. Referring again to Fig. 17, at 112 degrees there is provided a machine stop impulse. This machine stop impulse is provided to every order of 6AC by a circuit which will now be traced. Referring to Figure 14s, cam contacts C25, at 101½ degrees through 124 degrees establish a circuit through shifted relay contacts 693R4, pertaining to the $\times$5 relay, through such contacts in shifted position, through contacts 696R4 ($\times$2 relay contacts), in the position shown, through relay contact 704R5 to machine stop timer relays 437R, 477R, 517R and 667R to ground. Referring now to Fig. 14s, left bottom, energization of 517R will shift contacts 517R1 through 517R6 to reverse position from that shown so that one of the impulses received from line through cam contact C14 at 112½ degrees can proceed via line 315 through contacts 510R10, in the position shown, through the 517R1 through 517R6 contacts, in shifted position, to the stop magnets 126. With the reception of this machine stop impulse, the "5" entries into the accumulator will be completed (see actual accumulator reading, second column, Fig. 21).

Referring again to Fig. 17, this chart shows a legend "Shift for component entry." It will be appreciated that the LH component should be entered into the accumulator one further order to the left as compared to the RH entry. Referring to Fig. 14l upon closure of cam contacts C17 at 90 degrees, a circuit is established through now closed relay contacts 693R2 (which are again contacts on the $\times$5 multiplying relay), through the relay contact 696R2, in the position shown; through the pickup coil of relay 686R. This may be termed a $\times$10 relay. The holding circuit for relay contact 686R is established through stick contacts 686R6 (Fig. 14u), cam contact C37 setting up this circuit at 250 degrees. The circuit from the stick contacts extends through the holding coil of relay 686R and through relay coils 687R, 404R, 444R, and 464R to ground.

NOTE:—The 686 relay under different operating conditions, is picked up at different machine times. The holding circuit for this relay through cam C37 provides a sufficient time interval for all these different time pickups, the hold circuit remaining effective until 214½° in the same machine cycle. Relay coil 484 having been energized, all the contacts 484R1 through 7 shift to reverse position from that shown in Fig. 14s. Accordingly, the next following entries will be shifted relatively one column to the left in the different orders of accumulator 6AC.

Referring again to Fig. 21, the machine is now ready to enter the left-hand component pertaining to the ×5 multiplication.

Bearing in mind the basic multiplying rules, including the complementary rule procedure of the present machine, namely that on the second half of an accumulator cycle when multiplying by times 5, the 4 complements of LH components are to be entered, it will be seen by reference to Fig. 21 that in the particular problem under consideration, the 4's complements in question constitute the number 430444.

In Fig. 14j, starting from the 3 index spot on the emitter, current flows through the 687–R6 contacts, in shifted position, through the 690R11 contacts, to wire 371, which energizes all the "Go" magnets of the accumulator 6AC (Fig. 14s). In the problem under consideration, the left-hand component of 5 times 9 is 4. The 4's complement of 4 is 0, so provision should be made to cancel or suppress accumulator wheel movement in the thousands order. This is effected in the following manner: Starting from the 3 index spot on emitter EM–1, current flows through relay contacts 687R4, in shifted position; through contacts 690R9, in shifted position; to wire #9 in cable 370 (see Fig. 14j). This current flows through the 9 bus into 2ST–RO (Fig. 14h), and encountering a brush in the units order on the 9 spot, current flows out through contacts 127R6, now closed, to plughub, thence via a wire 333 to Fig. 14s, thence through relay contacts 481R6, in the position shown; through relay contacts 484R6, in shifted position; through relay contacts 487R5, in the position shown; through contacts 490R5, in shifted position; through contacts 493R3, in the position shown; through contacts 507R9, in shifted position; through the 517R3 contacts, in the position shown; and back to stop magnet 126 in the thousands order. This impulse serves to cancel the "Go" impulse in the thousands order.

Referring again to 5 times 39, the left-hand component of 5 times 3 is 1 while the fours complement of 1 is 3. Accordingly, referring to the chart of Fig. 17, it is desired to stop the related accumulator wheel after it has taken 3 steps of movement. This is provided for by a digit stop impulse at 202½ degrees. As shown on the chart, this is at the zero index point. Referring now to Fig. 14j, with the brush of emitter 1 on the 0 spot, current flows via wire 373, thence via wire 374, through relay contacts 687R1, in shifted position, through relay contacts 690R3, in shifted position, to the 3 wire in cable 370. In the manner previously explained, this will interrupt the related accumulator wheel movement by impulsing the digit "stop" magnet at 202½ degrees after it has taken 3 steps of movement.

A common machine stop impulse is transmitted to all the digit stop magnets of all accumulator wheels at 225 degrees, as is shown in Fig. 17. Referring to Fig. 14s, on closure of cam contacts C23 at 214 degrees, a circuit is completed through the shifted 704R5 contacts, to relays 437R, 477R, 517R and 661R. The impulse at 225 degrees is timed by cam contacts C14 (Fig. 14s). The carry operations need not be traced in detail, these taking place in the usual manner.

The machine has now completed the multiplication of multiplicand by 5 and the next step is to effect multiplication by minus 2. Before this is done, however, the machine must ascertain that another multiplying step is necessary and it must further control the column shift relays so that they maintain the setting which they had for multiplication by 5.

During the machine cycle in which times 5 multiplying operations are effected, a program delay relay must be set up so that the machine will proceed through further multiplying cycles without advance of the program set-up. Upon closure of cam contacts C6 and 180 degrees, a circuit is established through shifted relay contacts 701–R4 (Fig. 14u), through relay contacts 716–R3, to and through the program delay relay 35R. Upon pickup of 35R, a circuit is established through stick contacts 35R1, etc. (see Fig. 14u, upper right). Energization of 35R opens contacts 35R2 (Fig. 14d), thereby preventing further pulsing of relay 42R, which is the stepping control relay for the program unit. Accordingly, the program exit hubs associated with P1 (Fig. 14c) remain effective for following machine cycles.

Referring to Fig. 14u, inasmuch as relay 693R is energized for a times 5 multiplication, relay contacts 693R3 will be in shifted position, and a circuit will be established from cam contacts C29 at 10 degrees of machine time, through relay contacts 693R3, now shifted, through relay contacts 635R10, in shifted position, to the pickup coil of relay 661R. Energization of 661R signifies that there is further multiplication required pertaining to the same order of the multiplier. 661R, being energized, is maintained energized through stick contacts 661R1 (Fig. 14v). Referring now to Fig. 14l, with relay 661R energized, relay contacts 661R12 are shifted, and accordingly under control of cam contacts C36 at 225 degrees a circuit is established through 679R2 contacts, now shifted; 679R having been energized, it will be recalled, by the first test of 1ST, having since been held by stick points 679R2 (Fig. 14v). The circuit continues through the now shifted 633R5 contacts, through the 661R12 contacts, now shifted; through the 651R12 contacts (Fig. 14k), now closed; through 647R3 contacts, in the position shown; through the 645R5 contacts, in shifted position; through the 642R9 contacts, in the position shown; through 123R6, as shown; to the 1ST–RO readout in the hundreds order now via the brush and the 3 spot in the hundreds order to and through the 648R3 contacts, as shown; through the 651R3 contacts, in shifted position; to the 3 wire in cable 366. From this wire current flows out via 654R3 (Fig. 14l), in the position shown, to the 661R3 contacts, in shifted position, thence direct to the pickup coil 640R of the minus relay. Energization of 640R closes 640R1, and a branch circuit is established to energize the times 2 relay pickup coil 696R. A stick circuit for 696R is established through stick contacts 696R1 (Fig. 14u), through 701R2 shifted to cam contacts C37. A further stick circuit for relay 640R is established through stick contacts 640R2, through cam contacts C37 (Fig. 14u). Energization of relay 696R (Fig. 14l) closes the contact 696R9 (Fig. 14u) and a circuit is established from cam contacts C32 through contacts 696R7 and 8 in parallel, through the 696R9 contacts, the 701R9 contacts, now in shifted position; through the now shifted 704R2 contacts, to the supplemental times 2 relay 683R. Relay 696R (Fig. 14l) may be termed a preparatory times 2 relay, it being set up during the times 5 multiplication; whereas, relay 683R is the actual multiplying times 2 relay which controls flow of current impulses from emitter EM1.

The condition has been described wherein there was times 3 multiplication which required 2 complete accumulator cycles; namely, one for times 5 and another accumulator cycle for times −2. If there were to be a multiplication of times 5 as a direct multiplier digit, two accumulator cycles would not be required, and this is provided for in the following manner: If 1-ST-RO were set up with a 5 digit setting during the second test, in the course of the ×5 cycle, current would flow out from the 5 bus through 648R5 in the position shown (Fig. 14k), through shifted 651R5 contacts, through a 5 wire in cable 366, through non-shifted 654R5 contacts (Fig. 14l), through the shifted 661R5 contacts, via line 375, through relay contacts 629R7 in the position shown, to the pickup coil of relay 619R. Relay 619R will prepare the machine for a shift operation to shift to the next column of the 1ST-RO. Returning to consideration of the multiplier digit 3, it will be recalled that, referring now to Fig. 14t, during the previous times 5 multiplication, shift relay No. 2—namely, 626R was energized. This closes contacts 626R4 so that a circuit extends from line through cam contacts C28 at 265 degrees (Fig. 14t) through the 626R4 shifted contacts, through 619R5 contacts as shown, through 632R5 contacts as shown, through the 633R3 shifted contacts, to multiplier test offsetting relay 645R. The circuit also extends from the shifted 633R3 contacts through 635R8 contacts, in shifted position, to pick up coil 614R. It may be here mentioned that relay 633R is energized at 180 degrees of every multiplying cycle through now closed contacts 635R4 (Fig. 14u), the circuit extending to cam C6. A hold circuit is provided by stick contacts 633R1, which are fed from cam contatcs C35 at 180 degrees.

Since the following entry is to be of negative character, provision is made to effect the next entry with a reverse sign. Referring to Fig. 14v, upon closure of cam contacts C38 at 270 degrees, current flows through closed 701R8 contacts, through the 678R2 contacts, in the position shown; through the now shifted 640R3 contacts, to relay coils 566R and 563R. These may be termed reverse sign relays.

An EC impulse from contacts 47R6 (Fig. 14c), flows via plugwire 307 to Fig. 14o, thence via the shifted 566R12 contacts, energized in the manner just described, through the shifted 572R10 contacts, and the non-shifted 510R11 contacts, to the minus relay 505R. With relay 505R energized, the contacts 505R1 to 6 (Fig. 14s) shift to a reverse condition, and condition accumulator 6AC for subtracting. Since shift control relay 614R has been energized in the manner previously described, contacts 614R3 (Fig. 14t) will close and provide a circuit to energize the shift 2 relays 490R, 450R, 410R and 626R pickup coil.

Since on subtracting operations the machine proceeds by entering the true number value into the accumulator according to its underlying principle of operation, the entry in the first portion of the accumulator cycle for RH components will be 006800 (see Fig. 21). The accumulator entry conditions for this minus 2 computation are shown in the lower portion of Fig. 16. In this diagram, the entries in the first portion of the accumulator cycle involve from 0 to 8 steps of accumulator movement, and the entries in the second portion of the accumulator cycle involve steps of not more than 1 step of accumulator movement. The times 10 shift, accordingly, is later in the cycle than for times 5 calculation; namely, after 180 degrees.

Since we are now concerned with a subtractive entry in which true digit values are entered, there are no machine "Go" impulses at the beginning of the accumulator cycle, but accumulator wheel movement is initiated wholly by digit "Go" impulses. The digit "Go" impulses are again derived from emitter FM1. When multiplying by times 2, relay 683R (Fig. 14j), is energized. When the emitter brush encounters the 9 index spot, current flows through line 389, through relay contact 687R11 in the position shown, through 683R9 contacts, in shifted position; through relay contacts 699R9, in the position shown; to the 9 wire of cable 370. This impulse flows to the 9 bus of 2ST-RO (Fig. 14h), thence through the 9 brush and out through relay contacts 127R6 now closed, and through plugwire 333 in the units position, to units position entry hub of accumulator 6AC on Fig. 14s. Current thence flows through 481R6, in normal position; through 484R6 contacts, in normal position; through 487R6 contacts, in the position shown; down through the now shifted 490R6 contacts, over to and through the 493R4 contacts, in the position shown; through the now shifted 505R4 contacts, to the start magnet 125. This causes initiation of the accumulator wheel movement. Referring again to Fig. 14j, from emitter EM1 number 7 spot, an impulse is transmitted through the now shifted 683R3 contacts, back through the non-shifted 690R3 contacts, to the 3 wire in cable 370. It is not believed necessary to trace the accumulator entry, it being sufficient to state that the digit "Go" impulse is such as to start the wheel rotating shortly after 45 degrees (see Fig. 16). The machine stop impulse to the 6AC accumulator need not be described in detail, except to state that the stop condition is set up by cam contacts C24 (Fig. 14s) at 169 degrees, and extends to the shifted 696R4 contacts, and back to the relays which have been previously described. The actual machine stop impulses are timed by cam contacts C14, which in this case, close at 180 degrees. The tens shift is initiated by a circuit starting through cam contacts C18 at 160 degrees, see Fig. 14l. This circuit extends through the now shifted 696R2 contacts, to the times 10 relay 686R. The rest of the circuit concerned with the manner in which shift of entry is effected need not be again repeated.

Referring to Fig. 21, the entry which now is to be made for LH components, comprises an accumulation of 001000, this being a left-hand component when multiplying 9 by 200. The circuit through the multiplying relays for this particular computation may be more generally traced by starting with the No. 9 wire in cable 370 (Fig. 14h), which, it will be recalled, leads to the 9 bus in the multiplicand readout 2ST-RO. Coming from the 9 wire in cable 370 (Fig. 14j), contacts 690R9 are in position shown, contacts 683R9 are shifted, contacts 687R11 are shifted; current flowing by wire 381, wire 374, wire 373, to the 0 spot of the emitter 1. As will be clear from Fig. 16, this circuit is closed at 202½ degrees. The impulse provides the digit "Go" impulse for the proper order accumulator wheel. At 225 degrees all stop magnets of the accumulator 6AC receive a machine "stop" impulse from cam contacts C14 in a manner similar to that previously described. The carry is effected in the usual manner. This completes the hundreds order step of the multiplication (39 times 300). Referring to Fig. 14l, at 225 degrees cam contacts C36 close and establish a circuit through shifted contacts 679R2 and 633R5, and through contacts 661R12 in the position shown, through wire 375 down through 629R7 in the position shown, to the pickup coil of relay 619R. 619R is held energized by a stick circuit shown on Fig. 14u, through stick contacts 619R1 to cam contacts C37. Energization of 619R signifies that multiplication for any given multiplier digit is complete. It prepares for a further column shift or for terminating multiplying if the multiplier digit is in the lowermost order. The machine is now ready to set up new shift control circuits to test 1STRO in the tens order instead of in the hundreds order as previously. Referring to Fig. 14t, since relay 619R is now energized, contacts 619R5 are open, and relays 645R and 614R are thereby prevented from being re-energized since the circuit to the shifted 626R4 contacts is open. However, an alternate path is provided from cam contacts C28, which make at 265 degrees, through relay contacts 628R4, which are now in the position shown, current flowing through the now shifted 626R6 contacts, through relay contacts 623R6, in the position shown; through the shifted 619R4 contacts, through the 632R4 contacts, in the position shown; through the shifted 633R2 contacts, to energize pickup coil 642R of multiplier test offset relay No. 1. A parallel circuit is established through 635R7 in position shown to energize 608R and 605R, these being shift control relays. The stick circuits for these multiplier test offset relays and shift control relays need not be traced, but are shown on Fig. 14s, lower right. Referring to Fig. 14k, the test circuit for 1STRO extends from line through cam contacts C16, thence through 150R5 and 661R2 contacts, in the position shown, through now closed 651R12 contacts, through 647R3, contacts in the position shown; through the 645R5 contacts, as shown; through the now shifted 642R11 contacts, through the 123R7 contacts as shown, and down to the tens order of the 1STRO. Since the brush in this order of the readout is standing at zero, the circuit is continued through 651R10, in shifted position, through wire 10 of cable 366 to Fig. 14l, and up and through the contacts 654R10, in the position shown, through the 618R4, shift control relay contacts as shown, through the 614R6 contacts as shown, the 608R8 contacts in shifted position, through the shifted 635R12 contacts, and down to relay coil 657R, and to ground. When relay 657R energizes, contacts 657R1 close, and a circuit is established through 608R9 in shifted position, down to and through 621R relay and the 622R relay coil to ground. The holding circuit for relay coil 621R is provided by relay contacts 621R1 (Fig. 14v), the circuit extending from line through cam contacts C40. The function of relays 622R and 621R when these relays are energized is to immediately institute a record test upon 1STRO one column further to the right. In other words these relays have determined that there was a zero in the tested order and a further test should be made in the next lower order without wasting a cycle.

Immediately upon energization of relay coil 622R (Fig. 14l), a contact 622R4 (Fig. 14k) is closed. Accordingly, the test circuit from cam contacts C16 (Fig. 14k) extends through the path previously traced, and then through contacts 651R11, now closed, 622R4 now closed, through 643R4 as shown, through 645R6 as shown, through 642R12 now closed, and down through 123R8 in position shown, to the units order of 1STRO. Here there is a brush standing on the 2 spot. Accordingly, the circuit extends to 648R2, in the position shown; through 651R2 shifted, to the No. 2 wire in cable 366 and thence to Fig. 14l. This circuit extends through contacts 654R2 as shown, over through contacts 717R1 as shown, to energize the times 2 relay pickup coil 696R. This relay coil is held as previously described.

With relay 621R (Fig. 14l) energized, as explained, relay contacts 621R2, 621R3, and 621R4 (Fig. 14t) all are shifted. Accordingly, no shift relay pertaining to shift 1, shift 2, or shift 4 are energized, these being relays 493R, 453R, 413R, 623R, 490R, 450R, 410R, 626R, 487R, 447R, 407R, and 628R. With none of these shift relays energized, accumulator entries will be conditioned for direct entry with no offset.

The machine is now ready to multiply 39 by a multiplier digit of 2. The arithmetical value of the right-hand component is 68, and the eights complement of such number is 888820. The LH component is 10, and the ones complement of 10 is 111101 (see Fig. 21). The entry relations for the accumulator are shown in the top portion of Fig. 16. Referring to Fig. 14o, it has been explained above that when multiplying by times 2 in the hundreds position, a relay 566R has been energized to condition the products accumulator 6AC for subtraction. Upon completion of this operation, the holding circuit will have been broken and, accordingly, the contacts 566R12 and 566R11 will have resumed their normal position. The programming impulse travelling along plug-wire 307, previously traced, will, accordingly re-energize the relay 507R, which conditions the accumulator 6AC for normal or adding entries which are to be used when multiplying by 2 in the units position of the multiplier storage device 1STRO.

Under these conditions, initial machine "Go" impulses will be received by all positions of the accumulator 6AC at the 0 degree time, such impulses issuing from emitter No. 1, as will now be described. The circuit extends from the 9 spot of emitter No. 1 (Fig. 14j) via line 380, contacts 686R1, in position shown; times 2 relay 683R11, now shifted; contacts 690R11, in the position shown; via line 371 to the relay contacts 507R1 to 507R6 of accumulator 6AC, Fig. 14s, such contacts now being closed condition this accumulator for adding. The circuit continues through contacts 505R1 to 505R6, now in position shown, to impulse all of the "Go" magnets 125 so that all wheels of this accumulator will start to rotate unless restrained by a cancellation impulse. The multiplication of 39 times 2 shows an arithmetical right-hand component result of 68 as shown in Fig. 21. The eights complement of 8 is 0, and, accordingly, the cancellation impulse to the stop magnet of the units order of accumulator 6AC is derived by a circuit which will now be traced. Extending from emitter EM1, No. 9 spot, Fig. 14j, via wire 380, contact 687R11, in position shown, relay contacts 683R9, now shifted, relay contacts 690R9, in position shown, to the No. 9 wire of cable 370, said connection continuing through the units position of the multiplicand read-out 2STRO (Fig. 14h). The units position brush of this read-out is standing at 9, and provides for continuance of the circuit through contact 127R6, via one of the plugwires 333, to units plug-hub of accumulator 6AC (Fig. 14s), thence via the contacts 481R6, 484R6, 487R6, 490R6, 493R6, which are all in position shown; and through contact 507R12, now closed; contact 517R6, in position shown, to stop magnet 126 in the units position. Energization of the stop magnet cancels the impulse transmitted to the start magnet in the units position only. Referring again to Fig. 21, the eights complement of a 6 is shown as 2, indicating that the tens position wheel of the product accumulator is to be advanced 2 steps before the stop magnet receives a digit stop impulse. Referring to the top portion of Fig. 16, the seventh line of this chart indicates that for multiplying 2 times 3 we control the entry of the eights complement of 6 by transmitting a digit stop impulse at 45 degrees. This circuit will now be traced. Extending from the 7 spot of emitter EM1 (Fig. 14j), through the contacts 683R3, now shifted; through contacts 690R3, in position shown; to the No. 3 wire of the cable 370. The circuit is continued in a manner similar to that already described, extending to the stop magnet of the tens order of accumulator 6AC. The accumulator wheels in positions hundreds to hundred thousands, inclusive, continue to rotate until their operation is terminated by a machine stop impulse transmitted at 180 degrees in the same manner as was described for subtraction entries.

Energization of the times 10 relay 686R is effected in identically the same manner as has been previously described.

The subsequent entry of the 1's complements which are shown on Fig. 21 as entries 111101 will now be described. The start magnets of accumulator 6AC receive machine "Go" impulses at 202½ degrees as shown at the top of Fig. 16. Such impulses are transmitted to all orders of the accumulator, and are effective in all cases except at the tens position, whose stop magnet also receives a cancellation impulse concurrently by a circuit which will now be described. Since the left-hand component of 2 times 9 is a 1, and since we are interested in entering the complement of 1, which is 0, the cancellation impulse circuit may be traced as follows: From 0 spot of emitter 1 (Fig. 14j), via line 373, line 374, line 381, contact 687R11, now shifted; contact 683R9, now shifted; contact 690R9, in position shown; to the No. 9 wire of cable 370. This circuit is continued as before to the tens order stop magnet 126 of accumulator 6AC.

Machine stop impulses are transmitted to all stop magnets of accumulator 6AC at 225 degrees, as shown on the upper portion of Fig. 16, using circuits previously traced earlier in the example.

Carry is effected in the usual manner. This completes the operation of multiplying 39 by 302.

End of multiplication is indicated in the following manner: Referring to Fig. 14l, the current supply from cam contacts C36 at 225 degrees is supplied through now closed 679R2 contacts, 633R5 shifted contacts, 661R12 contacts, in the position shown, through wire 375, 660R2 contacts in the position shown, 654R11 contacts in the position shown, then continuing in Fig. 14m through 629R12 contacts as shown, 628R2 contacts, 626R2 contacts, 623R10 contacts, 621R6 contacts, all in the position shown, to line 360. The line 360 extends to Fig. 14d, to and through the now shifted 35R2 contacts, and through contacts 37R4 as shown, to stepping control relay 42R, back to ground. At the same time, a parallel circuit extends through line 361 to Fig. 14a. This circuit extends through relay contacts 6R3, now shifted; 35R3 in shifted position, relay contacts 25R4, in shifted position; to energize the read-feed relay 5R. This is a latch type relay, and its energization initiates card feed in a manner previously described. It should be pointed out at this time that, concurrently with the impulse which initiated multiplication, a circuit was provided via plugwire 335 from program step 1 to the read hub, Fig. 19a. The SP impulse (255–285 degrees) proceeds through contacts 47R3 (Fig. 14c) through plugwire 335 to the read sockets (Fig. 14a), continuing through contacts 223R2, now in position shown, through latch pickup coil of relay 6R and to ground. The usual circuit controlled by relay 6R to energize relay 5R and thereby initiate clutch operation at 290 degrees of the following cycle extends from cam contacts C2 through contacts 6R2, 138R12, 35R3 and 25R4. Such circuit is interrupted during the entire duration of the multiplying operation by the shifted condition of contacts 35R3, relay 35R being the program delay relay which has been described as energizing during each multiplying cycle. At the end of multiplication, however, the above cited impulse through wire 361 to and through 6R3 in shifted position finally accomplishes the energization of relay 5R, so that when program plugging is arranged as in the example, a card feed cycle may occur immediately following the last multiplying cycle.

Owing to energization of stepping control relay 42R (Fig. 14d) mentioned above, the program circuit may move from step #1. Energization of relay 5R shifts contacts 5R2 to reverse position from that shown in Fig. 14d. This breaks down the set-up of the program and causes all of contacts 47R3 to 6, inclusive, Fig. 14d, pertaining to the first program step to resume an open status.

*End of multiplication general rules*

The end of a multiplication calculation is determined when the last factor of the lowest order significant multiplier digit has been entered into the product accumulator. Multiplication is then terminated by bringing the associated program delay to an end, causing the program circuit advance to the next step, initiating a different series of events. Whenever S+1 relay 619R, Fig. 14l, is energized by a factor selection test in the manner described, indicating that entry of the given multiplier digit is complete, and that shift to the right may occur, a parallel circuit extends to the multiply end test circuit. This extends through 660R2 contacts, as shown, Fig. 14l, 654R11, as shown to 629R12, Fig. 14m. The impulse continues through 629R12 contacts, as shown to shift-4 contacts 628R2. If the units digit of the multiplier amount has been entered at the time under discussion, all the shift relays will be in normal position, as shown, and the test circuit may then be completed through 628R2, 626R2, 623R10, 621R6, all as shown, to Fig. 14d via wire 360, there continuing through contacts 35R2 of the program delay relay, shifted during multiplication, to energize stepping control relay 42R, thereby ending the program delay. Upon the following cycle the next succeeding program step is effective and multiplication is no longer carried on.

The above mentioned test is made not only at the end of entry of the units multiplier digit, but is similarly attempted at the end of entry of every multiplier digit, since provision is made to end multiplication after calculating the lowest order significant multiplier digit, thus skipping over the series of zeros to the right. Thus, for example, if there are three zeros to the right, as in a multiplier amount 2000, significant digit relay 674R (Fig. 14k) is energized when the multiplier is entered into IST. Consequently, at the end of the ×2 entry cycle, which completes the multiplication, a circuit may be traced in Fig. 14l from C36, through 679R2, shifted, 633R5, shifted, 661R12, as shown, wire 375, 629R7, as shown, to energize 619R (S+1 relay). At the same time a parallel circuit extends through 660R2 and 645R11, as shown, to Fig. 14m, through 629R12, as shown. At this point, shift relays 2 and 1, 626R and 623R respectively, are energized to provide the requisite shift offset of 3 places to enter the ×2 multiple. The circuit therefore continues through shift 4 contact 628R2, as shown, through shift 2 contact 626R2 and shift 1 contact 623R9, both shifted, then through significant digit relay contacts 675R4, 676R4 and 677R4, all as shown, to wire 360, then continuing to end program delay and multiplication as previously described.

Referring now to Figs. 24a, b and c to 29a, b and c, these diagrams illustrate the sequence of operations pertaining to multiplying for a multiplier of 844986. The circuits which have been previously traced related to a multiplier amount of 302, but such example did not consider many of the circuit conditions which have to be taken into account to have the machine perform according to the basic multiplying rules which have been previously set forth. To more clearly clarify the operations and particularly the sequence of operations, the fragmental circuits set forth in the above figures have been used. The figures represent the circuits shown in Figs. 14k and 14l, with certain non-utilized wires and relay contacts deleted for additional clarity. On each sheet the completed circuit is shown by heavy lines. The sheet also shows a fragmentary portion of a timing diagram illustrating events that take place in the first machine cycle and in the second machine cycle. Certain actions occur as overlapped in a similar cycle. In order to denote the circuit for each event, the timing chart lines have been identified by numbers in circles; such as 1, 2, 3, 4, 5 and 6. Events 1 and 2 as shown on the timing chart, Fig. 24c, occur concurrently. Referring now to Fig. 24a, this illustrates multiplication by 8 in the highest order of the multiplier. The circuit in this case extends from cam contacts C16 and for the circled operation "1," the circuit extends to 661R2 relay contacts. Subsequently, all relay contacts will be shown in the position which they assume during the particular event which is being explained. Continuing, the circuit is completed through relay contacts 647R3, thence through relay contacts 645R3, thence through relay contacts 642R7, through relay contacts 123R3, down to the 8 spot on the readout, thence through contacts 651R8, through 654R8, through 661R8, Fig. 24b, and down through the balance of the circuit indicated by the heavy line and through the relay contacts shown to energize relay 686R, which is the times ten relay. This circuit is all set up in cycle one, as indicated, by the No. 1 in a circle on the diagram, Fig. 24c. In the same machine cycle, as indicated by the circled 2, the same circuit is completed through relay contacts 661R8. However, a No. 2 branch circuit is completed through the now shifted 686R3 contacts (686R having been energized), down to relay 699R, which is the times one multiplying relay. Relays 686R and 699R remain energized by holding circuits not here shown, being deenergized at 214 degrees as shown on the timing diagram.

In event 1, the times 10 relay 686R is energized. In event 2, the times 1 relay 699R is energized. The effect of the energization of these two relays is to enter 1 times the multiplicand offset one place to the left. Referring now to the timing diagram and the 3 circled portion thereof, this circuit starts at cam contacts C29, Fig. 24b. It extends through the 686R4 contacts, through the 635R10 contact, to relay 661R, which is the times transfer relay. This relay prepares the machine to operate in the following machine cycle. This circuit may be traced also on Fig. 14u of the main circuit diagram.

The effect of energizing the times transfer relay 661R is to alter the circuit relations so that when the 8 multiplier digit is resensed there will be caused an entry of minus 2 times the multiplicand.

The circled 4 showing on the timing diagram shows the next circuit which is set up. This circuit originates at cam contacts C36, Fig. 24b, following the heavy line through the 661R12 contacts, now shifted; then over to the 647R3 contacts Fig. 24a, now shifted; down through the 8 spot of the readout; to the right and through the 661R8 contacts, Fig. 24b, now shifted; downwardly directly to relay 640R, which is the minus relay. The minus relay 640R is maintained energized at the time indicated on the timing diagram, Fig. 24c. As soon as relay coil 640R is energized a parallel circuit is established through 640R1 through the path designated 5 in the circle. This will energize the times 2 relay 696R. This is shown also on the timing diagram.

Figure 25A:
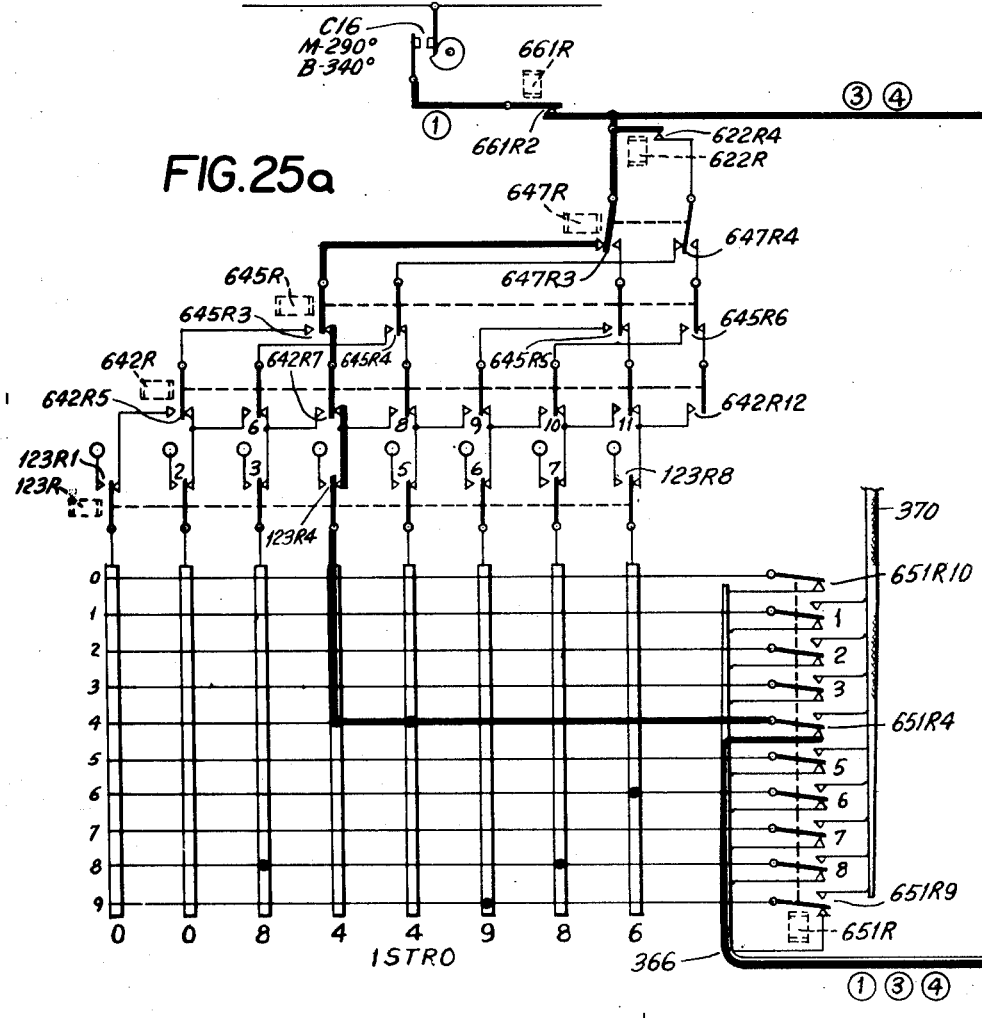
Figure 25C:
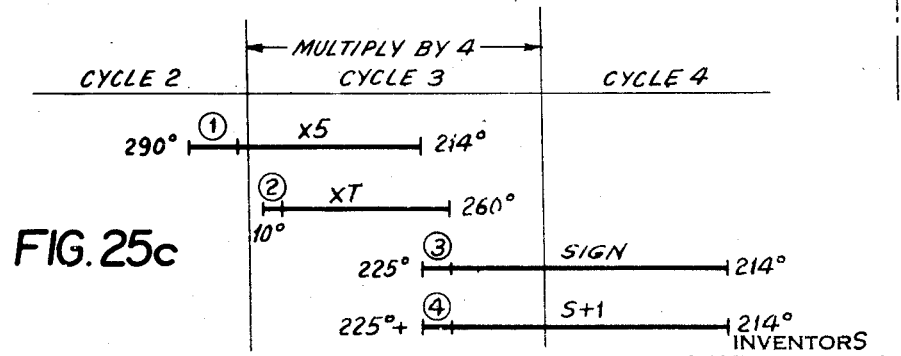
Figure 25B:
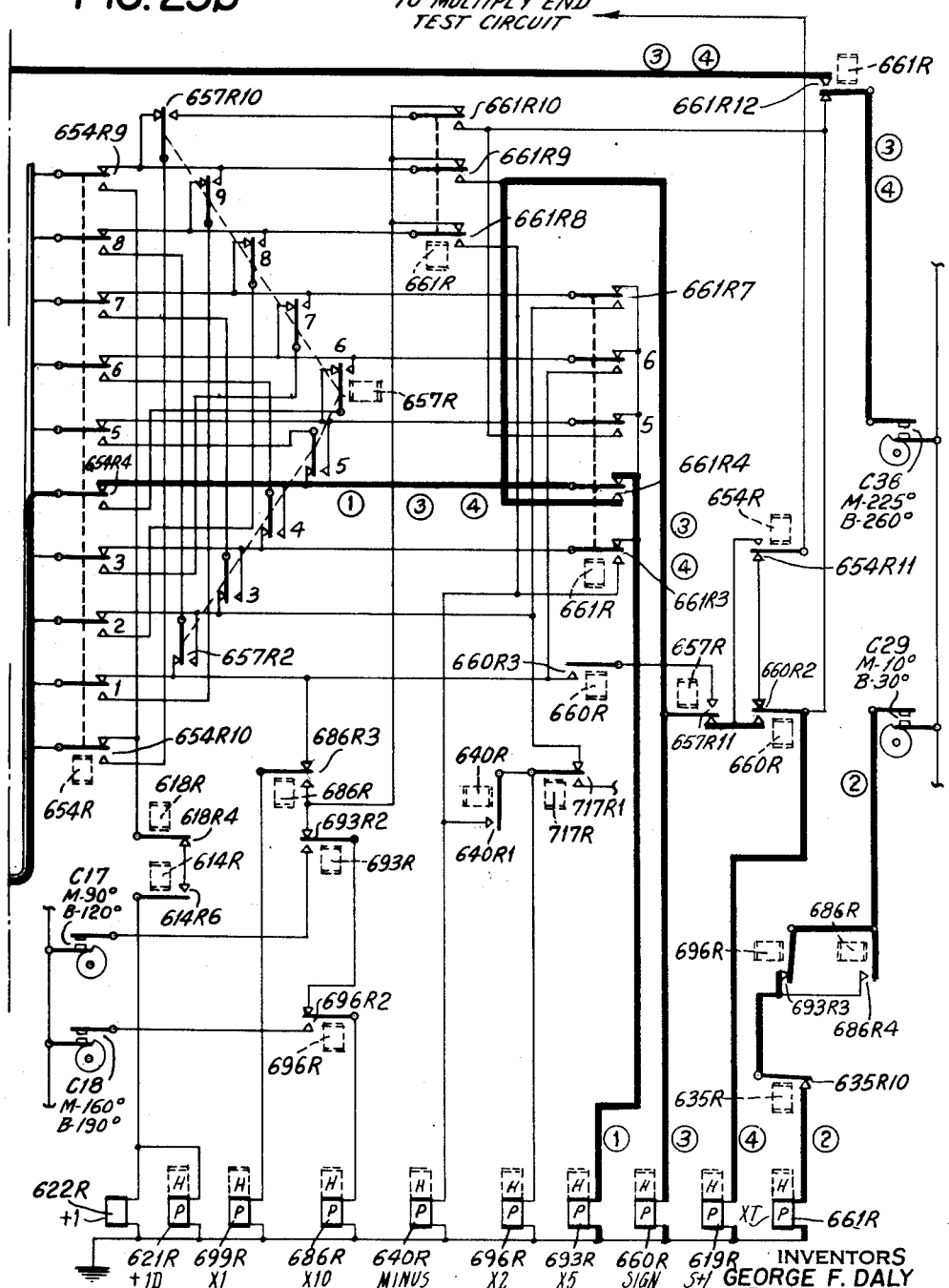

The energization of the minus relay 640R and the times 2 relay 686R will have brought about an entry of minus 2 times the multiplicand during cycle 2. Referring now to the sixth event, as shown in Fig. 24c, current flow starts from cam contacts C36, through contacts 661R12, now in the position shown, and thence direct to relay 619R. This is also labelled "S plus 1," which means shift circuits may be offset one further column to the right. There has been now a shift of one place to the right and the operations on the next lower digit of 4 will now be traced on the diagrams of Figs. 25a, b and c. For this multiplication there should be an entry of 5 times the multiplicand followed by a sign change. The times 5 relay is 693R and the sign change relay is 660R. The circuit for event one starts at cam contacts C16, extends through 661R2, now closed; through 647R3, in shifted position; through 645R3, in the position shown; through 642R7, in the position shown; through 123R4 to the fourth spot of the readout. The circuit is completed through 654R4, in the position shown; through 661R4, as shown; and down directly to the times 5 multiplying relay 693R. Multiplication by times 5 ensues, and shortly after the beginning of cycle 3, the circuit is set up for the second event. This circuit originates at cam contacts C29, extends through the 693R3 contacts, now closed; through the 635R10 now closed contacts, to the XT relay 661R. This relay remains energized for the time shown on the timing chart (Fig. 25c). Considering now event No. 3, the circuit commences at cam contacts C36, Fig. 25b, goes through 661R12 contacts in shifted position, through 647R3 in shifted position, Fig. 25a, through 645R3, in the position shown; through 642R7, in the position shown; through 123R4 as shown, to the fourth spot of the readout, thence through the path previously traced for event 1 to relay contacts 661R4, Fig. 25b, which are now shifted. The circuit extends directly to relay 660R, which is a change sign relay. Considering now event 4, when relay 660R energizes, contacts 660R2 shift, causing energization of relay 619R, the circuit extending to the previously traced circuit through closed contacts 657R11, Fig. 25b. The 619R relay is the S plus 1 relay, signifying shift one order to the right.

As explained in the multiplying rules, when the sign change occurs, this sign change remains in effect until there is a further reversal of sign or until the multiplication is finished. When a sign change occurs on testing any order, this directs the machine on the reading of the following order to read the multiplier digit as a nines complement unless the digit occurs in the units position. It also conditions the accumulator portion of the machine to subtract instead of add or vice versa. The description just given has described the manner in which relay 660R has been energized. Relay contacts 660R4, Fig. 14v, assume the reverse position from that shown, and when cam contacts C39 make at 260 degrees, a circuit is completed to energize the negative balance relays 732R, 654R, and 678R. The holding circuits for these relays are established through stick contacts 678R1 (Fig. 14u). During the following machine cycle at 225 degrees, when cam contact C36 makes with relay contacts 678R3 and 635R5 shifted, a pickup coil 639R will be energized (Fig. 14v). This coil will be held energized by stick contacts 639R1 from cam contact C35 (Fig. 14u). With 639R energized, contacts 639R2, Fig. 14v, shift, so that if the contacts 660R4 have returned to the normal position as shown, the next current flow there through will flow through 639R2 to reenergize pickup coils 678R, 654R and 732R. If 660R4 assumes a reverse position with 639R2 still in shifted position, sign reversal is terminated. During each cycle when 678R is energized, and with contacts 701R closed, relay contacts 678R2 will shift to energize relay coils 563R and 566R. Relays 566R have their contacts 566R11 and 566R12, for example, in the pluggable circuits associated with accumulator 6AC, Fig. 14o, and in the circuit extending to the master relays 507R and 505R which control adding entries and subtracting entries respectively, as has been described as for multiplying. Other contacts of the 566R relay are disposed in similar relay circuits for each of the 6 accumulators, so that all accumulators, any of which may be used for product entry, are changed from adding to subtracting condition or from subtracting to adding condition, each time the multiplier rules circuit detects a sign change condition. If minus relay 640R is energized during such sign reversal, as when controlling the minus times 2 cycle which forms the second portion of a multiplication by 8, contacts 640R3 have a further effect on the operation of reverse sign relays 566R and 563R. In such event, see Fig. 14v, the shifted condition of both contacts 678R2 and 640R3 interrupts the impulse to reverse sign relays 566R and 563R. During such a cycle, therefore, the control of the accumulator add and subtract relays temporarily returns to normal.

Figure 26A:
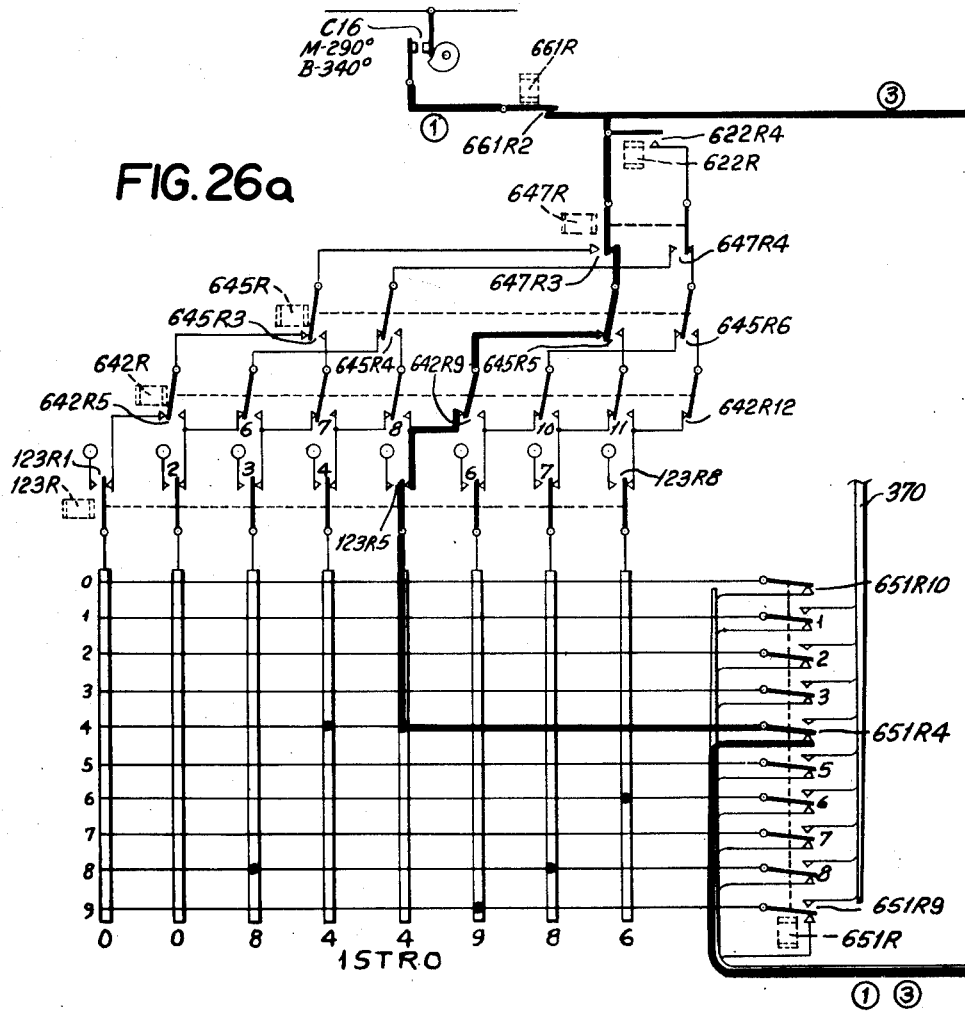
Figure 26C:
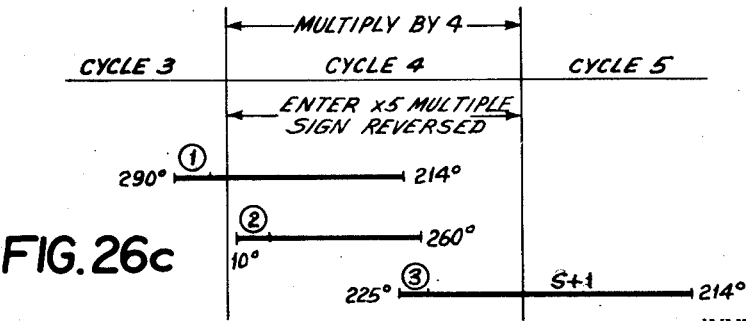
Figure 27B:
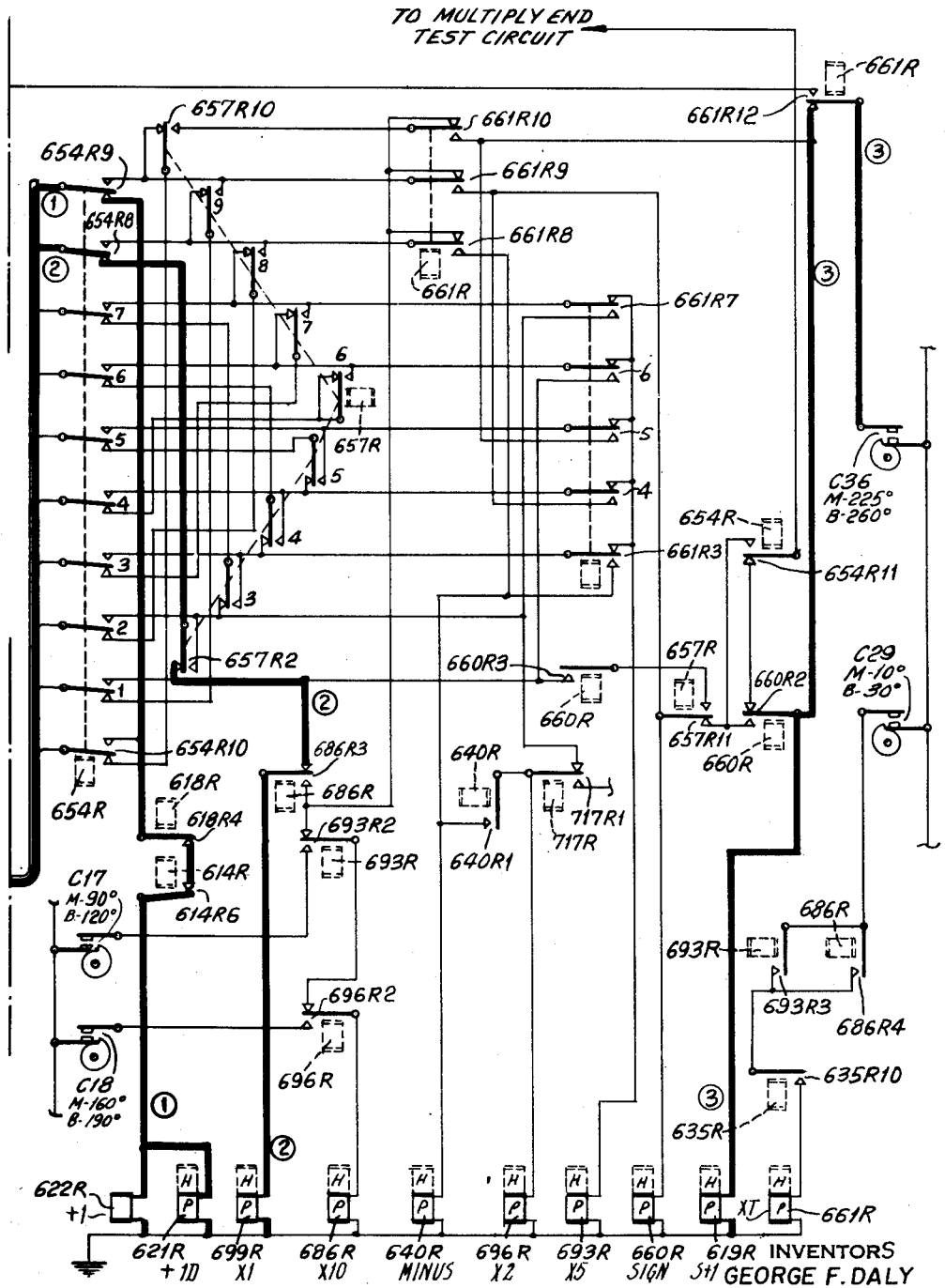

Referring now to Figs. 26a to c, inclusive, which illustrate the next step in the calculation where 4 is being read in the thousands order of the readout.

The machine is now operating under reverse sign conditions and another 4 in the thousands order has been sensed. Since sign reversal is in effect, the 4 which is sensed is converted to a 5, this being effected by the shift of contacts 654R1 to 9. 654R has been energized as a result of the energization of the sign change relay 660R. The operations which are now required comprise the entry of 5 times the multiplicand. This is brought about by the energization of the times 5 relay 693R. The first event starts in cycle 3, cam contact C16, Fig. 26a, making at the time indicated, the circuit being completed through 661R2, 647R3, 645R5, in shifted position, 642R9, in shifted position, 123R5 in the position shown, to the 4 spot of the readout, thence out through contacts 651R4 now closed, through balance relay contacts 654R4, Fig. 26b, which are now in shifted position due to the energization of relay 654R as indicated on the main circuit diagram, thence through contacts 657R6 in the position shown, through 661R5 in the position shown, and down to the times 5 multiplying relay pickup coil 693R. It will be noted that 5 is the nines complement of 4, 4 being the amount standing on the readout in the thousands order. Considering now event 2 in machine cycle 4, C29 supplies current at the time indicated through the 693R3 contacts now closed, Fig. 26b, through the 635R10 contacts now closed, to energize the pickup coil of relay 661R. Considering now event 3, as shown in the timing diagram, Fig. 26c, the circuit starts from cam contact C36, goes through 661R12 contacts, now shifted, through 647R3 contacts, Fig. 26a, and through the same path previously traced for event 1 up to the 661R5 contacts, Fig. 26b, which are now in shifted position. The circuit then extends through the path denoted by the heavy line designated 3 back to the 619R relay, the shift plus 1 relay, to cause the next testing circuit to be shifted one order to the right. At this point it may be noted by reference to Figs. 24c and 26c that the duration of operation of the times transfer relay 661R is different in the two cases. In Fig. 14u it is evident that relay 661R is energized by a circuit from cam contacts C29 whenever a ×10 or ×5 operation is signalled by shift of contacts 686R4 or 693R3, respectively. By reference to the multiplying rules, it is seen that a ×10 operation is used in connection with ×8, followed always by a minus ×2 operation. A times 5 cycle may be followed by a minus ×2, plus ×1 or plus ×2 cycle, for multiplier digits 3, 6, and 7 respectively. In all of the above cases, it is desired to maintain the long duration of operation for relay 661R as shown in Fig. 24c, i. e., until 30 degrees of the subsequent cycle. In any event, times transfer relay 661R is held energized until 260 degrees of the same cycle by a circuit from cam C41, Fig. 14v, through stick contacts 661R1 and hold coil 661R. In the event relay 661R was energized during the first cycle of an 8, 3, 6 or 7 digit operation, an energization of ×2 relay 696R or ×1 relay 699R will ensue at 225 degrees of such cycle, in the manner already described, and a further stick circuit will hold relay 661R beyond its normal duration of 260 degrees. This is seen in Fig. 14u, a circuit extending from cam contacts C27, through the shifted points of either relay contacts 696R3 or 699R3, through stick contacts 661R11, contacts 686R4 and 693R3, now in position shown, and through contacts 635R10, now closed, through pickup coil 661R to ground. This circuit is complete until 30 degrees of the following machine cycle. The above additional stick circuit is not established, however, for a ×5 multiplier digit, since, as shown in Figs. 26a and 26b, neither ×1 relay 699R nor ×2 relay 693R is energized at 225 degrees of the ×5 entry cycle. Consequently relay 661R has only the short duration shown in Fig. 26c.

Referring to Figs. 27a, b and c, it will be noted that the digit which is standing in the hundreds order of the readout is a 9 digit. Since sign reversal is still in effect, the nines complement of 9 will be 0. The effect of this is to consider the amount on the readout as if it was a zero and immediately skip over it, completely disregarding it otherwise.

The digit in the tens order which is now to be tested is at 8 and with the sign reversal in effect this is converted to a 1, the 9 complement of 8, but shifted relay contacts 654R1 to 9. A times 1 relay 699R is to be energized and sign reversal will cause the entry to be made subtractively. Starting from cam contact C16, Fig. 27a, the 1 event circuit extends through contacts 661R2, now closed; through 647R3, in the position shown; through 645R5, in shifted position; through 642R9, as shown; through 123R6, as shown; through 651R9, shifted; through 654R9, Fig. 27b, shifted; through 618R4, as shown; through 614R6, in shifted position; to relays 621R and 622R. Relay 622R causes an immediate shift of one place to the right in the multiplier as previously mentioned. Event No. 2 then immediately takes place. The circuit for event 2 is completed through the 622R4 contacts, now shifted, Fig. 27a, through the 647R4 contacts, as shown, through shifted 645R6 contacts, through 642R10 contacts as shown, through the 123R7 contacts as shown, and down to the 8 spot of the readout, thence through the 651R8 contacts now closed, over through the 654R8 contacts, Fig. 27b, now shifted, through the 657R2 contacts, in the position shown, through the 686R3 contacts, in the position shown, to energize the times 1 relay pickup coil 699R. This completes the No. 2 event circuit. For event No. 3, the circuit starts at cam contact C36, extending through 661R12, Fig. 27b, in the position shown, and directly to the pickup coil of 619R. This is a shift plus 1 relay which initiates a further shift to the right for multiplier testing.

Figure 28A:
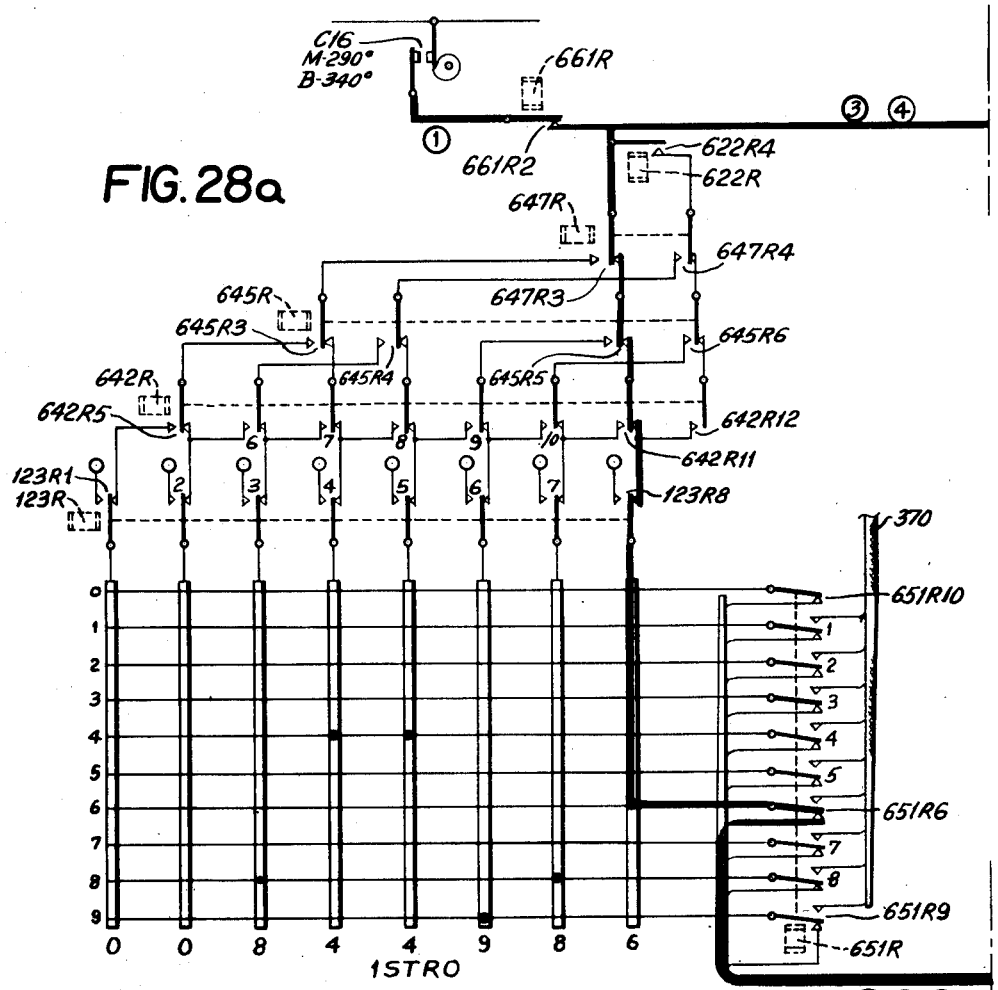
Figure 28C:
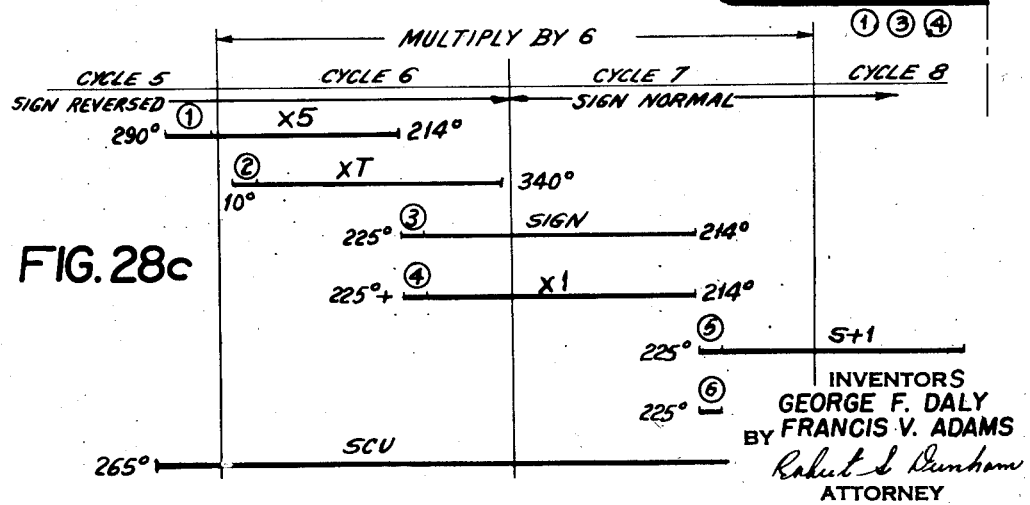

Referring now to Figs. 28a, 28b and 28c, here the digit which is being tested is in the units order of the multiplier. Up to this point, from preceding digits sign reversal has been maintained. Since sign reversal is still in effect, the 6 will be read out as a complement but, since the 6 digit is in the units order, in place of its being read out as a complement to 9 it is read out as a complement to 10; i. e., it is read out as a 4. In handling 4 as a digit, this is normally handled according to the multiplier rules as times 5, shift to the right and change sign. Since the 6 which is being traced as a tens complement is now in the units position, the machine cannot shift further to the right and must complete the operation as times 5 and times minus 1 without further shift. In order to obtain the tens complement in the units position rather than a nines complement heretofore used, relay 657R known as shift control units relay must be energized before sensing of the units multiplier digit takes place. This will be described by reference to the main diagram. Referring to Fig. 14t, a circuit may be traced at 265 degrees of cycle 5 from line 340, through contacts C28, relay contacts 628R4 (shift control 4), now in the position shown, contacts 626R6 (shift control 2) now in the position shown, contacts 623R11 (shift control 1) now shifted; and contacts 619R3 now closed in the manner described at the end of the ×1 cycle, and contacts 633R6, now shifted, to energize the pickup coil of shift control units relay 657R (Fig. 14t).

Referring back to Figs. 28a, 28b and 28c and considering event 1 as shown on the circuit diagram, Fig. 28c, current starts at cam contacts C16 (Fig. 28a) flowing through closed contacts 661R2, through closed contacts 647R3 as shown, contacts 645R5, 642R11, 123R8, all as shown, down to the 6 spot on the readout, out through now closed contacts 651R6, through shifted contacts 654R6 and 657R4 (Fig. 28b), through now closed contacts 661R4 as shown, and down direct to pickup coil of relay 693R. This is the times 5 multiplying relay.

Considering now event No. 2 as shown on Fig. 28c, the circuit starts at cam contacts C29, Fig. 28b, extends through now closed contacts 693R3, through now closed contacts 635R10, direct to the pickup coil of relay 661R, the times transfer relay. Taking now event 3 as shown on the timing diagram, current is supplied by cam contacts C36, Fig. 28b, and flows through shifted contacts 661R12, through now closed contacts 647R3, and in a path like that previously traced for event 1 down to and through now closed contacts 661R4, Fig. 28b, thence direct to pickup coil of relay 660R, which is the sign change relay. At the same time, for event 4 a circuit is established through 657R11, now shifted, Fig. 28b, through now closed contacts 660R3, through contacts 686R3 as shown, to pickup coil of relay 699R. Since the sign change relay 660R is energized, the sign reversal is terminated, and the times 1 entry into the product accumulator goes into it in a normal manner. For this final digit, the effective entry is, therefore, a minus 5 and a plus 1 times the multiplicand.

In the present machine wherein multiplication is by 1, the emitter circuits, multiplying relays and their contacts are so arranged that, if none of the multiplying relays is energized, the emitter EM1, Fig. 14j, directly emits digital values to the lines in cable 370, which extends to the storage device whose readout sets up the multiplicand. Otherwise expressed, if a multiplicand amount, such as 842, stands in the 2ST storage device, and such amount sets up its related readout, the emitter EM1, if no ×2 or ×5 multiplying relays are energized, will read out the amount of 842 from the 2STRO device and transfer it to the product accumulator.

Taking now event 5 in Fig. 28c, the circuit starts at cam contacts C36, extends through 661R12, as shown, Fig. 28b, and goes direct to the pickup coil of 619R. This is the shift plus one relay. Since there are no further columns to the right, there is no shift following this relay energization. Considering now event No. 6, the circuit traced for event 5 is branched through now closed relay contact 660R2, Fig. 28b, through 654R11 as shown, to a so-called multiply end test circuit. This circuit may be traced in Figs. 14l and 14m of the main circuit diagram, where it it seen that the impulse through contacts 654R11 continues to contacts 629R12, 628R2, 626R2, 623R10, 621R6, all in the position shown, to a line 366. The circuit then operates in the manner previously described to cause an ending of the program delay which was effected during multiplication and to permit a new card reading cycle if such cycle has been pending at the end of multiplication.

Figure 14M:
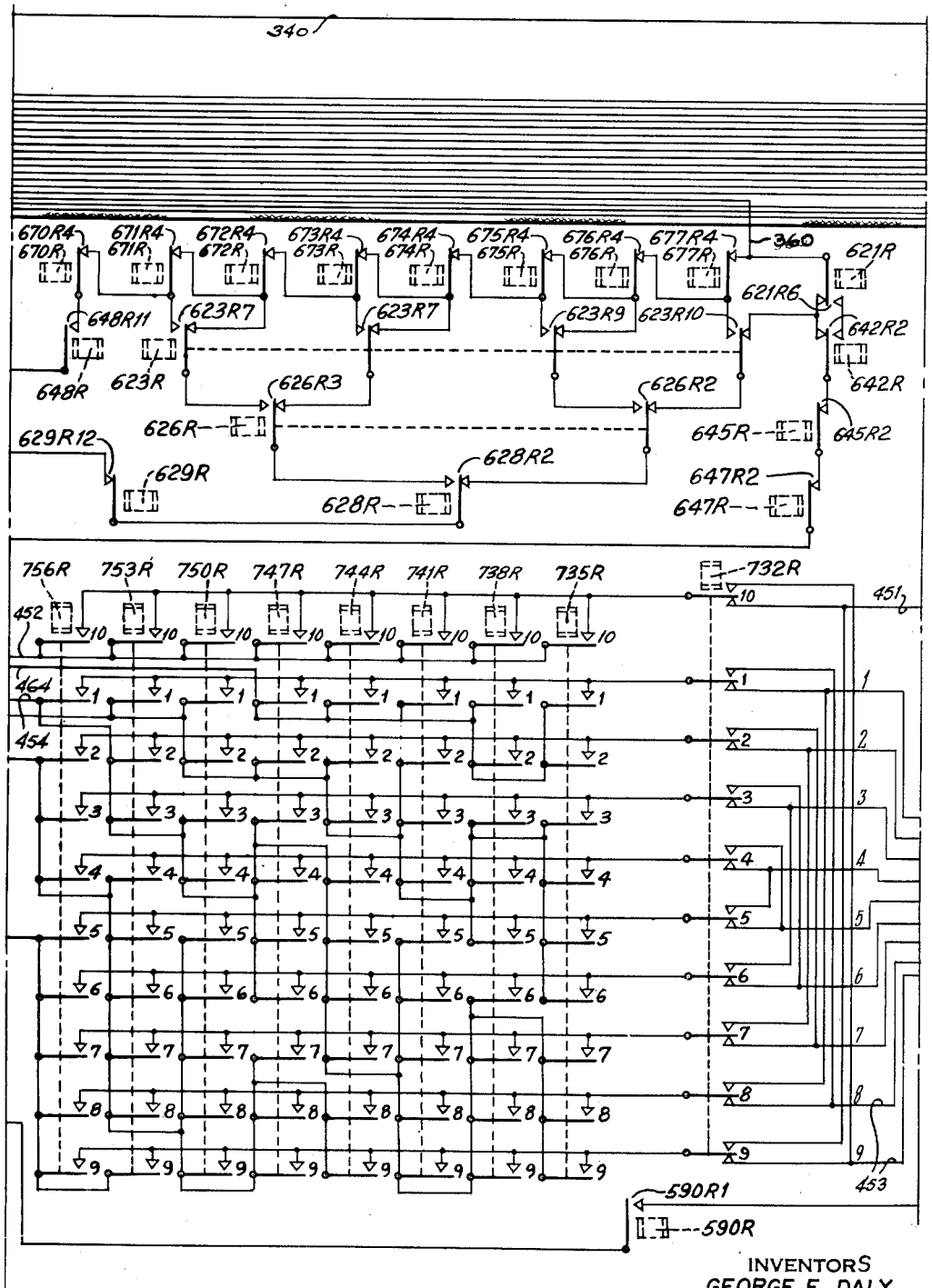

The multiply end test circuit of Fig. 14m is actually tested at the end of each multiplying digit operation, when sign conditions are normal, to immediately end the calculation if an unbroken succession of zeros extends to the right from the last significant digit calculated to the units position. Taking a multiplier 4000, for example, only the relay 674R of the significant digits sensing relay group 670R to 677R (Fig. 14k) would be picked up and latched upon entry of the multiplier amount into the IST storage unit. In the usual manner, the shift relay groups shift 1 and shift 2 would be energized for proper columnar offset of the ×5 entry initiated by sensing of the 5 multiplier digit. At 225 degrees of such ×5 cycle, therefore, a circuit may be traced (Fig. 14l) from cam contacts C36, through contacts 679R2 and 633R5, now closed, through contacts 651R12 in the position shown through wire 375, through contacts 660R2, 654R11 and 629R12 (Fig. 14m), all in position shown, through shift 4 contacts 628R2, as shown, through contacts 626R2 (shift 2) and 623R9 (shift 1) now transferred, then through significant digit relay contacts 675R4, 676R4 and 677R4, all in the position shown, to wire 360. Multiplication is thereby ended immediately upon completion of the ×5 entry, without the necessity for taking one cycle to skip each pair of remaining zeros.

Referring to Fig. 33, cycle 5 shows a condition wherein sign reversal is in effect and wherein a zero stands in the ten thousands order of the multiplier. Under these conditions the machine converts the sensed zero to its 9's complement, i. e., 9. An entry of 10 times the multiplicand must be directed into the product accumulator followed by a sign change. This may be illustrated by reference to Figs. 27a and 27b, with the assumption that the hundreds order storage unit is set up with zero in place of being set up with a 9 as shown. In this case a circuit is available to energize the times 10 relay 686R which may be traced as follows: from C16 (Fig. 27a) current flows through 661R2 as shown, 647R3 as shown, through shifted 645R5 contacts, through 642R9, as shown, through 123R6, as shown, through the brush on the zero in the hundreds order to the zero bus of ISTRO, out through contacts 651R10, as shown, to Fig. 27b. Thence the circuit extends through contacts 654R10 now shifted, these being the contacts which convert the sensed zero to its nines complement, thence through 657R10 as shown, 661R9 as shown, 693R2 as shown, 696R2 as shown, to the pickup coil of 686R (the times ten relay), and to ground.

Energization of the times 10 relay 686R closes contacts 686R4 (Fig. 27b) so that a circuit may be traced from line through cam contacts C29, through 686R4 now closed, through 635R10 in shifted position, through the pickup coil of the times transfer relay 661R to ground. The second test circuit now extends from line C36 (Fig. 27b), through shifted 661R12 contacts to Fig. 27a, thence through contacts 647R3 as shown, through 645R5 contacts shifted, through 642R9 as shown and 123R6 as shown, through the brush on the zero spot, thence through the zero bus through 651R10 as shown, via cable to Fig. 27b, thence through contacts 654R10 in shifted position, 657R10 as shown, through 661R9 now shifted, to the pickup coil of the sign change relay 660R. Immediately following energization of relay 660R, a parallel circuit is completed through contacts 657R11 as shown, 660R2 now shifted, to pickup coil of shift plus 1 relay 619R and thence to ground. The energization of the sign change relay will cause a further sign reversal restoring sign conditions to normal for calculations pertaining to following multiplier digits. Energization of S+1 relay 619R offsets the test shift circuits one order to the right for the sensing of the next digit.

*General explanation of relays utilized on multiplying and dividing calculations*

At this point it will be helpful to briefly summarize the general purpose of various relays which are used for certain specific purposes for multiplying and dividing calculations.

Figure 14N:
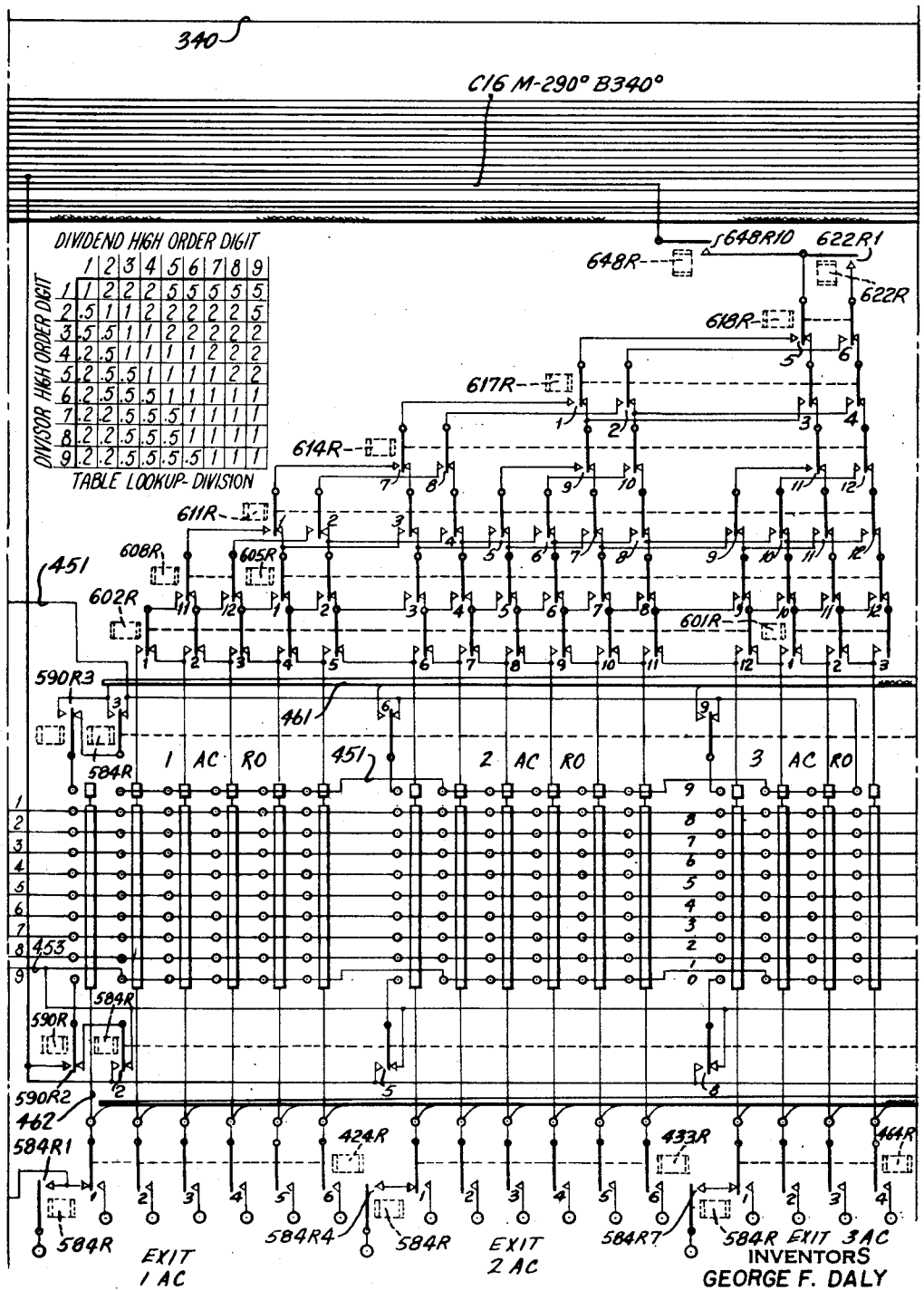
Figure 14O:
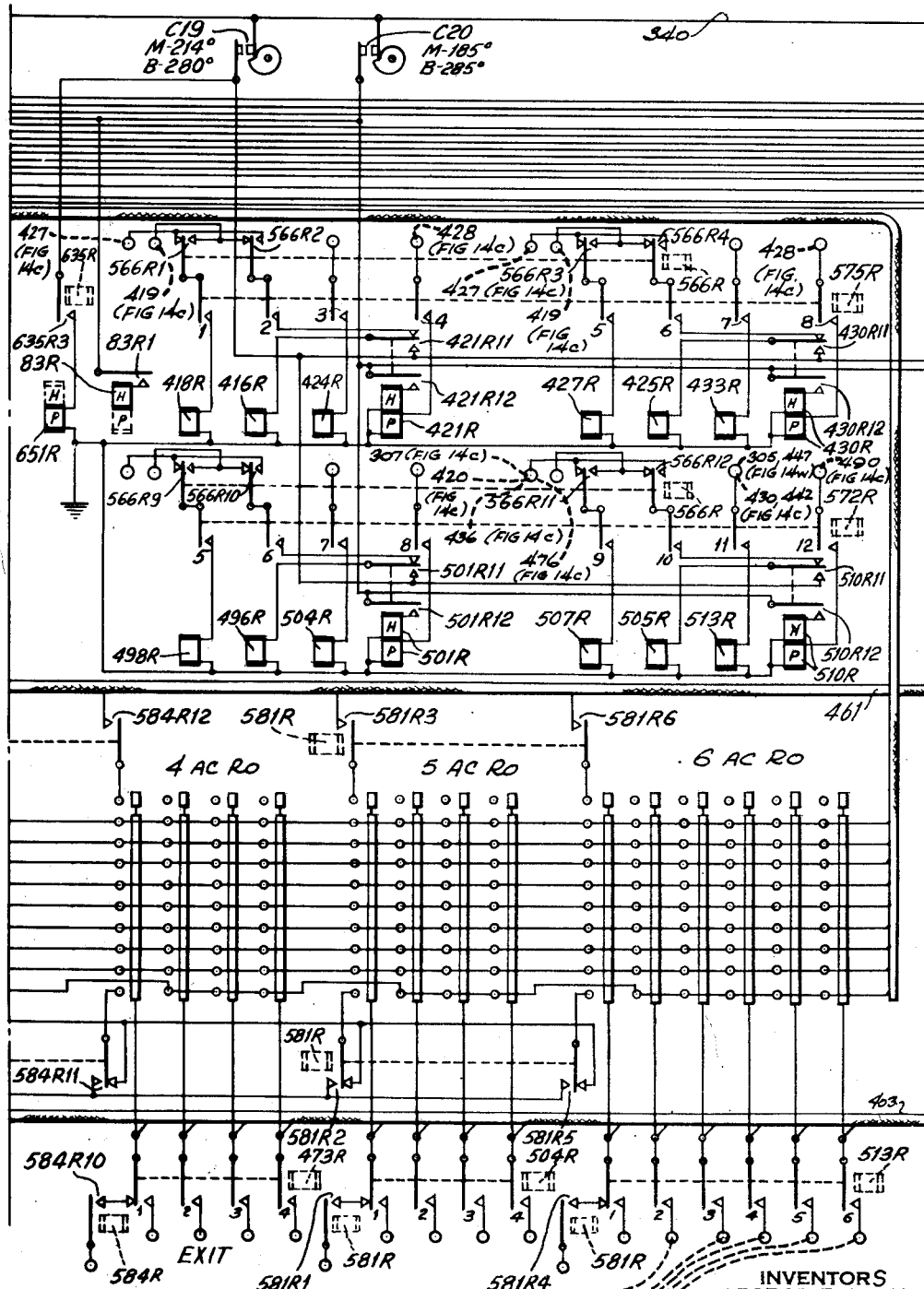
Figure 14P:
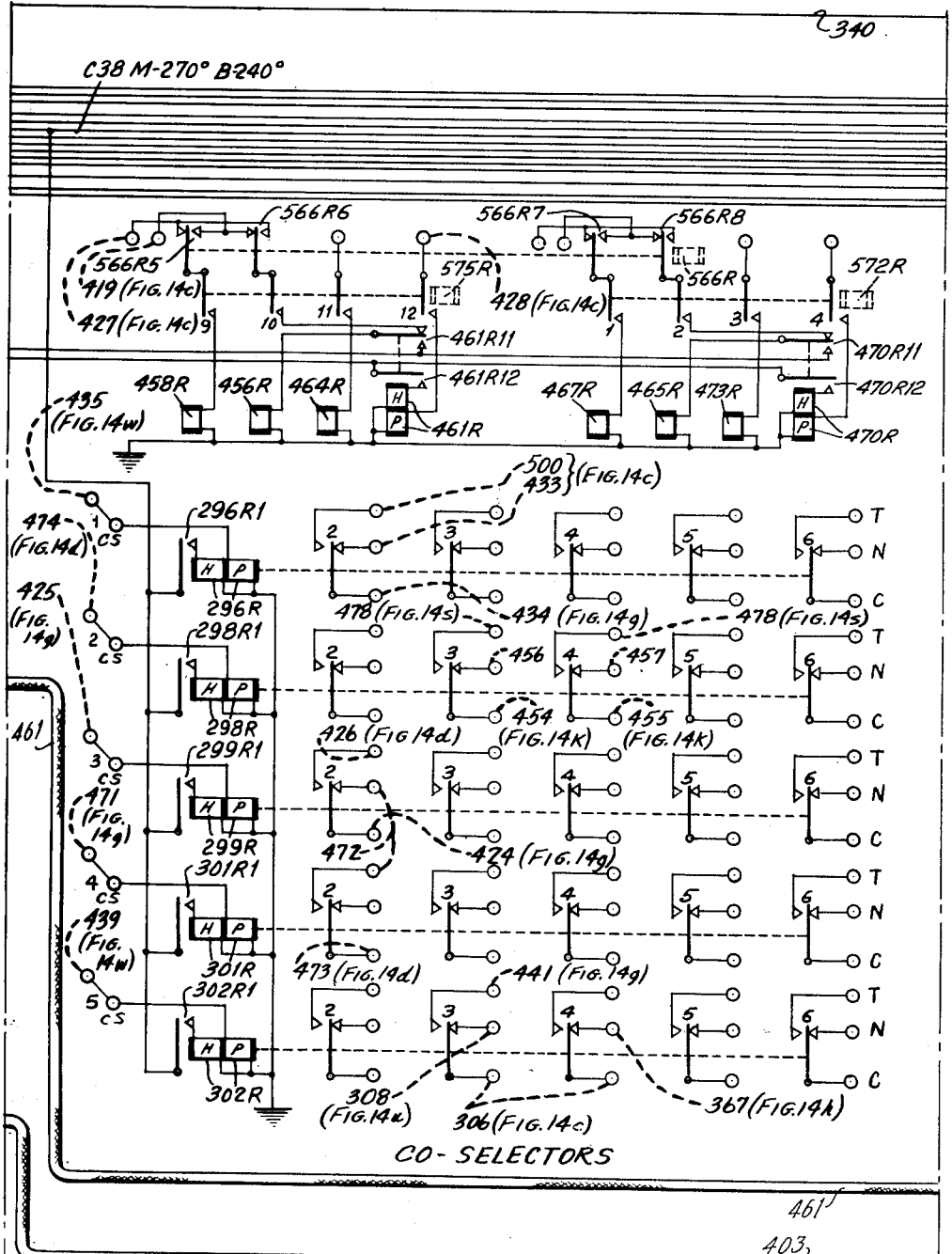

Referring to Fig. 14l, relays 622R and 621R marked +1 and +1d (+1 delay) are utilized to control operations associated with skipping over a zero in the multiplier, when the sign is normal and for the immediate skip over of a 9 in the multiplier, if the sign is reversed. 622R, the +1 relay, when energized causes a shift to the right of one order of the multiplier test off set circuits (on multiplying operations) or in the dividend test off set circuits when dividing. Control is afforded through contacts 622R4 (Fig. 14k for multiplying) and through contacts 622R1 (Fig. 14n for dividing). No hold circuit is provided for 622R since its operation is required only momentarily on testing. Relay 621R has a hold coil and it is utilized later in the cycle to modify column shift operations in the accumulator entry circuits. These conditions are provided by relay contacts such as 621R2 to 621R4 (Fig. 14t). If the multipler test off set requires an immediate shift of one column to the right, a corresponding shift must be made in the accumulator entry circuits. The operation which has just been described takes place at a relatively late time so the holding circuit affording the delay is provided on this relay.

Relay 699R, the ×1 relay, 696R, the ×2 relay, 693R, the ×5 relay, and 686R, the ×10 relay, require no detailed explanation. These relays determine proper stop and go impulses for the entry of related multiples of the multiplicand into the accumulator. The times 10 relay 686R is used for column shift controls for shifting a times 1 entry one place to the left. In such case the times 1 entry is controlled by the times 1 relay 699R.

The relay 648R or the minus relay is used on compound operations for multiplier digits 3 and 8. It is therefore used only in conjunction with the times 2 relay 696R to provide a minus entry of two times the multiplicand, when there is a compound operation such as times 5 minus times 2 for a 3 multiplier digit or times 10 minus times 2 for an 8 multiplier digit.

660R is a sign relay which is utilized on sign change. If operations are normal and this relay is energized, it will initiate a sign change which will remain effective only until another sign change occurs. Another energization of this relay will signify reversal of sign back to normal.

Relay 619R (the S+1 relay) is energized to signify completion of operations pertaining to a given multiplier digit. This relay will be energized after the first test of a simple multiplier digit requiring only one multiplying cycle, for example, for multiplier digits 1, 2 and 5. It will be energized at the end of the second test for compound multiplier digits. Its energization in any case will cause a multiplier test off set circuit and related column shift circuits to be shifted one step to the right, so operations can then ensue which pertain to the next lower multiplier order. Its energization in effect signifies that operations pertaining to a given digit are completed and that a shift to the right can take place, so that operations can follow on another multiplier order.

Relay 651R (the SCU relay signifying shift change control units) is a relay which is energized on testing a units multiplier order. In the event that a sign reversal is in effect at this time, the shifted condition of the contacts of this relay will cause a conversion of the digit which is sensed in the units order into tens complement instead of the nines complement. If the sign is normal this relay is ineffective.

Referring to Fig. 14u, the times transfer relay 661R (XT) is a relay which is effective whenever a test selects a times 5 relay 693R or a times 10 relay 686R, since in these cases a compound operation may be required. Its general operation is to shift related contacts on Fig. 14l so that the second test of the given multiplier digit will produce a different result from the first test. Its energization determines either the second multiplier component selection, or a sign change, or a shift to the right if the tested multiplier digit is a simple 5 digit.

Certain special relays are utilized only on dividing operations. While the details of the dividing operations have not been explained the general purpose of these special dividing relays will now be set forth.

Referring to Fig. 14l, 718R (QU) is a quotient units relay which is energized when test of the dividend remainder has progressed completely to the right. When energized this relay sets up circuits which are effective when a tenths or zero divisor multiple is selected to indicate that the dividend remainder is smaller than the divisor and that division may soon be terminated.

716R (DE) is a divide end relay which is picked up under control of the 718R relay when dividing operations are terminated. When this divide end relay 716R is energized, it permits a further cycle for entry of the divisor times 1 into the dividend accumulator, if the dividend remainder is negative at the end of division. This corrects the dividend remainder to a positive amount and also correspondingly corrects the quotient amount. It is also used for controlling certain programming operations.

Relays 717R are tenths pickup and hold relays which are energized during dividing whenever the test of the dividend remainder selects two tenths or a five tenths divisor multiple. Such relay is energized in conjunction with the times 2 relay 696R or the times 5 relay 693R and such relay 717R provides a further column shift of one place to the right for the accumulator entry circuits.

Calculate relay 701R (Fig. 14u) is energized whenever multiplying or division is in progress. Its primary function is to cause energization of the program delay relay at such times but it has other subordinate functions.

*Pilot selectors and card control of punching*

Fig. 20 is a condensed schematic and diagrammatic view of certain portions of the circuit diagram which has been drawn to show the relation of a card feed in the main card reading section of the machine and the card motion through the punch. It also shows the card in punching position where punching operations may be effected. The card may be punched in different fields and punching may be skipped in certain fields with further punching in other fields. In other cases the card may be skipped out following punching in a particular field.

Referring to Fig. 20, line 346 is the source of current supply. A record card is shown in position to be read by the advance sensing brushes (104). Brushes 103 are the main sensing brushes for operating through the card into cooperation with the feed and contact roll (94). 302 shows a plug connection to the emitter EM3. 303 shows a plug connection connected up to the "1" index spot on emitter EM3. Accordingly, when a card is read by brushes 103 and it has a perforation at the "1" index point, current will flow through plug connection 303. This current flows through a relay coil designated 205RP2 signifying pickup of a pilot selector relay 205R. 223R6 are contacts which close at the X-index position only so that if an X card is to be detected a plug connection can be established as indicated at 382. If an X-perforation is sensed in a card by the main brush with relay contacts 223R6 closed, supplemental pickup coil 205RP1 will be energized. When either 205RP2 or 205RP1 is energized, the translation of the armature will close contacts 205R2 and 205R3. Thereafter, these contacts will be latched closed by latch 351 (see Fig. 29). Latch relay coil 205RP2 corresponds to coil LP2 of Fig. 29, relay coil 205RP1 corresponds to LP1 in Fig. 29, and the unlatching coil 205RLT corresponds with the latch trip coil LT of this figure. The relay just described may be termed the first phase relay of the pilot selector. The second phase relay of this particular pair of relays which together constitute pilot #1 is generally designated "203R" and will comprise a relay coil 203RP2, Fig. 20, which is energized upon closure of contacts 205R3, when cam contacts C33 close after card sensing at 240 degrees to 295 degrees. 203RP1 is a so-called immediate pickup relay coil which may be plugged to any socket for energization of the phase 2 section of the relay without passing through phase 1. The 203R relay is provided with a holding coil 203RH, stick contacts 203R1, with a holding circuit established upon closure of cam contact C38. It will be noted that these contacts close at 270° late in one card feed cycle and then only open at 240° which is relatively late in the following card cycle. The effect of the joint controls in pilot 1 including first phase and second phase will be to shift relay contacts 203R2 and 203R3 to reverse position to that shown and to retain such setting throughout the machine cycle which follows the card feed cycle in which cards are sensed at brushes 103.

It may be further explained that since the 205 relay is a latch type of relay, the 203R relay will be reenergized each machine cycle until latch relay coil 205RLT is energized. In the present example, 205RLT is plugged by plug connection 383 to feed drop plug hubs which connect through relay contacts 22R5 back to line through cam contacts C42 which close at 340° of the machine cycle and open at 360°, see also Figs. 14v, 14w. Relay 22R will be energized on a new card feed cycle. It therefore follows that on a new card feed cycle the latch magnet 205RLT will become energized and any setup of 203R previously made will be broken down.

The first phase of the pilot selector is dropped back to normal position by a circuit extending through cam C42 as has been described. The circuit through 22R5 is closed very late in the cycle at a time when it has been determined that a new card feed operation is to ensue. This control will become effective normally upon completion of program operations on the preceding card. Such end of multiplying or other operations is sensed, however, so late in the cycle that it has been impossible to prevent a reenergization of the second phase of the pilot selector which has been made effective by a circuit extending through cam contacts C33 and contacts 205R3 to the pickup coil 203RP2 of the second phase of the pilot selector. Accordingly, this second phase selector is actually energized and its contacts 203R2 and 203R3 will be shifted while the machine is sensing the second card at brushes 103. This fact must be taken note of in making plug connections through the contacts 203R2 and 203R3.

The apparently contradictory control described in the preceding paragraph actually is useful in elimination of cycles, since transfer operations related to one card may be made effective during the cycle when the machine is sensing the following card. Thus, while the effective programming has been described as completing the calculating operations related to a card, certain other related operations, particularly such as transfer to storage for summation or transfer to storage for punching, may be made effective for a given card during the same time or cycle when the machine is sensing the following card at the brushes 103 in any application where an accumulator or a storage device is cleared and available for such entry at the time when the following card is being sensed. In other words, a pilot selector may be and often is employed to complete transfer or cross-adding operations related to a calculation while the machine is sensing the following card.

It may be explained at this point that the primary purpose of connections such as are shown on Fig. 20 is to indicate that a pilot selector such as pilot 1 may be generally associated with card feed and card reading operations and another selector such as pilot 2 may be generally associated with endwise feeding operations and punching. It will be recalled that in this machine there is no emitter timing relationship of the punching mechanism with respect to the main card feed. Accordingly, transfer of control from pilot 1 over to pilot 2, in effect, releases the card sensing pilot 1 which may then be restored at will upon new operation of the card feed, whereas pilot 2 remains effective until the card which initially picked up pilot 1 has been advanced to the punch, punched and/or skipped through the punching mechanism, and is about to be ejected.

The master control of endwise feeding is relay 84R which can be energized only when two conditions have been satisfied. A card must have been advanced through the card feed and into the punching tray, at a position generally designated 386, Fig. 20, and if the punching rack 181 be at the extreme left (at the extreme right as shown in rear view, Fig. 10), this contact PC4 will be closed. This closure of contact PC4 will have completed a circuit to a so-called last column contact relay 28R (see also Fig. 14b) and will have resulted in closure of the contacts 28R3 shown on Fig. 20.

Fulfillment of the remaining condition, i. e., the presence of a card in the tray closes card lever contacts 2CL1, Fig. 20, completing a circuit in Fig. 14b from cam C8, through contacts 2CL1 and pickup coil of relay 32R to ground. The resultant closure of contacts 32R7 completes the circuit shown in Figs. 14e and 20 extending from line 340, through cam contacts C9, contacts 7R4, 28R3 and 32R7, all in shifted position, to and through relay coil 84R to ground. At the same time, see Fig. 14e, a parallel circuit is completed to the punch feed and eject mechanism clutch magnet 193 (see Fig. 8), causing a card in the tray, such as card 386, Fig. 20, to feed to the left to punching position, generally identified as 387 (Fig. 20). Energization of 84R has two immediate effects, the first of which is to close contacts 84R6 shown at the right hand side of Fig. 20 to complete a circuit which will break down any previous setup of pilot 2 as will later be described. The second effect, with which we are now concerned, is to close a contact 84R7 disposed in the circuit between cam contact C29 which closes between 10° and 30° of the following cycle, and a plug connection 385 between contact 203R4 of pilot 1 and socket D connected to the pickup coil 208RP2 of pilot 2. See also corresponding circuits (Figs. 14v and 14w). The circuit thus traced energizes relay 208R shifting its armature and closing contacts 208R2 and 208R3 in a manner exactly the same as has been described for the closure of 205R2 and 205R3 associated with pilot 1. Pilot 2 has now been energized and transfers its circuit to energize the second phase relay of pilot 2 upon closure of contacts 208R3 which complete a circuit to a pickup magnet of the second phase relay 206RP2. After this action has been made effective the relay 208 will remain latched in position until such time as punching of the related card has been finished and until this card is ejected and a new card is fed into punching position.

When an endwise feeding again ensues as a card is being ejected from position 387 (Fig. 20) and as another following card is being advanced from position 386, the relay 84R will be energized by the circuit which has been described and under these conditions a contact 84R6 will be closed. Plugwire 388 is connected from the punch drop plug hubs PD to the tripping magnet 208RLT associated with pilot 2. See also corresponding circuits, Fig. 14v. This circuit will be completed late in a cycle upon closure of C42, the circuit being traced through C42 to contact 84R6, socket PD, plugwire 388, relay 208RLT to ground. This circuit will serve to reestablish pilot 2 in normal position.

The contacts 206R2 and 206R3 associated with the second phase relay of pilot 2 are employed primarily to control punching and/or skipping operations related to a particular card. Examination of the permanent connections to pilot 1 and pilot 2 will indicate that the fixed wiring of these selector devices is identical and accordingly either of them or other selectors so provided may be plugged directly for card feed control as is pilot 1, or may be plugged for sub-control under another pilot as is shown in this case for pilot 2. Accordingly, the contacts such as 206R4 need not be used in this particular example, but may come into effect on a following example.

The contacts 203R2 and 203R3, shown on Fig. 20, terminate in the plug connections shown in the upper left hand corner, Fig. 19a, designated "Pilot selectors—I—C, N, T." Generally speaking, the plug sockets shown on Figs. 19a and 19b which appear at various positions on the main circuit diagram bear identifications C, N and T which signify that they are the center or common leaf connector, the normally connected hub and the transfer hub, respectively. The symbol "N" means normally closed. The symbol "T" signifies that current flow is established to the hub on relay energization and the symbol "C" signifies a connection to the center leaf which transfers from N to T. Shown at the upper left hand corner of Fig. 19a is a legend "X or balance pickup" which identifies a group of hubs, one for each pilot selector such as are shown at X for pilot selector 1 and pilot selector 2 (Fig. 20). One of these hubs is shown connected by the wire 382 to brush 103, for example, Fig. 20. Digit pickup signifies that such hubs are pluggable to pickup of the selector from any desirable digit identifying perforation on a card. The "X or balance pickup" and "digit pickup" hubs are more briefly labeled "X" and "D" respectively on Fig. 20. The X hub of a pilot selector may, when desired, be connected by a wire such as 382 either to the normal reading brushes 103 or to the control reading brushes 104. Either the X pickup or the digit pickup may, when desired, be plugged to the hubs extending from control reading brushes 104 in any machine application where it may be desirable to sense in advance as for a rate card which may effect multiplication of each of a following group of cards.

In general, the effect of pilot 1 with respect to card reading will be described after considering the plugging which is used to set up such controls. Plugwire 304, Fig. 19a, connects a read cycles hub (Fig. 14c) to the center leaf "C" of a pilot selector 1 contact 203R3 (see Figs. 14w and 20). The transferred contact T hub is connected via wire 305 to the readout of accumulator 6AC (Figs. 14w, 14o and 20). The circuit thus described provides for transfer of the product derived from card #1 out of accumulator 6AC after multiplication has been completed. The product so transferred is to be entered into storage unit 6ST for punching. This circuit is controlled by the second contact of pilot 1, the plug connection extending from a read cycles hub, Fig. 14c, via wire 390 to transfer hub of contact 203R2, Fig. 14w, thence via wire 391 from the "C" hub of this contact to the readin hub of storage device 6ST, Fig. 14g. The circuits now set up must, in addition, include a wire 392 extending from the normally closed pilot selector contacts 203R3, Fig. 14w, via wires 392 to the readin hub of storage unit 7ST, Fig. 14g. This wire is a blocking wire which has the effect of preventing transfer of product into summary storage unit 7ST, since in the example shown in Fig. 18, the product "C" is not to be included in the summary amount to be punched at "M" in card #4. The plugwire connection 392 will be an open circuit when the machine is operating on card #1 and accordingly transfer from product accumulator 6 into summary storage unit 7 will not occur.

The plugging for punching the product of card #1 will now be described. This product 11778 is shown in Fig. 18 as being punched at the right hand end of card #1 in field "C," which also corresponds in position to field "F" of card #2. Punching is initiated in this case by plugwire 393 extending from the column #66 punching of hub of the punching strip emitter shown at the lower end of Fig. 19b (see also Fig. 14e) to the center leaf "C" of a contact 206R3 (Figs. 14w and 20) associated with pilot 2 which, as has been described, is to take over control of punching. The transferred contacts are connected by "T" hub and wire 394 to the extreme left hand position of the readout associated with the punch storage device #6 (Fig. 14f), in this case the 5th position, since a 5 column field is used.

In the present machine, punching proceeds from left to right and when a particular field is to be punched, provision is made for placing a selector control on the first column to be punched, which is the highest order column. If this selector establishes a "non-punching condition," punching is suppressed until a selector permits punching and until a second condition is satisfied, said second condition being that punching read out of the punching storage unit is called into operation. After the first or extreme left-hand column has been punched, the normal readout is effective through a simple direct plugging connection such as is shown for the other four columns at 395 on the lower end of Figs. 19b, 14e, and 14f. A circuit 396, extending from the normally closed side of contacts 206R3, Figs. 20 and 14w, extends to the "C" common hub of a contact 221R2 associated with pilot selector 7. Its function is in connection with operations on card 2 as will later be described. The second contact 206R2 (Fig. 14w) of pilot 2 is connected by a plugwire 397 extending from the center leaf of this contact to the 71st column of the card punching emitter, Figs. 19a, 19b, and 14e. A plugwire 398 is connected from the transfer hub of the same contact, Fig. 14w, to the "skip" hub (Fig. 14c), to skip columns 71–80, since no punching is to be made effective at the right of field "C" and card #1 (Fig. 18). The normally closed contact 206R2 is connected via wire 399 to the center leaf of a contact associated with pilot 5, Figs. 19a and 14w, in order to provide for skipping of a field such as field "C" on card #4, Fig. 18, which does not receive any punching in the corresponding field.

*Transfer of product to storage and punching out of storage*

The previous description of machine operations has described the manner in which the product was entered into the product accumulator 6AC. The machine is now ready to transfer this product from the product accumulator to storage unit 6ST. After the product is stored in this storage unit, the product amount is read out from the storage unit and punched back on the #1 card (Fig. 18). It may be here mentioned that the second card, namely card #2, is fed by the main card feed section of the machine during the period that this amount is being transferred from the product accumulator 6AC to storage unit 6ST. This is made possible since the pilot selector #1 remains in shifted position during the card sensing time as has been described above. The reinitiation of card feed for card #2, however, need not be described at the present time. It may be here mentioned, however, that just before the end of the multiplying cycle pertaining to card 1, when the program "read cycles" hubs become active, provision is made for clearing storage devices 1ST and 2ST during the last portion of this cycle so that such storage devices will be available to receive entries from the following card during the immediately following machine cycle. Expressed in machine degrees, the storage units are reset or restored between 255° and 360° of machine time. Setup of the storage unit on the following cycle can take place between 0° of machine time and approximately 225°. Accordingly, there is ample time after such setup for storage unit restoration in the same machine cycle. Generally speaking, as the multiplying on card #1 approaches completion, the machine prepares for card feed of the following card. This preparation for card feed on the new card sets up a control which brings about reset or clearing of the storage units. At the termination of multiplication as previously described, relay 43R is energized, reestablishing impulse supply to hub 319 (Fig. 14c), so that the SP impulse (255°–285°) proceeds via wires 330 and 331 to magnets 171-1ST and 171-2ST (Fig. 14h), which unlatch setup bail 151 (Fig. 3) of storage units 1ST and 2ST.

These storage devices function mechanically as described previously (see Fig. 3) and at the end of the last multiplying cycle, when card feed starts, factor storage devices 1ST and 2ST will have been cleared. It may be now mentioned that when the circuit via wire 330 (Fig. 14h) is completed to energize the magnet 171ST, a parallel circuit extends through contacts 144R1 to energize all of the latch trip coils of the relays 670R to 677R, inclusive. These are the unlatching magnets of a type of relay such as is shown in Fig. 29. The purpose of energizing these magnets at this time is to clear the previous multiplier significant digit indication stored by relays 670R to 677R, and to prepare for a new initial setup of column shift controls when the multiplier (or divisor) is entered from the following card.

The amount standing in the accumulator 6AC is also set up on the readout associated with this accumulator, namely 6ACRO (Fig. 14o). Plug connections 400 are established from the exit sockets here shown to the read-in hubs of the storage units 6ST (Fig. 14g). An EC impulse at 340° flows from one of the read cycle hubs 319 (Fig. 14c), via wire 304 (Fig. 14w), through pilot selector #1 contacts 203R3, now in shifted position, then via wire 305 to the 6AC "readout" hub (Fig. 14o), (see also Figs. 20 and 19a). This circuit continues through EC relay contacts 572R11, now closed, and thence through 6AC read-out relay 513R to ground. The contacts of relay 513R are shown at the lower right-hand corner of Fig. 14o and are in the circuit which has been joined by plugwires 400 connecting read-out 6ACRO to the input storage unit 6ST (Fig. 14g). During the machine cycle following completion of multiplication and concurrently with the sensing of the next following card, impulses flow from emitter EM1, Fig. 14j, via cable 370 to the busses of 6ACRO, Fig. 14o, and thence via the individual circuits of this read-out which is now standing in position to represent the product, 11778, to the now closed contacts 513R1 to 513R6, inclusive, thence via wires 400 to Fig. 14g, to the magnets 164 associated with storage device 6ST which is now being rocked, as described in connection with Figs. 3, 4, and 5, to receive entries. Upon completion of this entry operation the machine is ready to punch the result which has been transferred from accumulators 6AC to storage device 6ST.

Referring to Fig. 21, it is seen that the product of 39×302 is 011778, but owing to the complementary functioning of the accumulators, the wheels of 6AC actually stand at a setting of 988221. It is important to note, therefore, that the connections between EM1 and 6ACRO above referred to are also complementary, i. e., EM1 "0" segment is connected to the accumulator 9 bus, the "1" segment to the 8 bus, etc. For this reason the readout impulses from 6AC direct to 6ST occur at index times 011778, so that the true value 011778 is setup in storage unit 6ST.

It should be also explained at this time that concurrently with the reading of accumulator 6AC, there is a reset of 6AC, said reset circuit having been set up by connecting a plugwire 439 (Fig. 19a) to one of the read cycle hubs 319 (Fig. 14c). This EC impulse may be traced from cam C32 via wire 329, through contacts 43R11, to reset socket shown in the right-hand side of Fig. 14c through wire 498 (Fig. 14o) through allcycles relay contact 572R12, now closed, to the pickup coil of reset relay 519R.

A holding circuit for accumulator reset will have been established through the stick contacts 519R12 to the holding coil 519R. Accordingly, during the same cycle that amounts have been read out of accumulator 6AC, impulses will flow from the emitter through the read-out as previously traced, thence via wires in cable 403, Fig. 14o, to Fig. 14s, and through the contacts 519R1 to 519R6, now in shifted position; thence via the contacts 505R1 to 6, now in normal position; to the go magnets 125 of accumulator 6AC. The effect of these impulses, which are transmitted simultaneously with the impulses which cause entry into storage device 6ST, is to enter a 9's complement of the digital position of each order of the read-out device causing each such order to advance to 9. The required machine stop impulse at "0" index time (202½°), is provided by a circuit from line 340 through cam contacts C10 (Fig. 14j) through emitter 1, "0" segment, through wire 373 to Fig. 14s, to and through relay contacts 519R10, now in shifted position, through machine stop timer contacts 517R1 to 6, inclusive, in shifted position, through stop magnets 126 of accumulator 6AC to ground. Since no carry effect is necessary for reset purposes, a second machine stop impulse for carry, such as was shown in the lower right-hand corner of Fig. 14s is not required and the contacts 519R10 and similar contacts in the other accumulators prevent such a second machine stop impulse when resetting. It may be explained at this point that the machine stop impulse normally associated with carry should not be effected during a reset operation due to the fact that the space in the cycle between 225° and 0 is used during reset to permit a special control, if desired, which will have the effect of adding 5 in a product or quotient accumulator in connection with the well known practice of correcting the units position of product or quotient to the nearest one-half cent. This will be further described elsewhere.

The amount of the product is now standing in 6ST and set up of its related readout and punching is initiated by an EC impulse (340°–192°) extending from cam contacts C32 via wire 329, Fig. 14c, through read cycles relay contact 43R7, Fig. 14c, plugwire 508, which extends to "T" hub coselector 1, Fig. 14p, through contacts 296R2, now in shifted position; thence via wire 434 to the "P" (punch hub) for 6ST, Fig. 14g, through contacts 141R4, now closed, through the storage punch pickup relay latch pickup coil 172RLP to ground.

It should be explained at this point that coselector 1 is used to augment the capacity of the pilot selector 1, which provides only two sets of contacts for control purposes. The T, N, C hubs associated with coselector 1 will function exactly as the T, N, C hubs of pilot selector 1, since the selectors are coupled by a plugwire 435, Fig. 19a, extending from pilot selector 1 "couple exit" hub to coselector 1 "PU" (pickup hub). In Fig. 14w, it is seen that a circuit is established from cam C33 through pilot selector 1, phase I contacts 205R3 whenever 205R is latched in shifted position, through plugwire 435 to the pick up coil of relay 296R, which is also designated coselector lCS, Fig. 14p. In this manner a coselector coupled to a given pilot selector is supplied with a pickup impulse identical with that supplied to the pilot selector phase II relay. A stick circuit through stick contacts 296R to hold coil 296R provides a duration equivalent to that of the pilot selector phase II relay. Upon energization of 172R as described above, relay contacts 172R2, Fig. 14g, close, allowing current to flow from cam 33 at 240° to energize relay 173R. A stick circuit for relay 173R is established through stick contacts 173R2 and relay contacts 172R1 direct to line 340. Relay 173R also establishes a circuit to energize punch relay 170R from line 340 through contacts 173R4. 173R has supplement stick contacts 173R1 which close on energization of 173R to establish a circuit to cam contact C33. Referring now to Fig. 14f, energization of 170R closes relay contacts 170R1 through 170R12, inclusive. Referring now to Fig. 14e, a circuit is established from line 340 through the PC2 punch contacts, through the escapement contact PC3 to the readout strip 284 of the punch, see also Figs. 10 and 12. The movable brush 288, Figs. 12a, 11, and 14e establishes contact between readout strip 284 and the #66 contact spot 286.

When the brush encounters the first spot on the read-out strip from which punching is to commence, a circuit is established from the read-out strip segment 286, column 66, Fig. 14e, through the brush 288 to plug connection 393. Plug connection 393 extends to Fig. 14w to the selector active during punching of card #1, the C hub of a pilot selector #2, thence through the shifted relay contacts 206R3 to the T-hub and out via plugwire 394 to the hub shown in Fig. 14f. Since relay contacts 170R8 are now closed, the reading in the ten thousands order circuit is completed through contacts 167R2, in the position shown; to the brush in the read out, now on the "1" spot, and out via the #1 buss through relay contacts 164R1 (Fig. 14f) now in the position shown, and to a wire in cable 407 which extends to Fig. 14e. The circuit is then completed to energize the #1 punch selector magnet 218, which circuit extends to ground. On Fig. 14e, another circuit from line is established through PC2, PC3, and the interposer bail contact, PM1, to energize the punching magnet PM. On operation of the punching magnet (PM), the punch is actuated in the manner previously described. Consequent opening of the escapement contact PC3 deenergizes the punching magnet PM and also deenergizes the punch selector magnet 218. The punch then operates column by column, the circuits proceeding from readout strip 284, Fig. 14e, via wires 395 to 6STRO, Fig. 14f. When column 70 is reached, a circuit is established to socket 408, Fig. 14f. Since relay contacts 170R12 are now shifted, current supply is afforded to relay 174R. Relay 174R is then maintained energized through stick contacts 174R1, the stick circuit remaining effective as long as current flows to socket 408, despite subsequent opening of contacts 170R12. With relay 174R energized, relay contacts 174R3 (Fig. 14g) close to establish a circuit from line to energize latch trip coil 172R. Energization of latch trip coil 172R releases the shifted contacts 172R1 and 172R2 to deenergize the 173R holding coil and the 173R pickup coil, unless current supply is extended to the latter through 173R1, in which event 173R pickup will be deenergized at 295° under control of cam contact C33. With 173R deenergized, 173R4 will interrupt the circuit to 170R whereupon contacts 170R1 through 12 reopen (Fig. 14f). When relay 170R deenergized, contacts 170R12 resume the position shown in Fig. 14f. Since current supply is still available through plugwire 395, current flows through 170R12 (Fig. 14f) now in the position shown; through 174R2, now closed; through 167R6, now in the position shown, up to the "8" spot on the read-out and thence via the #8 wire in cable 407 over to the #8 selector magnet (Fig. 14e). This will punch "8" in the last order of field "C" in record card #1, Fig. 18. On punching the last column, the opening of escape contacts PC3 (Fig. 14e) will effect deenergization of relay 174R (Fig. 14f) allowing contacts 174R1 to reopen.

After the punch has perforated column 70, brush 288 moves one further column to the right and establishes contact to the insert in circuit with plug connection 397 (Fig. 14e). The current then flows through the path previously traced from line through PC2 and PC3, as shown; through 284, 288, and wire 397 to Fig. 14w. The circuit is completed through pilot selector #2 relay contacts 206R2, now in shifted position, to wire 398 which connected to one of the skip hubs 409 (Fig. 14c). The circuit continues through to the pickup coil of relay 87R. With 87R energized (Fig. 14e), a parallel circuit is established through relay contacts 87R1 down through skip solenoid 263 and back to ground. The skip solenoid upon energization skips the card out of the punch to the eject position.

The concurrent energization of punch magnet PM, necessary for initiation of skipping as described in connection with mechanical operation of the punching unit is provided by a further parallel circuit through contacts 87R2.

It has been previously explained that for eject of the card, it is not only necessary that the card which has been previously punched be in the eject position, but a further card must be in the tray, i. e., in position 386 (Fig. 20). The pertinent circuits were described during discussion of the operations of Fig. 20. These are effective at this point to energize the pick up coil of relay 84R and to also energize the punch clutch magnet 193. Eject of the previously punched card now occurs and the new card is advanced to the punching die.

Another interlock control may now be mentioned as follows: with the card in the tray of the punch, relay 32R, as previously described, will be energized. Referring to Fig. 14b, relay contacts 32R5 are provided, and if relay 32R is energized signifying the presence of a card in the tray, the 32R5 contacts will be open to interrupt the feed circuit to the card feed clutch magnet CF. Accordingly, feed of a new card in the main card handling section will be prevented until the card in the punch is fed away from the tray position endwise in the punch. This prevents premature operation of the card feed unit if the punch feed unit has not yet removed the preceding card from the tray.

Plugging connections for card 2

Certain items of the plug connections which are established for the #2 card have already been described. Before describing the dividing operations which are effected on record card 2, the remainder of these plug connections will now be referred to.

Dividend entry is provided into accumulator 3AC by means of plugging connections 415 (Figs. 19b, 14r, and 14j) extending between reading brushes 7–10 and the entry hubs of 3AC. It may be explained that accumulators 1AC, 2AC, and 3AC are together used as a dividend accumulator. Coupling these three accumulators together to function as a single accumulator is shown in the lower left-hand corner of Fig. 19a where jumper connection 416 couples CX hub of 3AC into CR hub of 2AC, 417 couples CX of 2AC to CR hub of 1AC, and connection 418 couples feed-back carry from high order of accumulator 1 to units order of 3AC (see also Figs. 14q and 14r).

Program step #2 is to be the basic control for dividing. Accordingly, the program exit hubs (Figs. 19a and 14c) are plugged to the minus hubs controlling subtractive entries of divisor multiples into the accumulators 1AC, 2AC, and 3AC. This is a 3-pronged wire 419 (Figs. 14c, 14o, and 14p). Program exit for the second step is also connected via wire 420 which extends to the plug hubs related to 6AC (Figs. 14c and 14o), the connection 420 being one of a multi-pronged connection shown on Fig. 19a. Divisor entry for the divisor, "E" (see Fig. 18) is to be made in the storage unit 1ST, utilizing the same plugging as was provided for entering the multiplier for card 1, via connections 301, this entry having already been described. In addition, it is now necessary to provide for read-out from the divisor storage 1ST, as this divisor is to be operated upon substantially as a multiplicand during the dividing steps. Accordingly, a connection 421 extends from one of the hubs of program exit step 2 into the read-out hub of 1ST in the lower left-hand corner of Fig. 19a (see also Figs. 14c and 14h). Since this is a dividing operation, a plugwire 422 also extends from one of the program exits for step 2 (Fig. 19a) to the divide hubs (Figs. 14c and 14u). This problem requires omission of program step #1, with immediate skipping to the second program step following the read cycles step. Operations on card #2 are to be performed during program steps #2, # 3, #4, and #12, then repeating back to program step 1 in a manner which has been generally described. In order to skip the program step #2 after the read cycles step, which is effective during feeding of card #2, a circuit is made effective by means of plug connection 423, extending from a digit impulse hub (Figs. 19a and 14s) to the input or C (common) hub of emitter EM2 (Figs. 19a and 14g). The X-hub of this emitter #2 is connected via wire 424 to the C or center contact of a contact associated with coselector #3 CS (Fig. 14p). This coselector is arranged to be energized when "4" control perforation identifying card #2 is sensed. The plugwire 302 has previously been described as connecting the #1 sensing brush hub to the input of emitter EM3 (Fig. 14g). The "4" hub of this emitter is connected via wire 425 to the input control for coselector 3CS as shown at Fig. 14p. The transferred contact "T" of this coselector is connected via wire 426 to the skip hub related to program step #2, Fig. 14d. This plug, it may be explained at this point, is provided to advance the program step immediately to step #2 when the machine detects that card #2 bearing a "4" perforation has been sensed, since no multiplying is to be effected on this card.

An additional circuit extends from the #4 spot of emitter EM3 (Fig. 14g) via wire 503, to the digit pickup hub of pilot selector 3 (Fig. 14v). Pilot selector 3 is controlled to drop out by plugwire 501, inserted between the drop out hubs of said selector, Fig. 14v, and read drop out impulse hubs, same figure. The punch control exit hub of pilot selector #3 is connected to the digit pickup of pilot selector 7 via wire 491 (Figs. 14v and 14w) and the drop out hub of selector 7 is plugged to punch drop out hub via wire 492 (Fig. 14v) in order that pilot selector #3 may transfer its control to pilot selector 7 for skip control in connection with punching related to card #2. In order to effect such control, plugwire 396 is inserted between an "N" hub of pilot selector #2 contacts 206R3 to the "C" hubs of pilot selector #7 contacts 221R2 (Fig. 14w). A wire 494 extends from the "N" hub of the latter contact to the skip hub, Fig. 14c, while a wire 496 (Fig. 14w) extends from the "T" hub of the same contact to the ten thousands storage punch exit hub of storage unit 6ST (Fig. 14f).

Dividend entry, in this case, must be made from the card direct to an accumulator. This is the only case related to any of the four cards shown in Fig. 18 where card entries are made into an accumulator, since in all other cases, card entries are made direct to storage units. Dividend entries must be made into coupled accumulators 1AC, 2AC, and 3AC, which have special circuits associated therewith for division. Such initial entry is controlled by a 3-pronged wire, 427, extending from a read cycles hub (Fig. 14c) to the plus hubs of accumulators 1AC, 2AC, and 3AC (Figs. 14o, 14p). After division has been completed, it will be necessary to reset these accumulators, said reset occurring during the third step of programming. Accordingly another 3-pronged wire 428 extends from one of the exit hubs for step #3 (Fig. 14c) to the reset hubs for 1AC, 2AC, and 3AC (Figs. 14o and 14p). The quotient hub at the left side of Fig. 14j is connected via wire 429 to the units position input for accumulator 6AC (Fig. 14s). It may be explained that while this is a single wire, it will receive quotient impuses which are progressively stepped first to the highest order of the quotient accumulator and then back via the shift mechanism so that the correct quotient digit will be entered in each order of the quotient accumulator 6AC as the division operation proceeds. One of the program hubs related to program step 3 (Fig. 14c) is plugged via plugwire 430 to the read-out relay of 6AC (Fig. 14o). It may be explained at this point that, after the quotient has been computed, this quotient is to be transferred out of accumulator 6AC and is to be entered into storage unit 6ST for punching of the intermediate result, "F." Before describing this operation, it should be noted that operations of card #2 include crossfooting of field G (Fig. 18) and that the final result, "H" must be carried forward as one of the items to be included in the summary which will be punched into card #4. Entry of field "H" from the card into the left side of storage unit 2ST will be provided for by the plugging connection 431 (Figs. 14j and 14h). It may be explained at this point that the read-in to the right-hand side of the storage unit and the left-hand side of the storage unit will have been provided for by wire 331 which was described as being plugged in relation to card #1. These same connections function on the reading cycle for card #2 and serve to control entry of the item shown in field G of such card (Fig. 18), which has been described as being plugged for entry at the left side of 2ST via the group of connections generally designated as group 431. Plug connections 467 extend from exit hubs of 2STRO (Fig. 14h) to the entry hubs of accumulator 6AC (Fig. 14s).

Extending from program step 3 (Fig. 14c), is a plug-wire 432 which extends to the "N" hub of the #1 pilot selector contact 203R2 (see Fig. 14w), also schematic drawing, Fig. 20. The wire 391 previously described as provided for entry into storage unit 6ST (see Fig. 14g), was described in connection with the plugging for card #1. Circuits extend along this line for entering into 6ST on program step 3 of card #2 operations, during which time the pilot selector #1 will be in its normal position. The plugging which has been described thus far in connection with card #2 has provided for: entry of the dividend and divisor; entry of the amount sensed from field G; dividing operation, including entry of quotient into accumulator 6AC in program step 2; reset of accumulators 1AC, 2AC, and 3AC, concurrently with transfer of quotient to storage unit 6ST during program step 3. One operation remains, i. e., providing for punching of the intermediate result quotient "F." A wire 433, extending from the third step of program (Fig. 14c) extends to the "N" contact of coselector "1" contacts 286R2 (Fig. 14p). A second wire 434, previously described, extends to the punching control hub of storage unit 6ST (Fig. 14g). It has been mentioned that coselector "1" is coupled to operate at the same time as pilot #1 during card #1 operations only, and is therefore in the position shown during card #2 calculations.

During program step 3 punching of amount "F" will be initiated and the plugging just traced provides for initiating such punching. The actual punching circuits are identical with those employed for punching result "C" in card #1 and such plugging has already been described.

We will now proceed with the plugging of program step 4 during which step of operation transfer of amount "G" (Fig. 18) into accumulator 6AC is accomplished to produce the total shown at "H" on card #2. Joining the branch wire 429 previously described, is another wire 436 extending from one of the hubs on the 4th program step, Fig. 14c. This wire extends also into the plug hubs of accumulator 6AC (Fig. 14o) as previously described for wire 420 and serves to provide additive entry into accumulator 6AC during the 4th program step.

Since amount "G" is to be read from storage unit 2ST, such read out is provided by a wire 437 extending from another one of the read out hubs for program step 4, Fig. 14c, to the read out hub for the left-hand side of 2ST (Fig. 14h). Upon completion of program step 4, the program is arranged to skip directly to program step 12. Here the operations relating to card 2 are completed during the 12th program step and during the step #1 immediately following, when the program restarts at step #1 before effecting another card feed. This skipping operation is rendered effective by means of a connection 438. This extends from one of the hubs related to program step 4, Fig. 14c, into the skip hub for program step #12, Fig. 14d.

While the skipping of the intermediate steps of the program is not essential in this particular calculation, the skipping is illustrated to explain the manner in which program steps can be skipped to the last step, together with the restarting of the program thereafter to the first step.

During program step 12 the following general operations are to be performed. Accumulator 6 will read out; the 6ST storage unit will receive such readings; punching of said amount into card #2 will be initiated; the #6 pilot selector will be picked up to effect control of coselector 5CS, which will thereupon become effective during the succeeding program step #1.

Wire 442 is connected from one of the #12 program steps, Fig. 14c, and joins wire 430 extending to the read out of 6AC, Fig. 14o, thus providing for read out from accumulator 6AC during the 12th program step. A connection, 444, extends from another hub of program step 12 to the read-in hub of storage unit 6ST, Figs. 14c and 14g. A third connection 443 extends from a program step #12 hub, Fig. 14c, to the "P" (punch) hub of storage unit 6ST (Fig. 14g). The above mentioned three plugwire connections thus serve to read the amount "H" from 6AC into storage unit 6ST, and initiate punching thereof. Plugwires 466 connect from readout hubs of storage unit 6ST, Fig. 14f, to "punching" hubs 72-75 (Fig. 14e). These plug connections are made for all positions of the punching field related to amount "H," except the left-hand order of such field.

It will thus be observed that the storage unit 68T will have been employed in connection with card #2 for the punching of the amount "F" originally computed, after which amount "G" is added into the accumulator 6AC, storage 6ST, is cleared, amount "H" is entered, and "H" is then punched.

The remaining hub of program step #12, Fig. 14c, is connected by a plugwire 440 to the digit pickup hub of pilot selector #6, Fig. 14v. The dropout hub of said selector is connected by wire 502 to read drop-out impulse hubs, Fig. 14v. Pilot selector #6 is used for altering the effects of program step #1, which immediately follows, since step #1 was also used for causing multiplication for card #1, as described, and such multiplication is not desired on card #2. This generally illustrates the manner in which the program may be repeated, with a different series of operations during the repeated sequence. Contacts of pilot selector #6 are not used directly in this instance, since, for additional clarity in Figs. 19a and 19b, use has been made of the contacts of a co-selector 5CS, which is coupled to pilot selector #6, and which operates in unison therewith, in the manner already described in connection with pilot selector #1 and co-selector 1CS coupled thereto. The coupling is accomplished by plugwire 439 inserted from the couple exit hub of pilot selector 6, Fig. 14w, to the pickup hub of 5CS, Fig. 14p.

The plugging for program step 12 has now been described completely and as has been explained, the program will immediately start to repeat its series of operations, beginning with step 1, since no card feed operation has yet been initiated. During the repeat operations of the program the program step #1 is employed to complete certain operations on card #2, including the read-out from storage unit 7ST into accumulator 6AC. The reason for this will be apparent when it is understood that storage unit 7ST is used to retain the summary total "M" of amounts "H" and "K," Fig. 18. Though, in the present example, no amount is yet present in 7ST, it should be pointed out that cards #1, 2 and 3 could be arranged in any order, followed by summary card #4. If, therefore, card #3 had preceded card #2, 7ST would contain the amount "K" during calculation of card #2, and the above mentioned transfer from 7STRO to 6AC entry would be useful to add the amount "K" to the amount "H" already present in 6AC. Returning now to discussion of plugging for program step repeat #1 of card #2; the read-in to 6AC is made effective by connection 307, previously traced, which extends from one of the #1 step hubs to join wires 420 and 436 extending to the plus entry control of accumulator 6AC (Figs. 14c and 14o). The read-out of storage device 7ST at this time is made effective through a wire 396, extending from step #1 exits Fig. 14c) to and through 5CS contacts 302R3, now shifted as described for co-selector 5, Fig. 14p, then via wire 441 to 7st readout hub, Fig. 14g. It will be recalled that co-selector 5CS is coupled to pilot selector 6 and since such coupling has been made, the contacts related to co-selector 5CS actually function during the #1 step when the program is repeated, even though they were initially set up during the preceding programming step #12. It will be noted by reference to Fig. 14p, that impulses from program step 1 exit hubs via wires 396 to co-selector 5CS contacts 302R3 and 302R4 are prevented from reaching wires 396 and 397 by the shifted condition of these contacts during card #2 operations. Since wire 396 (Fig. 14p and Fig. 14u) extends to the multiply hub and wire 397 (Fig. 14p) extends to the 2ST readout hub (Fig. 14h), these operations, already described for card #1, are prevented during calculation of card #2.

Figure 13:
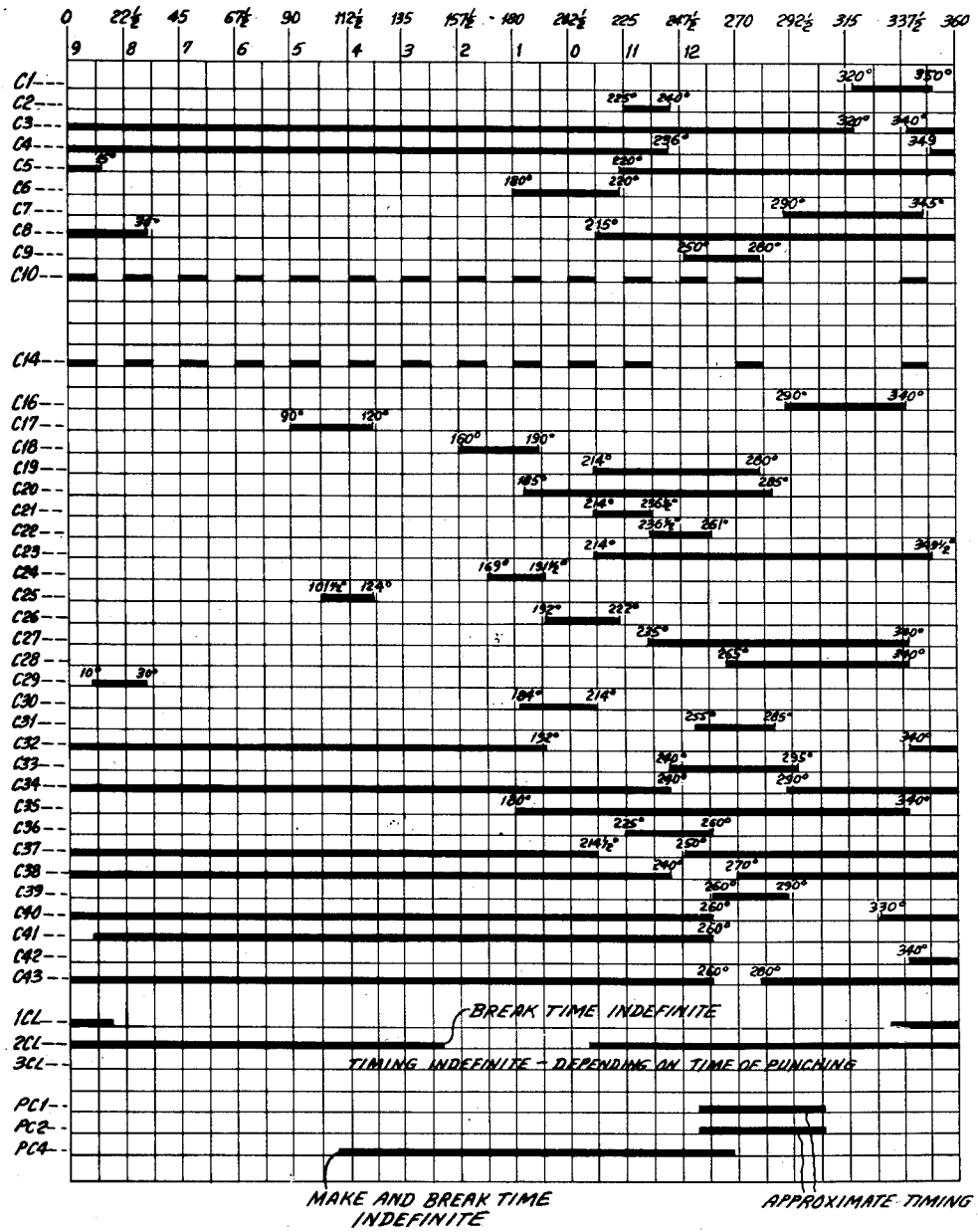
Figure 13 shows a timing diagram of the machine.

Program step #1 initiates card feed at the end of the cycle via a connection 335 which was described in connection with operations on card #1. Card #3 then feeds during the following cycle, during which cycle the remaining operations for card #2 are completed, and the necessary entries from the card #3 are accomplished, concurrently. When the read cycles hubs emit control impulses during feeding of card #3, it is necessary that they cause the following results: readout of accumulator 6AC; restoration and setup of storage unit 7ST, such setup, in this case, resulting in storage of the amount "H" received from 6AC; reset of 6AC concurrently with readout thereof. Concurrently with the above card #2 operations, though not related directly thereto, the factor "J" on card #3, Fig. 13, is to be read into 1ST.

Referring now to Fig. 14c, the SP (255–285°) impulse from line 320 continues through contacts 43R3, now closed; via wire 394 to pilot selector 1 "C" hub, Fig. 14w; to and through contacts 293R3, in the position shown, pilot selector 1 being inactive during card 2 operations; then by wire 392 to storage unit 7ST read-in hub, Fig. 14g. A second connection, 446, from the read cycles hubs, Fig. 14c, transmits an impulse to a C hub of pilot selector #4, not yet energized. The circuit proceeds to and through contacts 212R2, Fig. 14w, then by wire 447 to 6AC readout hub, Fig. 14o. A further connection 448 extends from a read cycle socket, Fig. 14c, to 6AC reset hub, Fig. 14o.

From the above, it is seen that the read cycles program step exercises the necessary control to read amounts from accumulator 6AC into storage unit 7ST, at the same time resetting 6AC. Further wiring is provided as shown by wires 470, Fig. 19b, to transfer the digitally timed impulses correspondingly to the amount "H" from 6AC counter exit, Fig. 14o, to 7ST storage entry, Fig. 14g.

Concurrently with the above, wires 330 and 331 transmit impulses from a read cycle hub, Fig. 14c, to the read in hubs of 1ST and 2ST, Fig. 14h. Before reading of card #3 begins, therefore, both storage units 1ST and 2ST restore and then take a new setup cycle while card #3 is being sensed by the card reading brushes. Storage unit 1ST, which is wired to receive information from columns 13, 14 and 15 of a card, enters the "J" amount or 79. 2ST, however, being wired to receive sensing impulses from columns 4 and 5, which are blank on card #3, is reset to zero.

The machine is now prepared to proceed with the division problem for card #2, as shown on Figs. 18 and 21.

*Dividing operations—general rules for dividing*

As explained before, the present machine on dividing operations functions in a manner described in the Brand and Adams application, Serial No. 50,574. Briefly the dividing procedure in the present machine is as follows:

The machine is provided with a table lookup relay section which can best be understood by referring to Fig. 14m. This circuit makes the selection shown by Fig. 31. The dividend is entered into a dividend accumulator, while the divisor is entered into a storage device. The machine then compares the highest order of the divisor with the highest order of the dividend or of the dividend remainder, and by the table lookup energization, determines a quotient digit. For example, if the dividend was 83059 and the divisor was 297 the highest divisor digit of "2" would be compared with the highest dividend of "8" and a "2" quotient digit multiple would be provided in the table lookup section.

Referring to Fig. 31, this shows, in an arithmetical manner, the way in which the highest order digit of the divisor is to be compared with the highest order digit of the dividend, and the number at the intersection shows the digital multiple of the divisor which is to be multiplied by the divisor to obtain an amount which is to be subtracted from or added to the dividend or dividend remainder. For example, taking the highest divisor digit as 8, and the highest dividend digit as 6, the multiple of the divisor which is to be used is the 1 multiple. When such a multiple of the divisor is selected and deducted from the dividend, it is obvious that an overdraft condition will be obtained. The figures chosen for the multiples have been selected after analysis which will give the most efficient overall operation of the machine. Taking a further example, using the same divisor 8 and highest dividend digit as 1, the multiple according to the table is .2 or two-tenths, and provision is made in the machine for taking into account the tenths by a column shift control. It will be further noted that in this table (Fig. 31), all of the multiples which are shown on the table include the digits 1, 2 and 5 only. This is done in order to utilize the same entries which were used on multiplication. Where the multiple is used as a .5 or five-tenths, the multiplication is by 5, and the tenths is provided for by a shift to the right one place farther than for the normal setting.

The circuits and relay contacts shown in the lower portion of Fig. 14m constitute an electrical interpretation of the table shown in Fig. 31. Considering the group of lines emerging from Fig. 14m at the lower left, these lines, it will be noted, extend to Fig. 14l where they are designated X0, X2, X2T, signifying two-tenths, X4 and X5T, signifying five-tenths. These are the desired output multiple circuits. Referring to Fig. 14m, the group of contacts associated with the relay 756-R—namely, contacts 756R1 to 756R9, inclusive, and specially wired contact 756R10, are associated with a divisor digit of 1, and such relay contacts will be closed whenever the highest order of the divisor is a 1. Thus, if the machine were dividing by a divisor having 1 in the left-hand order, the divisor 1 relay, 756R, would be energized during each dividing cycle. In the present example now being traced, the left-hand digit or the highest order of the divisor is 8, and in this case, accordingly, the relay 738R (see Fig. 14k) will be energized during the test portion of each dividing cycle, closing all of the contacts 738R1 to 738R-10 inclusive (Fig. 14m). The input lines at the right of Fig. 14m are connected to the readout of the dividend accumulators, as shown on Fig. 14m and Fig. 14n. The wires 453 extend from the left end of the dividend readout 1ACRO (Fig. 14n) to the relay contacts 732R1 to 732R9, as shown. The 732R10 contact is connected by a special wire 451. The output busses of the dividend accumulator readout connect to corresponding numbered buses or wires on the divisor look-up table relay arrangement; for example, wire 1, which connects to 732R1 lower contact, connects to the No. 1 bus of the dividend accumulator readout; and the No. 9 wire connecting to 732R9 lower contact connects to the 9 bus on the dividend readout. This is a 9 digit bus, and due to complementary action of the accumulator, represents the zero position of the accumulator. The 7 bus of accumulator readout connects to the contact 732R7 lower, likewise the 4 bus of accumulator 1ACRO connects to the fourth wire normally joined to the lower contact 732R4, etc. On Fig. 14m, relay contacts 732R1 to 10 are reversing contacts and if a positive number stands in the dividend accumulator, these contacts are in the position shown. If a negative number is in the dividend accumulator, the contacts will be shifted to reverse position. Either the true digit value of the number standing in the dividend accumulator or its nines complement value can be connected over to the contacts of the relays 735R, 738R, 741R, 744R, 747R, 750R, 753R, and 756R. It will be noted that the relay 738R functions for both a divisor digit of 7 or 8. The multiples on the table are therefore the same for both digits. For example, if a dividend digit is 4, and the divisor digit is 6, the circuit if traced out will come out on the output line marked ×5T, signifying a multiple of five-tenths, which corresponds with the table look-up, Fig. 31. Other figures can be similarly traced.

The Brand and Cunningham machine which has been previously referred upon dividing calculations required one accumulating cycle for LH components amounts to be deducted from the dividend and another accumulating cycle for RH components. A further complete machine cycle was required for comparing the dividend and the divisor and for setting up the necessary controls in accordance with such comparison. According to the present invention since the divisor multiples are only one, two or five, both LH and RH components can be entered in a single accumulating cycle when the dividend is being deducted. Furthermore in this same cycle after deductions have been made, there is sufficient time interval to compare the highest order of the dividend with the highest order of the divisor and to set up the necessary controls related thereto. While the comparison which is made according to the present invention is not as exact as in the Brand and Cunningham machine since occasionally an additional cycle (or cycles) is required to complete dividend reducing operations there is an over-all saving of machine time on dividing. The relative gain in speed is in the ratio 1:4 to 3:0. Accordingly the present machine on dividing has a speed over twice as great as the earlier machine.

Considering a problem with a dividend 833059 divided by a divisor 297, the first trial quotient digit is seen to be ×2 by reference to Fig. 31.

Having determined a quotient digit, the machine proceeds as follows: if the sign of the dividend is plus, as it is in the beginning of the above typical calculation, the machine proceeds to multiply the quotient digit times the divisor and this product is subtracted from the amount in the dividend accumulator. At the same time the quotient digit is added into a quotient accumulator. Proper column shift relations are provided for the subtraction of the dividend in the accumulator and for addition in the quotient accumulator. After this subtraction is effected, another comparison is again made between the highest digit of the divisor and the highest significant digit of the remainder in the dividend accumulator. In the problem under consideration the dividend remainder after the first operation is 239059 and the sign is plus. Again comparing "2," the divisor digit, with "2," the highest remainder digit, the quotient multiple is determined to be "1," see Fig. 31. This quotient digit is entered in the quotient accumulator and the "1" multiple of the divisor or the divisor itself is subtracted from the remainder in the dividend accumulator. Another comparison is again made by the table look-up device, in this instance, divisor digit of "2" as compared with "5." Here again, the quotient multiple is determined to be "2" but since the remainder in the dividend accumulator is now negative, i. e., −57941, the entry of the "2" multiple of the divisor, or 594, is made positively into the dividend accumulator instead of negatively as before. In the present instance, the "5" in the dividend accumulator is sensed one column to the right of the previous remainder so the shift circuits are altered accordingly. In entering the quotient multiple into the quotient accumulator the quotient is entered negatively instead of positively. The amount now remaining in the dividend accumulator for the above calculation is plus 1459. Comparing divisor digit of "2" with the highest dividend digit of "1" by the table look-up shows that the quotient multiple is .5. Since the quotient remainder in this case is plus, the divisor times .5 is subtracted from the dividend remainder. The quotient amount is again added. As a result of the foregoing operations the dividend remainder now becomes minus 0026. This amount is smaller than the divisor which would indicate that dividing operations are complete except that the result is negative and a correction is required to obtain a positive remainder. The machine then proceeds to additively enter 1×the divisor to the dividend remainder and "1" is subtracted from the quotient. This gives a final remainder result for the above calculation of "271" for the remainder and "2804" for the quotient.

The dividing rules may be summarized as follows: A quotient digit is selected by comparing the highest divisor digit with the highest digit of the dividend or dividend remainder. If the sign of the dividend remainder is positive the selected quotient digit times the divisor is deducted from the dividend amount. The quotient is additively entered. On the other hand, if the dividend remainder is negative in character, the selected quotient digit times the divisor is additively entered into the dividend accumulator and the quotient digit is subtracted. If the dividend remainder becomes less than the divisor and is positive, this signifies that division is complete. If less than the divisor and negative, the next step is to add back a "1" multiple of the divisor to bring the remainder to a positive amount. A "1" is correspondingly subtracted in the quotient accumulator.

The column shift controls always direct entries so that subtraction of divisor multiples from the dividend or dividend remainder will commence from the highest order of the dividend accumulator containing a significant digit. Corresponding column shifts must be made for quotient entries and for the typical calculation discussed above, these quotient entries would appear as follows:

*Quotient accumulator*

```
00000000
       2
────────
    2000
      +1
────────
    3000
      −2
────────
    2800
       5
────────
    2805
     − 1
────────
    2804
```

*Entries for #2 card*

When the #2 card is read, the dividend amount is entered into accumulators 1AC, 2AC, and 3AC, which together comprise one large accumulator and the divisor amount from the "E" field of card 2, Fig. 18, is entered into 1ST, Fig. 14k. The amount which is to be cross added is directed into 2ST. When the #2 card is being read, relay 5R, Fig. 14a, is energized in the manner previously described to set up the program relays, particularly 43R, (Figs. 14d and 14c) to close relay points 43R3 to 43R11 inclusive, Fig. 14c. The all cycles impulse SP proceeds through 43R5, Fig. 14c, now closed, to plugwire 339 (see also Fig. 14h) to energize latch magnet 171 pertaining to the 1ST device. Accordingly this can be cleared so as to receive the divisor. The EC impulse through the same circuit proceeds also to relay 664R, Fig. 14h, through the now closed 704R7 contacts. Another circuit from relay contacts 43R5, Fig. 14c, flows through plug-wire 331 to Fig. 14h, through 144R2 contacts, now closed, to energize latch magnet 171 pertaining to the 2ST storage device so that it may be cleared. The EC all cycles impulse through 43R6, Fig. 14c, flows via the wire 427 to Fig. 14o and 14p, to condition the 1AC, 2AC and 3AC accumulators for a plus operation by energizing "Plus" relays 418R, 427R and 458R. Referring now to Fig. 14k, relay contacts 664R1 through 8 are now closed. Impulses representative of the divisor flow in via plug connections 301 from the brushes, Fig. 14j, to energize and latch significant digit relays 676R and 677R. The related 164 magnets in 1ST are also energized to set up the amount of the divisor in the storage device 1ST. The entry circuits for the dividend entries proceed via plugwires 415 back from Fig. 14r to Fig. 14j. It will be understood that relay 333R is energized at this time to close circuits to the brushes. The amount "G" as read from the card, flows through the 431 plugwires from Fig. 14j to Fig. 14h and energizes the 164 magnets to set up the 2ST storage with the amount in Field G.

The reading brush pertaining to the first column has detected a "4" control perforation in card 2 and at index point 4 a circuit is established through plug connection 302, Fig. 14j; through emitter EM3, Fig. 14g, to the "4" segment; out via wire 425 to Fig. 14p to cause energization of pickup coil 299R which is then held in the customary manner. The energization of relay 299R which is otherwise termed co-selector 3CS, Fig. 14p, has now set up a control telling that the operation is to be one of dividing. On such dividing operation, program step 1 is omitted and the program will immediately proceed to program step 2. Cam contact C14 provides an impulse through relay contacts 704R9, Fig. 14s, at the "11" index time of the same cycle, which impulse flows via wire 423 to emitter EM#2, Fig. 14g, and out through the "11" spot to wire 424 which extends to Fig. 14p, and is there connected to the 3CS co-selector, which impulse flows through 299R2 contacts, now shifted, and out via plugwire 426 to Fig. 14d, entering the program unit at the skip hub for step 2 of the program. This impulse proceeds through 76R1 contacts, now closed, through 47R2 to pickup coil 48R. A stick circuit is established in the usual manner and at 240° of the reading cycle current can flow through 5R2, in the position shown; 42R2 shifted; 41R3, in the position shown; down to contacts 73R3 and then up through the various contacts 71R3, etc; to relay contacts 48R3, now shifted; to program relay 49R. 49R closes contacts 49R3 to 49R6 (Fig. 14c) pertaining to the second program step to make the exit hubs of that step emit all cycles impulses. Program step 2, it may be stated, is the program step allotted to division. The SP impulse through relay contacts 49R3, Fig. 14c, flows via wire 422 to Fig. 14u, and thence through the relay contacts 636R4 and 629R2 to energize the divide start relay 632R (pickup coil). A stick circuit is established for 632R hold coil through a circuit beginning at cam contact C28, Fig. 14t, through 628R4, 626R6, 623R11, all in the position shown; through 632R1, now shifted, to and through hold coil 632R. Energization of 632R completes a parallel circuit through 632R2, Fig. 14u, to energize pickup coil 629R, whereupon contacts 629R2 shift to prevent further pickup impulses to 632R pickup. The above circuit insures that the divide start relay 632R will only operate on the first divide cycle but will permit 629R to operate on multiple machine cycles during dividing operations. A stick circuit is provided for 629R hold coil through stick contacts 629R1, Fig. 14u.

During dividing operations provision has to be made to determine the columnar magnitude of the divisor, particularly the columnar order of the highest significant digit of the divisor in its storage device. This is necessary because the size of the divisor determines the maximum size of the dividend for which a quotient may be calculated. The shift circuits utilized throughout the machine provide for a maximum of 7 shifts. Therefore the size of the dividend should not exceed the size of the divisor plus 7 orders. Upon entry of the divisor amount into 1ST, Fig. 14k, latch type relay 676R and 677R are energized and latched up owing to the entry of significant digits into the units and tens orders of 1ST. This follows a similar procedure described for multiplication.

Figure 14T:
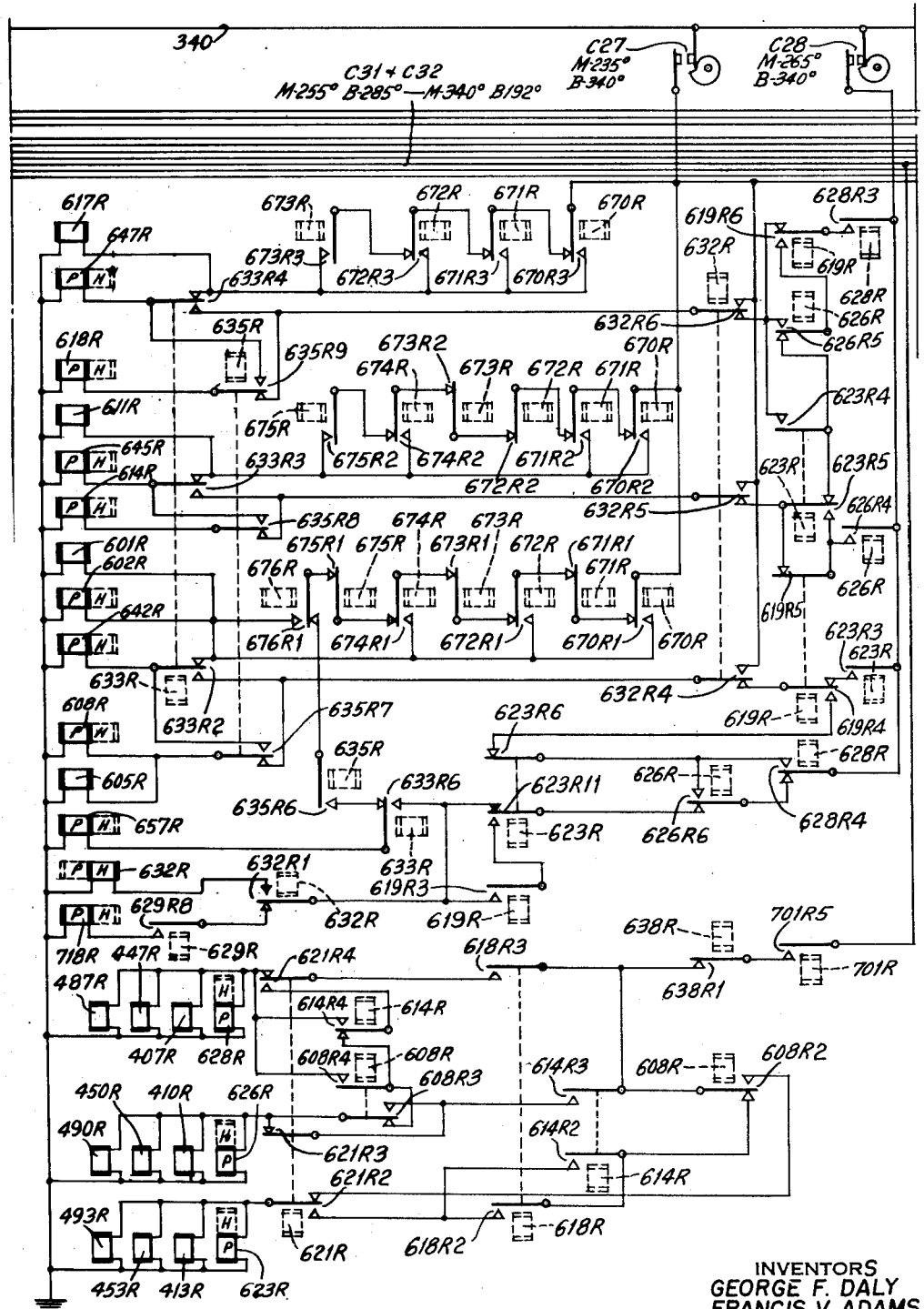
Figure 14U:
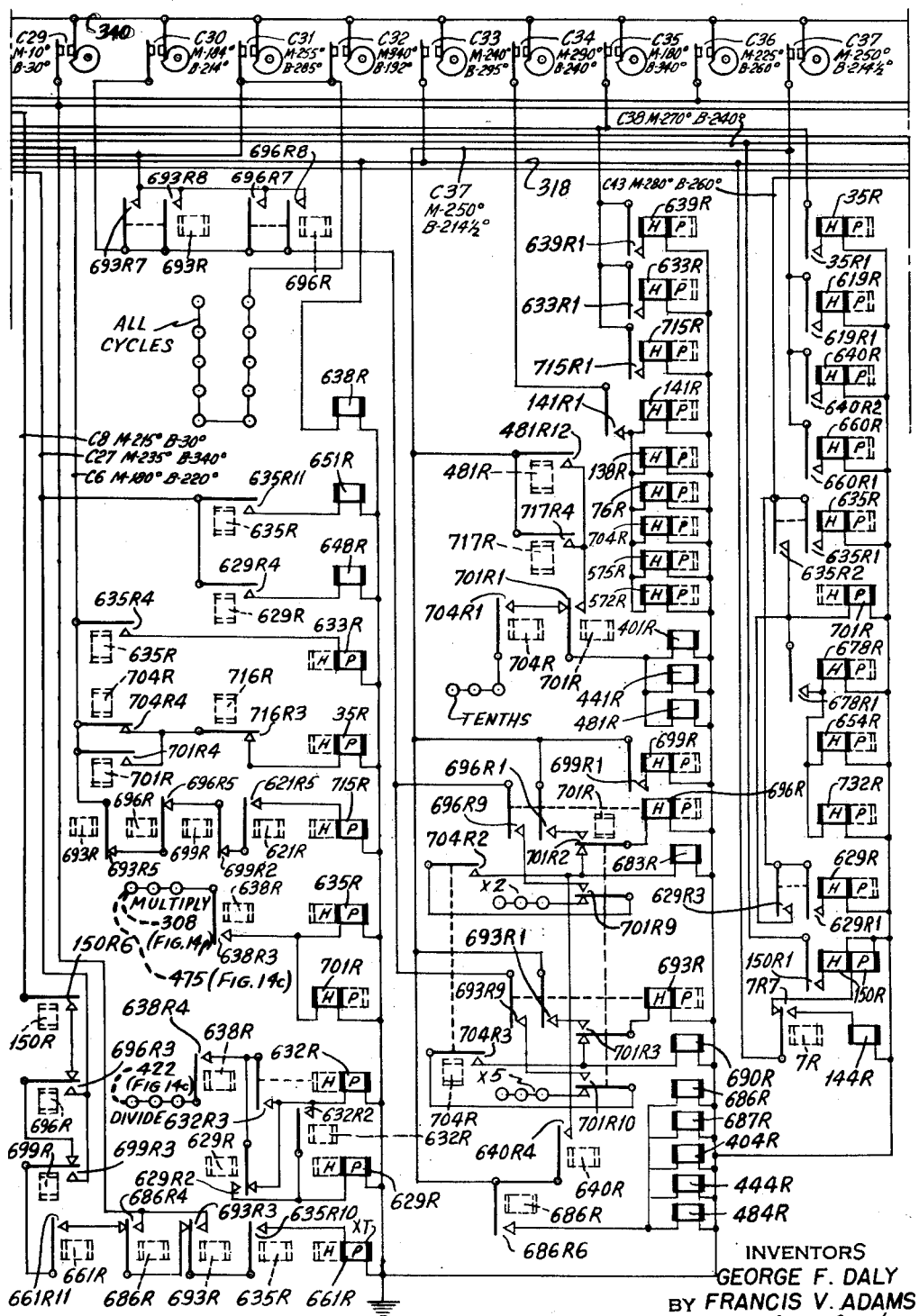
Figure 14V:
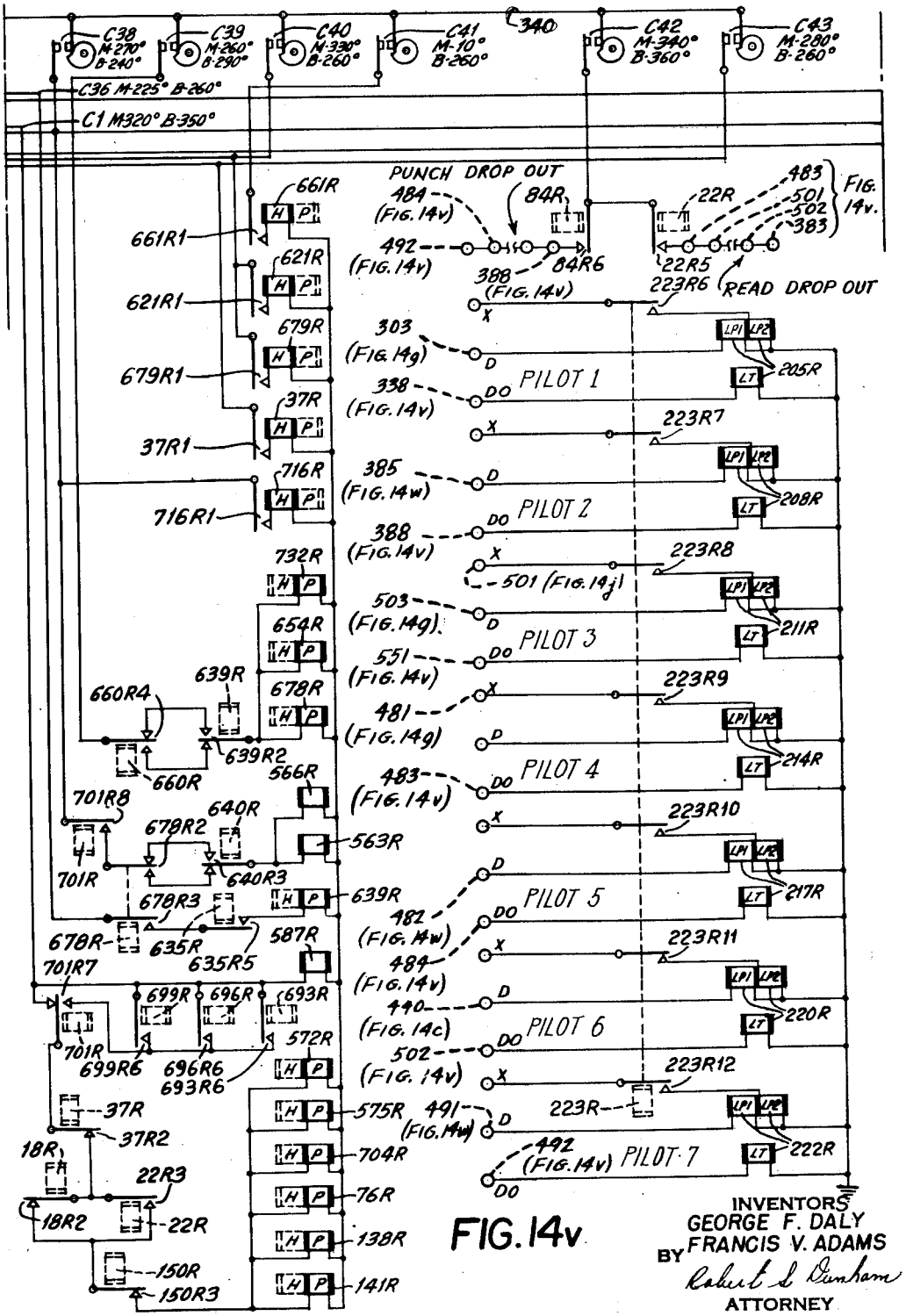
Figure 14W:
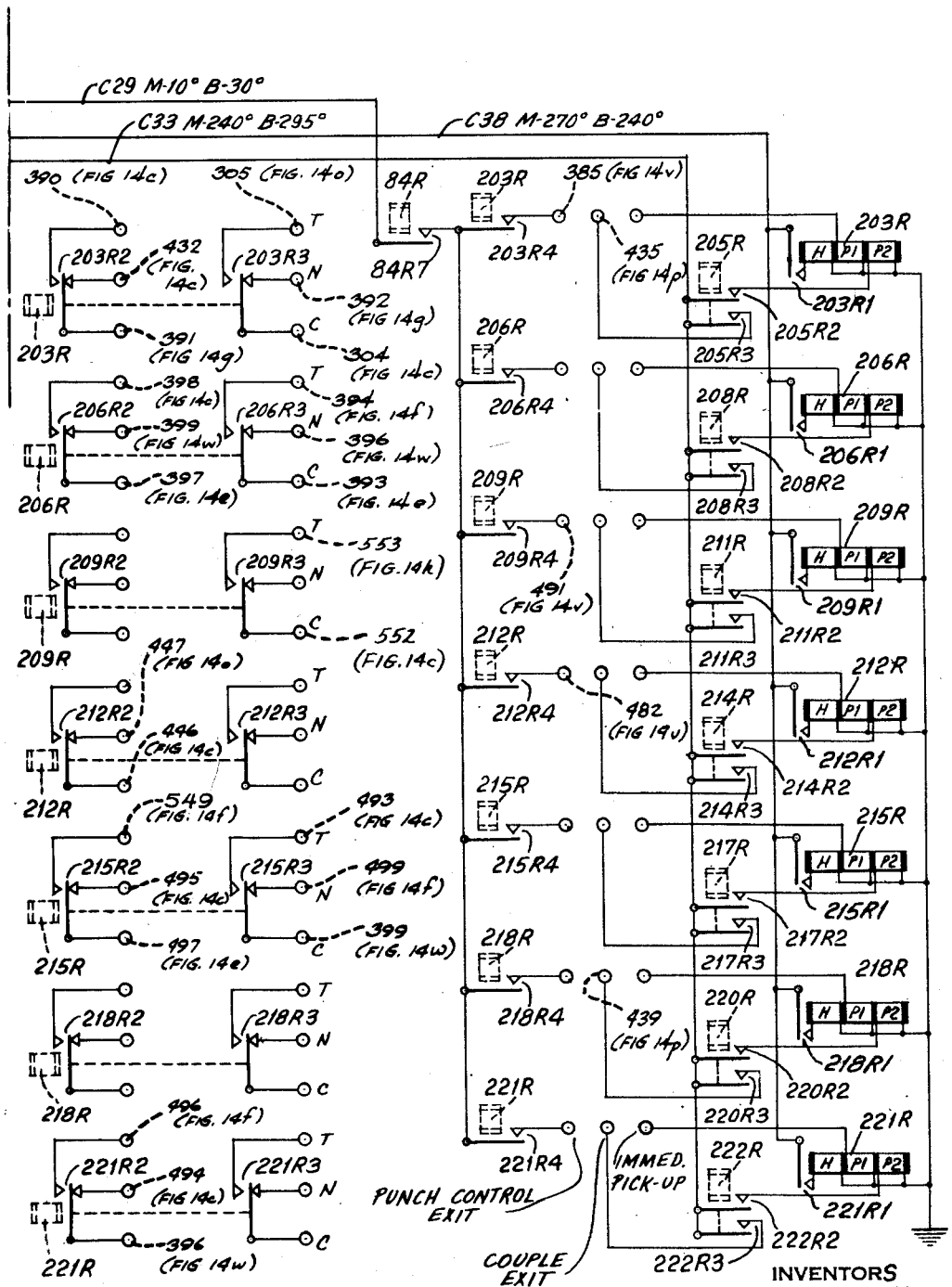

Referring to Fig. 14t, at 235 degrees preceding every calculating cycle on dividing, cam contacts C27 close, and establish a circuit via relay contacts 670R1 through 675R1, all in the position shown, then through now shifted contacts 676R1, to energize the dividend test offset relays 601R, 602R, and multiplier test offset No. 1 relay 642R, the latter relay being energized through the 633R2 relay contacts, in the position shown. The holding circuit for 642R is provided by stick contacts 642R1 (Fig. 14s). Provision is made for energizing shift control relays 618R, 614R, 605R and 608R (Fig. 14t) which are related to the shift No. 4, shift No. 2, and shift No. 1 operations. This is done following closure of cam contacts C27 at 235 degrees, by a circuit through 632R6, now shifted, through 635R9, as shown, to 618R pickup. Another circuit is completed through 632R5, shifted, through 635R8, as shown; to 614R pickup. A further circuit is established through 632R4, shifted, through 635R7, in the position shown; to the 608R pickup coil. 605R is also energized at this time. The relays just described are maintained energized by stick contacts 618R1, 614R1, and 608R1, Fig. 14s.

At 235 degrees, under control of cam contact C27 (see Fig. 14u), a circuit is completed through the 629R4 contacts, now shifted, to energize relay coil 648R. This circuit is made and established during each machine cycle upon division. Referring to Fig. 14k, if relay contacts 648R1 through 9 are in the position shown, the 1-ST-RO will be connected to the emitter EM1 (Fig. 14j) through wires in cable 370. If, on the other hand, 648R is energized, shifting related contacts to reverse position, the busses of 1-ST-RO will be connected to divisor relays 756R, 753R, 750R, 747R, 744R, 741R, 738R, and 735R. Generally stated, these relays are the control relays for table look-up operations.

The previous setup of relay 642R (multiplier test offset relay No. 1) has determined that the order of 1-ST-RO to be tested is the tens order. With 642R energized, upon closure of cam contact C16 at 290, Fig. 14k, a circuit is established through contacts 150R5 and 661R2, in the position shown; through 648R12 contacts, now shifted; through 647R3 and 645R5 contacts, in the position shown; through now shifted 642R11 contacts; through 123R7 contacts, as shown; to the tens order of 1-ST-RO, thence out via a brush standing on the 8 segment, through the now shifted 648R8 contacts to a wire in cable 450, thence through relay 738R. This relay, it may be explained, is utilized for divisor digits 7 and 8. With 738R energized, relay contacts 738R1 through 738R10 (Fig. 14m) will be shifted.

At 290 degrees of the same cycle, a circuit is also established through 150R5 (Fig. 14k) to energize relay 679R (pickup). This relay, being energized, is held energized through stick contacts 679R1 (Fig. 14v).

Referring to Fig. 14n, on all dividing operations there is initial concurrent shift of shift control relays #4, #2 and #1, namely, related relays 618R, 614R, 608R and 605R. With these relays all energized in the manner described, there is a columnar shift of 7 columns to the left. However, the columnar magnitude of the divisor has also been tested, and divisor test offset relays No. 1, i. e., relays 601R and 602R have also been energized. Such relays, when energized, will provide for an additional shift to the left, making 8 columnar shifts in all. The subsequent test will, therefore, be extended to the ninth order of the dividend accumulator considering units order as 1.

It has been mentioned that with a maximum shift of 7 places provided, the dividend size cannot exceed divisor orders +7, or 2+7=9, in this example. With the aforementioned relays set up, upon closure of cam C16 at 290 degrees machine time, a circuit is completed through 648R10, Fig. 14n, through 618R5, now shifted; through 617R1, as shown; through 614R9, now shifted; through 611R5, as shown; through 605R5, shifted; through 602R7, shifted; and down to the dividend readout in the ninth order thereof. This particular order of the accumulator contains a zero (see example, Fig. 21), as evidenced by the accumulator wheel standing at 9, so the circuit is extended through wire 451 to Fig. 14m, through relay contacts 732R10, as shown; to relay contacts 738R10, now shifted; out via wire 452 to Fig. 14l, through relay contacts 618R4, now shifted, thence to and through relay coils 622R and 621R. Energization of relay 622R provides for immediate shift of one place to the right when the presence of a zero is detected in the tested order of the dividend accumulator. The purpose of relay 621R is to similarly control a shift of one place to the right in the dividend and quotient accumulator entry circuits. When relay 622R1 contacts are closed (Fig. 14n), the test circuit previously described extends through the shifted 618R6 contacts, through 617R2 contacts, as shown; through shifted 614R10 contacts; through 611R6 contacts, as shown; through 605R6 contacts, shifted; through shifted 602R8 contacts, and down to the eighth order of the dividend accumulator read out 2ACRO. A zero also stands in this order of the accumulator, represented by a wheel position 9, so the circuit proceeds as previously traced back to relays 622R and 621R (Fig. 14l). Since the above described test circuits provide for the testing of a maximum of 2 orders in succession, an idle cycle must now ensue before a further test can be effected. Referring to Fig. 14u, since none of the relays 696R, 693R, or 699R have been energized by the preceding test, but since relay 621R is energized, a circuit will be established through the now shifted 621R5 contacts and the other contacts in the position shown to the left, to energize idle cycle relay 715R (pickup coil). This relay is held energized through stick contacts 715R1.

With 715R2 shifted (see Fig. 14l) right center, the circuit is completed at 225 degrees from cam C36, through 679R2 contacts, now closed; through 715R2, 629R7, now shifted; to the pickup coil of 619R. This is the shift plus one control relay previously referred to in multiplication.

Before describing the control on shift, which is provided for by the shift plus one relay 619R, it may be mentioned that provision should be made to delay advancing of the program so that all cycles impulses (Fig. 32) will be repeatedly emitted from program step 2 to perform further dividing operations. Referring to Fig. 14u, cam C43 at 280 degrees, establishes a circuit through the 629R3 contacts now shifted to energize the pickup coil 701R. With 701R4 closed, a circuit is established from cam C6, at 180 degrees, through 701R4, now closed, and 718R3, as shown, to program delay relay pickup coil 35R. This program delay relay now functions in the manner described for multiplying operations to delay further stepping of the program. It may be briefly mentioned that opening of contacts 35R2 (Fig. 14d) interrupts the circuit to the 42R program stepping relay magnet. When cam contacts C32 close at 340 degrees, prior to the first dividing entry cycle, a circuit is completed (Fig. 14t) to contacts 701R5, now closed, 638R1, in the position shown, 618R3, now closed, 621R4, in shifted position, 614R4, now shifted, to energize shift 4 relays 497R, 447R, 407R, and 623R pickup coils. At the same time a parallel circuit may be traced through relay contacts 614R3 and 608R3, both in shifted position, to energize shift No. 2 relays 490R, 450R, 410R and 626R (pickup coil). No circuit is available to energize shift No. 1 relays owing to the shifted position of contacts 621R2 in the related pickup circuit. Shift 4 relay 623R and shift 2 relay 626R hold by means of their hold coils and respective stick contacts 623R1 and 626R1 to cam contacts C35, Fig. 14s. The above operations described column shift operations in the machine cycle wherein no entries were made into the dividend accumulator. Since there are no entries into the accumulator, none of the relays 699R, 696R and 693R will be energized, inasmuch as there is no multiplication by 1, 2 or 5. With calculating relay 701R energized, relay contacts 701R7 will be shifted and there will be, accordingly, no circuit to set up relays 141R, 138R, 76R, 704R, 575R, 572R (see Fig. 14v). Accordingly, the related open condition of the contacts pertaining to these relays (Figs. 14o and p) prevents accumulator entries by interrupting the impulses to accumulator plus and minus relays. At 265 degrees of the aforementioned idle cycle, when cam contacts C28 close (Fig. 14t), a circuit is established through 628R3, shifted; through 619R6, shifted; through 626R5, shifted; through 632R6, as shown; through 635R9 as shown to shift control #4 relay, 618R pickup coil. At the same time a further circuit is established through 623R4, in shifted position; through 626R6, in shifted position; through 623R5, in the position shown; through 619R4, in shifted position; through 632R4, as shown; to and through 635R7, as shown; to relay coils 608R and 605R which pertain to shift control 1. Relays 618R and 608R are retained energized through their related stick contacts 618R1 and 608R1. Referring to Fig. 14n, it may be mentioned that the dividend test offset #1 relays 601R and 602R are energized on each machine cycle during division by the circuit previously traced. Since relays 618R and 605R are now energized, as well as 601R and 602R, the next test impulse flowing in through 648R10, now shifted, Fig. 14n, will eventually reach the seventh order of the dividend accumulator through 632R9, now shifted. With a zero present in this order, the accumulator wheel standing on 9, the circuit is completed back through the line 451 and through the path previously traced to energize relay 621R and relay 622R (Fig. 14l) again. With relay 622R energized, another test is immediately made of the dividend accumulator readout in the sixth order, in which a zero is again encountered. Since this is the second zero that has been sensed in the given cycle, another idle machine cycle ensues. This reestablishes the shift control relays to set up shift control relays Nos. 2 and 1, relays 614R and 605R respectively. At the end of such idle cycle, there is another test of the dividend accumulator readout in the fifth order, in which another zero is present. Relay 622R and relay 621R are therefore again energized. Immediately upon closing contacts 622R1, a test circuit is completed for the fourth order of the dividend readout, where a significant digit of 6 is indicated by an accumulator position of 3 (Fig. 14n). Current flows through the 6 bus to Fig. 14m, through contacts 732R6 pertaining to the table look-up arrangement, through 738R3, now in shifted position, through the labyrinth wiring to the left to wire 454, to and through the times 1 relay 699R (pickup coil), Fig. 14l.

With the digit multiple of the quotient determined by the look-up circuits, according to the dividing rules, the machine will subtract the amount of divisor from the amount in the dividend accumulator. This necessitates certain supplementary controls. The entry in the dividend accumulator is to be negative; the entry in the quotient accumulator is to be positive; further provision must be made to energize the readout relay 123R for 1STRO; the shift relays must be set up for the dividend and quotient accumulator entries.

Referring to Fig. 14c, on the second step of the program, the EC impulses flow out through the closed 49R6 contacts, to wire 419, thence to Figs. 14o and p, to the minus hubs of accumulators 1AC, 2AC, and 3AC. These impulses will condition these accumulators for minus operation. Another wire 420 from contacts 49R4 in program step 2 (Fig. 14c) extends to Fig. 14o, to the plus socket of the 6AC accumulator, which is intended to receive the quotient entry.

In order to set up the column shift, referring to Fig. 14t, it will be recalled that relays 614R and 608R (shift control relays No. 2 and No. 1) were set up to test the highest significant dividend digit. These relays, when energized, shift contacts 608R3 and 614R3 (Fig. 14t), to reverse position from that shown, causing the shift 2 relays 490R, 450R, 410R, and 626R pickup to be energized. No further shift relays can be energized because of the concurrently shifted contact 621R4 and contact 621R2.

Referring to Fig. 14c, the EC impulse flowing through program step 2 contacts 49R5 flows via plugwire 421 to Fig. 14h, thence through now closed 138R2 contacts, to relay 123R, the readout relay for 1STRO (Fig. 14k).

Energization of the read-out relay 123R (Fig. 14k) prepares the machine to read-out of the storage device 1STRO which contains the divisor. The read-out from this device at this time will be a multiple of the divisor which is to be entered negatively to the dividend accumulator 3AC. Referring to Fig. 14j, since the ×2 and ×5 relays are now deenergized, the timing of pulses impressed on the wires of cable 370 will be the normal or ×1 impulse values and during the ensuing cycle ×1 the divisor is to be entered subtractively into the dividend accumulator total setting 1STRO. Closure of relay contacts 123R1 to 8 inclusive, upon energization of 123R, shifts the contacts 123R1 to 8 inclusive, Fig. 14k, and during the first dividing cycle impulses flow from emitter EM1, Fig. 14j, through the contacts of the ×2 and ×5 relays in normal position to the cable 370 which extends to the read-out device 1STRO and thence via contacts 123R7 and 123R8 and out via the plugwires 454 and 455 to the co-selector contacts, generally labeled 2CS on Fig. 14p, through the relay contacts 298R3 and 298R4 now in the position shown and via plugwires 456 and 457 to the sockets of accumulator 3AC, as shown in Fig. 14r. From these hubs entry circuits extend to the 3AC accumulator. The operation of the accumulator circuits 3AC is in all respects identical to the operation of accumulator circuits for 6AC, as has been described for a multiplying operation.

Entry of the ×1 multiple of the divisor, namely 82, is made subtractively into the dividend accumulator 3AC from the divisor setting on 1STRO. Concurrently with the negative entry of 1 times the divisor into the dividend accumulator there is to be a positive entry of the corresponding digit of the quotient into the quotient accumulator. Both of these entries will be effected concurrently as shown by the second line of Fig. 21.

As has been noted above with reference to Fig. 14j both the ×2 and ×5 relays 683R and 690R will be deenergized during this cycle. The quotient impulse will flow out through emitter segment 1, Fig. 14j, through contacts 683R1 and 690R1, as shown, and through contacts 629R10 now closed to a so-called quotient hub, shown in the upper left corner of Fig. 14j, thence via plugwire 429 which is connected by shift circuits to enter a 1 in the hundreds order of the quotient accumulator. It will be understood that shift 2 relay 490R will be in shifted position. The shift 2 relay makes possible a quotient digit entry in the hundreds order of the quotient accumulator 6AC in identically the same manner as the lowest order digit of the divisor multiple is entered in the hundreds order of the dividend accumulator. It should be emphasized, as has been noted above, that the entry in the dividend accumulator of the divisor multiples is a negative entry to subtract this multiple out of the dividend and that the entry of the corresponding quotient digit is a positive entry.

Referring to Fig. 21, the arithmetical value in the dividend accumulator is minus 1642 at the end of the foregoing operation. The amount in the quotient accumulator is 100. The actual accumulator setting will be as indicated with zeros to the extreme left in the dividend accumulator and nines to the extreme left in the quotient accumulator. The dividend accumulator must now be tested to ascertain whether or not a negative number is therein. Such negative sign is indicated by the highest order accumulator wheel being positioned at zero. Since the negative balance test is to be made before carry movement occurs, however, such negative sign may also be indicated if the highest order wheel stands at 9, and a carry impulse is directed to the "Go" magnet of said wheel (to move it to zero). In the present example, if a carry impulse reaches the highest order position of 1AC, Fig. 14q, with relay contacts 421R9 in the position shown, such carry impulses will also flow via a wire in a cable 461 and across to the left-hand side of Fig. 14n; thence through the dividend balance test relay contacts 590R3, now shifted, to the 9 spot of the readout in the highest order position of 1ACRO; thence through the common ring of this read-out, via wire 462 through contacts 424R1, now in position shown; contact 590R1, now closed (Fig. 14m); to and through relay contact 629R6, now shifted (Fig. 14l), to energize the pickup coil of the sign change relay 660R. Thus, a negative balance condition is detected on the dividend accumulator sections 1AC, 2AC and 3AC concurrently with the transmission of the impulse which is actually to effect carry in such accumulators. This advance sensing of a negative balance prior to carry is necessary to afford time in the cycle for the setup operations in preparation for the next dividing cycle. Dividend balance test relay 590R is energized during every machine cycle when cam contacts C22 (Fig. 14s) close between 236½ degrees and 261 degrees.

Energization of sign change relay 660R initiates a series of relay operations on the relays 678R, 566R and 563R (Fig. 14v) which is identically the same as was described in connection with sign change when multiplying, the ultimate effect of such change being to make an accumulator subtract if it be plugged to add, and vice versa. It will be recalled that in such a case on multiplying, a sign change becomes effective and is maintained during one or more cycles until reversed by indication of a second sign change in response to the working of the multiplier rules relays. When dividing, however, the sign change is effective only for one cycle, and the status of the dividend accumulator is tested late in every dividing cycle to re-establish whether such change be necessary. Referring to Fig. 14v, the multiply relay contacts 635R5 will be open during all dividing operations, and accordingly, the circuit extending from cam contacts C36 through contacts 678R3, etc. cannot be completed for a dividing operation. In such a case, upon opening of cam contacts C38, which has served to energize the sign reverse relays 566R and 563R, these relays will deenergize and the master circuits which are directing accumulator entry, as shown at the upper portion of Fig. 14o, will return to normal setting after one negative entry cycle with respect to the dividend accumulator. Accordingly, a reversal of accumulator entry will not last for more than one cycle unless sign change relay 660R be again energized, in other words, during dividing operations, the status of the dividend entries during any following cycle may be positive or negative.

It will be recalled that during the process of reducing the dividend, multiples of the divisor are chosen and entered, each such multiple being subtracted from the dividend accumulator and the corresponding factor being added into the quotient accumulator, thus, for example, in the present case, at this point, 82×1, or one times the divisor, has been subtracted from the dividend and the corresponding quotient digit 1 has been added into the quotient accumulator 6AC.

Upon completion of this cycle, the negative balance test traced above indicates that the sign of the dividend has changed, and this condition determines that during the ensuing cycle a positive entry of the next divisor multiple is to be made in the dividend and a corresponding negative entry of the quotient digit is to be made concurrently into the quotient accumulator 6AC. This rule applies irrespective of the value of such quotient digit, which is to be chosen by the look-up table circuits.

The dividend remainder as tested has been found to be negative. For table look-up purposes it must be treated as a positive amount. Referring to Figs. 14m and 14n there are shown a series of relay contacts 732R1 through 10 inclusive. When these contacts are in the position shown, the true amount standing on 1ACRO through 3ACRO is compared with the divisor amount. On the other hand, if these relay contacts 732R1 through 10 are in shifted position, the divisor amount will be compared against a complement of the high order amount in the dividend accumulator. This is a condition which is necessary under a dividend over-draft condition changing the status from positive to negative. The manner of energization of relay 732R will now be described:

Relay 660R (Fig. 14l) is energized on the sign change as has been described above. When this relay is energized the contact 660R4 (Fig. 14v) is shifted and the circuit extending from cam contacts C39 which makes at 260° completes a circuit through 660R4 now shifted to 639R2, as shown, to energize the pickup coil of relay 732R. The stick circuit is established through contacts 678R1 of another relay to 678 which is wired in parallel with 732R (Figs. 14u and 14v). This stick circuit is completed from cam C40 via dividing relay contacts 628R3. The next test to be performed by the division look-up unit is to compare the divisor digit 8 with the highest digit of the dividend remainder (—1642 arithmetical value) (see Fig. 21). Relay 738R is energized in the manner previously explained in each dividing computation. With this relay energized and if the circuits are traced through the table look-up with relay contacts 738R1 closed and with relay 732R energized, the proper multiple will be the ×2 of the divisor. Current will flow from the #1 bus of the 1AC read-out (Fig. 14n) to and through the 732R1 contacts, now shifted (Fig. 14m), to and through the 738R1 contacts, now shifted, out via line 464 (Fig. 14l) through contacts 718R2, as shown, to energize relay 717R which is the tenths pickup relay. Upon energization of this relay 717R, contacts 717R1 close to provide a parallel circuit to energize the pickup coil of ×2 relay 696R.

Multiplication by times two follows in the general manner previously fully described for multiplication, except that the tenths pickup relay 717R completes a circuit in Fig. 14u through 717R4, and 701R1 in shifted position to energize the tenths relays 401R, 441R and 481R. The function of these relays has heretofore been described, and will be obvious from inspection of Figs. 14q, r and s. With these relays energized, the entries into the dividend and quotient accumulators all occur one column to the right of that which is provided by the usual column shift relays. The entry in the dividend accumulator will be as shown in Fig. 21, line 4, #2 card section. At this time, a minus two quotient digit is entered with a tenths column shift correction. The entry impulses into the quotient accumulator are indicated in Fig. 16, lower section, by the subtract two times one entry. The digit "Go" impulse is transmitted from the emitter EM1 No. 3 index spot at 135 degrees, Fig. 14j, through contacts 683R1, shifted, 690R1, as shown 629R10, shifted, "quotient" hub and wire 429.

The dividend accumulator receives a complement of 1640, since this accumulator is now conditioned for adding, and at the end of this accumulator cycle, the setting would be a series of zeros with a 2 in the units position, following carry, as shown in the fifth line of Fig. 21 relating to card No. 2. A balance test is made as before, and said balance test indicates that the dividend accumulator is still negative.

During cycles 1 and 2 of the numerical example, Fig. 21, the division table look-up test has been made with reference to the thousands order of the dividend accumulator. At the end of cycle 2, the thousands order of the accumulator is reduced to a digital value zero, so that in the manner described during the initial idle cycles, the quotient digit look-up test is immediately shifted one position to the right by action of relays 622R and 621R to sense the hundreds order of the dividend accumulator. Since the hundreds order of the dividend accumulator contains a digit value of zero as well, no further tests can be made at this point, and an idle cycle ensues. Following the idle cycle, designated cycle 3 in the example on Fig. 21, the usual quotient digit test is directed to the tens order of the dividend accumulator. In this instance, the dividend test shift through shift control relays SC1, SC2, and SC4, represented by relays 605R, 614R, and 618R (Fig. 14m) is made with no shift offset, owing to the normal condition of all the above relays.

It has been stated as one of the basic dividing rules, that the presence of a dividend remainder smaller than the divisor indicates completion of the division calculation. This may be determined either by the selection of a tenths quotient digit under such circumstances, or by the detection of a zero in the tested order of the dividend accumulator. In this example, the tens order of the accumulator contains a digit value zero, so that a division termination circuit may be traced from cam C16 (Fig. 14n), through contacts 648R10, now closed, and contacts 618R5, 617R3, 614R11, 611R11 and 605R11, all in the position shown; then to and through relay contacts 601R2, now in shifted position, to the tens collector ring of accumulator 3AC. With the designated accumulator wheel positioned at zero, the circuit is traced through the zero accumulator bus to contacts 732R10 (Fig. 14m). With contacts 732R10 in shifted position owing to the negative condition of the dividend accumulator, the circuit continues through contacts 738R10, to wire 452, thence through contacts 608R10, Fig. 14l, now in the position shown, contacts 718R1, closed in a manner to be described subsequently, to energize divide end relay 716R (pickup coil). A hold circuit is established (Fig. 14v) from cam C38 through stick contacts 716R1 and hold coil of 716R to ground.

Because of the presence of a negative amount in the dividend accumulator at the time that completion of division is indicated, it is necessary to apply a correction cycle, as mentioned in the general discussion. For this purpose, the last mentioned circuit is extended through contacts 716R2 (Fig. 14l), now in shifted position, and through the now shifted negative balance relay contacts 654R12, to energize times 1 relay 699R (pickup coil). The foregoing circuit is based on the premise that quotient units relay 718R is energized at the time of such test. It may be generally stated that the quotient units relay 718R is energized whenever the shift circuits have progressed to the right to a position of no offset. At such time, a circuit exists from cam contacts C28 (Fig. 14t), to and through contacts 628R4 and 626R6, in the position shown, through 623R11, now in shifted position, then through contacts 619R3 now shifted, thence through contacts 632R1, now in the position shown, and shifted contacts 629R8 to energize the pickup coil of quotient units relay 718R. With the times 1 relay 699R (Fig. 14l) energized as previously described, the divisor amount times one, or the divisor itself, is entered additively into the dividend accumulator. Concurrently, the quotient is entered negatively into the quotient accumulator 6AC.

Termination of dividing operations is effected under the control of the divide end relay 716R, which has been energized in the manner previously explained. Opening of contact 716R3 (Fig. 14u) prevents energization of the program delay relay 35R during the last mentioned times one correction cycle, so that at the end of such cycle, the program circuit is permitted to advance from step 2 to step 3 upon the return of contacts 35R2 (Fig. 14d) to the position shown.

The quotient amount standing in the 6AC accumulator is now to be transferred into 6ST storage unit in order that the quotient amount "F" may be subsequently punched. The third step of the program circuit has been connected by wire 430 (Fig. 14c), which extends to the readout control hub of accumulator 6AC, in this case the quotient accumulator (Fig. 14o). An impulse transmitted along this line will serve to energize the readout relay 513R associated with this readout device. Simultaneously, a circuit extending via plugwire 432 from the third step program (Fig. 14c) extends to the "N" contact of the No. 1 pilot relay (Fig. 14w). The circuit continues to the C hub through the contact 203R2, and thence via a plug connector 391, (Fig. 14g) to the read-in control of storage unit 6ST. Thus, during the third program step, the quotient is transferred out of 6AC and into 6ST, using the controls and plugging connections just described. The detail circuits need not be traced as similar circuits have been traced for operations during multiplying. During program step 3, a circuit extending from one of the contacts of program step 3, Fig. 14c, via wire 428, connects to the reset sockets of accumulators 1AC, 2AC, and 3AC which have been employed for dividend acceptance and reduction. This circuit is now encountered for the first time, and will now be described in somewhat more detail. The circuit extends from cam C32 (Fig. 14c), program contact 52R5, plugwire 428, to Figs. 14o and 14p. This 3-pronged wire circuit is completed through contacts 575R4 to the reset relay 421R of accumulator 1AC, also through contacts 575R8, to the reset relay 430R of accumulator 2, also through the contact 575R12, to the reset relay 461R of accumulator 3AC. The reset of these three accumulators then is effected in the usual manner.

Punching is initiated upon completion of program step 3 by a circuit extending from a hub at this program step (Fig. 14c) via wire 433, to an "N" contact of co-selector 1 (Fig. 14p), through contact 296R2, in normal position, and thence via a plugwire 434 to the punch control hub for storage unit 6ST, the circuit continuing as shown in Fig. 14g, through contacts 141R4 now closed, to energize relay magnet 172R. The operation for punching from storage unit 6ST, with respect to the quotient, is exactly as was described for punching the product of card No. 1.

The program device is now advanced to step 4, during which cycle the additional amount "G," which was sensed from card No. 2 and entered into storage 2ST, is to be transferred to the accumulator 6AC, where it is added to the "F" quotient amount now present therein. The storage unit 2ST is conditioned for readout from the left-hand side of the storage unit, into which amount "G" was entered, by a connection extending from one of the sockets of program step No. 4 (Fig. 14c), via wire 437 to Fig. 14h, through contacts 138R3, now closed, to energize readout relay 126R. Accumulator 6 is conditioned to receive the amount by means of a wire 436 extending from the fourth step of program device, Fig. 14c, said circuit functioning in the same manner as for circuits 307 and 420, which have been described previously as providing for entry into accumulator 6AC, (see Fig. 14o). The impulses from 2ST-RO (Fig. 14h) are transferred by wires 467 to the 6AC entry hubs (Fig. 14s).

A program step exit hub of the fourth step is also plugged to effect program skipping at this time, via wire 438 (Fig. 14c), which is plugged from the fourth step to the skip hub of the twelfth step (Fig. 14d). The EC all cycles impulse from cam contacts C32 proceeds through program step 4 contacts 54R3, Fig. 14c, via wire 438, to program step 12 skip hub (Fig. 14d), then through contacts 76R11, now closed, and 72R2, as shown, to energize program control No. 12 relay 73R pick coil. At 240 degrees of the ensuing cycle, when cam contacts C–33 close, the program relay pick circuit from such contacts is directed through contacts 5R2 now in the position shown, Fig. 14d, contacts 42R2, now in shifted position, contacts 41R3, in the position shown, to and through contacts 73R3, now in shifted position, to energize program relay No. 12 74R pickup coil. The 74R3 through 74R6 contacts close to establish circuits to the program step 12 exit hubs in the usual fashion during the following cycle.

During the twelfth step of program, the operations to be performed include pickup of pilot selector 6 from a program exit #12 hub, via wire 440 which is connected from the program exit, lower right-hand corner of Fig. 14c, to the digit input hub of pilot selector 6 (Fig. 14v). The couple exit hub of this pilot selector 6 is connected via wire 439 (Fig. 14w to Fig. 14p), to input hub of co-selector 5CS. Pilot selector No. 6 includes the phase I latch type relay 220R, Fig. 14v, and a permanently associated relay 218R, Fig. 14w. The action and co-operation of these relays is exactly identical to the operation and control of relays 205R and 203R (pilot selector 1) which were described in detail in connection with Fig. 20. The pilot selectors are electrical devices which have all of their connections shown on Figs. 14v and 14w. Each small group of circuits generally identified as a pilot selector includes a pair of relays, such as 205R and 203R, associated with pilot 1.

A typical operation of a pilot selector, such as pilot 1, has been described in detail in connection with Fig. 20. The other pilot selectors, each comprising a pair of relays, may be connected in tandem as shown on Fig. 20, where pilot selector 1 controls the operation of pilot selector 2 for punching, or any one of these pilot selectors may be connected for card feed operations as is the case with pilot selector 1, as shown in Fig. 20. These pilot selectors may also be controlled from the program device, a pilot selector 6 comprising relays 220R and 218R, being so controlled by the plugging 440 as previously mentioned. In this case also, an exit hub of the pilot selector is coupled to a so-called co-selector by means of a wire 439 (Figs. 14w and 14p). Each co-selector is a relay having 5 contacts connected to plug hubs, such contacts being shown at the lower right-hand corner of Fig. 14p; a pickup coil, such as 296R, associated with co-selector No. 1; and a holding coil 296R, which is shown as being connected through contact 296R1, extending through cam C38. The co-selectors are generally identified as 1CS, 2CS, etc., to 5CS on Fig. 14p. The main purpose of coupling a co-selector to a pilot selector, as indicated by the plug connection 439, is either to increase the capacity of the pilot selector by adding contacts, or to transfer control to contacts at a more accessible location on the plugboard.

Resuming the operations relating to card No. 2, we will now describe the actions associated with program step 12. Assuming that pilot selector 6 and co-selector 5 have already been picked up by the circuits just described, during step 12 there is a readout of accumulator 6AC, which now contains the quotient "F" plus the amount "G." The entry to storage 6ST, which is controlled by plug connection 444 extending from the 12th program step (Fig. 14c) to the read-in hub of storage unit 6ST (Fig. 14g), is provided with a delay device in order to provide an indeterminate length of time, if necessary, for punching the quotient "F" into the card No. 2.

In this example, it is probable that the punching of quotient "F" out of storage unit 6ST–RO will not yet be complete when program step 12 provides an impulse to the punch control hub of 6ST to initiate punching of amount "H." In such a case, the incomplete nature of the preceding punching operation is indicated by the fact that relay contacts 173R3 (Fig. 14g) remain in a shifted position. It was previously explained that completion of punching in the units position of 6ST–RO (Fig. 14f) deenergizes said relay 173R. The SP all cycles impulse through program step 12 contacts 74R6 (Fig. 14c) proceeds via plugwire 444 to the read-in hub of storage unit 6ST (Fig. 14g), thence through contacts 144R6, now closed, and through contacts 173R3, now in shifted position, to energize pickup coil No. 1 of storage delay relay 37R. Relay 37R establishes a holding circuit (Fig. 14v) from cam contacts C43 through stick contacts 37R1 and the holding coil of relay 37R. It will be noted that the transferred condition of contacts 173R3 (Fig. 14g) prevented the normal energization of the latch magnet 171 of storage unit 6ST, thereby preventing premature restoration of the amount contained in the storage unit, which is still in process of being punched. Upon energization of storage delay relay 37R, contacts 37R2 (Fig. 14v) open in the previously described circuit to the pick magnets of EC control relays, 141R, 138R, 76R, 704R, 575R, and 572R. It will be noted that contacts of the EC control relays are located in the operating circuits of the various accumulator control relays, Figs. 14o and 14p. Therefore the EC impulse through contacts 74R4 (Fig. 14c) directed by plugwire 442, to the readout control socket of accumulator group 6AC, Fig. 14o, is prevented from energizing readout relay 513R by virtue of the open condition of contacts 572R11, as a consequence of the storage delay. In a similar manner, energization of reset relay 510R is prevented by the open condition of contacts 572R12. While punching of the preceding amount is taking place, it is necessary to initiate a program delay, so that the control impulses of program step 12 will remain available until the delay has been terminated. A circuit is therefore available to energize program delay relay 35R (Fig. 14u) extending from cam contacts C6, through contacts 704R4 of EC relay 704R, now inactive for the reasons explained above, through contacts 716R3 now in the position shown, to energize program delay relay 35R. Relay 35R operates in the previously described manner to effect the program delay, causing step 12 to emit impulses during succeeding cycles. When the punching carriage reaches column 70 to effect punching of the units position of quotient field "F," see Fig. 18, the punching impulse may be traced in the usual manner to units position punch exit socket 408, 6STRO (Fig. 14f). In the previously described manner, this impulse energizes relay 174R, causing the return of relays 172R, 173R, and 170R to their normal condition. Following the return of contacts 173R3 (Fig. 14g) to the position shown, the next following SP impulse from step 12 to the read-in hub of 6ST may proceed through contacts 144R6, now shifted, and through contacts 173R3, in the position shown, to energize the latch magnet 171 of 6ST, causing a restoration. Since no circuit is provided to energize storage delay relay 37R, the previously described circuits for establishment of program delay and suppression of operation of EC relays are no longer effective and normal operation follows.

Since it has been shown that pilot selectors 2 and 7 are operative during punching of cards #1 and #2, respectively, it is seen that during punching of card #2, shown diagrammatically in Fig. 18, selector #2 in normal position and selector #7 being in shifted position, punching should occur in columns 66–70 and 71–75, skipping to begin in column 76. These circuits may be traced as follows:

When the punching carriage reaches column 66, a circuit may be traced from segment 66 of the readout strip, Fig. 14e, via wire 393 to "C" hub of pilot selector 2, now inactive, Fig. 14w; thence through contacts 206R3, as shown, then via wire 396 to "C" hub, pilot #7, through 221R2, shifted and wire 496 to 6ST (Fig. 14f). Punching of columns 67–70 then continues via wires 395 extending between 6ST punch exit hubs (Fig. 14f), to readout strip segments 67–70 (Fig. 14e). When the punching carriage reaches column 71, an impulse proceeds from segment 71 of the readout strip (Fig. 14e), via wire 397 to "C" hub pilot selector 2 (Fig. 14w), then through contacts 206R2, in the position shown, via wire 399 to "C" hub, pilot selector 5, through contacts 215R3, now as shown, then via wire 499 to fifth order punch exit hub 6ST (Fig. 14f) to punch the high order of amount "H." The remaining columns of amount "H" are punched as previously described by wires 466. In order to skip over columns 76–80, an impulse extends from segment 76 of the readout strip (Fig. 14e), via wire 497, to "C" hub, pilot selector 5 (Fig. 14w), through contacts 215R2, as shown, via wire 495 to skip hubs (Fig. 14c), thereby initiating a skip in the usual manner. Following completion of the operations of step 12, the program repeats in the usual manner, beginning with step 1. Step 1, as described in the general plugging for card #2, is used to add the summary amount, if any, retained in 1ST storage unit, to the sum "H" present in accumulator 6AC. At the present time, 1ST contains no amount but the transfer process takes place, adding 0 to the "H" amount in accumulator 6AC.

The EC impulse through program step #1 contacts 47R4 (Fig. 14c), proceeds via wire 306 to Fig. 14p, through co-selector 5CS contacts 302R3, now shifted, through wire 441 to Fig. 14g, there continuing through contacts 141R9, now closed, to energize readout relays, 179R and 176R. At the same time the previously described circuit from program step #1 via wire 307 (Fig. 14c) to energize 6AC plus relay 207R (Fig. 14o), is active. Impulses may therefore proceed from emitter EM1 (Fig. 14j) in the usual manner into cable 370; then to Fig. 14f; through contacts 176R1 to 176R10 shifted; to 1STRO; thence through contacts 179R1 to 179R6, now shifted, via plugwire 505 to Fig. 14s and to the entry hubs of accumulator 6AC.

At the beginning of program step #1, the SP all cycles impulse through contacts 47R3 (Fig. 14c) continues via plugwire 335 to Fig. 14a, read hubs; through contacts 223R2, as shown, to energize relay 6R. At 225 degrees of the following cycle, read feed relay 5R is energized by an impulse from cam C2, proceeding through contacts 6R2, and 138R12, both shifted; through contacts 35R3, as shown; through contacts 25R4, shifted, through latch pick coil, relay 5R. In the manner previously explained, 5R is effective to cause a card feeding operation on the following cycle, together with emission of SP and EC impulses from the read cycles program hubs concurrently with such feed cycle.

Card #3 is thus fed past the card reading brushes, while at the same time, certain operations on card #2 are completed. The previous description has explained the manner in which the "G" amount (see Fig. 23b) has been read from the card and entered into 2ST storage device, and it also described how this amount was later read out from the 2ST storage device and entered into 6AC accumulator to be accumulated with the "F" amount which was already therein, as a result of the dividing operation. Provision is made, during the feed cycle for card #3, for reading out of the 6AC accumulator the amount "H." This amount is read out from the 6ACRO readout and transferred over to the 1ST storage device. This is effected in the following manner:

Accumulator 6AC is controlled to read out by an impulse extending through read program relay contacts 43R9, now closed (Fig. 14c), thence via read cycles hub and plugwire 446 to the "C" hub of the pilot selector 4 contacts (Fig. 14w) continuing through contacts 212R2, in the position shown, then by plugwire 447 to readout socket for accumulator 6AC (Fig. 14o) through contacts 572R11, now closed, to energize readout relay 513R. Readout of the amount in 6AC now takes place in the usual manner. Before the amount can be entered into the 1ST storage device, the latch magnet 171 of this storage device must be energized. The SP impulse which accomplishes this function proceeds through contacts 43R3 (Fig. 14c) via a read socket and plugwire 304, to the "C" socket of the pilot selector 1 (Fig. 14w) continuing through contacts 203R3, now in the position shown, via wire 392 to the read in socket of 1ST (Fig. 14g), continuing through the relay contacts 144R7, in shifted position, through 185R3, as shown, to latch magnet 171 pertaining to 1ST. The readout circuits can be readily traced from 6ACRO through the accumulator exit hubs and the relay contacts through wires 470 (Fig. 14o to Fig. 14g). The amount which was previously in 6AC will then be set up in 1ST. Referring to the schematic diagram (Figs. 23b and 23c), it may be explained that the transfer of the "H" amount from 6AC accumulator to 1ST storage device occurs on card feed cycle #3, which is at the time when the amounts are being read from card #3 (see the first step on Fig. 23c). The sum mentioned above remains in the 1ST storage device during the cycles of the machine in which operations occur pertaining to card #3. Referring to Fig. 23c, card feed having been reinitiated in the manner previously described, the "J" amount from the third card is entered into the first storage device 1ST. Entry controls have been previously explained for this operation. It will be recalled that the operation pertaining to the third card is to be a squaring operation.

Card #3 has a perforation therein at the 7 index point position. This perforation will be read in the manner previously described and through a plug connection 471 (Figs. 19a, 14g, 14p) a co-selector #4 CS is energized. In this instance, it is desired to skip over intervening program steps to step 11. In a manner similar to that previously described, an X timed impulse is transmitted from digit impulse sockets (Fig. 14s) through plugwire 423, to the "C" socket of emitter 2 (Fig. 14g). The circuit continues from the X socket of the emitter, via plugwire 424 to the "C" socket of co-selector 3CS (Fig. 14p) which is at present not energized. The impulse continues from the "N" hub of the co-selector 3 contacts, through plugwire 472, to the "T" socket of co-selector 4. The circuit is then directed from the C socket of co-selector 4CS, now energized, through plug wire 473, to the skip hub for program step 11 (Fig. 14d). This causes program step 11 to become active on the cycle immediately following the read cycles step of the program for card #3.

With program relay 72R energized for step 11, (Fig. 14c), an SP impulse proceeds through contacts 72R3 via wire 475 to the "multiply" hub (Fig. 14u) to initiate multiplication in the usual manner.

An EC impulse proceeds through contacts 72R4 (Fig. 14c) via wire 476 to "plus" hub of 6AC (Fig. 14o). At the same time, a similar EC impulse continues through contacts 72R6 (Fig. 14c) via wire 477 to the "read out" hub for 1ST (Fig. 14h). Controls are thereby established to utilize the multiplier mount "J" in 1ST as a multiplicand also, transmitting the component impulses therefrom to 6AC in a manner to be described.

Referring to Fig. 14d, coselector 2CS was previously utilized in deenergized condition on dividing operations to direct entries which were transferred from 1STRO into the dividend accumulator 1AC. By energizing the relay magnet 299R of this coselector, Fig. 14p, the coselector may be utilized to divert the entries to the 6AC accumulator instead. The wiring for coselector magnet 299 is as follows: a plug wire 474 is inserted from the couple hub for program step 11 (Fig. 14d) to the pick up hub for coselector 2 (Fig. 14p). It will be seen, therefore, that when program step #11 relay 72R (Fig. 14d) is energized to make the program step 11 hubs active, a parallel circuit is available from 72R pick up coil, through plug wire 474, to the pick up coil of coselector 2 relay 298R (Fig. 14p). Relay 298R then holds through stick contacts 298R1 to cam contact C38. Coselector 2CS will thereupon operate each time that program step 11 is active during multiplication operations for card 3, and may, therefore, be used to direct the impulses for entry into accumulator 6AC in the manner previously mentioned. The component impulses from 1STRO may, therefore, proceed from 1STRO storage transfer exit hubs, Fig. 14k, via plug wires 454 and 455, to contacts 298R3 and 298R4 (Fig. 14p), through these contacts, now transferred, by plug wires 478, to accumulator entry plug hubs in the units and tens positions of accumulator 6AC (Fig. 14s). Generally speaking, with the amount "K" set up on 1ST, 1STRO is used first to make a factor selection of the amount "J" as a multiplier. The partial product components, which are selected as a result of the factor selection, go back to 1STRO, this now being used as the multiplicand storage unit. The resulting impulses flow to the 6AC accumulator. Referring to Fig. 14k, the multiply pick up relay 651R, which controls contact points 1 through 10, inclusive, is energized only during the test portion of a multiplying cycle. This portion does not overlap the portion of the cycle in which impulses are directed through the readouts for reading out amounts standing therein. Relay 651R is therefore energized to effect a multiplier set up by energizing the various relays previously described and which are shown at the bottom of Fig. 14l. After multiplying selection is made, relay 651R becomes deenergized, whereupon impulses from emitter EM1 flow through the multiplier test circuits in the manner previously described, and such impulses flow back through the 1STRO and thence to the product accumulator.

Figure 23A:
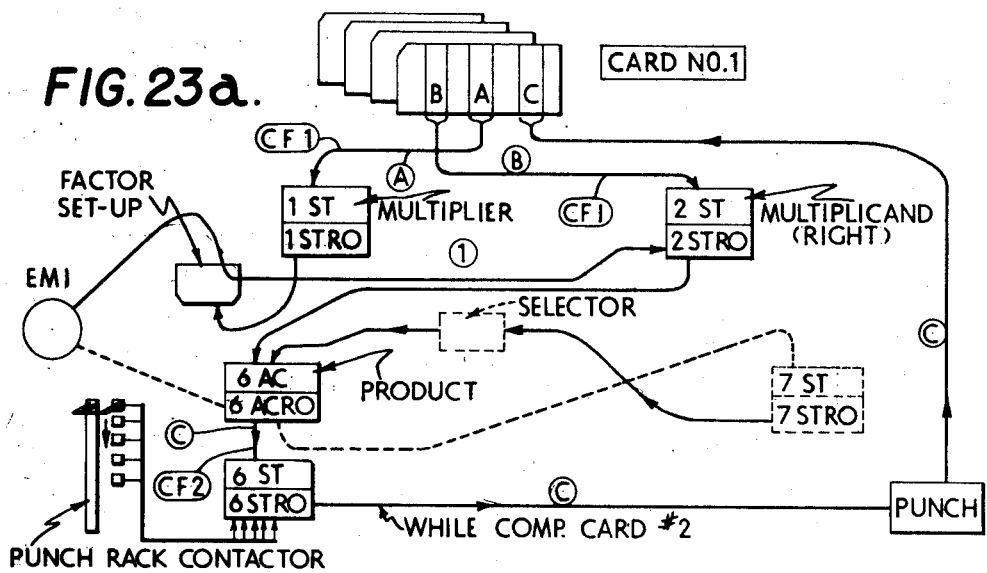
Figure 23B:
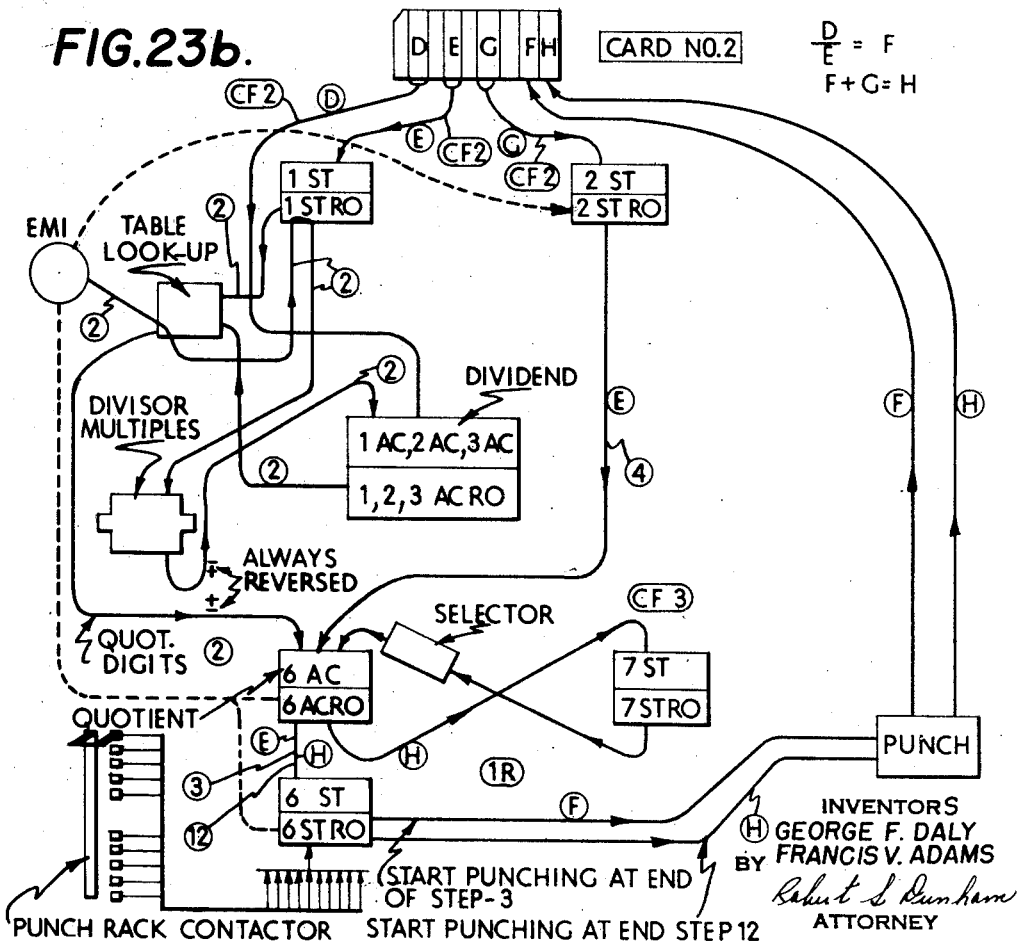

It will be recalled that the amount from the previous card—namely, amount "H"—now stands in the storage device 7ST (see Fig. 23b). The product amount, which is the square of the amount "J," stands in the 6AC accumulator at the end of multiplication. This amount can be punched out by first transferring the amount in 6AC to 6ST, and then controlling punching back the amount on the record in the manner previously explained. Transferring of the amount from 6AC to 6ST takes place on program step 12, just as in the card #2, punching being initiated at the end of the 12th step.

Multiplying pertaining to card #3 is ended when the program advances from step 11 to step 12, since the end of multiplication causes an end of program delay in the manner previously described. An SP impulse flows from line 320 through contacts 74R6 (Fig. 14c) via plugwire 444 to Fig. 14g to the read in hub of 6ST, then through contacts 144R6 now closed and contacts 173R3, as shown, to energize latch magnet 171 of 6ST. This conditions 6ST to receive an entry which is to come from 6AC. The EC impulse on program step 12 will flow through contacts 74R4 now closed (Fig. 14c) via plugwire 442 to Fig. 14o to the read out socket of 6AC through contacts 572R11 now closed to energize a read out relay 513R. Energization of 513R through contacts 513R1 to 6 permits impulses to flow out from 6ACRO (Fig. 14o) which impulses flow by plug wires 400 to the entry hubs of 6ST (see Fig. 14g). On flow of these impulses the amount in 6AC is set up on 6ST.

The EC impulse on program step 12 also flows through contacts 74R5 now closed (Fig. 14c) via plugwire 443 to Fig. 14g and to the punch hub of 6ST, then continuing through contacts 141R4, now closed, to energize and latch relay 172R. Relay 172R operates in a manner previously described, to energize relay 170R (Fig. 14f). The closure of contacts 170R1 to 12 completes circuits to 6STRO so that the amount standing therein may be punched in a manner previously described.

Following program step 12, the program goes back to program step 1 which is repeated as in card #2. On program step 1 repeat, the amount standing in 7ST is transferred over to 6AC, so that it can accumulate with the squared amount already standing therein. Following this transfer, there is a readout of the amount now standing in 6AC back to 7ST. This transfer is effected while the next card is being sensed. It may be mentioned, however, that after the amount has been read out from 7ST, this storage device is reset preparatory to receiving the sum from 6AC, since in the present machine, whenever any storage device is called into operation to receive an amount preparatory to the receiving of a new amount, the storage device is automatically cleared. This will enable the above described operation to take place.

The above operations are effected in the following manner: An EC impulse on program step 1 repeats, will flow through contacts 47R4 now closed (Fig. 14c), via wire 386 to Fig. 14p to a C hub of coselector 5CS. The previous explanation has told how 5CS is energized on a program operation when step 1 is repeated following step 12. The impulse therefore continues through shifted contacts 302R3 via plugwise 441 to Fig. 14g to the read out socket of 7ST then through now closed contacts 141R9 to energize relay magnets 179R and 176R. These relays condition 7ST to read out the amount restored therein. At the same time another EC impulse flows from now closed contacts 47R6 (Fig. 14c) via plugwire 307 to Fig. 14o to the plus input hub of accumulator 6AC, then through contacts 566R11 as shown, and 572R9 now closed, to energize plus relay 507R. Closure of 597R1 to 12 contacts (Fig. 14c) conditions 6AC to receive an additive entry through its entry hubs. The controlling impulse flows through plugwires 505 (Fig. 14s) from 7STRO (Fig. 14f). Energization of 179R closes contacts 179R1 to 6 to permit outflow of impulses to 6AC and 176R1 to 9 contacts on shifting allow impulse flow into 7STRO from emitter 1 through cable 370 (see Fig. 14j). The above has described how the amount in 7ST is transferred to 6AC.

Following the above a new card feed and read cycle ensues (note plugwire 335, Fig. 14c) which goes to 14a to cause energization of relay 6R to ultimately bring about a card feed. During such card feed cycle card #4 will be sensed but during the read cycle the amount now in 6AC, namely the sums $(H+K)$, is to be transferred to 7ST. On a read cycle, 43R (Fig. 14c) is energized in the manner previously described. An SP impulse will flow through 43R3 (Fig. 14c) via wire 304 to a C hub of pilot selector 1 (Fig. 14w). This pilot selector is now inactive so that the circuit continues through contacts 203R3 as shown to and through plugwire 392 to Fig. 14g to the read in hub of 7ST through contacts 144R7 now closed and through contacts 185R3 as shown to energize the latch magnet 171 of 7ST. This clears 7ST and conditions it to receive a new entry from 6AC. The EC impulse during the reading cycle flows (see Fig. 14c) through contacts 43R9 now closed via plugwire 446 of Fig. 14w thence to the C hub of pilot selector 4. This selector is now inactive and the EC impulse flows through 212R2 as shown through wire 447 to Fig. 14o to the read out hub 6AC. It continues through 572R11 now closed to energize read out relay 513R. Closure of 513R1 to 6 establishes read out circuits from 6ACRO to plugwire 470 which extend to 7ST (Fig. 14g). 6ACRO receives impulses in the previously described manner from emitter #1. Accordingly, the amount in 6AC is transferred to 7ST. A reset circuit for 6AC is provided by a plugwire 490 extending from Fig. 14c to Fig. 14o to supply an EC impulse to energize reset relay 510R (Fig. 14o). Accordingly there is a concurrent reset of 6AC while an amount is being read out therefrom.

Referring to Fig. 18, it is seen that card #3 is to have result "K" punched in columns 71-75. In order to skip field 66-70, a circuit extends from segment 66 of the readout strip, Fig. 14e, via wire 393 to "C" hub, pilot selector 2, Fig. 14w. The circuit continues through contacts 206R3, as shown, through wire 396 to "C" hub, pilot selector 7, which is also inactive during punching of card #3. The circuit continues through contacts 221R2, as shown, via wire 494 to skip hubs, Fig. 14c, to cause skipping as previously described. When the punching carriage reaches column 71, a circuit is completed through segment 71 of the readout strip, Fig. 14e, via wire 397 to "C" hub of pilot selector 2, Fig. 14w, there continuing through contacts 206R2, as shown, wire 399, to C hub of pilot selector 5, through contacts 215R3, as shown, via wire 499 to fifth order punch exit hub of 6ST (Fig. 14f) thereby causing punching of the high order of amount "K." Punching of amount "K" continues via wires 466 as previously described. When column 76 is reached, a circuit is available from readout strip segment 76, Fig. 14e, via wire 497 to "C" hub of pilot selector 5, Fig. 14w. The impulse continues through contacts 215R2, as shown, via wire 495 to skip hubs, Fig. 14c, causing the punching carriage to skip over the remaining columns of the card.

The operations pertaining to the last card, card #4, are only briefly described. Card #4 is perforated with an identifying "X" designation, see Fig. 18.

When card #4 is being handled its X punching in column 1 is extended to call into operation controls which direct that the amount which ultimately becomes stored in 7ST is to be read out and punched on the #4 card. This is effected in the following manner: The X punching causes an immediate skip of the program to step 5, a previously unused step. This X punching on this particular card also picks up pilot selector #4 which in turn is used to control a punching pilot selector #5. When card #4 passes under the brushes an impulse will flow from line 340 through C10 to the brush 103 in the first column, through the X perforation in the card, through contacts 338R1 now closed, via wire 302 to Fig. 14g to common hub of emitter EM3, through the brush on the 11 segment, then via wire 480 to Fig. 14d to the skip hub of program step 5. In the manner previously described, the program is set up so that ultimately step 5 of the program will become active. The X impulse also flows from emitter EM3 by wire 481 to Fig. 14v, there connecting to X pick up hub of pilot selector 4.

Pilot selector 4 is plugged to control pilot selector 5 for punching, via wire 482 extending from pilot selector 4 punch control exit hub (Fig. 14w) to pilot selector 5 digit pick up hub (Fig. 14v). It may be explained at this point that said coupling of pilot selector 4 into pilot selector 5 for control of punching is done in identically the same manner, and this pair of selectors function in the same manner as pilot selectors 1 and 2, as described in connection with Fig. 20. Pilot selector 4 is plugged to drop out under card feed control by the jumper 483 (Fig. 14v) and pilot selector 5 is plugged for punch drop out via the wire 484, also shown in Fig. 14v.

Card #4 will be fed to the punch tray. At a later time when card #3 has escaped to the extreme left-hand position and closed last column contact PC4, relay 84R and the punch feed trip magnet 193 will be energized to cause an eject of card #3 and a feed of card #4 to the punching position. Relay 84R being energized, a circuit will be completed (see Fig. 14w) from C29, through 84R7, through pilot selector 4 contacts 212R4 now closed, via plugwire 482 to Fig. 14v to digit pick up hub of pilot selector 5, energizing LP coil 217R. Pilot 5 is thus set up during punching of card #4 and remains effective until such punching is complete.

One of the contacts of program step 5 (Fig. 14c) is connected via wire 485 to the read hubs (Fig. 14a) to cause card feed. One more connection is made from a program step 5 hub (Fig. 14c) to the punch control hub for storage unit 7ST (Fig. 14g) by wire 405. The latter connection transmits the EC all cycle impulse from program step 5 through contacts 141R7, now closed, to energize and latch 184R (Fig. 14g). The action of relays 185R, 181R, and 184R (Fig. 14g), is similar to that of relays 173R, 170R, and 172R, previously described in connection with punching from 6ST. Relay 181R is thereby energized to permit punching out from storage unit 7ST. It will be seen in Fig. 18 that summary amount M, now present in 7ST, is to be punched into columns 76-80 of card #4. When card #4 is fed to column #66, field 66-70 is therefore to be skipped. A circuit may therefore be traced from segment 66 of the punch readout strip, Fig. 14e, through wire 393 to "C" hub of pilot selector #2, Fig. 14w. Since pilot selector #2 is inactive during punching of card #4, the impulse continues through contacts 206R3, now in the position shown, to the "N" hub, then by wire 396 to the "C" hub of pilot selector 7, same figure. The circuit then continues through contacts 221R2, now as shown, via wire 494, to the skip hubs, Fig. 14c, there to energize relay 87R and cause the punching carriage to skip to column 71, where it is halted by an insert in the skip bar. An impulse from segment 71 of the readout strip, Fig. 14e, proceeds by wire 397 to "C" hub of pilot selector 2, Fig. 14w, continuing through contacts 206R2, now as shown, then by wire 399 to "C" hub of pilot selector 5. Pilot selector 5 being energized and latched during punching of card #4, the circuit continues through contacts 215R3, now shifted, then by wire 493 to skip hubs, Fig. 14c, to cause skipping over columns 71-75 of the card. When the punching carriage reaches column 76, a circuit extends from segment 76 of the punching emitter, Fig. 14e, by wire 497 to "C" hub, pilot selector 5, Fig. 14w. The circuit continues through contacts 215R2, now shifted, by wire 549 to the fifth order of storage punch exit hubs, 7ST, Fig. 14f, thereby causing punching into column 76. The remaining columns of the amount "M" are punched via wires 504 extending from 7ST storage punch exit hubs, Fig. 14f, to segments 77–80 of the readout strip, Fig. 14e.

Since column 80 is punched in card #4, the skip solenoid is not energized to skip this card to the extreme left-hand position in preparation for ejection into the stacker. Consequently, if additional cards are following the fourth card just described, the next card will feed to punching position with the skip lifter 264, see Fig. 12, in retracted position, and the punching rack will therefore stop in the column 1 punching position. In order to effect skipping to column 66, the first column in which punching is desired, a plugwire 545 is inserted as shown in Figs. 19b, 14c, and 14e. When the rack stops in column 1, a circuit is completed from line 340, through contacts PC2, as shown, PC3, now closed, to punching readout strip 284, through wiper 238 to #1 segment 286, then by plugwire 545 to skip hubs, Fig. 14c, through relay 87R to ground. The energization of relay 87R results directly in the energization of trip magnet PM, Fig. 14e, following closure of contacts 87R1 and 87R2. In the manner previously described, this causes the punching rack to be disengaged by the escapement, permitting it to skip to column 66, in which position an insert 270 in skip bar 268, Fig. 11, stops further movement. The card remains in this position until calculation is completed, at which time punching of the result is accomplished as previously described.

*Last card control*

When the last card of a run escapes to beyond the last column position, contacts PC4, Fig. 14b, close to energize last column relay 28R. With this relay energized, 28R3, Fig. 14e, closes and the circuit is completed from cam contacts C9, at the time indicated, through contacts 7R4, now closed, through shifted 28R3 contacts, through contacts 26R2, 21R6, 11R4, all in the position shown, through 16R2, in shifted position, through 32R7 as shown, to energize the punch feed relay 84R. A parallel circuit is also completed to energize the trip magnet 193. It may be mentioned that 26R2 and 11R4 contacts are in the position shown since there are no more cards either being fed or in the hopper of the machine, and their related relays are therefore deenergized. Referring again to Fig. 14b, relays 16R and 25R are deenergized upon the last described condition since relay contacts 32R6 are in the position shown at the time relay contacts 84R2 open. This will provide an open circuit to deenergize the hold coils of relays 16R and 25R. With relay 25R thus deenergized, relay contacts 25R2 (Fig. 14a) return to the position shown and start relay 1R will be thereafter deenergized when its holding circuit is opened by cam contacts C5. With relay 1R thus deenergized, relay contacts 1R4 may return to the open position shown, Fig. 14a, and no pick up circuit will be provided to the run relay 7R. With relays 1R and 7R deenergized, relay contacts 7R2 and 1R3, Fig. 14b, will resume the position shown, and accordingly, the normal circuit to the heavy duty relay HD will be interrupted. However, another circuit will be established to this heavy duty relay through the latch contact PC1 which remains closed until the eject cycle for the last card is completed. With the start relay 1R deenergized, a circuit will be established, see Fig. 14b, to the idle lamp which will advise the operator that the run of cards has been completed.

Referring to Fig. 14b, with relay 7R energized, which is the machine running condition, a circuit is completed through relay contacts 7R10 to and through the contacts 28R2, now in shifted position with the punching rack 181 at its extreme left end position, thence to card lever contacts 3CL1 which are in the punching section of the machine. It may be mentioned at this point that these contacts 3CL1 normally would not be closed on this condition unless a card for some reason remained in the punching section of the machine. When the rack of the punch moves to the extreme left-hand position, a card which is in the punch should be moved out from under card lever 3CL. Accordingly, these contacts 3CL would normally be open if proper punch action occurred. However, if the card for some reason remained in the punch under card lever 3CL, Fig. 9, keeping contacts 3CL1 closed, a circuit would be completed, see Fig. 14b, from line through 7R10 contacts now closed, through 28R2 now closed, through 3CL1 contacts, now closed, to energize error stop relay 40R. With such relay energized, contacts 40R1 close to provide a stick circuit to hold relay 40R energized. Referring now to Fig. 14a, with relay 40R energized, relay contacts 40R2 assume an open position, thereby interrupting the holding circuit through relay contacts 1R1 to relay 1R. With relay 1R thus deenergized, contacts 1R4 assume an open position and the pick up circuit to relay 7R is interrupted. With relay 7R thus deenergized, relay contacts 7R7, Fig. 14u, assume the position shown to energize relay 150R. A hold circuit for relay 150R is established through relay contact 150R1. With relay contacts 7R7 in the position shown, there is no circuit for the SP relay 144R. Upon energization of 150R relay, contacts 150R3, Fig. 14v, will open, interrupting the circuit to the EC relays 141R, 138R, 76R, etc. Contacts of the EC relays and the SP relays are used to control exit and input from and to the storage units, accumulators, etc. Accordingly, operation of these units is prevented during coasting of the machine under conditions just described. The operation which has just been described will also light an error lamp, Fig. 14b, by a parallel circuit extending from relay coil 40R which has been energized in the manner previously explained. The HD relay circuit will also be interrupted since, under these conditions, 7R2 and 1R3 are in the position shown, Fig. 14b. Under these conditions, a circuit can continue through contacts 1R3 to the idle lamp. When the machine operation terminates under these conditions, it can only be restored by pressing the reset key, Fig. 14b, which will interrupt the stick circuit through 40R1 to the error stop relay magnet 40R. Thereafter the start key, Fig. 14a, may be operated in the usual manner.

*Summary of typical machine operations*

Figure 30A:
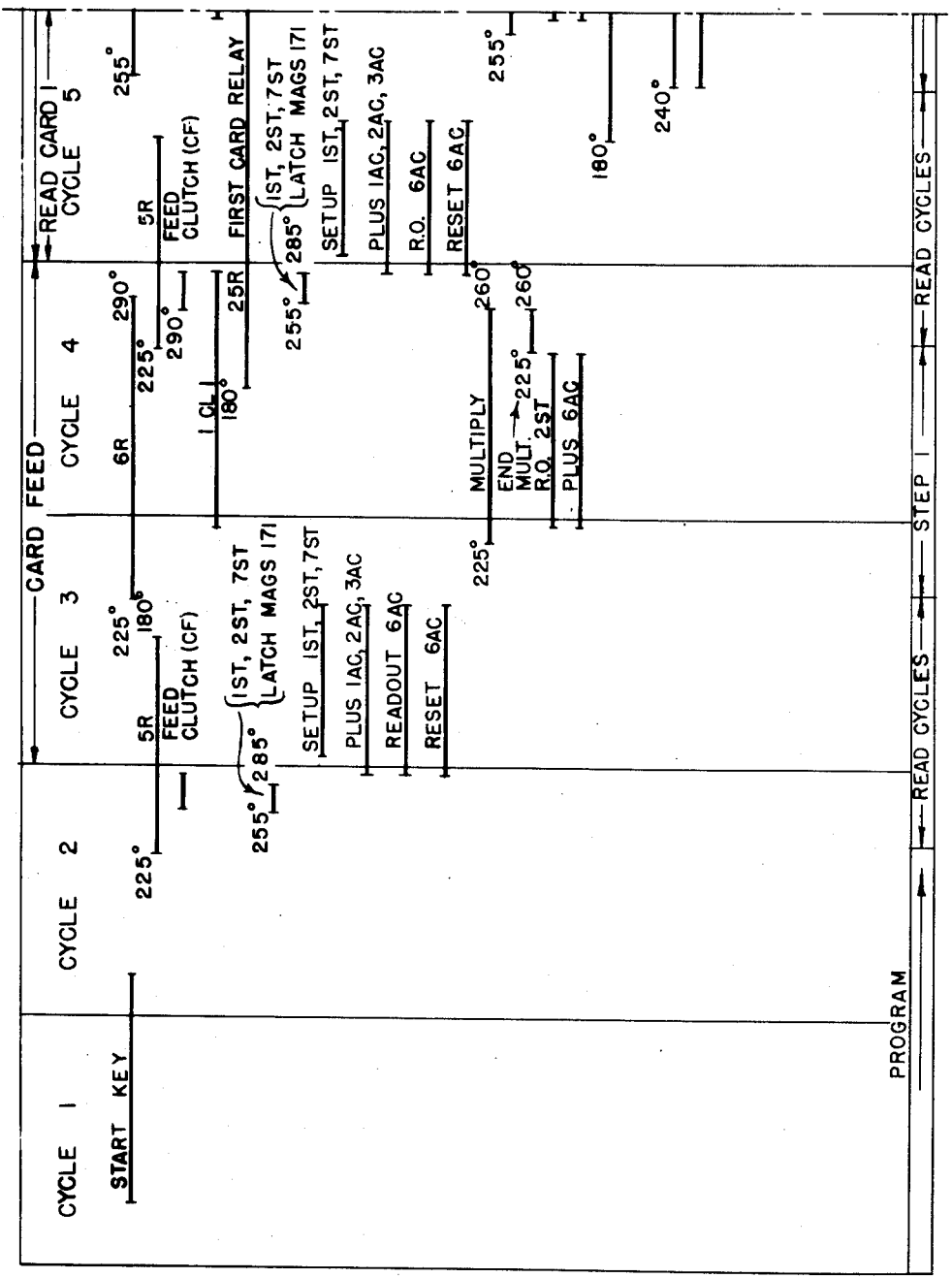

Figs. 30a to 30g, inclusive, show the principal machine operations which are effected in handling a run of cards, including cards 1 to 4 shown in Fig. 18, and also shown on the diagrammatic views 23a to 23d, inclusive. Referring first to Fig. 30a, the first four cycles designated cycles 1 to 4, inclusive, are preliminary cycles to start up the operation from the beginning. Cycles 1 and 2 require no detailed explanation and in cycles 3 and 4 the card feed commences and the card is advanced during these cycles from the magazine to a position in which the amounts may be read therefrom in cycle 5. In cycles 3 and 4, there are certain dummy operations which have been previously described which need not be repeated here. It is significant to note that in cycle 4 at 255° the latch trip magnets 171 pertaining to the 1ST, 2ST, and 7ST storage devices are energized. This prepares these storage devices for receiving a reading, which reading is received on cycle 5. This is shown on Fig. 30a by the legend "Setup 1ST, 2ST, and 7ST." It may be here mentioned that the entries into 1ST and 2ST are shown in Fig. 23a, being designated by legend CF1 indicating impulse flow along these lines for card #1. It will be noted that there is an attempted entry into 7ST in cycle 5. This entry, however, comes from 6AC which stands at 0 and therefore no significant entry goes into 7ST for this particular card. Summarizing the operations on cycle 5 for card #1, the only significant operations that take place include the entry of the multiplier and the multiplicand into 1ST and 2ST, respectively. As has been previously explained, after the read cycle pertaining to a particular card, the program advances to step 1. The setup of the program is indicated at the arrow point to the right of "Read cycles" at the bottom of the field pertaining to cycle 5. Referring, however, to cycle 5, at 255° in that cycle, and under program control, the multiply control is set up. The read out control from 2ST is also set up at the end of cycle 5 and the entry control or plus control for 6AC is set up at this time. In cycle 5 at 180°, relay 205R is set up by reason of a "1" being punched in this particular card, see Fig. 18. This is the set up for phase 1 of the pilot #1 relay. Later in cycle 5, namely at 240°, under control of 205R, relays 203R and 296R are set up, these being, respectively, the phase II relay for pilot selector #1 and the coselector #1 relay which is coupled to this relay, see Fig. 20.

Figure 30B:
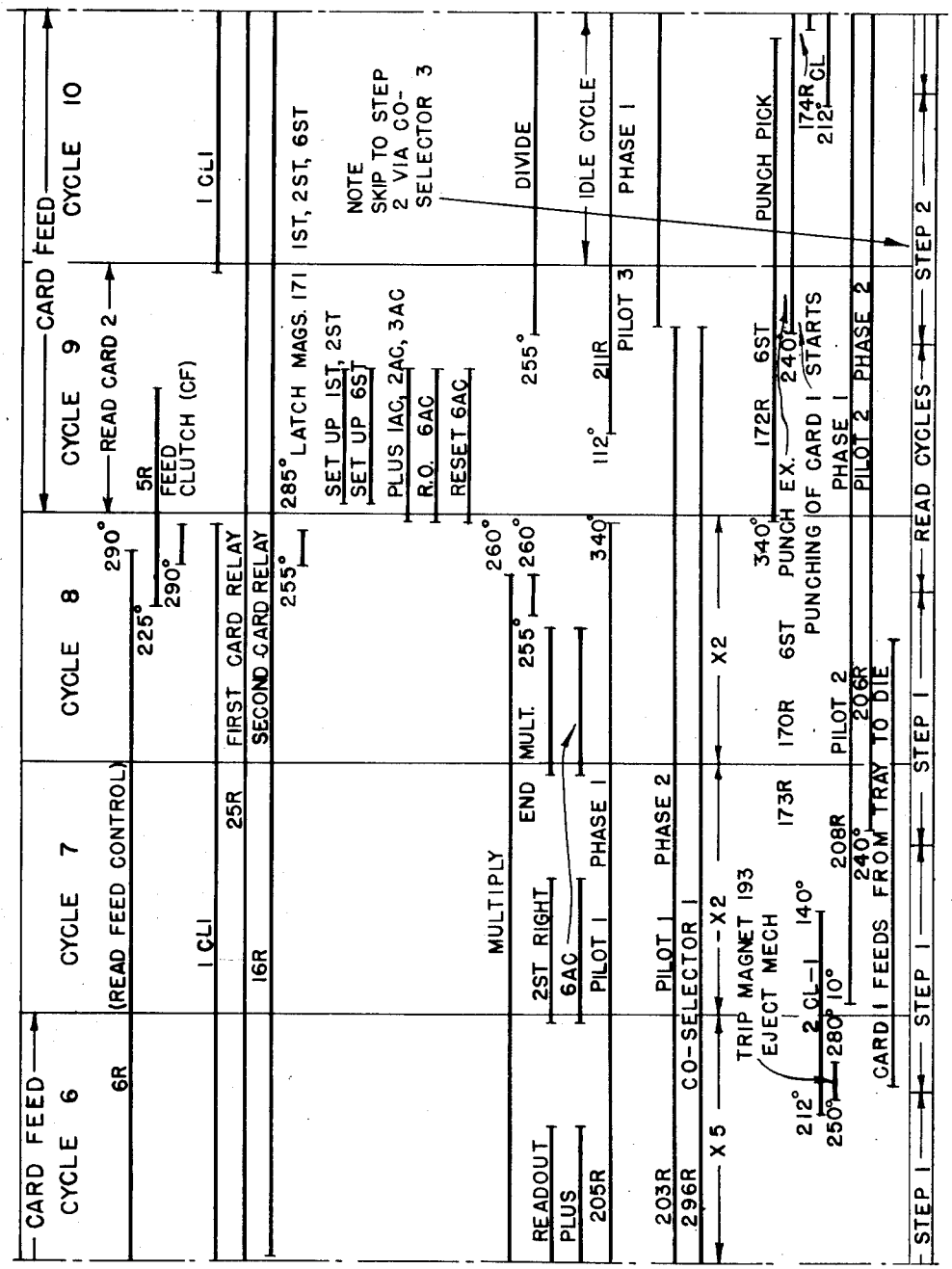

Before proceeding to describe the operations for cycle 6, Fig. 30b, it should be pointed out that at the end of cycle 5 certain factor selection operations will take place as previously described in detail. It should be sufficient at this time to state that such factor selection operations will result in the determination of a ×5 operation to take place during cycle 6.

On cycle 6 and during step 1 of the programming and under program control, read out relations are established for the read out from the right side of 2ST. Similarly, under program control in step 1, the 6AC accumulator is conditioned to receive an additive entry. Due to the program delay which is being effected on step 1, since multiplication is in progress, similar operations ensue on cycles 7 and 8 except that different multiplying factors are selected and different products entered. It may be mentioned that the program delay keeps repeating for cycles 6, 7, and 8, as indicated by the legend "Step 1" at the bottom of the diagram under each of the above 3 machine cycles.

Referring again to cycle 5 of Fig. 30a, and cycle 6 of Fig. 30b, on cycle 5, card #1 is read by brushes 103. On cycle 6, card #1 has its feed continued, as indicated by the dotted line, Fig. 20, into the punching tray at position 386, Fig. 20.

In cycle 6 at 212°, since card #1 is now in the tray, card lever contacts 2CL1 close. Slightly later the trip magnet 193 is energized as indicated by corresponding legend, Fig. 30b, and the card #1 is fed from the tray to the punching die. See Figs. 7, 8 and 20. It may be here explained that the card moves to the left or endwise to the first punching position and remains in such position until multiplication is finished.

At 10° of cycle 7, pilot 1 picks up pilot 2 as has been described in connection with Fig. 20, that is to say, relay 208R is energized at 10° in cycle 7. At 240° in cycle 7, the phase 2 relay 206R is energized and is thereby available to control punching or skipping of fields in card 1. Card feeding operations, which have been previously prepared for, have been deferred, awaiting the end of multiplication, which occurs in cycle 8. At the end of cycle 8, the machine will have completed multiplying operations pertaining to the amounts which were read from card #1. It is then ready to begin certain operations which pertain to card #2 and it also must continue and complete other operations which pertain to card #1. This involves an overlap of machine operations starting with cycle 9.

The first operation which may be mentioned is to bring about feed of card #2. This is brought about by energization of 5R at the degree time indicated in cycle 8, Fig. 30b. Another operation which must be made is to prepare 1ST, 2ST and 6ST, etc. to receive new amounts. This is brought about by the energization of latch magnet 171 related to each of these units at 255° time in cycle 8. With magnets 171 pertaining to 1ST and 2ST energized, the multiplier and multiplicand are cleared from these storage devices at the end of cycle 8. 6ST is also cleared but as it had no amounts in it this is a dummy or idle operation. During cycle 9, the product 6AC is transferred to 6ST. This is indicated by legend "RO6AC" and "Setup 6ST" in cycle 9, Fig. 30b. Concurrently with the read out from 6AC, 6AC is reset as indicated.

Referring to Fig. 30b, cycle 9, also Fig. 23b, during the card feed cycle which is identified by the legend CF2 on Fig. 23b, the divisor E is entered into 1ST and the dividend D is entered into the accumulator groups 1AC, 2AC, and 3AC. During this card sensing cycle, the amount G punched on card 2 is entered into 2ST for use later in the computations on card 2. During cycle 9, Fig. 30b, pilot selector 3, comprising the relays 211R and 209R, is picked up by reason of the "4" perforation in card #2. This perforation indicates that card #2 calls into operation the dividing apparatus and also a supplementary cross footing operation. Energization of the pilot #3 relay 211R will prepare the machine to correctly record the results in card 2 after completing the computations relating to this card. The pilot #3 operates in combination with pilot 7 in exactly the same manner as pilot #1 has operated in combination with pilot #2 to control punchings in the previous card. At the end of cycle 9, the machine is in position to begin a dividing operation and concurrently with such dividing operation on card #2 results are to be punched in card #1 as will now be described.

At the end of cycle 8, Fig. 30b, at 340°, relay 172R is energized to prepare for punching from 6ST. Such punching, however, cannot begin until 240° in cycle 9 when punching of card #1 starts as shown in Fig. 30b.

Punching of card #1 starts at cycle 9 and the machine is ready to commence dividing operations, these being prepared for in cycle 9 but effected in cycle 10 and in following cycles, as indicated by the legend "Divide."

During the sensing of card #2 in cycle 9, the

"4" perforation appearing in the left hand column of this card has a dual effect. It not only energizes pilot #3 to prepare for control of punching later in a series of operations, but also energizes co-selector 3 which causes the program device to skip immediately to step 2, since card #2 is not to be acted upon by multiplying but rather by dividing, as explained, according to the plugging of program step #2. The machine is thus prepared immediately for initiating dividing operations at the end of cycle 9 without any intermediate multiplying operations such as were performed on card #1, when program step #1 was the governing agent. Expressed otherwise, a particular perforation, namely, the "4" perforation in card #2, sets up the program directly for step #2 operations.

Figure 30C:
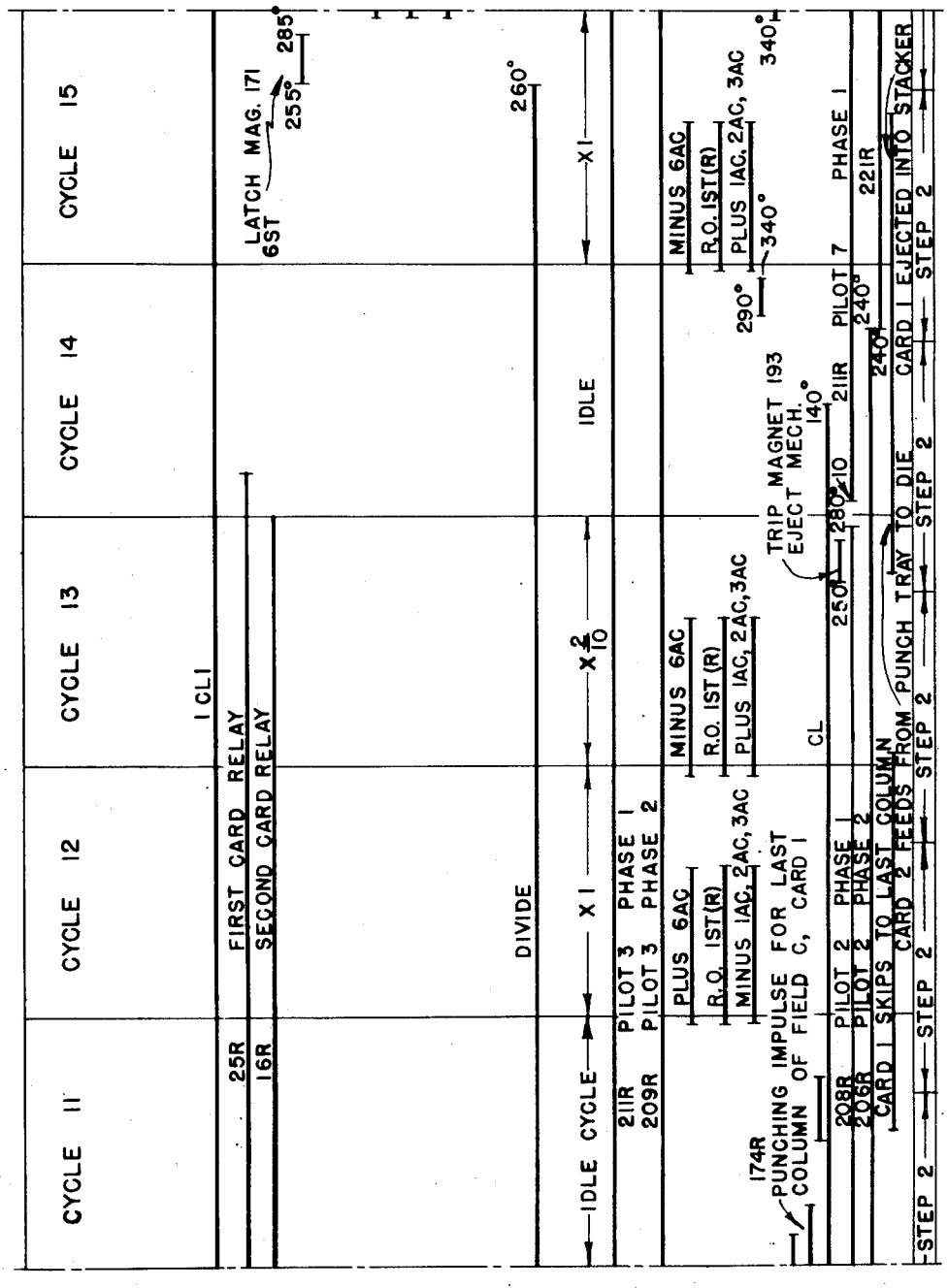

In this particular example, since relatively small numbers are used, the machine will require two idle cycles identified by the corresponding legend in cycles 10 and 11, Figs. 30b and 30c. During these cycles the divisor and the dividend are being compared, offset circuits being established in the manner described previously to compare the highest order significant digit of the divisor against the highest order significant digit of the dividend.

Accumulators 1AC, 2AC and 3AC, which function as a single large accumulator, into which the dividend has been entered, are plugged for minus entry since the dividend is to be reduced by subtracting multiples of the divisor during the dividing process. This operation is indicated on the chart as a series of operations designated "Minus 1AC, 2AC, 3AC," beginning at cycle 12, Fig. 30c.

Fig. 30c, cycle 11, indicates that the punching of the product in card #1 will be completed at some time such as shown early in cycle 11. This is an indeterminate time. When such punching is completed, it is necessary that the remaining space on the card #1 be skipped over as the corresponding space on other cards will require punching. Accordingly, card #1 skips from column 70 to the right hand end of the card as indicated by the legend "Card 1 skips to last column" in the lower left hand corner of Fig. 30c. When such skipping has been completed there is a concurrent operation ejecting card #1 into the stacker magazine and feeding card #2 from the punching tray into punching position. The time that these latter two operations take place is an indeterminate time with respect to machine cycles. In other words, card #1 in skipping to last column may reach such last column late or early in cycle 12, or thereafter, but when such card #1 has reached the last column, the other two operations follow concurrently under control of the mechanism shown in Fig. 7.

The machine is now ready to perform dividing operations, one dividing step involving a ×1 operation being effected in cycle 12, as shown. In this cycle the quotient is entered into 6AC additively as indicated by the plus legend. The dividend is reduced as indicated by the legend "Minus 1AC, 2AC and 3AC." The divisor itself is read out of 1ST, being read out either as the divisor high order digit for comparison purposes, or as the selected multiple of the divisor, after comparison has been made, for dividend reduction purposes, see Fig. 23b. It may be here again mentioned that if the divisor multiple be entered into the dividend negatively, the quotient entry will be a positive figure and vice versa, see legends "Plus 6AC and R. O. 1ST-R," cycle 12, Fig. 30c.

Referring to cycle 13, since the dividend shows a negative balance the next quotient entry is negatively into 6AC and there is an additive entry into 1AC, 2AC and 3AC.

Cycle 14 is shown as an idle cycle since two successive zeros were encountered when comparing the dividend and divisor.

On cycle 15 there is another minus entry of the quotient into 6AC with a corresponding positive entry of the deduction of the divisor multiple from 1AC, 2AC, and 3AC. As before, there is a readout from 1ST. This is actually a correction cycle since there was an overdraft when operating on the right hand significant order of the dividend. This was explained in the description of the dividing circuits. In other words, when division is terminated by reason of the remainder becoming smaller than the divisor and such remainder is negative, a correction is necessary to provide the desired positive remainder.

At the end of cycle 15, the machine prepares to enter the now completed quotient into storage device 6ST from which it will be punched. This operation is initiated by impulsing magnet 171 as indicated, Fig. 30c. During cycle 16 the program device will have been advanced to step 3, as indicated toward the end of cycle 15, Fig. 30c. During cycle 16, see Fig. 30d, the quotient is transferred to 6ST from 6AC, indicated by legends "Setup 6ST" and "R. O. 6AC." The quotient accumulator 6AC is concurrently reset and the dividend accumulators 1AC, 2AC and 3AC are reset as shown by corresponding legends. Referring to Fig. 23b, current flows along lines identified by an encircled "3." It may be further explained that the legends on Fig. 23b refer to the identification of either a factor or data derived from a card or later results to be punched back into a card. The encircled numbers correspond to the program step numbers shown at the lower edge of Figs. 30c and 30d. The machine is prepared for punching of the quotient which stands in the device 6ST by energization of 172R at 340° of cycle 15, Fig. 30c, prior to transfer of quotient to storage. At 240° of cycle 16 when such storage entry is complete, punching may be initiated as indicated by the legend "173R, 170R, 6ST punch exit."

The card #2 has been advanced to punching position and punching is initiated late in cycle 16. In an example such as has been described, endwise feed of card to punching position will almost certainly have been completed prior to the completion of dividing and under these circumstances punching will start as soon as the quotient has been transferred to 6ST and will continue during cycle 17. When the units position of the quotient is punched, an impulse is transmitted to relay 174R, shown by legend "Punch impulse—col. 70 last column of field F," indicating that punching from the related storage unit is complete and that such storage unit may be cleared and used for other operations.

Figure 30D:
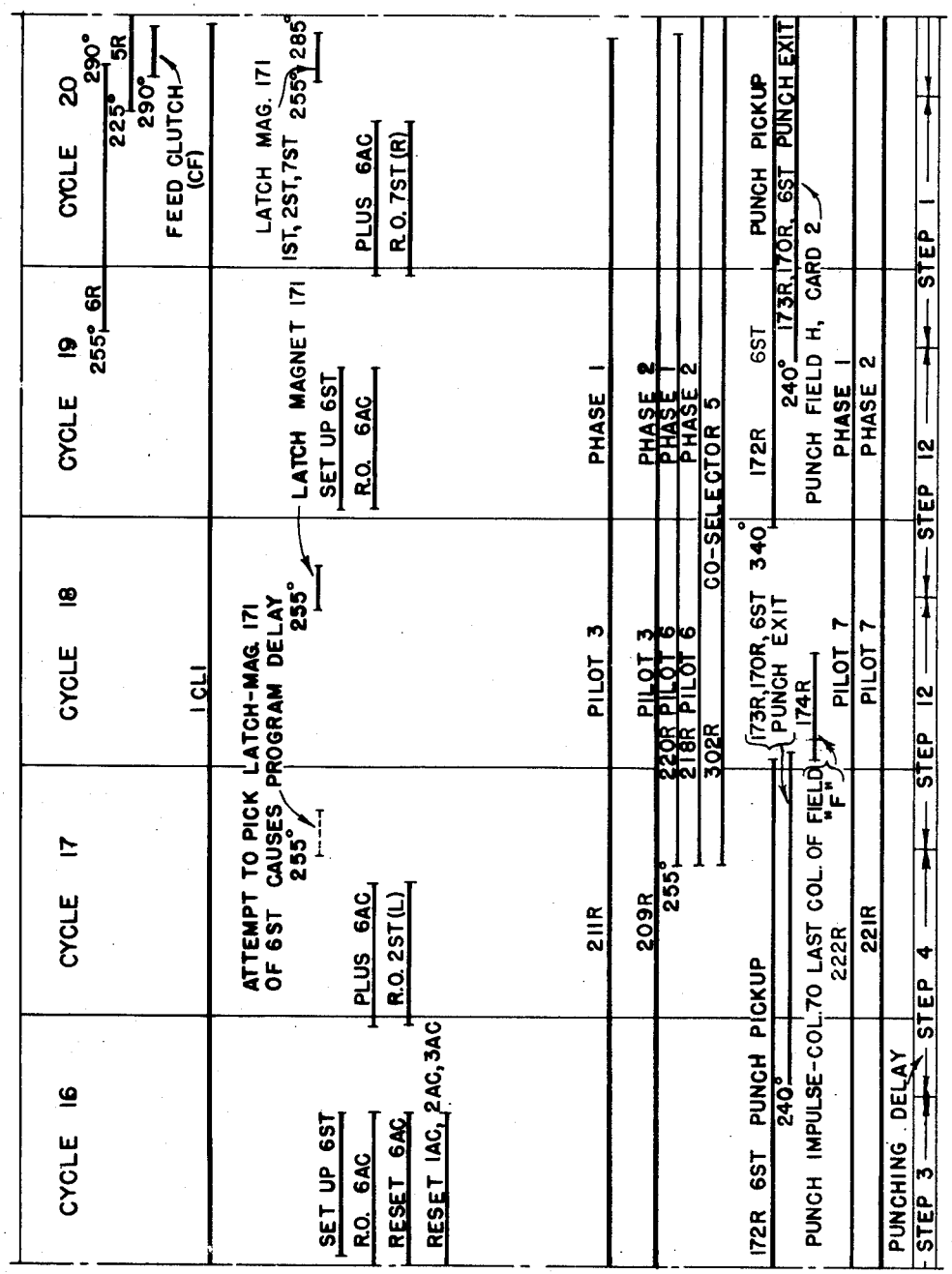

At the end of cycle 16, Fig. 30d, programming advances from step 3 to step 4 to control the operations to be effective at cycle 17. Such operations on step 4 comprise transfer of the value G, which has been held in 2ST, into the quotient now present in accumulator 6AC. Referring to Figs. 23b and 30d, accumulator 6AC is conditioned for plus entry and the left hand side of storage unit 2ST is called for readout during cycle 17, see legends "Plus 6AC" and "R. O. 2ST (L)." Accordingly, at the end of cycle 17, the amount standing in the accumulator 6AC will be a total of the quotient F plus the value G (which is expressed on the example) and which is identified on Figs. 18 and 23b as value H. At the end of cycle 17, the program skips from step 4 to step 12, and there is an attempt to pick up the latch magnet 171 related to storage unit 6, see corresponding legend, Fig. 30d. However, as in this example, the circuit will not be completed unless punching has been completed from storage unit 6ST.

Since punching time is unrelated to machine cycles, there can be no further advance of programming after cycle 17 until the punching of the intermediate result, in this case a quotient, has been completed. The governing control in this case is the punching of the units order of the quotient field. When the units order digit has been punched, this signals the machine that punching of the intermediate result is complete and that the storage unit which has been temporarily assigned by the machine to storage of the intermediate result may be released and that programming may proceed.

In Fig. 30d, program step 12 is indicated twice. When the program advances from step 4 to step 12, as shown, program step 12 attempts to cause transfer of the amount H into storage unit 6ST, as indicated by the legend "Attempt to pick latch mag. 171 of 6ST etc." Owing to the fact, however, that the preceding amount F has not yet been completely punched from unit 6ST, delay circuits operate in the manner previously specified to cause a program delay. In addition to initiating a program delay, the storage delay prevents transfer of the amount H into 6ST. As shown in cycle 18 in Fig. 30d, column 70 of field F is punched early in cycle 18, causing the energization of relays 173R and 170R to be terminated. When, therefore, program step 12 is active for a second time at the end of cycle 18, the impulse to latch magnet 171 of storage unit 6ST is completed and the amount H can be transferred into 6ST for punching.

In cycle 17, Fig. 30d, advance of the program to step 12 energizes pilot selector #6 relays 220R and 218R as well as co-selector 5 relay 302R coupled thereto. It has been pointed out that co-selector 5 contacts are used to alter the later effects of program step #1, which follows step 12, from those effects which were previously utilized.

The machine now operates during cycle 19 according to the plugging of program step 12 to transfer the new amount H now standing in the accumulator 6AC into storage unit 6ST. See legends "Set up 6ST" and "R. O. 6AC," cycle 19, Fig. 30d.

During cycle 18, relay 172R will have prepared the machine for punching and later in cycle 19, at 240°, such punching will be initiated upon reenergization of 173R and 170R in the same manner as was described for the punching of the intermediate result. The machine now starts punching the final result H from storage unit 6ST and continues such punching throughout the following cycle, or cycles, as required.

At the end of cycle 19, the program begins to repeat, returning to step 1. Program step 1 causes energization of relay 6R as shown at 255° of cycle 19, this resulting directly in energization of relay 5R at 225° of cycle 20 with consequent energization of the feed clutch magnet CF as shown at 290° of cycle 20.

While there is a purported transfer of the amount from 7ST into 6AC during cycle 20, no significant transfer occurs since there is no amount in 7ST at this time. Late in cycle 20 at 255°, latch magnets 171 pertaining to 1ST, 2ST and 7ST are energized to reset these storage devices.

Figure 30E:
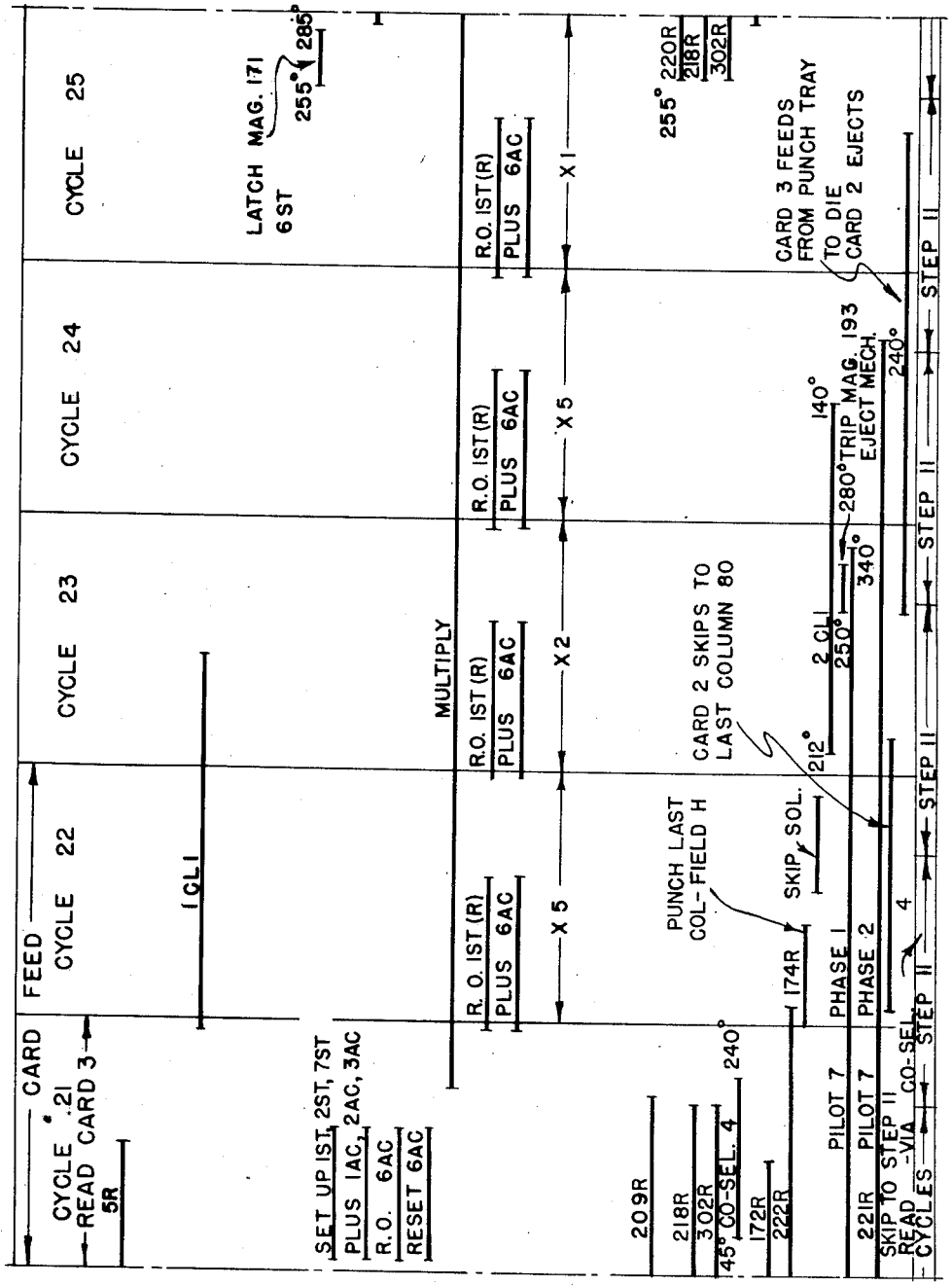

Referring now to Fig. 30e, cycle 21, card #3 is read and the amount J, Fig. 23c, is read therefrom and entered in 1ST, this amount being the multiplier and multiplicand of this particular card. The storage device 2ST mechanically functions but there is no entry since there are no perforations in the corresponding card 3. The result standing in accumulator 6AC is transferred into storage device 7ST, being accumulated for later punching and summary, this being indicated by legends "Set up 1ST, 2ST, 7ST" and "R. O. 6AC."

The legend "Plus 1AC, 2AC, 3AC" indicates that 1AC, 2AC and 3AC are in condition for plus entries. They receive no significant entry, however, since there is no punching in the corresponding fields of the card.

During cycle 21, when card #3 is sensed, the pilot selectors #3 and #6 are deenergized as shown being plugged to "Feed drop out" hubs as shown on Fig. 19a, as described elsewhere. Accordingly, relays 209R, 218R, and 302R, the latter being coupled to pilot 6, are deenergized. During cycle 21, the punching of the final result from card #2 is still proceeding and pilot selector 7 is being held for this purpose, the relays 222R and 221R both remaining energized at this time.

Referring to Fig. 30e, the completion of the punching operations for card #2 which are indicated by the lines at the bottom portion of the sheet, may extend into cycle 22. These need not be described at this time as the delayed punching has been described previously and similar controlling selectors are fully shown on Fig. 20.

During card cycle 21 as card #3 is sensed, the product or quotient accumulator 6AC reads out and is reset as shown. Card #3 is identified by a "7" perforation which indicates that the program device should advance directly to step 11 late in cycle 21, as indicated by the legend "Skip to step 11 via co-selector 4." Program step 11 is plugged to effect a squaring operation which is an unusual type of application in which the amount entered in a single storage device, in this case 1ST, is to be treated both as a multiplicand and as a multiplier. Advance to program step 11 for this purpose is a co-selector 4 which is plugged to the #7 spot of emitter EM3 so that, when the machine detects a "7" perforation at 45° of machine time, the co-selector 4 will be energized as indicated in the lower left hand corner of Fig. 33e. Accordingly, the program device immediately advances to step 11 and multiplying operations are initiated, using 1ST both as multiplicand and as multiplier.

The operations on cycles 23, 24 and 25 are generally similar to normal multiplying and need not be explained cycle by cycle.

Figure 30F:
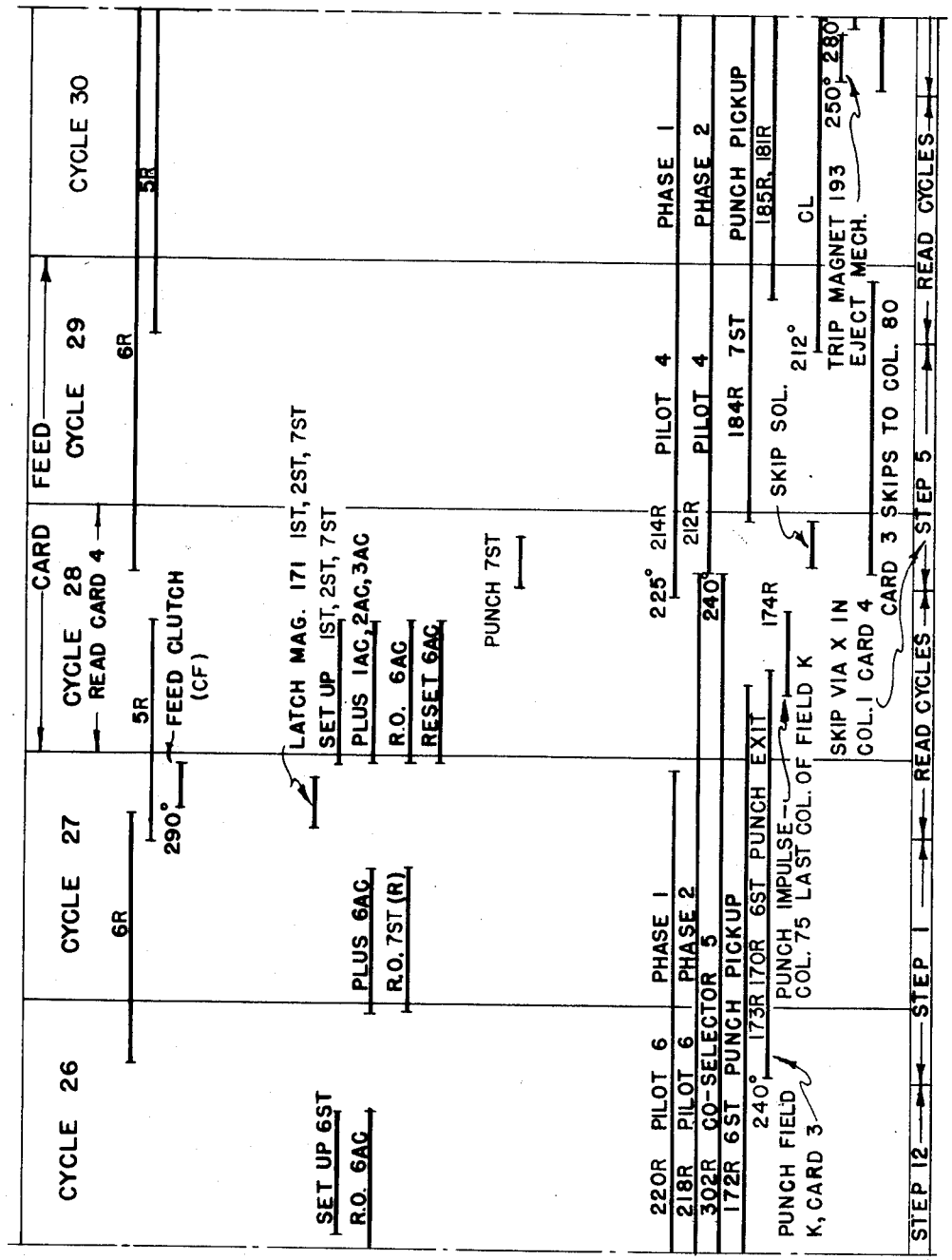

Toward the end of cycle 25, there is a signal that multiplication has been completed and accordingly the latch magnet 171 of storage device 6ST receives an impulse at 255° preparatory to receiving the result, or squared amount, from accumulator 6AC. Referring now to Fig. 30f, readout of the accumulator 6AC takes place during cycle 26 and this squared amount is transferred into storage device 6ST, as shown. Generally speaking, the operations 26 and 27 correspond to the operations performed during cycles 19 and 20, since in both cases the machine operates on the 12th step of the program and then returns to the first step of the program. In each case these operations are performed for the sole purpose of collecting summary results through the medium of storage unit 7ST and accumulator 6AC, as has been described in detail in connection with cycles 19 and 20. This operation is expressed diagrammatically by the crossed connections between 6AC and 7ST. It will be noted that these connections are identical at the lower portion of Fig. 23b and at the lower portion of Fig. 23c, since in both cases 7ST transfers a previous accumulated amount into a newly computed result in 6AC and then transfers the new accumulator total back to 7ST where it remains until operations are completed or until the next following card. At the end of cycle 27 the machine prepares to operate on card #4. The latch magnets 171 for 1ST, 2ST and 7ST are energized and during cycle 28, which is a card feed cycle, there is an attempt to read factors and other data in the usual manner. However, in this case card #4 bears no identification except an "X" perforation in the first column, which identifies this card as a summary card. Accordingly, there is no entry into 1ST, 2ST, 1AC, 2AC or 3AC during cycle 28, Fig. 30f. The only active operation is a transfer of the total from accumulator 6AC into storage device 7ST. There is an accompanying reset of accumulator 6AC during this cycle.

At 225° of cycle 28 one of the brushes encounters the "X" perforation identifying card #4 as a summary card and pilot selector #4 is energized through the medium of relays 214R and 212R in the usual manner. At this time, there is a provision for an immediate skip to program step 5 under control of the aforementioned "X" perforation.

Program step 5 is plugged directly to punch any amount standing in storage device 7ST and such punching is initiated immediately by energization of relays 184R, 185R and 181R as shown by the related legends on cycles 29 and 30 in Fig. 30f. It should be explained at this time that since there are no calculations related to card #4, and the machine prepared for punching in cycles 29 and 30, the actual punching in this card must be delayed until the punching of card #3 is completed and until card 3 has been ejected and card 4 has been fed into punching position as indicated in the lower right corner of Fig. 30f. In an example such as here being traced, the actual punching will be initiated approximately at a position as shown on cycle 33, and there will be a loss of cycles 31 and 32 during which time operations as just described are being completed.

Rate and multiplication

This machine, like other machines of this general class, is also adapted to handle so called rate card operations wherein the first card of a run will be perforated with one factor of a computation and wherein the other factor of the computation is derived from each of a series of detail cards which follow the rate cards in a run. With such rate card operations, provision must be made to retain the reading of the factor on the rate card in a storage device. This storage device must be cleared to receive a new amount from a following rate card at the proper time. Frequently the operations on the detail cards are of a complex character and for expeditious operation it is preferable to avoid unnecessary operations for the rate card itself. The handling of the rate card may be compared generally to the operations on the so-called summary card which have heretofore been described (card #4, Fig. 18 and Fig. 23d). On rate card operations the advance sensing brushes 104 are utilized.

The handling of rate cards involves a series of operations and the use of pilot selector devices which function in a manner similar to that described in connection with the example of Fig. 18, with certain important differences. The simplest handling of rate card involves the use of three pilot selectors. One of the pilot selectors would be controlled from advance brushes 104 and the other two pilot selectors would be used in what might be termed a tandem hookup such as was shown in Fig. 20. The first pilot selector would be controlled from the first pilot brushes 104 and would be picked up during the card feed cycle when the last card of the preceding group is being sensed. This pilot selector will have assigned to it the general function of controlling the restoration of a multiplier storage device and the entry of a new multiplier rate, and is effective preceding and through the sensing of the same rate card at the reading brushes 103.

The other two pilot selectors will function in substantially identical manner to the operations related in connection with the pilot selectors 1 and 2 which operate on card 1 (Fig. 18). In this case the first of the pair of selectors so used will transfer its control to the second one of the pair as the rate card is delivered into the punching tray and the second pilot selector of this pair will be effective to skip out the rate card without punching, since there will have been no computations performed on this card.

It will have been noted by reference to the timing charts of Figs. 30a to 30g inclusive that each time the feed operates it continues to function during two machine cycles. A card is sensed by the reading brushes 103 during the first of these two cycles and a following card which has been advanced from the feed magazine is always sensed during the second of this pair of card feed cycles at a time when the previous card is being advanced to the punching unit tray. Under such conditions the sensing at the brushes 104 is not effected concurrently with the sensing of the brushes 103 but within the same pair of card feed cycles and at a corresponding time with respect to index points as related to storage and accumulator entry. Owing to the similar index point timing of the two sets of brushes, a further incidental characteristic of the present rate card control is that rate card control, in place of being limited to control under X-perforation, as heretofore, can be effective for control from any index point perforation.

A general form of the plugging for such an example will now be briefly described. One of the plug hubs generally designated 550 (Fig. 14j) will be connected to the input of a pilot selector at the X-input hub via plugwire 551 to a pilot selector shown on Fig. 14v. The selector employed for this purpose might, for example, be pilot selector 3. The contacts of this selector would then be connected by plugwires 552 and 553 as shown, in a circuit from a read cycle's hub (Fig. 14c) to pilot selector #3 (Fig. 14w) and thence through pilot selector contacts 209R3 via wire 553 to the control hub of storage device IST, Fig. 14h, which controls multiplier entry to storage. This circuit would function to clear storage device IST and effect entry of a new multiplier amount as the rate card is sensed at the reading brushes 103.

It is ordinarily desirable to skip out the rate card without punching any amount in this card and to control such skipping action two pilot selectors must be used. If pilot selectors 1 and 2 are to be employed for this purpose, they may be connected in substantially the same manner as shown and described in connection with Fig. 20, the only important difference being that the pilot 2 will have its contacts 206R2, for example, connected in a circuit to effect skipping by a connection such as the plugwire 398 used as described for the problem of card 18. In such case the card would immediately skip out as soon as it reaches the punching position if pilot selector 2 be picked up in response to the controls just described.

Field selection of multiplicand or multiplier

Another use of the advance sensing brushes 104 relates to selecting one of two or more fields in the card which may contain one of the factors. As an example: if each card be prepunched with a wholesale and retail price, a control perforation in one additional column of the card will indicate to the machine that a particular field is to be sensed for use as a multiplier and the other discarded. This is a relatively simple application of a pilot selector. In such case a pilot selector would be plugged from one of the hubs 550 (Fig. 14j). The contacts of this selector (shown on Fig. 14w) would be inserted by suitable plugging, in the line between sensing brushes 103, Fig. 14j, and the entry hubs of the multiplier storage device IST (Fig. 14k). One selector would be so employed if it were necessary to select from either of two fields and additional selectors might be employed, with suitable interlaced plugging, to select one from as many fields as desired. This type of operation, which is generally termed "field selection," is well known in the art.

Rounding off

Machines of this general class frequently employ a so-called rounding off control to bring the result to the nearest half value. Rounding off, as heretofore practiced, involves the entry of a "5" in the selected accumulator order, which is always one column lower than the units value to be punched. In earlier machines this rounding off has been accomplished by initially introducing a "5" into the column to the right of the units order to be punched. In the present machine the clearing of the result from an accumulator and the re-entry of the "5" in preparation for the next calculation is effected during the same machine cycle. In other words, in place of separately introducing the "5" as heretofore, the "5" for rounding off purposes is introduced as an incident to reset. This saves operating time and is made possible in the present machine by the type of accumulator which is employed.

For rounding off with the desired "5" to be introduced in the lowest order of accumulator 2AC (Fig. 14q), a plug connection 556 is made from one of the reset-to-5 sockets in Fig. 14j to the indicated socket in Fig. 14q. A further plug connection 428 will be made from one of the program exit hubs for program step 3 (Fig. 14c) to the reset hub indicated on Fig. 14o, upper right.

This energizes the 2AC reset relay 430R. When cam contact C19 closes at 214° a circuit will be established through the 430R11 contacts now shifted to energize the minus relay 425R (Fig. 14o). When cam contacts C21 (Fig. 14s) close at 214° a circuit is completed through 704R6 now closed to energize relay 581R. When cam contacts C10 close at 225° (Fig. 14j) a circuit is completed through 701R6 contacts now closed through 581R8 contacts now closed and out through plug connection 556, previously mentioned to Fig. 14q. The circuit continues through relay contacts in the position shown, namely, 401R12, 404R12, 407R12, 410R12, 413R12, through the now shifted relay contacts 425R6 to energize the Go magnet 125 in the units position of accumulator 2AC. The accumulator wheel will now receive five steps of movement after which the accumulator will receive a stopping impulse in the manner now to be described. Referring to Fig. 14v, when cam contacts C1 close at 320° a circuit is established to energize pickup coil 587R. With relay 587R energized (Fig. 14s) a circuit may be traced through cam contacts C14 at 337½° to and through relay contacts 587R2, (Fig. 14q) through the now shifted 431R12 contacts to energize the stop magnet 126. This will stop the accumulator wheel which has received five steps of movement. After such "5" rounding off entry the accumulator wheels of accumulator 2AC will stand with a reading of 999994 which is the 9's complement of 000005.

Signal lights

Referring to Fig. 14h, certain signal lights are provided. Those designated "1" to "8" at the lower left portion of Fig. 14h are used to indicate column shift operations. In case the operator of the machine desires to ascertain the status of column shift the switch designated "520" can be thrown to closed position whereupon current supply will be afforded from line 340 through the relay contacts 701R11 now closed. Assuming that shift 4, for example, is being tested, relay 487R will be energized, shifting the 487R8 contacts to reverse position from that shown. If the circuit is then traced down it will be seen that the #5 light is illuminated, the four lights to the left being dark, which signifies that shift has taken place four columns to the left of direct entry. It seems unnecessary to trace the lighting of lights for other column shift controls. At the lower right of this same figure, there are other lights, one row being designated with the legends .2, .5, 1, 2, 5, and 10. Another set of lights being labelled "plus" with similar numerical designations. These particular groups of lights indicate which multiplier factor is being used. The circuit from these lights is from the same source through relay contacts 701R11. Assume that the ×2 multiple is being tested. Under these conditions ×2 relay 696R12 contacts are in shifted position from that shown, and if a circuit is traced it will be found to extend to the lower light designated "2" in the plus row. On a dividing operation, if the entry is going to be of negative character, relay 503R is energized and in this case the light which is illuminated will be found to be the minus 2 light. No further tracing is believed necessary to illustrate the manner in which various multiplier relays control lighting of corresponding lamps.

Reset test circuit

The machine includes a subordinate feature which in general allows the machine to continue to run if reset operations are effected properly and which interrupts machine operations if a particular accumulator is not correctly reset to zero (accumulator wheels positioned at 9). It will be assumed first that only accumulator #2 is being reset and the other accumulators are not being reset. Referring to Fig. 14j, at 225° cam contact C10 provides current supply through emitter spot 11 to a wire 510 extending through to Fig. 14s. Since accumulators 6AC, 5AC, 4AC, 3AC and 1AC are not being reset, a test circuit is established through contacts 510R8, as shown, through wire 511, through 501R8 as shown, Fig. 14r, wire 512, 470R8, as shown, 461R8 as shown, through 430R8, Fig. 14q, now in shifted position, since this accumulator is being reset; thence through contacts 434R12, as shown, through the 9's carry contact in the units order and thence serially through all of the 9's contacts and out via 430R9, in shifted position, through 421R8, as shown and 474R9 as shown, to energize reset test relay 83R (pickup). A hold circuit for this relay is established through stick contacts 83R1 (Fig. 14o), the circuit going back to cam C20. If relay contacts 83R3 (Fig. 14e) are open, no circuit will be completed to the error stop relay 40R, pickup coil. If on the other hand, one of the wheels in accumulator 2AC failed to return to the "9" position upon reset, the contacts in the accumulator would interrupt the circuit to the 83R relay and in this event upon cam contact C9 making at 250°, a circuit would be established through 83R3 now closed, to relay 40R. The manner in which relay 40R operates to stop the machine has previously been described.

What is claimed is:

1. In a cyclically operable calculating machine, including an accumulator settable to represent a product, a number storing means settable to represent a multiplier, a number storing means settable to represent a multiplicand, means to test the multiplier storing means, means for setting the machine for normal sign or reversed sign operations, cyclically operable means including entry effecting means and cyclically operable selecting means responsive to tested digits of 1, 2, 4, 5 and 9 upon normal sign operations and responsive to tested digits whose nines complements are 1, 2, 4, 5 and 9 upon reverse sign operations for entering LH and RH partial product components into the accumulator in a single accumulator entry cycle, means responsive to tested digits 4 and 9 upon normal sign operations and to digits whose nines complements are 4 and 9 upon reverse sign operations for controlling the aforesaid setting means to shift from normal sign to reverse sign operations and vice versa following the single cycle entry of the LH and RH partial product components relating thereto into the accumulator, and cyclically operable means including entry effecting means and cyclically operable selecting means responsive to other tested digits for entering LH and RH partial product components into the accumulator by successive accumulator entry cycles.

2. The invention according to claim 1 wherein the cyclically operable means includes means to test the multiplier storage means for the presence of simple multiplier digits 1, 2 or 5 in a given order with means controlled thereby upon the detection of a simple multiplier digit to set up a shift control to test a further multiplier order upon an immediately following cycle.

3. A calculating punch including a record reading section, a number storage section including a plurality of number storage units settable to represent numbers, an accumulating section and a punching section, entrance and exit controls for each number storage unit, separate and independent exit and entrance controls for the accumulating section, exit controls for the reading section, entrance controls for the punching section, a program section including a program read and preparing relay which is set under control of the record reading section when a record is to be read, program controls under the control of said read and preparing program relay for controlling the operations which are to be selectively effected during a record read cycle, and a plurality of program step relays for controlling selectively the entrance and exit controls above mentioned for various machine operations which are to be effected in a following machine cycle or cycles, means for setting up the first of the program step relays under control of the program relay and means for setting up others of the program step relays under control of a preceding step relay.

4. The invention according to claim 3 wherein means is provided under control of the record reading section upon the feeding of a following record for breaking down the setup of a program step relay.

5. A program control for a record controlled calculating machine having a record reading and record feeding section, said program control including a program read relay which is set up under control of the record feeding section when a record is fed, and which setup is broken down following the record feeding cycle, a plurality of program read outlets controlled by said program read relay, and means for supplying advance setup impulses to said read outlets and for also supplying sustained entry controlling impulses to said outlets for the purpose described.

6. The invention according to claim 5 wherein a plurality of program step relays are provided, each with read out outlets, with means for supplying all cycles set up in advance and sustained entry controlling impulses thereto, means for setting up the first of the program step relays from the program read relay and means for setting up succeeding step relays under control of a preceding step relay.

7. A program control for a calculating machine including a plurality of program step relays, one for each program step, a plurality of program control relays, one for each program step relay, a stepping control relay adapted upon energization to permit a program control relay to energize a related program step relay, means effective upon deenergization of the stepping control relay to repeat the energization of a program step relay, a plurality of skip hubs for certain of the program steps and means connecting each of said hubs to a related program control relay whereby the program may be skipped to any desired step depending upon the current supply to a selected skip hub.

8. A read out for a calculating machine, with the usual denominational ordered setting elements, each with brush means, a single set of conducting strips one for each order, a single set of segment spots one for each order, the aforesaid elements, brush means and strips and segment spots constituting a single read out including in combination, sets of multi-contact relays, a source of impulses for concurrent readout operations, a source of impulses for column by column read out and means for selectively controlling such multi-contact relays for selectively routing said impulses whereby said common single readout may be utilized for either concurrent read out operations or column by column read out operations.

9. In a multiplying machine with a single product accumulator and with storage means set up to represent a multiplier, digit value ascertaining and testing means for testing an order of such storage means to ascertain the presence of compound digits 3, 4, 6, 7, 8 or 9 therein and control means for determining compound operations upon the presence of any of said digits in an order of the storage means which compound operations comprise two cycle entry operations or a single cycle entry operation into the single accumulator with an accompanying sign change, which sign change modifies subsequent operations, said control means being controlled by said testing means, and said compound operation determining means including means to cause the entry of successive partial product components into the single accumulator.

10. In a multiplying machine with storage means set to store a multiplier, a set of multiplier relays for digits 1, 2 and 5, a shift one column to the right relay, means to test each order of said storage means to ascertain whether such order contains simple digits only, namely 1, 2 or 5, or compound digits such as 3, 4, 6, 7, 8 or 9, means controlled by said testing means upon detecting 1, 2 or 5 digit therein for selecting the related multiplier relay and for also calling into action a shift one column to the right relay for the purpose described, and means controlled by said testing means upon ascertaining the presence of compound multiplier digits for bringing about a retest of said storage means by said testing means and for making a further selection and sub-selection of the said multiplier relays.

11. In a calculating machine with number storage means with input and output controls therefor, accumulating means with input and output controls therefor, multiplying calculation relay control means, dividing calculation relay control means, a record reading and card feeding section, and control means therefor, a punching section, input controls therefor, a programming relay unit with a card read program preparing relay and program step relays, plugging means for selectively interrelating the program preparing relay, and the program step relays with the various exit and input controls aforesaid and with the multiply relay controls and said dividing controls for the purpose described.

12. In a multiplying machine of the partial products type with means to store an entered multiplicand factor and a multiplier factor and means to accumulate LH and RH components of partial products based upon such stored factor including in combination means to test the storage means for the multiplier factor to ascertain the digital value of a digit in a given order, means associated with said testing means and effective when a stored multiplier digit is a simple 1, 2 or 5 digit to cause both the LH and RH components of such digit times the stored multiplicand to be entered into the products accumulating means, and means effective when such testing means ascertains the presence of a compound multiplier digit other than the 1, 2 or 5 in any order to make a sub-selection which may utilize the LH and RH components of such 1, 2 or 5 multiplier digits as combined components which taken together represent any stored digit, and means to cause such last mentioned components to be entered in the products receiving accumulator, said last named means including entry effecting means, column shift means and sign change control means, said column shift means and said sign change means being controlled by the testing means.

13. A multiplying machine with means to store an entered multiplicand and an entered multiplier, product accumulating means, means to enter partial product components therein under the control of the multiplier and multiplicand storage means including, in combination, LH and RH partial product component selecting means including times one, times two, times five and times 10 multiplying relays, operable singly or in combinations, minus entry determining means, compound operation determining means, sign change determining means, means to test the multiplier storage means and responsive to the value of the stored digit to determine whether the stored digit or its nines complement will be utilized for selection of said relays singly or in combination for effecting multiplication by any stored digit, means also controlled by the said testing means and responsive to the value of the stored digit for normally causing a single entry cycle when the stored digit determines such operation and for controlling the minus entry determining means to effect a minus entry when required, means also controlled by said testing means and responsive to a stored multiplier digit for initiating a compound operation, and means also controlled by said testing means for initiating a sign change when the stored digit value requires such sign change.

14. The invention according to claim 13 wherein the times 10 relay is called into action by said testing means when the presence of an 8 or 9 multiplier digit is detected, upon normal sign operations and when a multiplier digit whose nines complement is an 8 or 9 is detected upon reverse sign operations.

15. The invention according to claim 13 wherein a sign change relay is provided with means controlled by the testing means for calling it into action when the presence of a multiplier digit of 4 or 9 is detected upon normal sign operations and when a multiplier digit whose nines complement is 4 or 9 is detected upon reverse sign operations.

16. The invention according to claim 13 wherein a shift plus 1 controlling relay is provided and including testing means and circuits for controlling it to render it effective upon completion of operations pertaining to any multiplier digit.

17. The invention according to claim 13 wherein supplemental control means are provided for terminating calculations, comprising means to test the units order of the multiplier storage means and responsive to stored digits 4 and 9 upon normal sign operations for selection of combinations of said relays and said minus entry determining means to cause selected positive and negative LH and RH partial product components related to such digits and to the stored multiplicand to be entered in the product accumulating means by compound operations in two accumulating cycles.

18. The invention according to claim 13 wherein supplemental control means are provided for terminating calculations, comprising means to test the units order of the multiplier storage means and responsive to storage digits whose tens complements are 1, 2 and 5 upon reverse sign operations for selection of said relays singly and selection of said minus determining means to cause selected negative LH and RH partial product components related to such digits and to the stored multiplicand to be entered in the product accumulating means in one accumulating cycle, means to test the units order of the multiplier storage means and responsive to digits whose tens complements are other than 1, 2 or 5 upon reverse sign operations for selection of combinations of said relays and said minus entry determining means to cause selected positive and negative LH and RH partial product components related to any such digits and to the stored multiplicand to be entered in the product accumulating means by compound operations in two accumulating cycles.

19. A multiplying machine having a multiplier storage unit which stores a multiplier, a group of relays all selectively set under control of said multiplier storage unit according to the number stored therein, said relays comprising a times 1 multiplying relay, a times 2 multiplying relay, a times 5 multiplying relay, a times 10 relay, a minus relay, a sign change relay and a times transfer relay, means to test and retest the multiplier storage unit order by order, means controlled by said testing means to call into action either the times 1 relay, the times 2 relay or the times 5 relay depending upon which of the above digits is detected in an order upon test thereof, means to call into action the times transfer relay when the presence of any digit 3, 4, 5, 6, 7, 8 or 9 is detected in any order upon test, means controlled by testing means to call into action the times 10 relay when either a 9 or an 8 digit is detected upon test, means to call into action the minus relay when either a 3 or an 8 multiplier digit is detected, and means to call into action the sign change relay when a 4 or 9 digit is detected upon test.

20. A record controlled multiplying machine comprising a plurality of selectively operable accumulators, a plurality of selectively operable number storage units, a program unit comprising a plurality of program steps each step comprising a plurality of pluggable outlets, program preparing means for initiating a program set-up, read cycles plug outlets controlled by said preparing means, a record reading section with means for feeding record cards therethrough, means to set up the program preparing means under control of said record feeding means, means to supply setup and entry controlling impulses to the pluggable outlets of said read cycles outlets and to program step outlets, input and output controls for said accumulating means and said number storage means and means to control said input and output controls from the pluggable outlets of the program means and from the read cycles outlets for the purpose described.

21. A record control accounting machine including record feeding and record reading means, a program preparing relay setup under control of the record feeding means, a plurality of program step relays, the first of which receives its setup under control of the program preparing relay, means for controlling the setup of succeeding step relays under control of a preceding step relay means controlled from the record reading means in accordance with index point designations on records for selectively rendering active desired different program step relays according to a sensed index point upon a record whereby one index point will afford one setup of a program step relay and whereby a different index point will select a different program step relay for activation, and means to break down the setup of any of the program step relays under control of the record feeding means.

22. A record controlling machine comprising number storage devices each device having a latch magnet for releasing a storage device which has had a number stored therein, a record feeding section, means for setting up a program preparing relay under control of said record feeding section, a set of read cycles outlets under control of said preparing relay, means for supplying set up and entry controlling impulses to said read cycles outlets, means for controlling the latch magnets of selected number storage devices from the set up impulses supplied to said read cycles outlets, exit outlet control means for said number storage devices and means to control said exit outlet control means from the entry controlling impulses supplied through said read cycles outlets.

23. A program control for a calculating machine including in combination a plurality of program step relays, one for each of a plurality of program steps, record feeding means, and means effective upon record feed for setting up the first of said step relays, means to set up succeeding step relays under control of a previously set up step relay, a stepping control relay, means controlled by it when in one status to cause the program step relays to be set up step by step, and means controlled by it when in a different status to cause repeated set up of a previously set up program step relay.

24. The invention set forth in claim 23 wherein a program delay relay is provided with means controlled by it for controlling the status of the control relay.

25. The invention set forth in claim 23 wherein a program delay relay is provided with means controlled by it for controlling the status of the stepping control relay and also including a calculating relay which is effective during multiple machine operations pertaining to multiplying or dividing, with means controlled by said calculating relay for controlling the status of aforesaid program delay relay.

26. A calculating punch including a number storage unit, said storage unit including a latch magnet adapted upon energization to condition the storage unit for receipt of a new number, a program control relay which is set up when a number is to be punched out of storage, a train of relays set up under control of said last named relay, means controlled by the relays of such train to condition the storage unit for read-out and for preventing subsequent operation of said latch magnet, means called into action when the last column of the storage device is read out for punching, for breaking down the setup of said train of relays whereby a new amount can be entered into storage after the last column has been read out and punched.

27. A calculating punch including a number storage unit which receives amounts to be subsequently punched, a program control for the storage unit, means controlled from said program control to condition a storage unit to receive a number, means also controlled by said program control means to condition said storage unit for readout to control punching, and means to prevent reconditioning of the storage unit to receive a new amount until the former amount therein has been completely punched.

28. A calculating punch including a number storage device in which a number can be stored for controlling subsequent punching, restoring control means for controlling reset of the number storage means, control means set up upon receipt of a number into storage, means to retain said set up until the last column has been read out of storage for punching, and means controlled by the foregoing control means to suppress operation of said restoring control means until the last column of stored amount has been punched.

29. A relay control for a calculating machine comprising a pair of pilot relays, each relay of the pair comprising a phase one relay and a phase two relay, each phase one relay comprising at least one pickup coil, a latching trip coil and contact means adapted to be shifted when the pickup coil has been energized and to be thereafter latched, each phase two relay comprising at least one pickup coil, a hold coil and contact means adapted to be shifted when the pickup coil is energized and held, said second pilot relay comprising a similar phase one and a phase two relay with like contacts, means to energize the pickup coil of the phase one relay under record card control, means to energize the pickup coil of the phase two relay of said first pilot relay under control of the contacts which are shifted by the phase one relay, means to energize the latch magnet of the phase one relay after the phase two relay has been set and means to energize the phase one relay of second pilot relay under control of the shifted contacts of the phase two relay of the first pilot relay.

30. The invention according to claim 29 wherein means is provided to de-energize the hold coil of the first pilot phase two relay after such first pilot relay has transferred its control to the second pilot relay.

31. The invention according to claim 29 wherein means is provided to energize the latch magnet of the phase one coil of the second pilot relay, said means comprising a control which is indeterminate in its time of operation with respect to machine timing.

32. A relay control for a calculating machine comprising a first pilot relay comprising a phase one relay and a phase two relay, said phase one relay comprising at least one pickup coil and a latching trip coil with shiftable contacts set up when the phase one coil is picked up and adapted to be thereinafter latched, said phase two relay comprising a pickup coil adapted to be energized under control of the contacts of the phase one relay and a hold coil, means to energize the latching magnet of the phase one relay after the phase two relay has been picked up, means to maintain energization of the hold coil of the phase two relay for a period of time after the phase one relay has been released, and record controlled means for causing pickup of the phase one relay.

33. The invention according to claim 32 wherein contacts are provided for the phase two relay which are adapted to maintain their setting during the period when the phase two relay is held energized.

34. A relay control for a calculating machine, comprising a first pilot relay and a second pilot relay, each of the above relays comprising a phase one relay which comprises at least one pick up coil, a latching trip coil and shiftable contacts, each of the above relays comprising a phase two relay which comprises at least one pick up coil, a hold coil and shiftable contacts, means for setting up the phase two relay of the first pilot relay under control of the phase one relay of the first pilot relay, means for setting up the phase one coil of the second pilot relay under control of the phase two relay of the first pilot relay, record controlled means for energizing the pickup coil of phase one of first pilot relay, means for energizing the latching trip magnet of phase one relay of the first pilot relay after the phase two relay has been picked up, and means for de-energizing the phase two holding coil of the first pilot relay after the phase one coil of the second pilot relay has been picked up.

35. The invention set forth in claim 23 wherein a storage delay relay is provided for controlling the status of the stepping relay, another relay which is effective when a storage device receives an entry which is to be subsequently punched, means including a last column punching control to control said relay to maintain it effective until punching is complete, means under control of said last named relay to de-energize the storage delay relay when a new amount is received for entry into storage before punching is completed out of storage.

36. The invention set forth in claim 23 wherein the calculating machine includes a storage device which receives an amount to be punched and wherein a storage delay relay is provided for controlling the status of the stepping control relay, another relay which is effective when the storage device receives an entry which is to be subsequently punched, means including a last column punching control to control said last named relay to maintain it effective until punching is complete, means under control of said last named relay to deenergize the storage delay relay when a new amount is received for entry into storage before punching is completed out of storage.

37. In a calculating punch with means for feeding record cards one by one to a punch receiving tray, means to feed the cards through the punch through a punching position and to an eject position, means to sense data from a record, a train of successively actuated relays, the first relay of the train being actuated under control of the sensing means and succeeding relays of the train being under control of a preceding relay in the train, control means which designates that a card has been moved through the punch to an eject position, and a further control means which designates that a following card has reached the punch tray, means controlled jointly by both of the foregoing last mentioned control means to hold the last relay in the train active until a first card has been sensed and moved through the tray in the punch to eject position and until a following card has been advanced to the tray in the punch.

38. The invention according to claim 37 wherein means is provided for disabling a preceding relay in the train after the succeeding relay has been actuated, whereby the first relay of the train may receive a new setup from a following record.

39. A relay control system for a calculating machine, said machine having record controlled impulse source means, a first pilot relay comprising a phase one relay and a phase two relay, said phase one relay being responsive to an impulse from said source means, said phase two relay being responsive to said phase one relay when the latter is energized, a latch tripping magnet for said phase one relay adapted when energized to interrupt supply of energizing current to said phase two relay, means to hold the phase two relay active after the interruption of the energizing current, a second pilot relay comprising a phase one relay responsive to the active condition of the phase two relay of the first pilot relay, a phase two relay responsive to the last mentioned phase one relay, a latch tripping magnet for the phase one relay of said second pilot relay adapted to interrupt current supply to the phase two relay of the second pilot and means to hold the phase two relay of the second pilot active for an indeterminate time period after such current supply is interrupted.

40. A control system for a calculating punch, said calculating punch including means to feed cards one by one to a punch tray, means to feed cards in the punch from the tray to an eject portion, means to sense record card data, a first pilot selector for controlling operations related to card feed, sensing means to set up the first pilot selector, a second pilot selector responsive to the first pilot selector and picked up under its control for controlling operations associated with punching, means effective when the second pilot selector has received its setting to release the first pilot selector for further operations pertaining to a following card, and means to retain the setting of the second pilot selector until the first card has advanced through the tray in the punch to an eject position and until the record card has reached the punch tray.

41. In a calculating machine with a products accumulator for receiving RH and LH components of partial products, means to transmit both of such components successively into said accumulator during a single accumulator entry cycle; means to store a multiplier entry and means to store a multiplicand entry, column shift means for selectively directing the component entries into various denominational orders of the accumulator, column shift control means for controlling said last mentioned means, means for testing said multiplier storage means for selectively controlling said last named means, said testing means including means for testing the digit value of said stored multiplier and to control the column shift control means in one entry cycle for tested mulitplier digits including digits 1, 2, 4, 5 and 9 and for controlling the column shift control means for two successive entry cycles for the other mulitplier digits.

42. A calculating machine including a product receiving accumulator, storage means for a multiplier and for a multiplicand, column shift means for controlling the columnar order entry into the products receiving means, testing means for testing the multiplier storage means to ascertain the order in which significant digits occur and for controlling the column shift means in accordance with such testing, means also controlled by such testing means for testing the multiplier storage means to ascertain the digit values of the multiplier in the orders in which significant digits occur, and multiplier relay means selected by said last named means including times 1, times 2, and times 5 relays which are selected singly or in combinations of 2 relays for selecting partial product components for entry into the product receiving accumulator, means for also selecting such entry or entries under control of the storage means for the multiplicand, and means controlled by the aforesaid testing means to cause both LH and RH components related to the tested multiplier digit and to the stored multiplicand to be entered into the product receiving accumulator successively in one accumulating cycle.

43. In a multiplying machine including a cyclically operable product receiving accumulator for receiving LH and RH components of partial products, means to store a multiplicand and a multiplier entry, means controlled by the multiplier storage means to test said storage means for the presence of the multiplier digits 1, 2 or 5, means controlled in accordance with such testing to cause both LH and RH partial products related to any such digit and to the stored multiplicand to be entered in the product receiving means in one accumulating cycle and means also controlled in accordance with such testing for stored digits of 3, 6, 7 and 8 to cause LH and RH components related to the tested digits to be entered by compound operations into the accumulating means in two cycles thereof, and means also controlled by said testing means in accordance with testing of stored digits 4 and 9 to cause LH and RH partial product components related to such digits to be entered by compound operations into the accumulating means comprising a single cycle and a sign change.

44. A calculating machine for performing multiplying and dividing operations including a plurality of program step relays for each of a plurality of program steps, record feeding means with means controlled thereby for setting up the first of said program step relays, a divide control means set up under control of the first step program relay which is set up, a program delay relay for preventing advance of the program from one step to the next step, a calculating relay rendered effective by said divide control relay, means to control the program delay relay from said calculate relay, a divide end relay for disabling the program delay relay when dividing is finished to permit advance of the program to a further program step, a multiplying relay under control of said latter program step, and means to control the calculate relay from said multiplying relay and for therethrough controlling the program delay relay to prevent further program advance.

45. A calculating punch with a record handling and sensing section, a punching section and a plurality of number storage units for storing number data derived from records under control of said record sensing section, and including a common calculating section controlled from said number storage units and for controlling entry of calculated results therefrom into said number storage units, means controlled by the record sensing section including means for sensing a controlling designation upon a single record, and control means controlled from said last mentioned sensing means for selectively controlling the common calculating means to cause it to perform cross algebraic addition operations, multiplying operations, dividing operations, or combinations thereof, all according to a controlling designation upon a single record, and control means controlled by the record sensing section for selectively correlating the number storage units with the record sensing section, means for selectively correlating said number storage units with the common calculating section for the selective entry of data into the calculating section, means for correlating the calculating section with the number storage units for the receipt of calculated data into selected storage units, and means for correlating the storage units with the punching section for punching data from selected storage units.

46. A calculating punch for reading records, calculating record data and for punching results upon selected records, said punch including in combination means to read calculation selection data and other data from records, number storage means to receive factor data as read by said reading means under selective control of said reading means, a common calculating section with means for controlling it from said reading means according to calculation selection data to perform diverse calculations according to algebraic addition, multiplication or division or combinations of such operations, means controlled by said reading means to selectively control which storage means are to receive numbers from a record under control of the record reading means, means to selectively control which storage means are to control the common calculating means for computations pertaining to each record, means to selectively control which storage means are to receive results from said calculating means and means to selectively control which storage means are to control punching.

47. A calculating punch to selectively perform different calculating functions including algebraic cross addition, multiplying and dividing, including in combination a common calculating section for effecting such calculating functions, a plurality of records each bearing a distinctive calculation selecting designation with certain records also bearing factor data, means to sense the records for both calculation designations and factor data, factor data number storage devices adapted to receive factor data from certain records under control of the sensing means, a calculation selecting means brought into operation under control of the calculation designation sensing means for selecting whether a cross algebraic addition or a multiplying operation or a dividing operation or combinations of such operations are to be performed by the calculating section, means brought into operation by the calculating selecting means for selecting the storage means which are to receive amounts from certain records and for also selecting which storage means are to control the calculating section, and means effective during the course of the selected calculation for transmitting values from said selected storage means to the calculating section and for also transferring calculated result amounts from said calculating section to selected storage means.

48. A calculating machine with a record reading means including in combination a number storage means set up under control of said reading means, a readout set by said number storage means, a product accumulator, multiplying means for controlling entries into the product accumulator means to test the readout for control of the product accumulator order by order to ascertain the multiplier digits for use during each cycle, means to utilize the same readout to ascertain the value of a multidenominational multiplicand and means to transmit multiplier selecting impulses and multiplicand selecting impulses through the same readout whereby a square of a number set up in a single storage means may be computed by the multiplying means and entered into the product accumulator.

49. The invention according to claim 48 wherein product receiving means are provided to receive the computed product and wherein punching means are provided controlled by the product receiving means for punching the square result on a record.

50. A program control for a calculating machine, a plurality of program step relays, means for controlling their setup in succession one after the other to successively control sequential program steps including means for controlling the setup of one relay under the control of a preceding relay which has been set up, means to automatically reset the setup of the program step relays after the last program step relay has been utilized to augment the number of available program steps, function controls for each program step and means for selectively and automatically varying the function controlled by any program step relay whereby different functions may be called into operation upon a program repetition.

51. A multiplying machine with storage devices set up according to the multiplier, a plurality of other storage devices any or all of which may be set up with entered multiplicands, multiplying devices under control of said storage devices for the multiplier and multiplicands all of said storage devices having single readouts only for controlling said multiplying devices and selectively operable multi-contact relay means cooperating with the single read-out for the multiplier and with the single read-outs for the multiplicand whereby dual read-out may be derived from the aforesaid single read-outs.

52. A multiplying machine having storage devices set up according to an entered multiplier, a plurality of accumulators any or all of which may be set up with entered multiplicands, said multiplying devices controlled by said storage devices and by said accumulators, said storage devices and said accumulators having single readouts only for controlling said multiplying devices and selectively operable multi-contact relay means cooperating with the single read-out for the multiplier and with the single read-outs for the multiplicand whereby dual read-outs may be received from the aforesaid single read-outs.

53. In a multiplying machine with storage means for an entered multiplicand and an entered multiplier, with product accumulating means and with means for entering partial product LH and RH components therein, including, in combination, selecting relays for RH and LH components of partial products including a times one, a times two, a times five, and a times ten relay, testing means controlled by the multiplier storage means and responsive to the value of the storage multiplier digit therein to select which of the aforesaid four partial product component selecting relays are to be called into operation singly or in combination for partial product component selection for effecting multiplication by any stored multiplier digit means controlled by the multiplicand storage means for further selecting entry of components into the said product accumulating means, and means controlled by the testing means to cause both LH and RH components related to the stored multiplier and multiplicand to be entered into the product accumulating means successively in a single accumulating cycle.

54. A multiplying machine with means to store an entered multiplicand and an entered multiplier, product accumulating means, means to enter partial product components therein under control of the multiplier and multiplicand storage means including, in combination, LH and RH partial product component selecting means including times one, times two, times five, and times ten multiplying relays, operable singly or in combination, minus entry determining means, compound operation determining means, sign change determining means responsive to the presence of predetermined digits in the multiplier storage means for changing from normal sign operations to reverse sign operations and vice versa, means to test the multiplier storage means and responsive to stored digits 1, 2 or 5 upon normal sign operations for selection of said relays singly to cause selected positive LH and RH partial product components related to such digits and to the stored multiplicand to be entered in the product accumulating means in one accumulating cycle, means to test the multiplier storage means and responsive to stored digits whose nines complements are 1, 2, or 5 upon reverse sign operations for selection of said relays singly and selection of said minus determining means to cause selected negative LH and RH partial product components related to any such digits and to the stored multiplicand to be entered in the product accumulating means in one accumulating cycle, means also controlled by the said testing means and responsive to stored digits 3, 6, 7, and 8 upon normal sign operations and stored digits whose nines complements are 3, 6, 7, and 8 upon reverse sign operation for selection of combinations of said relays and said minus entry determining means to cause selected positive and negative LH and RH partial product components related to any such digits and to the stored multiplicand to be entered in the product accumulating means by compound operation in two accumulating cycles; means also controlled by said testing means and responsive to stored digits 4 and 9 upon normal sign operation for selection of said relays singly and selection of said sign change determining means to cause selected positive LH and RH partial product components to be entered in the product accumulating means by compound operations in one accumulating cycle with a sign change, means also controlled by said testing means and responsive to stored digits whose nines complements are 4 and 9 upon reverse sign operation for selection of said relays singly and selection of said minus entry determining means and said sign change determining means to cause selected negative LH and RH partial product components to be entered in the product accumulating means by compound operations in one accumulating cycle with a sign change.

55. The invention according to claim 54 wherein supplemental control means are provided for terminating calculations, comprising means to test the units order of the multiplier storage means and responsive to stored digits 4 and 9 upon normal sign operations for selecting of combinations of said relays and said minus entry determining means to cause selected positive and negative LH and RH partial product components related to such digits and to the stored multiplicand to be entered in the product accumulating means by compound operations in two accumulating cycles.

56. The invention according to claim 54 wherein supplemental control means are provided for terminating calculations, comprising means to test the units order of the multiplier storage means and responsive to storage digits whose tens complements are 1, 2 and 5 upon reverse sign operations for selection of said relays singly and selection of said minus determining means to cause selected negative LH and RH partial product components related to such digits and to the stored multiplicand to be entered in the product accumulating means in one accumulating cycle, means to test the units order of the multiplier storage means and responsive to digits whose tens complements are other than 1, 2 or 5 upon reverse sign operations for selection of combinations of said relays and said minus entry determining means to cause selected positive and negative LH and RH partial product components related to any such digits and to the stored multiplicand to be entered in the product accumulating means by compound operations in two accumulating cycles.

57. In an accumulating machine of the partial products type with means to store an entered multiplicand and a multiplier and with a single product accumulator and with controlling means for correlating left hand and right hand partial product entries relating to stored multiplicand amounts and to stored multiplier digital amounts for entry into the product accumulator comprising, in combination, means controlled by the multiplier storage means according to certain digits stored therein for shifting from normal sign operations to reverse sign operations and vice versa when digital conditions so require, the aforesaid correlating means comprising means to test the multiplier storage means order-by-order to ascertain in each order the value of any significant digit stored therein, means controlled by said testing means upon determining the presence of either a 1, 2 or 5 in such order to select LH and RH partial product components related to such digits for direct entry without sign change upon normal sign operations or for direct or compound entry with or without sign change upon reverse sign operations, means controlled by such testing means upon ascertaining the presence of a significant digit other than 1, 2 or 5 to select LH and RH partial product components related to such digits for direct or compound entry with or without sign change, and means to cause the selected partial product entry or entries to be effected into the single accumulator.

58. In a partial products type of calculating machine having means to store an entered multiplicand and means to store an entered multiplier and means to accumulate a product and including in combination means to test the multiplier storage means for determining normal sign operations or reverse sign operations, partial product component selecting relays for multiplier digits 1, 2 and 5 and a times ten relay, means to test the storage means for the multiplier factor and to select either the 1, 2 or 5 partial products relay for operation when a simple multiplier digit of 1, 2 or 5 is stored in any order upon normal sign operations and when the nines complement of the stored digit is 1, 2 or 5 upon reverse sign operations, means controlled by said testing means and effective when the presence of any digit other than 1, 2 or 5 upon normal sign operations or when a nines complement of the stored multiplier digit is other than 1, 2 or 5 upon reverse sign operations is detected to make a compound selection of the aforesaid relays to utilize the same in combination to build up the required partial product components from the components available from said singe digital components.

59. In a cyclically operable calculating machine with storage means to receive a multiplier entry and a multiplicand entry and a product receiving accumulator, means to effect entry of partial product components into said accumulator, means to test the multiplier storage means for the value of the stored multiplier digit in an order thereof, partial product component selecting means including control means responsive to the value of the stored digit tested by said testing means to determine whether the tested digit or its nines complement will be utilized for partial product component selection and for single cycle entry with selected positive and negative entries, or whether the tested digit or its nines complement will initiate a compound operation which comprises successive entry cycles of partial product components with selective positive and negative entries, or a single cycle entry of partial product components with a sign change, said last named means including means to test the multiplier storage means to ascertain the digit values entered therein in different denominational orders and column shift means controlled by the multiplier storage means to direct the proper columnar order of entries of such components into the product accumulator.

60. The invention according to claim 42 wherein a supplemental times ten relay is provided for cooperation with said times one, times two and times five relays for selecting partial product components for entry into the product receiving accumulator.

61. The invention according to claim 42 wherein a supplemental minus relay is provided for cooperation with the multiplying relays and which minus relay is under control of the testing means.

62. The invention according to claim 42 wherein a supplemental sign change relay is provided, controlled by the testing means to change the entry operation from normal sign to reverse sign, and vice versa.

63. In a partial products type of calculating machine with storage means for an entered multiplicand and for an entered multiplier and with products accumulating means and means for directing partial product components related to said stored multiplicand and stored multiplier into the accumulating means, said last named means including means to selectively direct into product accumulating means positive and negative LH and RH component entries based upon the multiplicand and stored multiplier digits of either 1, 2 or 5 or stored multiplier digits whose nines complement are 1, 2 or 5, and means effective when a stored multiplier digit is other than 1, 2 or 5 or multiplier digits whose nines complement are other than 1, 2 or 5, and thus constitute a compound multiplier digit for causing compound operations to be effected, said means including means to selectively utilize positively and negatively the times one or times two or times five LH and RH components as elements of combined components which algebraically sum into an amount which corresponds to a stored compound digit times the stored multiplicand.

64. In a cyclically operable calculating machine, including an accumulator settable to represent a product, a number storing means settable to represent a multiplier, a number storing means settable to represent a multiplicand, means to test the multiplier storing means, cyclically operable means including entry effecting means and cyclically operable selecting means responsive to tested digits of 1, 2 and 5 for entering LH and RH partial product components into the accumulator in a single accumulator entry cycle, cyclically operable selecting means responsive to tested digits of 4 and 9 for entering LH and RH partial product components into the accumulator in a single entry cycle with a subsequent sign change for the next entry, and cyclically operable means including entry effecting means and cyclically operable selecting means responsive to other tested digits for entering LH and RH partial product components into the accumulator by successive accumulator entry cycles.

65. A calculating machine including an accumulating apparatus for receiving partial product components based upon a divisor and multiplier digit values, number storage means of the non-accumulative type for receiving the divisor or multiplier, means to select and direct LH and RH partial product component entries comprising times 1, times 2, times 4, times 5 and times 9 digits of the divisor or multiplier for normal sign operations and as pertain to digits whose nines complements are 1, 2, 4, 5 and 9 for reversed sign operations into said accumulating means during a single accumulating cycle thereof, means responsive to stored digits of 4 and 9 upon normal sign operations or stored digits whose nines complements are 4 and 9 upon reverse sign operations to change the sign of the entry into the accumulator which follows said single accumulating entry cycle, and means under control of said number storage means to select and direct compound entries of partial product components for multiplier digits 3, 6, 7 and 8 in two accumulative cycles in which combinational components are required.

GEORGE F. DALY.
FRANCIS V. ADAMS.

References Cited in the file of this patent
UNITED STATES PATENTS

| Number | Name | Date |
|---|---|---|
| 2,032,805 | Lake | Mar. 3, 1936 |
| 2,062,117 | Bryce et al. | Nov. 24, 1936 |
| 2,141,597 | Cunningham | Dec. 27, 1938 |
| 2,176,933 | Smith | Oct. 24, 1939 |
| 2,195,850 | Cunningham et al. | Apr. 2, 1940 |
| 2,199,537 | Campbell | May 7, 1940 |
| 2,239,524 | Johnstone et al. | Apr. 22, 1941 |
| 2,244,241 | Bryce | June 3, 1941 |
| 2,264,622 | Dickinson | Dec. 2, 1941 |
| 2,328,623 | Dickinson | Sept. 7, 1943 |
| 2,344,885 | Kozma et al. | Mar. 21, 1944 |
| 2,361,996 | Dickinson | Nov. 7, 1944 |
| 2,369,430 | Brand et al. | Feb. 13, 1945 |
| 2,390,427 | Dickinson | Dec. 4, 1945 |
| 2,405,287 | Brand et al. | Aug. 6, 1946 |
| 2,490,362 | Lake et al. | Dec. 6, 1949 |

FOREIGN PATENTS

| Number | Country | Date |
|---|---|---|
| 484,150 | Great Britain | Oct. 28, 1935 |
| 629,156 | Germany | Apr. 27, 1936 |